United States Patent
Kobayashi

(10) Patent No.: US 8,435,422 B2
(45) Date of Patent: May 7, 2013

(54) FIVE-RING COMPOUND, LIQUID CRYSTAL COMPOSITION AND LIQUID CRYSTAL DISPLAY DEVICE

(75) Inventor: Masahide Kobayashi, Minamata (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 121 days.

(21) Appl. No.: 13/073,714

(22) Filed: Mar. 28, 2011

(65) Prior Publication Data

US 2011/0240919 A1   Oct. 6, 2011

(30) Foreign Application Priority Data

Apr. 5, 2010   (JP) .................. 2010-086748

(51) Int. Cl.
- *C09K 19/00* (2006.01)
- *C09K 19/06* (2006.01)
- *C09K 19/34* (2006.01)
- *C09K 19/52* (2006.01)
- *G02F 1/1333* (2006.01)

(52) U.S. Cl.
USPC .............. 252/299.6; 252/299.01; 252/299.63; 252/299.66; 428/1.1; 428/1.2; 428/1.3; 349/1

(58) Field of Classification Search ............ 252/299.01, 252/299.6, 299.63, 299.66; 428/1.1, 1.2, 428/1.3; 349/1
See application file for complete search history.

(56) References Cited

U.S. PATENT DOCUMENTS

| 8,187,494 B2 * | 5/2012 | Kobayashi et al. ........ 252/299.6 |
| 2004/0006235 A1 | 1/2004 | Pauluth et al. |
| 2010/0328600 A1 | 12/2010 | Shimada et al. |

FOREIGN PATENT DOCUMENTS

WO   98/23564 A   6/1998

\* cited by examiner

*Primary Examiner* — Geraldina Visconti
(74) *Attorney, Agent, or Firm* — Hogan Lovells US LLP

(57) ABSTRACT

The subject is to provide a liquid crystal that has a high stability to heat, light and so forth, a wide temperature range of a nematic phase, a small viscosity, a large optical anisotropy and a suitable elastic constant $K_{33}$, and further has a large negative dielectric anisotropy and an excellent compatibility with any other liquid crystal compound. The invention provides the compound (1):

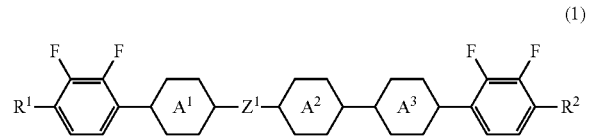

(1)

wherein, for example, $R^1$ and $R^2$ are hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; when one of the ring $A^1$, the ring $A^2$ and the ring $A^3$ is 1,4-phenylene or 2,3-difluoro-1,4-phenylene, the other two are 1,4-cyclohexylene or 1,4-cyclohexenylene; and $Z^1$ is a single bond, —$(CH_2)_2$—, —$CH_2O$—, —$OCH_2$—, —COO— or —OCO—.

15 Claims, No Drawings

FIVE-RING COMPOUND, LIQUID CRYSTAL COMPOSITION AND LIQUID CRYSTAL DISPLAY DEVICE

This nonprovisional application claims priority under 35 U.S.C. §119 (a) on Patent Application No. 2010-086748 filed in Japan on Apr. 5, 2010, the entire contents of which are hereby incorporated by reference.

BACKGROUND OF THE INVENTION

1. Field of the Invention

The invention relates to a liquid crystal compound, a liquid crystal composition and a liquid crystal display device. More specifically, the invention relates to a five-ring 2,3-difluorobenzene derivative that is liquid crystalline, a liquid crystal composition including this compound and having a nematic phase, and a liquid crystal display device containing this composition.

2. Related Art

A liquid crystal display device typified by a liquid crystal display panel, a liquid crystal display module and so forth utilizes optical anisotropy, dielectric anisotropy and so forth, which are possessed by a liquid crystal compound (in this invention the liquid crystal compound is used as a generic term for a compound having a liquid crystal phase such as a nematic phase or a smectic phase, and a compound having no liquid crystal phases but useful as a component of a liquid crystal composition). As an operating mode of this liquid crystal display device, a variety of modes are known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and a polymer sustained alignment (PSA) mode.

In the operating mode, the ECB mode, the IPS mode, the VA mode and so forth utilize homeotropic orientation of liquid crystal molecules, and it is known that in particular the IPS mode and the VA mode are able to improve a limited viewing angle that is a disadvantage of a conventional display mode such as the TN mode and the STN mode.

A variety of liquid crystal compounds in which hydrogen on the benzene ring had been replaced by fluorine have conventionally been studied as a component of a liquid crystal composition having negative dielectric anisotropy which can be used for liquid crystal display devices having these operating modes.

For example, the compounds (A) and (B), in which hydrogen on the benzene ring had been replaced by fluorine, were studied. However, these compounds did not have such a large negative dielectric anisotropy that satisfied market demand.

The compound (C) having a fluorine-substituted benzene ring was studied. However, this compound did not have such a large negative dielectric anisotropy that satisfied market demand.

The quarterphenyl compound (D) having two fluorine-substituted benzene rings was studied (see patent document No. 1). However, this compound had a quite high melting point and a poor compatibility. The compound did not have such a large negative dielectric anisotropy that satisfied market demand.

The compound (E) having an ethylene bonding group and three fluorine-substituted benzene rings was studied (see patent document No. 2). However, this compound (E) had a high melting point and a poor compatibility. The compound did not have such a large negative dielectric anisotropy that satisfied market demand.

The five-ring compound (F) having a bonding group and a fluorine-substituted benzene ring located in the middle of the molecule was studied (see patent document No. 3). However, the compound (F) did not have such a large negative dielectric anisotropy that satisfied market demand.

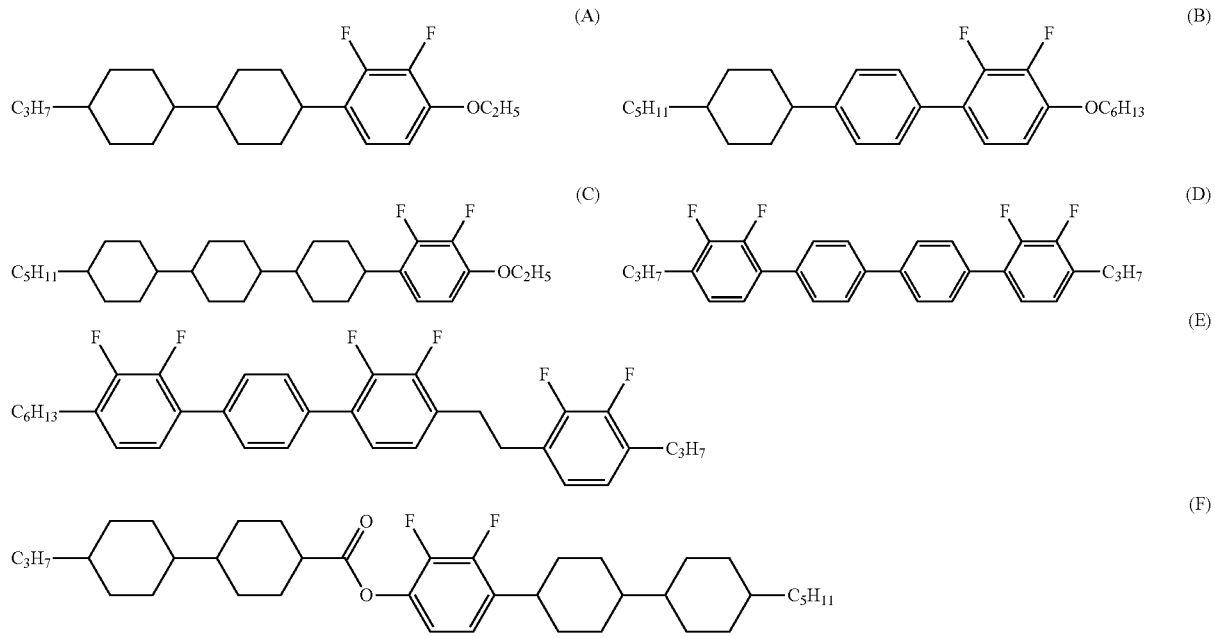

Patent document No. 1: EP 1,346,995 A1.
Patent document No. 2: WO 98/23564 A (1998).
Patent document No. 3: WO 2009/034867 A.

Accordingly, there are still subjects to be solved even in a liquid crystal display device having an operating mode such as an IPS mode or a VA mode, and, for example, an improvement of the response speed, an improvement of the contrast and a decrease of the driving voltage are expected.

A display device operated by the IPS mode or the VA mode described above mainly contains a liquid crystal composition having negative dielectric anisotropy, and a liquid crystal compound included in this liquid crystal composition is required to have the following characteristics shown in items (1) to (8), in order to improve the characteristics of the composition. That is to say:
(1) being chemically stable and physically stable,
(2) having a high clearing point (transition temperature between a liquid crystal phase and an isotropic phase),
(3) having a low minimum temperature of a liquid crystal phase (a nematic phase, a smectic phase and so forth), especially of the nematic phase,
(4) having a small viscosity,
(5) having a suitable optical anisotropy,
(6) having a large negative dielectric anisotropy,
(7) having a suitable elastic constant $K_{33}$ ($K_{33}$: a bend elastic constant), and
(8) having an excellent compatibility with other liquid crystal compounds.

A voltage holding ratio can be increased when a composition including a chemically and physically stable liquid crystal compound, as described in item (1), is used for a display device.

The temperature range of a nematic phase is wide in a composition that includes a liquid crystal compound having a high clearing point or a low minimum temperature of a liquid crystal phase as described in items (2) and (3), and thus the device can be used in a wide temperature range.

When a composition that includes a compound having a small viscosity as described in item (4) and a compound having a large elastic constant $K_{33}$ as described in item (7) is used for a display device, the response speed can be improved. When a composition that includes a compound having a suitable optical anisotropy as described in item (5) is used for a display device, an improvement of the contrast in the display device can be expected. A device requires compositions having a small to large optical anisotropy, depending on the design of the device. Recently, a method for improving the response speed by means of a decreased cell thickness has been studied, whereby a liquid crystal composition having a large optical anisotropy is also required.

When a liquid crystal compound has a large negative dielectric anisotropy, the threshold voltage of the liquid crystal composition including this compound can be decreased. Hence, the driving voltage of a display device can be decreased and the electric power consumption can also be decreased, when the display device contains a composition that includes a compound having a large dielectric anisotropy as described in item (6). The driving voltage of a display device can be decreased and the electric power consumption can also be decreased, when a display device contains a composition that includes a compound having a suitable elastic constant $K_{33}$ as described in item (7).

A liquid crystal compound is generally used in the form of a composition prepared by mixing it with many other liquid crystal compounds in order to exhibit characteristics that are difficult to be attained by a single compound. Accordingly, it is desirable that a liquid crystal compound used for a display device has an excellent compatibility with other liquid crystal compounds and so forth, as described in item (7). Since the display device may also be used in a wide temperature range including a lower temperature than the freezing point, the compound that exhibits an excellent compatibility even at a low temperature may be desirable.

As a result of earnest studies in consideration of these subjects, the inventors have found that a five-ring liquid crystal compound having two benzene rings at each end, in which hydrogen at the 2- and 3-positions is replaced by fluorine, has a high stability to heat, light and so forth, a wide temperature range of a nematic phase, a small viscosity, a large optical anisotropy and a suitable elastic constant $K_{33}$, and further has a large negative dielectric anisotropy and an excellent compatibility with other liquid crystal compounds. The inventors have also found that a liquid crystal composition that includes the compound has a high stability to heat, light and so forth, a small viscosity, a large optical anisotropy, a suitable elastic constant $K_{33}$, a suitable and large dielectric anisotropy, a low threshold voltage, a high maximum temperature of a nematic phase and a low minimum temperature of a nematic phase. The inventors have further found that a liquid crystal display device that contains the composition has a short response time, low electric power consumption, a low driving voltage, a large contrast ratio and a wide temperature range in which the device can be used. Thus, the inventors have completed the invention.

SUMMARY OF THE INVENTION

The invention concerns a compound represented by formula (1), a liquid crystal composition that includes the compound and a liquid crystal display device that contains the composition:

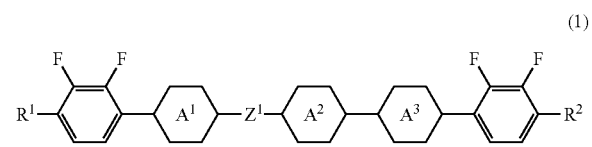

(1)

in formula (1), $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^1$, the ring $A^2$ and the ring $A^3$ are each independently 1,4-cyclohexylene, 1,4-cyclohexenylene, 1,4-phenylene or 2,3-difluoro-1,4-phenylene; when one of the ring $A^1$, the ring $A^2$ and the ring $A^3$ is 1,4-phenylene or 2,3-difluoro-1,4-phenylene, the other two are 1,4-cyclohexylene or 1,4-cyclohexenylene; and $Z^1$ is a single bond, —(CH$_2$)$_2$—, —CH$_2$O—, —OCH$_2$—, —COO— or —OCO—.

DETAILED DESCRIPTION OF THE INVENTION

One of the advantages of the invention is to provide a liquid crystal compound having a high stability to heat, light and so forth, a wide temperature range of a nematic phase, a small viscosity, a large optical anisotropy and a suitable elastic constant $K_{33}$, and further having a large negative dielectric anisotropy and an excellent compatibility with other liquid crystal compounds.

Another advantage of the invention is to provide a liquid crystal composition that includes the compound and has a high stability to heat, light and so forth, a small viscosity, a large optical anisotropy, a large negative dielectric anisotropy, a suitable elastic constant $K_{33}$, a low threshold voltage, a high maximum temperature of a nematic phase (phase-transition temperature between a nematic phase-an isotropic phase) and a low minimum temperature of a nematic phase.

A further advantage of the invention is to provide a liquid crystal display device that contains the composition and has a short response time, low electric power consumption, a low driving voltage, a large contrast and a wide temperature range in which the device can be used.

The invention includes the items described in the following items 1 to 15.

Item 1. A compound represented by formula (1):

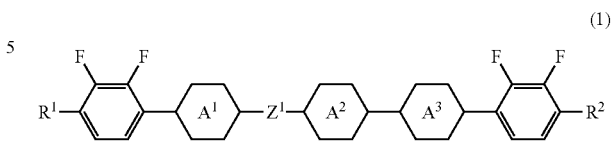

in formula (1), $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^1$, the ring $A^2$ and the ring $A^3$ are each independently 1,4-cyclohexylene, 1,4-cyclohexenylene, 1,4-phenylene or 2,3-difluoro-1,4-phenylene; when one of the ring $A^1$, the ring $A^2$ and the ring $A^3$ is 1,4-phenylene or 2,3-difluoro-1,4-phenylene, the other two are 1,4-cyclohexylene or 1,4-cyclohexenylene; and $Z^1$ is a single bond, —(CH$_2$)$_2$—, —CH$_2$O—, —OCH$_2$—, —COO— or —OCO—.

Item 2. The compound according to item 1, wherein the compound is represented by any one of formulas (1-1) to (1-3):

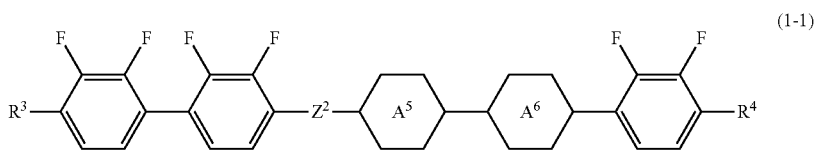

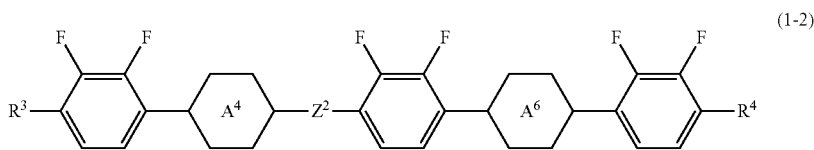

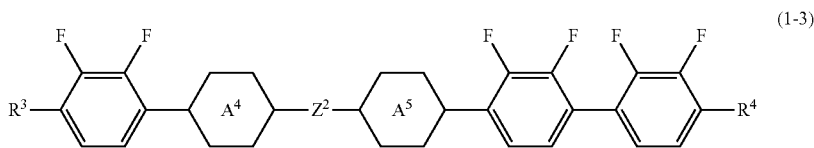

In formulas (1-1) to (1-3), $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^4$, the ring $A^5$ and the ring $A^6$ are each independently 1,4-cyclohexylene or 1,4-cyclohexenylene; and $Z^2$ is a single bond, —(CH$_2$)$_2$—, —CH$_2$O—, —OCH$_2$—, —COO— or —OCO—.

Item 3. The compound according to item 1, wherein the compound is represented by any one of formulas (1-1-1) to (1-3-1):

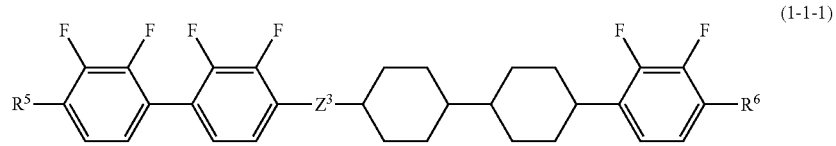

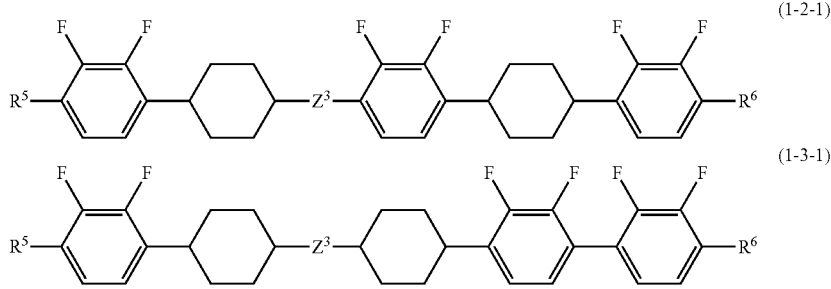

In formulas (1-1-1) to (1-3-1), $R^5$ and $R^6$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^3$ is a single bond, —(CH$_2$)$_2$—, —CH$_2$O—, —OCH$_2$—, —COO— or —OCO—.

Item 4. The compound according to item 1, wherein the compound is represented by formula (1-4):

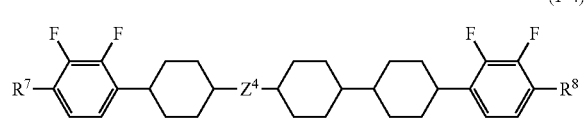

In formula (1-4), $R^7$ and $R^8$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^4$ is a single bond, —(CH$_2$)$_2$—, —CH$_2$O—, —OCH$_2$—, —COO— or —OCO—.

Item 5. The compound according to item 3, wherein $Z^3$ is —(CH$_2$)$_2$— in formulas (1-1-1) to (1-3-1).

Item 6. The compound according to item 3, wherein $Z^3$ is —CH$_2$O— or —OCH$_2$— in formulas (1-1-1) to (1-3-1).

Item 7. The compound according to item 3, wherein $Z^3$ is —COO— or —OCO— in formulas (1-1-1) to (1-3-1).

Item 8. The compound according to item 4, wherein $Z^4$ is —COO— or —OCO— in formula (1-4).

Item 9. A liquid crystal composition that includes at least one compound according to any one of items 1 to 8

Item 10. The liquid crystal composition according item 9, further including at least one compound selected from the group of compounds represented by formulas (2), (3), (4), (5), (6) and (7):

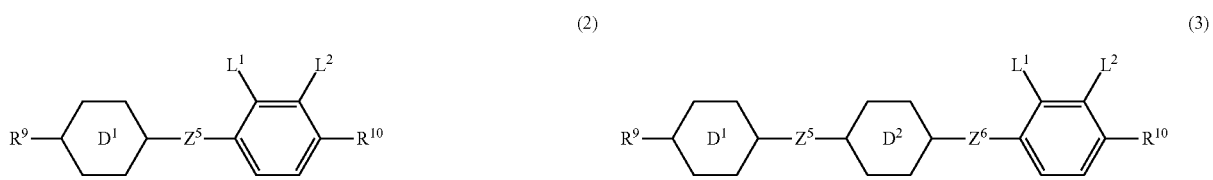

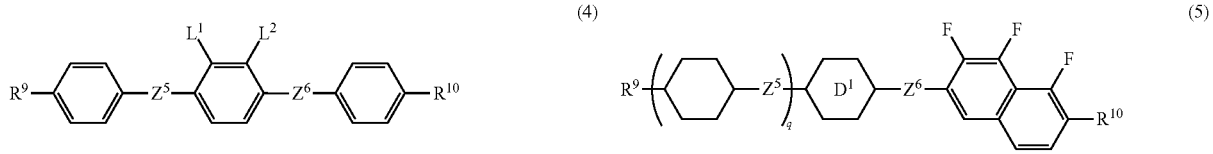

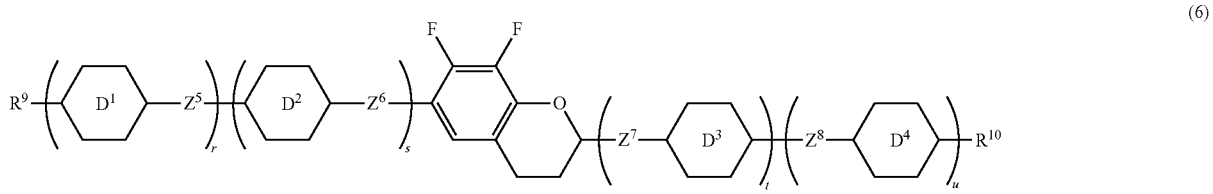

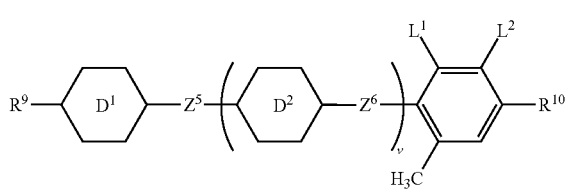

In formulas (2) to (7), $R^9$ and $R^{10}$ are each independently alkyl having 1 to 10 carbons or alkenyl having 2 to 10 carbons, and in the alkyl and alkenyl, arbitrary hydrogen may be replaced by fluorine and arbitrary —$CH_2$— may be replaced by —O—; the ring $D^1$, the ring $D^2$, the ring $D^3$ and the ring $D^4$ are each independently 1,4-cyclohexylene, 1,4-cyclohexenylene, 1,4-phenylene in which arbitrary hydrogen may be replaced by fluorine, tetrahydropyran-2,5-diyl or decahydro-2,6-naphthalene; $Z^5$, $Z^6$, $Z^7$ and $Z^8$ are each independently —$(CH_2)_2$—, —COO—, —$CH_2O$—, —$OCF_2$—, —$OCF_2(CH_2)_2$— or a single bond; $L^1$ and $L^2$ are each independently fluorine or chlorine; and q, r, s, t, u and v are each independently 0 or 1, and the sum of r, s, t and u is 1 or 2.

Item 11. The liquid crystal composition according item 9, further including at least one compound selected from the group of compounds represented by formulas (8), (9) and (10).

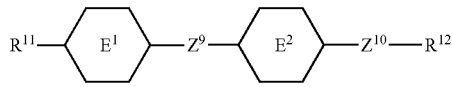

(8)

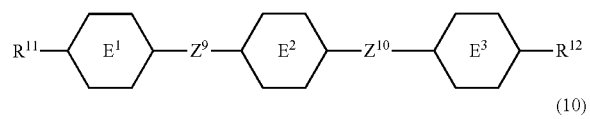

(9)

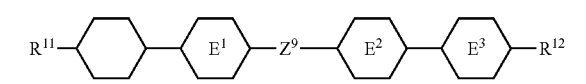

(10)

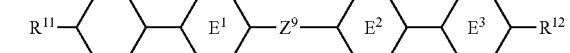

In formulas (8) to (10), $R^{11}$ and $R^{12}$ are each independently alkyl having 1 to 10 carbons or alkenyl having 2 to 10 carbons, and in the alkyl and alkenyl, arbitrary —$CH_2$— may be replaced by —O—; the ring $E^1$, the ring $E^2$ and the ring $E^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^9$ and $Z^{10}$ are each independently —C≡C—, —COO—, —$(CH_2)_2$—, —CH=CH— or a single bond.

Item 12. The liquid crystal composition according item 10, further including at least one compound selected from the group of compounds represented by formulas (8), (9) and (10) described in item 11.

Item 13. The liquid crystal composition according to any one of items 9 to 12, further including at least one optically active compound and/or at least one polymerizable compound.

Item 14. The liquid crystal composition according to any one of items 9 to 13, further including at least one antioxidant and/or at least one ultraviolet light absorbent.

Item 15. A liquid crystal display device containing the liquid crystal composition according to any one of items 9 to 14.

Usage of the terms in this specification is as follows. A liquid crystal compound is a generic term for a compound having a liquid crystal phase such as a nematic phase or a smectic phase, and also for a compound having no liquid crystal phases but useful as a component for a liquid crystal composition. The terms, a liquid crystal compound, a liquid crystal composition and a liquid crystal display device may be abbreviated to a compound, a composition and a device, respectively. A liquid crystal display device is a generic term for a liquid crystal display panel and a liquid crystal display module. A maximum temperature of a nematic phase is the phase transition temperature between a nematic phase and an isotropic phase, and may simply be abbreviated to a clearing point or the maximum temperature. A minimum temperature of the nematic phase may simply be abbreviated to the minimum temperature. The compound represented by formula (1) may be abbreviated to the compound (1). This abbreviation may apply to the compound represented by formula (2) or the like. In formula (1) to formula (10), the symbols D, E or the like surrounded by a hexagonal shape correspond to the ring D, the ring E or the like, respectively. The amount of a compound that is expressed as a percentage means a weight percentage (% by weight) based on the total weight of the composition. A plurality of a symbol such as $A^1$, $Y^1$, B or the like were used in the same or different formulas, where these symbols may mean the same or different groups.

"Arbitrary" is used not only in cases where the position is arbitrary but also in cases where the number is arbitrary. However, it is not used in cases where the number is 0 (zero). The expression "arbitrary A may be replaced by B, C or D" includes cases where arbitrary A is replaced by B, and arbitrary A is replaced by C, and arbitrary A is replaced by D, and also cases where a plurality of A are replaced by at least two of B, C and/or D. For example, the expression "alkyl in which arbitrary —$CH_2$— may be replaced by —O— or —CH=CH—" includes alkyl, alkenyl, alkoxy, alkoxyalkyl, alkoxyalkenyl and alkenyloxyalkyl. Incidentally, it is undesirable in the invention that two successive —$CH_2$— are replaced by —O— to give —O—O—. It is also undesirable that —$CH_2$— in the methyl moiety of alkyl is replaced by —O— to give —O—H. The invention will be further explained below.

The liquid crystal compound of the invention had a high stability to heat, light and so forth, a wide temperature range of a nematic phase, a small viscosity, a large optical anisotropy and a suitable elastic constant $K_{33}$ ($K_{33}$: bend elastic constant), and further had a large negative dielectric anisotropy and an excellent compatibility with other liquid crystal compounds. The liquid crystal compound of the invention was quite excellent in view of the fact that the maximum temperature of a nematic phase had a tendency not to decrease, and moreover the optical anisotropy had a tendency to increase without an increase of the viscosity.

The liquid crystal composition of the invention had a small viscosity, a large optical anisotropy, a suitable elastic constant $K_{33}$, a large negative dielectric anisotropy and a low threshold voltage, and further had a high maximum temperature of a nematic phase and a low minimum temperature of a nematic phase. In particular, the liquid crystal composition of the invention was effective in a device that required a large optical anisotropy, since it had a large optical anisotropy.

The liquid crystal display device of the invention was characterized by including this liquid crystal composition, and had a short response time, low electric power consumption, a small driving voltage, a large contrast ratio, a wide temperature range in which the device could be used, and thus it could be used preferably as a liquid crystal display device having a display mode such as an IPS mode, a VA mode and a PSA mode.

The invention will be explained in greater detail below. In the following description, the amount of a compound that is expressed in a percentage means the weight percentage (% by weight) based on the total weight of the composition unless otherwise noted.

The Compound (1)

The compound of the invention has a structure represented by formula (1). Hereinafter the compound may be referred to as "the compound (1)."

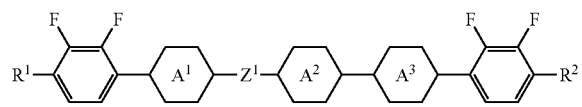

(1)

In formula (1), $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons.

The ring $A^1$, the ring $A^2$ and the ring $A^3$ are each independently 1,4-cyclohexylene, 1,4-cyclohexenylene, 1,4-phenylene or 2,3-difluoro-1,4-phenylene. When one of the ring $A^1$, the ring $A^2$ and the ring $A^3$ is 1,4-phenylene or 2,3-difluoro-1,4-phenylene, the other two are 1,4-cyclohexylene or 1,4-cyclohexenylene.

1,4-Cyclohexylene has two configurations of a cis configuration and a trans configuration with regard to two hydrogens at the 1- and 4-positions. The cis configuration is preferable in view of an increase of a clearing point.

$Z^1$ is a single bond, —$(CH_2)_2$—, —$CH_2O$—, —$OCH_2$—, —COO— or —OCO—.

The compound (1) has two 1,4-phenylene, in which hydrogen at the 2- and 3- positions is replaced by fluorine, at each end of the molecule. It shows a suitable optical anisotropy, a suitable elastic constant $K_{33}$, a large negative dielectric anisotropy and an excellent compatibility with other liquid crystal compounds, by the effect of such a structure. It is particularly excellent in view of the fact that the maximum temperature is not low and the negative dielectric anisotropy is large.

In formula (1), $R^1$ and $R^2$ are hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons, and their examples include $CH_3(CH_2)_3$—, —$CH_2$—, $CH_3(CH_2)_2O$—, $CH_3$—O—$(CH_2)_2$—, $CH_3$—O—$CH_2$—O—, $H_2C$=CH—$(CH_2)_2$—, $CH_3$—CH=CH—$CH_2$— or $CH_3$—CH=CH—O—.

However, a group having adjacent oxygens, such as $CH_3$—O—O—$CH_2$—, or a group having adjacent double bond moieties, such as $CH_3$—CH=CH—CH=CH—, are undesirable in consideration of the stability of the compound.

It is desirable that the chain of carbon-carbon bonds in these groups is straight. When the chain of carbon-carbon bonds is straight, the temperature ranges of liquid crystal phases can be increased and the viscosity can be decreased. When either $R^1$ or $R^2$ is an optically active group, the compound is useful as a chiral dopant, and a reverse twisted domain which will occur in a liquid crystal display device can be prevented by the addition of the compound to a liquid crystal composition.

$R^1$ and $R^2$ are preferably alkyl, alkoxy, alkoxyalkyl and alkenyl, and more preferably alkyl, alkoxy and alkenyl.

When $R^1$ and $R^2$ are alkyl, alkoxy or alkenyl, the temperature range of a liquid crystal phase in the liquid crystal compound can be increased.

A desirable configuration of —CH=CH— in the alkenyl depends on the position of the double bond.

A trans-configuration is desirable for alkenyl having a double bond in an odd-numbered position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ or —C$_2$H$_4$CH=CHC$_2$H$_5$.

On the other hand, a cis-configuration is desirable for alkenyl having a double bond at an even-numbered position, such as —CH$_2$CH=CHCH$_3$, —CH$_2$CH=CHC$_2$H$_5$ and —CH$_2$CH=CHC$_3$H$_7$. An alkenyl compound possessing a desirable configuration described above has a wide temperature range of a liquid crystal phase, a large elastic constant ratio $K_{33}/K_{11}$ ($K_{33}$: bend elastic constant, $K_{11}$: spray elastic constant), and a decreased viscosity. When this liquid crystal compound is added to a liquid crystal composition, the maximum temperature ($T_{NI}$) of a nematic phase can be increased.

Specific examples of the alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$ and —$C_{10}H_{21}$;

specific examples of the alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$ and —$OC_9H_{19}$;

specific examples of the alkoxyalkyl include —$CH_2OCH_3$, —$CH_2OC_2H_5$, —$CH_2OC_3H_7$, —$(CH_2)_2OCH_3$, —$(CH_2)_2OC_2H_5$, —$(CH_2)_2OC_3H_7$, —$(CH_2)_3OCH_3$, —$(CH_2)_4OCH_3$ and —$(CH_2)_5OCH_3$;

specific examples of the alkenyl include —CH=CH$_2$, —CH=CHCH$_3$, —CH$_2$CH=CH$_2$, —CH=CHC$_2$H$_5$, —CH$_2$CH=CHCH$_3$, —$(CH_2)_2$CH=CH$_2$, —CH=CHC$_3$H$_7$, —CH$_2$CH=CHC$_2$H$_5$, —$(CH_2)_2$CH=CHCH$_3$ and —$(CH_2)_3$CH=CH$_2$; and specific examples of the alkenyloxy include —OCH$_2$CH=CH$_2$, —OCH$_2$CH=CHCH$_3$ and —OCH$_2$CH=CHC$_2$H$_5$.

Accordingly, among the specific examples of $R^1$ and $R^2$, —CH$_3$, —C$_2$H$_5$, —C$_3$H$_7$, —C$_4$H$_9$, —C$_5$H$_{11}$, —OCH$_3$, —OC$_2$H$_5$, —OC$_3$H$_7$, —OC$_4$H$_9$, —OC$_5$H$_{11}$, —CH$_2$OCH$_3$, —$(CH_2)_2$OCH$_3$, —$(CH_2)_3$OCH$_3$, —CH$_2$CH=CH$_2$, —CH$_2$CH=CHCH$_3$, —$(CH_2)_2$CH=CH$_2$, —CH$_2$CH=CHC$_2$H$_5$, —$(CH_2)_2$CH=CHCH$_3$, —$(CH_2)_3$CH=CH$_2$, —$(CH_2)_3$CH=CHCH$_3$, —$(CH_2)_3$CH=CHC$_2$H$_5$, —$(CH_2)_3$CH=CHC$_3$H$_7$, —OCH$_2$CH=CH$_2$, —OCH$_2$CH=CHCH$_3$ or —OCH$_2$CH=CHC$_2$H$_5$ is desirable, and —CH$_3$, —C$_2$H$_5$, —C$_3$H$_7$, —OCH$_3$, —OC$_2$H$_5$, —OC$_3$H$_7$, —OC$_4$H$_9$, —$(CH_2)_2$CH=CH$_2$, —$(CH_2)_2$CH=CHCH$_3$ or $(CH_2)_2$CH=CHC$_3$H$_7$ is more desirable.

The ring $A^1$, the ring $A^2$ and the ring $A^3$ are 1,4-cyclohexylene, 1,4-cyclohexenylene, 1,4-phenylene or 2,3-difluoro-1,4-phenylene.

In these rings, 1,4-cyclohexylene and 2,3-difluoro-1,4-phenylene are more desirable, and a combination of 2,3-difluoro-1,4-phenylene with two of 1,4-cyclohexylene is most desirable.

In particular, the viscosity of a liquid crystal compound is decreased when at least one of these rings is 1,4-cyclohexylene, and when this compound is added to a liquid crystal composition, the maximum temperature ($T_{NI}$) of a nematic phase is increased.

When at least one of these rings is 2,3-difluoro-1,4-phenylene, the dielectric anisotropy of a liquid crystal compound is increased negatively, and when this compound is added to a liquid crystal composition, the optical anisotropy is increased.

$Z^1$ is a single bond, —$CH_2CH_2$—, —$CH_2O$—, —$OCH_2$—, —COO— or —OCO—.

It is desirable that $Z^1$ is a single bond or —$CH_2CH_2$—, since the viscosity of the compound is decreased. It is more desirable that $Z^1$ is —COO— or —OCO—, since the maximum temperature of a nematic phase ($T_{NI}$) of the compound is increased. It is further desirable that $Z^1$ is —$CH_2O$— or —$OCH_2$—, since the dielectric anisotropy of the compound is increased negatively.

A single bond, —$CH_2CH_2$—, —$CH_2O$— or $OCH_2$— is desirable, and a single bond or —$CH_2CH_2$— is more desirable in consideration of the stability of the compound. When one of $Z^1$, $Z^2$ and $Z^3$ is —$CH_2CH_2$—, —$CH$=$CH$—, —$C$≡$C$—, —$CH_2O$—, —$OCH_2$—, —$COO$— or —$OCO$—, the others are preferably a single bond in consideration of a high maximum temperature of a nematic phase in the compound. All of $Z^1$, $Z^2$ and $Z^3$ are more preferably a single bond.

Incidentally, the compound (1) may also contain isotopes such as $^2H$ (deuterium) and $^{13}C$ in a larger amount than the amount of the natural abundance, since such isotopes do not make major differences in physical properties of the compound.

In this compound (1), it is possible to adjust physical properties, such as dielectric anisotropy, to desired values by suitably selecting $R^1$, $R^2$, the ring $A^1$, the ring $A^2$, the ring $A^3$ and $Z^1$.

Examples of desirable compounds among compounds represented by the compound (1) include the compounds (1-1) to (1-4).

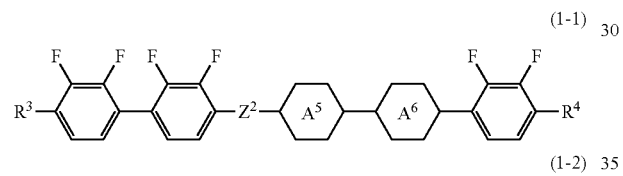
(1-1)

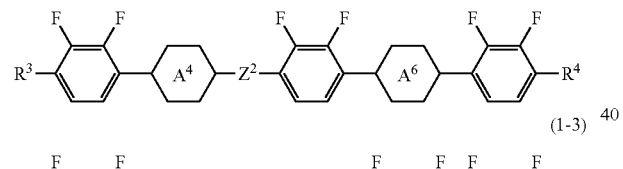
(1-2)

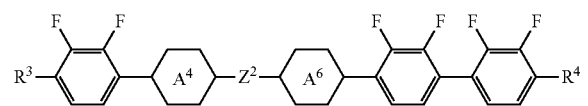
(1-3)

In formulas (1-1) to (1-3), $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^4$, the ring $A^5$ and the ring $A^6$ are 1,4-cyclohexylene or 1,4-cyclohexenylene; and $Z^4$ is a single bond, —$(CH_2)_2$—, —$CH_2O$—, —$OCH_2$—, —$COO$— or —$OCO$—.

The liquid crystal compound represented by the compounds (1-1) to (1-3) has a 1,4-cyclohexylene group or a 1,4-cyclohexenylene group in addition to three of a fluorine-substituted benzene ring, and has asymmetric positioning of bonding groups in the molecule. Thus, the compound is more desirable in view of a high stability to heat or light, a lower minimum temperature of a liquid crystal phase, a higher maximum temperature of a nematic phase, a large optical anisotropy and a suitable elastic constant $K_{33}$.

Examples of desirable compounds among compounds represented by the compounds (1-1) to (1-3) include the compounds (1-1-1) to (1-3-1).

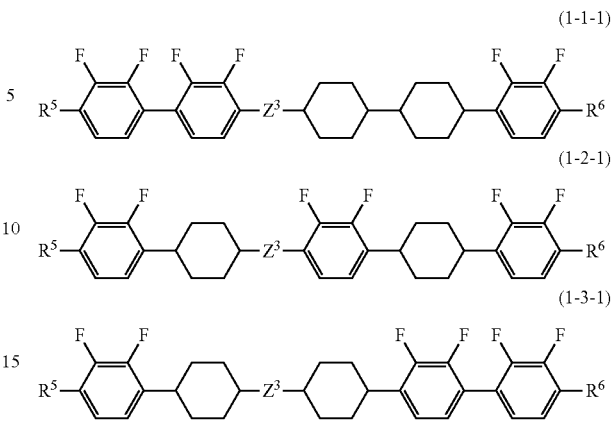
(1-1-1)
(1-2-1)
(1-3-1)

In formulas (1-1-1) to (1-3-1), $R^5$ and $R^6$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^3$ is independently a single bond, —$(CH_2)_2$—, —$CH_2O$—, —$OCH_2$—, —$COO$— or —$OCO$—.

The liquid crystal compound represented by the compounds (1-1-1) to (1-3-1) has two of a 1,4-cyclohexylene group in addition to three of a fluorine-substituted benzene ring, and has asymmetric positioning of bonding groups in the molecule. Thus, the compound is more desirable in view of a high stability to heat or light, a lower minimum temperature of a liquid crystal phase, a higher maximum temperature of a nematic phase, a suitable optical anisotropy, a suitable elastic constant $K_{33}$ and a small viscosity.

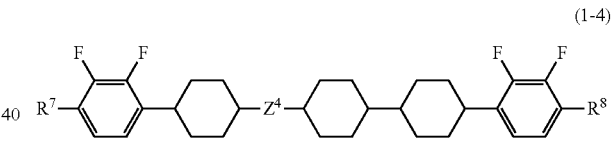
(1-4)

In formula (1-4), $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and $Z^4$ are independently a single bond, —$(CH_2)_2$—, —$CH_2O$—, —$OCH_2$—, —$COO$— or —$OCO$—.

The liquid crystal compound represented by the compound (1-4) has three of a 1,4-cyclohexenylene group in addition of two of a fluorine-substituted benzene ring, and has asymmetric positioning of bonding groups in the molecule. Thus, the compound is more desirable in view of a high stability to heat or light, a lower minimum temperature of a liquid crystal phase, a higher maximum temperature of a nematic phase, a suitable optical anisotropy, a suitable elastic constant $K_{33}$ and a small viscosity.

The liquid crystal compound represented by the compounds (1-1) to (1-4) has a large negative dielectric anisotropy, a high stability to heat or light, a wide temperature range of a nematic phase, a suitable optical anisotropy and a suitable elastic constant $K_{33}$. Among these, a compound where $Z^3$ or $Z^4$ is a single bond is desirable in view of a lower minimum temperature of a liquid crystal phase and a smaller viscosity. A compound where $Z^1$ is —$COO$— or —$COO$— is more desirable in view of a high maximum temperature of a nematic phase. A compound where $Z^3$ or $Z^4$ is —$CH_2CH_2$— is more desirable in view of a lower minimum temperature of a liquid crystal phase, a higher compatibility and a smaller viscosity. Moreover, a compound where $Z^3$ or $Z^4$ is —$CH_2O$— or —$OCH_2$— is most desirable in view of a larger negative dielectric anisotropy and a smaller viscosity.

When a liquid crystal compound has a structure represented by formulas (1-1) to (1-4), it has a large negative dielectric anisotropy and an excellent compatibility with the other liquid crystal compounds. It also has a high stability to heat, light and so forth, a small viscosity, a large optical anisotropy and a suitable elastic constant $K_{33}$. A liquid crystal composition including the liquid crystal compound (1) is stable under the conditions in which a liquid crystal display device is usually used, and this compound does not deposit its crystals (or its smectic phase) even when the composition is kept in storage at a low temperature.

Accordingly, the liquid crystal compound (1) is suitably applied to a liquid crystal composition used for a liquid crystal display device having a display mode such as IPS, VA and PSA.

Synthesis of the Compound (1)

The liquid crystal compound (1) can be synthesized by a suitable combination of techniques in synthetic organic chemistry. Methods of introducing objective terminal groups, rings and bonding groups into starting materials are described in books such as Organic Syntheses (John Wiley & Sons, Inc), Organic Reactions (John Wiley & Sons, Inc), Comprehensive Organic Synthesis (Pergamon Press) and New Experimental Chemistry Course (Shin Jikken Kagaku Kouza, in Japanese) (Maruzen Co., Ltd.).

(1) Formation of the Bonding Group $Z^1$

One example of methods for forming the bonding group $Z^1$ is shown. Schemes for forming the bonding groups are illustrated as follows. In the schemes, $MSG^1$ or $MSG^2$ is a monovalent organic group. A plurality of the $MSG^1$ (or $MSG^2$) used in the schemes may be the same or different organic groups. The compounds (1A) to (1D) correspond to the compound (1).

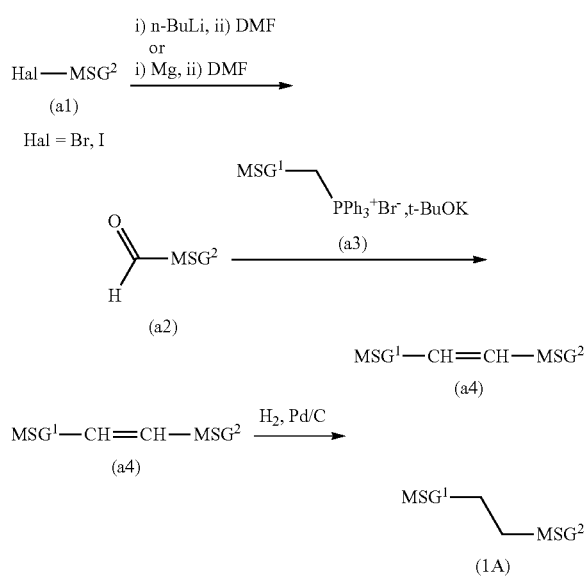

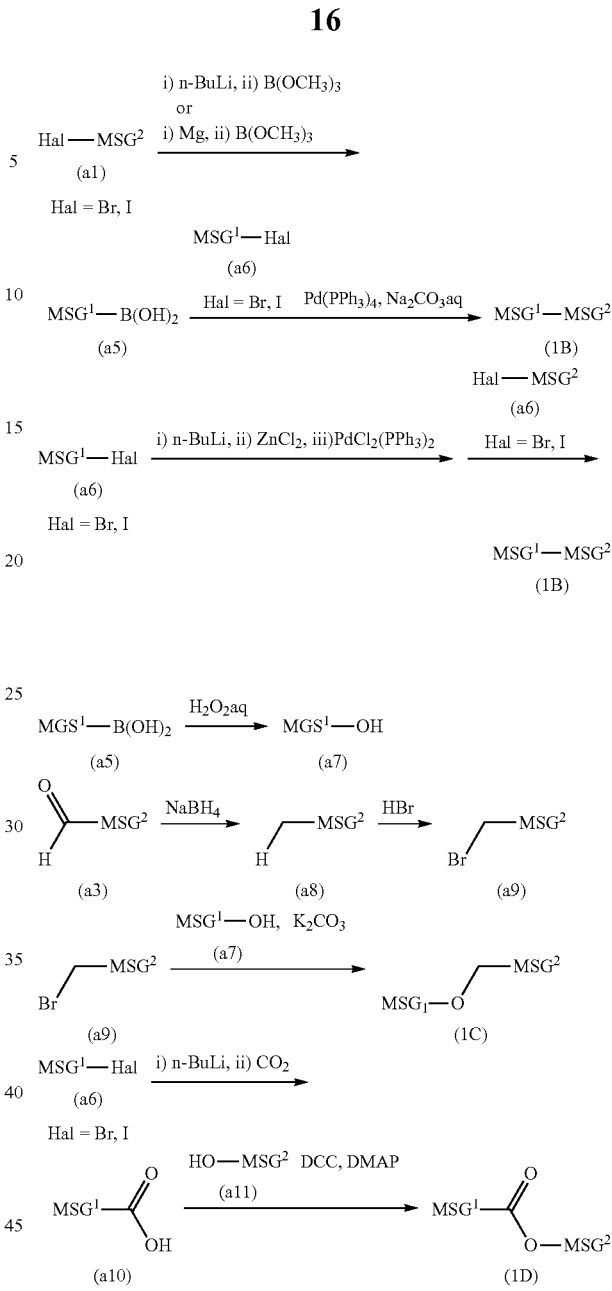

(2) Formation of —$CH_2CH_2$—

The organohalogen compound (a1) is allowed to react with butyllithium or magnesium, and the resulting intermediate is allowed to react with a formamide such as N,N-dimethylformamide (DMF) to give the aldehyde derivative (a2). Then, the resulting aldehyde (a2) is allowed to react with a phosphorus ylide that is formed by the treatment of the phosphonium salt (a3) with a base such as potassium t-butoxide to give the compound (a4) having a double bond. The compound (1A) is prepared by the hydrogenation of the compound (a4) in the presence of a catalyst such as palladium on carbon (Pd/C).

(3) Formation of a Single Bond

A Grignard reagent or a lithium salt is prepared by the reaction of the organohalogen compound (a1) with magnesium or butyllithium. The dihydroxyborane derivative (a5) is prepared by the reaction of the Grignard reagent or the lithium salt thus prepared with a boric acid ester such as trimethyl borate, and then by hydrolysis of the product in the presence of an acid such as hydrochloric acid. The compound (1B) is prepared by the reaction of the dihydroxyborane derivative (a5) with the organohalogen compound (a6) in the presence of a catalyst, for example, of an aqueous carbonate solution and tetrakis(triphenylphosphine)palladium [Pd(PPh$_3$)$_4$].

The compound (1B) is also prepared by the reaction of the organohalogen compound (a6) having a monovalent organic group MSG$^1$ with butyl lithium and further with zinc chloride, and then by the reaction of the resulting compound with the compound (a1) in the presence, for example, of a bistriphenylphosphinedichloropalladium[Pd(PPh$_3$)$_2$Cl$_2$] catalyst.

(4) Formation of —CH$_2$O— or —OCH$_2$—

The oxidation of the dihydroxyborane derivative (a5) with an oxidizing agent such as hydrogen peroxide gives the alcohol derivative (a7). Separately, the reduction of the aldehyde derivative (a3) with a reducing agent such as sodium borohydride gives the alcohol derivative (a8). The halogenation of the resulting alcohol derivative (a7) with hydrobromic acid or the like gives the organohalogen compound (a9). The compound (1C) is prepared by the reaction of the alcohol derivative (a7) formed initially with the organohalogen compound (a9) in the presence of potassium carbonate or the like.

(5) Formation of —COO— or —OCO—

The compound (a6) is allowed to react with n-butyllithium and then with carbon dioxide, giving the carboxylic acid derivative (a10). The compound (1D) having —COO— is prepared by the dehydration of the carboxylic acid derivative (a10) and the phenol derivative (a11) in the presence of DDC (1,3-dicyclohexylcarbodiimide) and DMAP (4-dimethylaminopyridine). The compounds having —OCO— is also prepared according to this method.

(6) Formation of the Ring A$^1$, A$^2$ or A$^3$

Starting materials are commercially available or methods for their syntheses are well known with regard to rings, such as trans-1,4-cyclohexylene, cyclohexene-1,4-diyl, 1,4-phenylene or 2,3-difluoro-1,4-phenylene.

(7) Synthetic Example of the Compound (1)

Synthetic examples for the compound (1), that is to say, the compound represented by formula (1) are shown below.

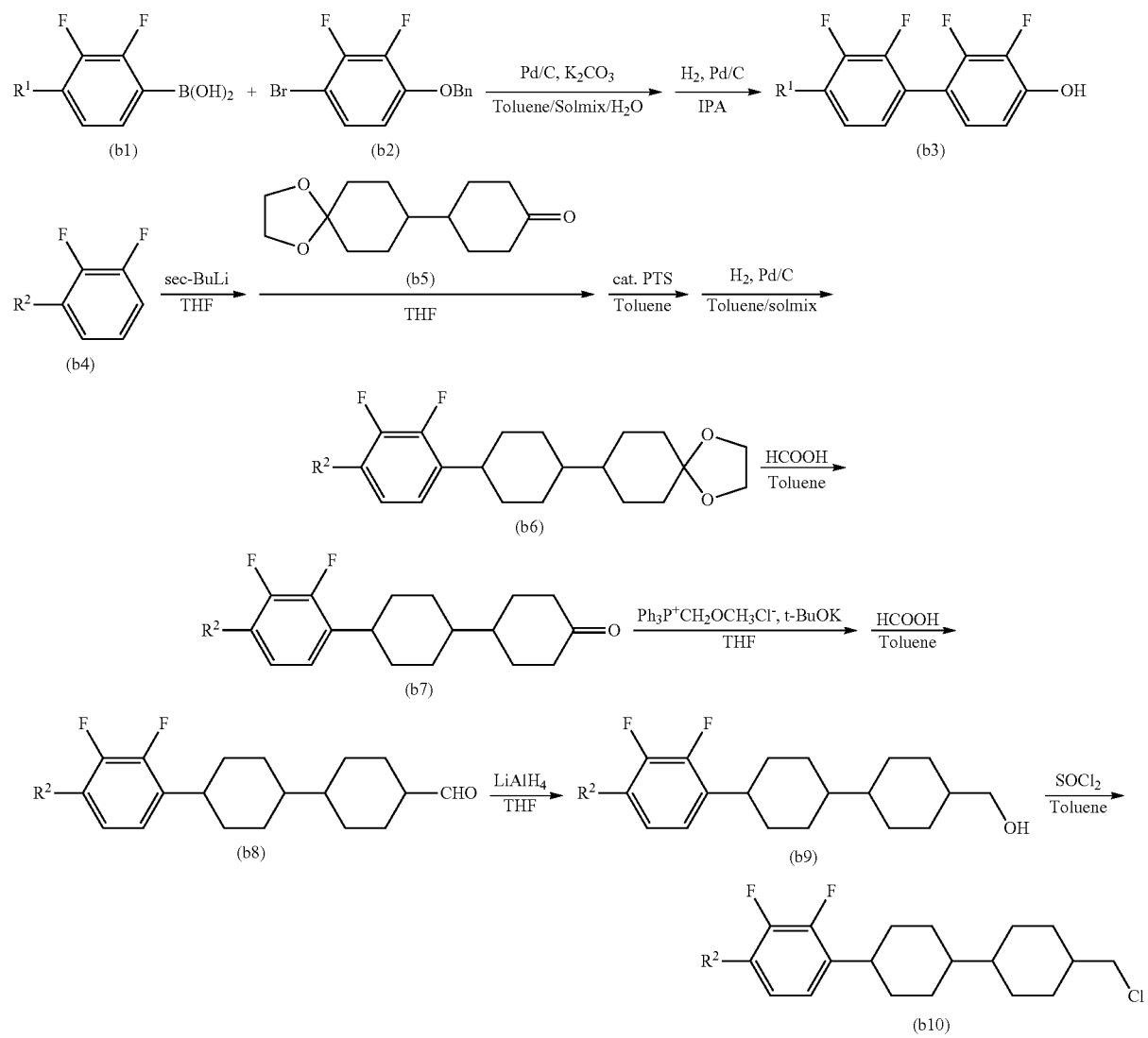

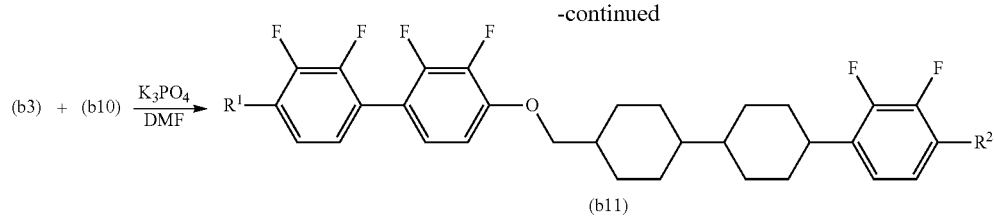

First, the difluorophenylboronic acid (b1) is allowed to react with the bromodifluorobenzene derivative (b2) in the presence of a catalyst such as Pd/C and potassium carbonate, and the hydrogenation of the product in the presence of a catalyst such as Pd/C gives the compound (b3). Separately, a lithium salt is prepared by the reaction of the difluorobenzene derivative (b4) with sec-BuLi. The lithium salt is allowed to react with the carbonyl derivative (b5) to give the alcohol derivative, which is then dehydrated in the presence of an acid catalyst such as p-toluenesulfonic acid, and the hydrogenation of the product in the presence of a catalyst such as Pd/C gives the compound (b6). The resulting compound (b6) is allowed to react with formic acid or the like to give the carbonyl derivative (b7). The Wittig reaction of the resulting carbonyl derivative with a phosphorus ylide prepared from methoxymethyltriphenylphosphonium chloride and a base such as potassium t-butoxide (t-BuOK) gives a product, which is further reacted with formic acid or the like to give the aldehyde derivative (b8). This aldehyde derivative is allowed to react with a reducing agent such as lithium aluminum hydride to give the alcohol derivative (b9). The alcohol derivative (b9) is then chlorinated with thionyl chloride or the like to give the compound (b10).

The compound (b11) which is one example of the liquid crystal compound (1) of the invention is prepared by the etherification of the compound (b10) prepared by the above procedure with the biphenol derivative (b3) in the presence of a base such as tripotassium phosphate.

The Composition

The liquid crystal composition of the invention will be explained below. This liquid crystal composition is characterized by including at least one of the liquid crystal compound (1) as a component. The composition may include two or more of the liquid crystal compounds (1), or may be composed of the compound (1) alone. When the liquid crystal composition of the invention is prepared, its components can be selected, for example, by taking into consideration the dielectric anisotropy of the liquid crystal compound (1). The liquid crystal composition in which the components have been suitably selected has a small viscosity, a large negative dielectric anisotropy, a suitable elastic constant $K_{33}$ and a low threshold voltage, and also has a high maximum temperature of a nematic phase (phase-transition temperature between a nematic phase and an isotropic phase) and a low minimum temperature of a nematic phase.

The liquid crystal composition of the invention should include the compound represented by formula (1) of the invention as a component A. There may be a composition including only this component A or a composition including the component A and the other components whose names are not shown in this specification. However, the liquid crystal composition (a), (d), (e), and so forth of the invention having a variety of characteristics that are exhibited by including components selected from the components D and E in addition to this component A are desirable.

A composition including the component D consisting of at least one compound selected from the group of compounds represented by formulas (2), (3), (4), (5), (6) and (7) as a component added to the component A is desirable. The threshold voltage, the temperature range of a liquid crystal phase, the refractive index anisotropy, the dielectric anisotropy, the viscosity and so forth can be adjusted by the addition of the component E consisting of at least one compound selected from the group of compounds represented by formulas (8), (9) and (10).

The component D consisting of at least one compound selected from the group of compounds represented by formulas (2) to (7) is desirable as a component when a liquid crystal composition having negative dielectric anisotropy is prepared for use in a device having a vertical alignment mode (a VA mode), a polymer sustained alignment mode (a PSA mode) or the like.

Suitable examples of the compound represented by formulas (2) to (7) (namely, the component D) include the compounds (2-1) to (2-6), (3-1) to (3-15), (4-1), (5-1) to (5-3), (6-1) to (6-11) and (7-1) to (7-10).

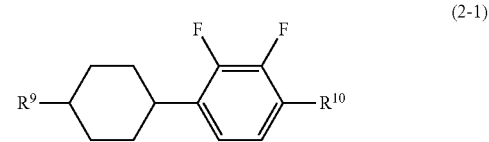

(2-1)

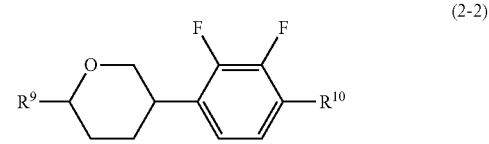

(2-2)

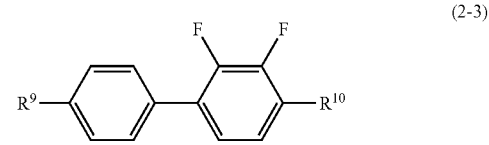

(2-3)

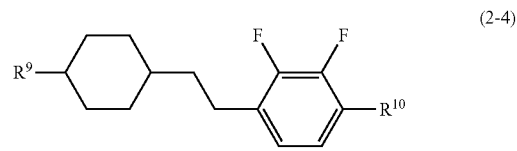

(2-4)

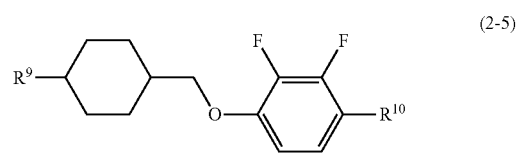

(2-5)

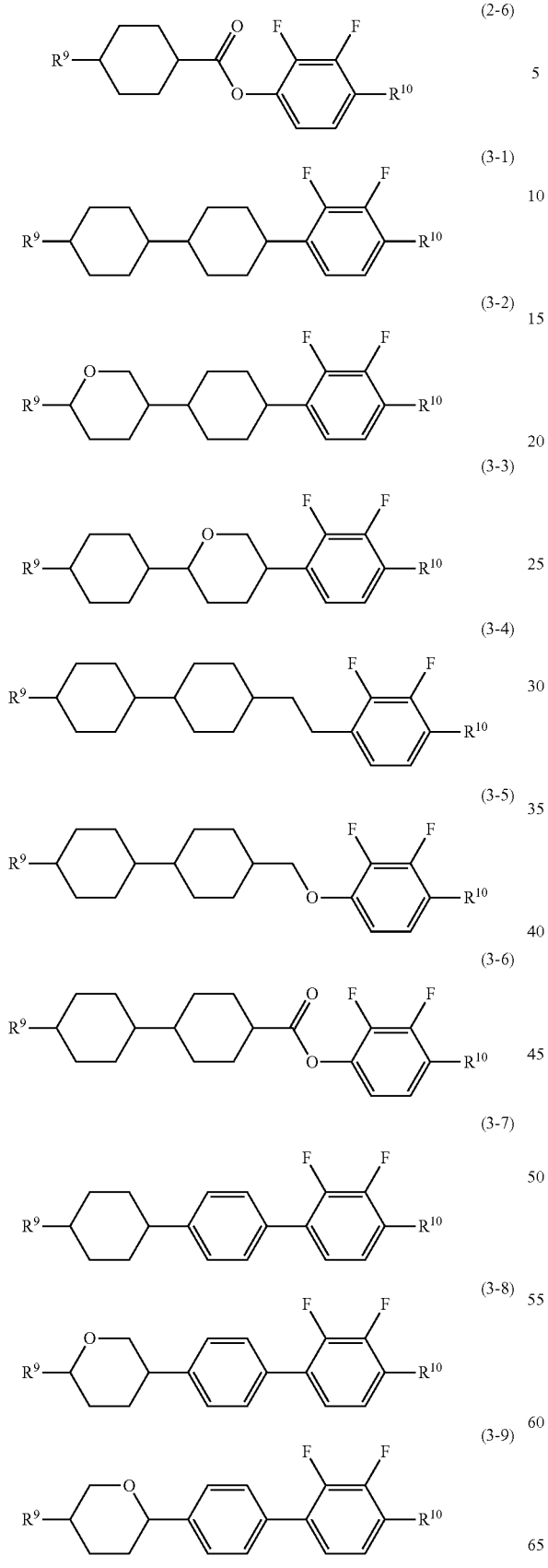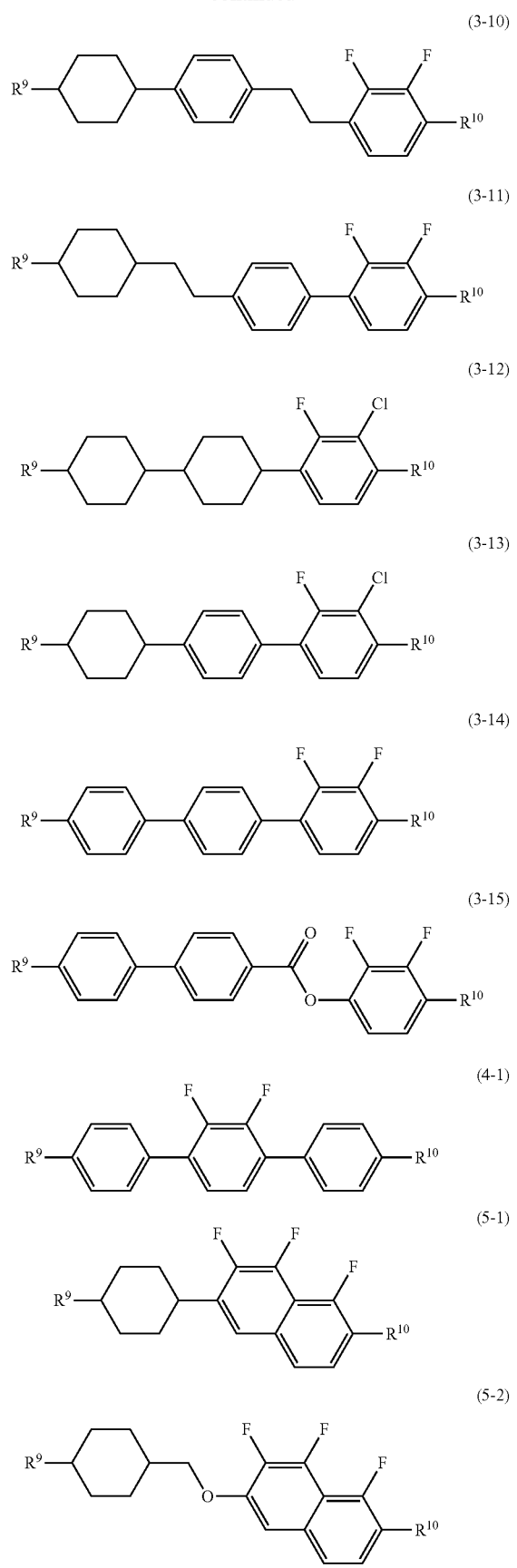

(5-3)
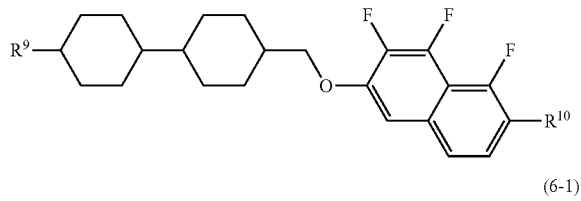
(6-1)
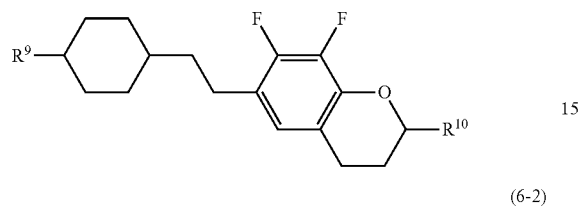
(6-2)
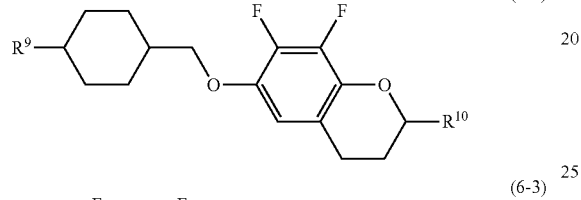
(6-3)
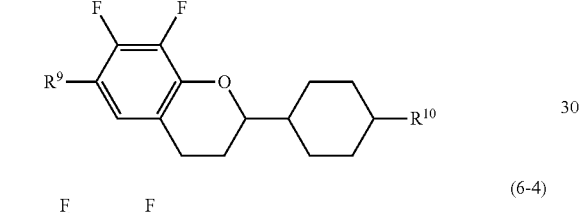
(6-4)
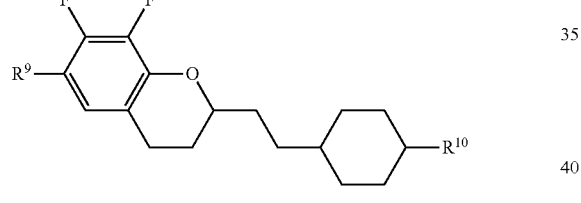
(6-5)
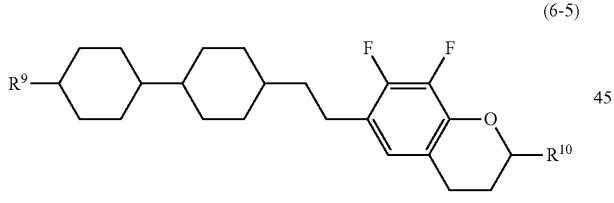
(6-6)
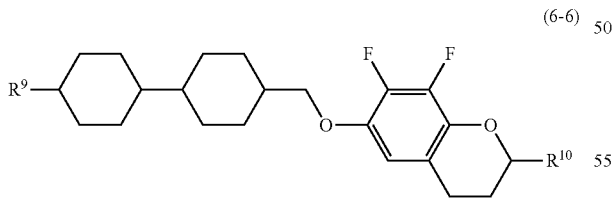
(6-7)
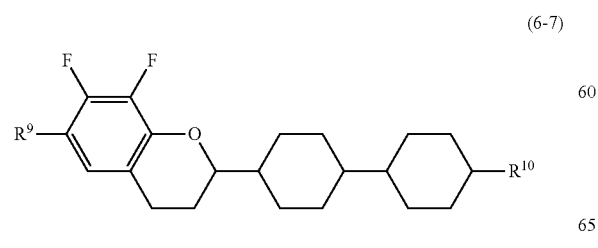
(6-8)
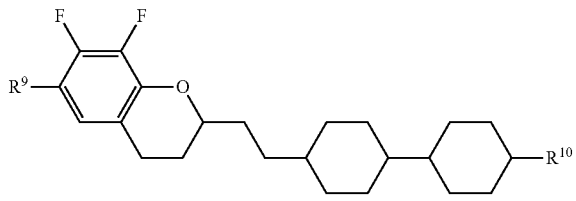
(6-9)
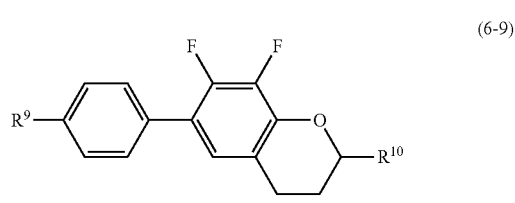
(6-10)
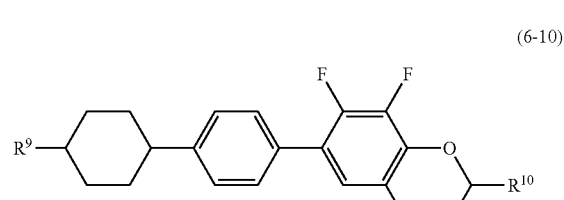
(6-11)
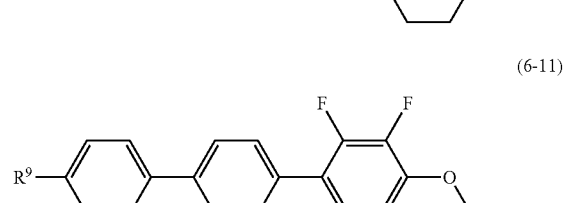
(7-1)
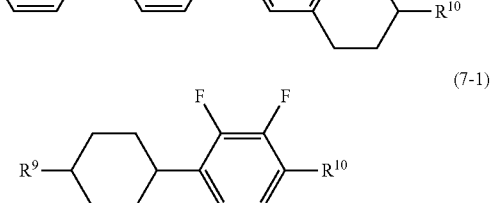
(7-2)
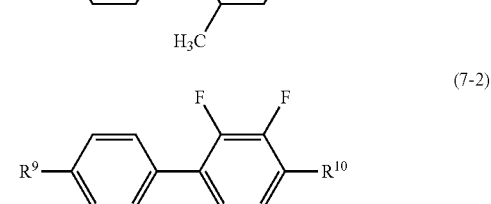
(7-3)
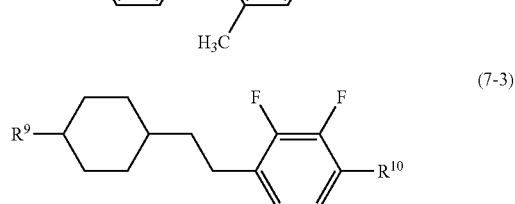
(7-4)
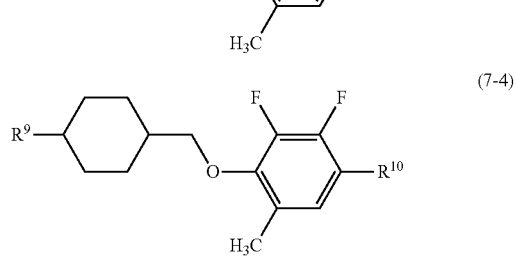

-continued

(7-5)

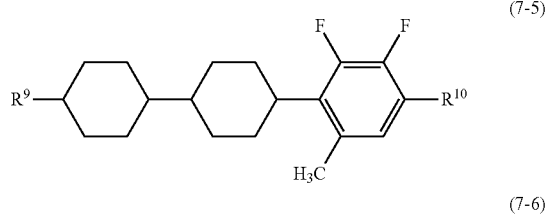
(7-6)

(7-7)

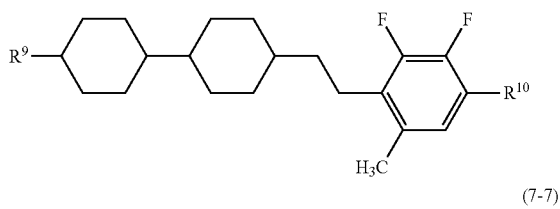
(7-8)

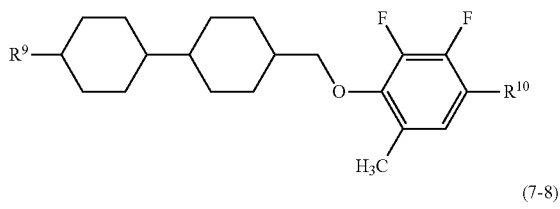
(7-9)

(7-10)

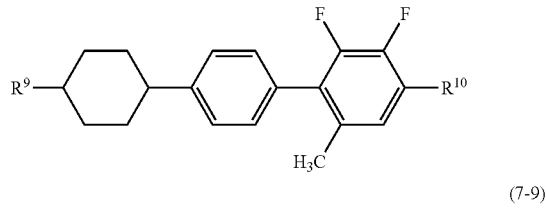

In these formulas, the definitions of $R^9$ and $R^{10}$ are described above.

These compounds of the component D are mainly used for a composition having negative dielectric anisotropy that is suitable to a VA mode or a PSA mode. When the content of the component D increases, the threshold voltage of the composition is decreased but the viscosity is increased. Accordingly, it is desirable that the content is decreased as long as a desired value of the threshold voltage is satisfied. However, there are cases where the content of less than approximately 40% by weight may not allowed for the voltage-driving, since the absolute value of the dielectric anisotropy of the component D is about 5.

The compound represented by formula (2) among the component D is effective mainly in adjusting the threshold voltage, adjusting the viscosity, and adjusting the refractive index anisotropy, since it is a two-ring compound. The compounds represented by formulas (3) and (4) are effective in increasing the clearing point, increasing the temperature range of a nematic phase, decreasing the threshold voltage or increasing the refractive index anisotropy for instance, since it is a three-ring compound. The compounds represented by formulas (5), (6) and (7) are effective in decreasing the threshold voltage for instance.

The content of the component D is preferably approximately 40% by weight or more, and more preferably approximately 50% to approximately 95% by weight based on the tatal amount of the composition, when a composition is prepared for a VA mode or a PSA mode. The elastic constant can be adjusted and the voltage-transmission curve of the composition can be adjusted, by the addition of the component D. It is desirable that the content of the component D is approximately 30% by weight or less based on the total weight of the composition when the component D is added to a composition having positive dielectric anisotropy.

Suitable examples of the compound (namely, the component E) represented by formulas (8), (9) and (10) include the compounds (8-1) to (8-11), (9-1) to (9-19) and (10-1) to (10-6).

(8-1)

(8-2)

(8-3)

(8-4)

(8-5)

(8-6)

(8-7)

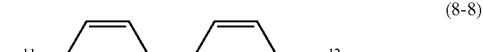
(8-8)

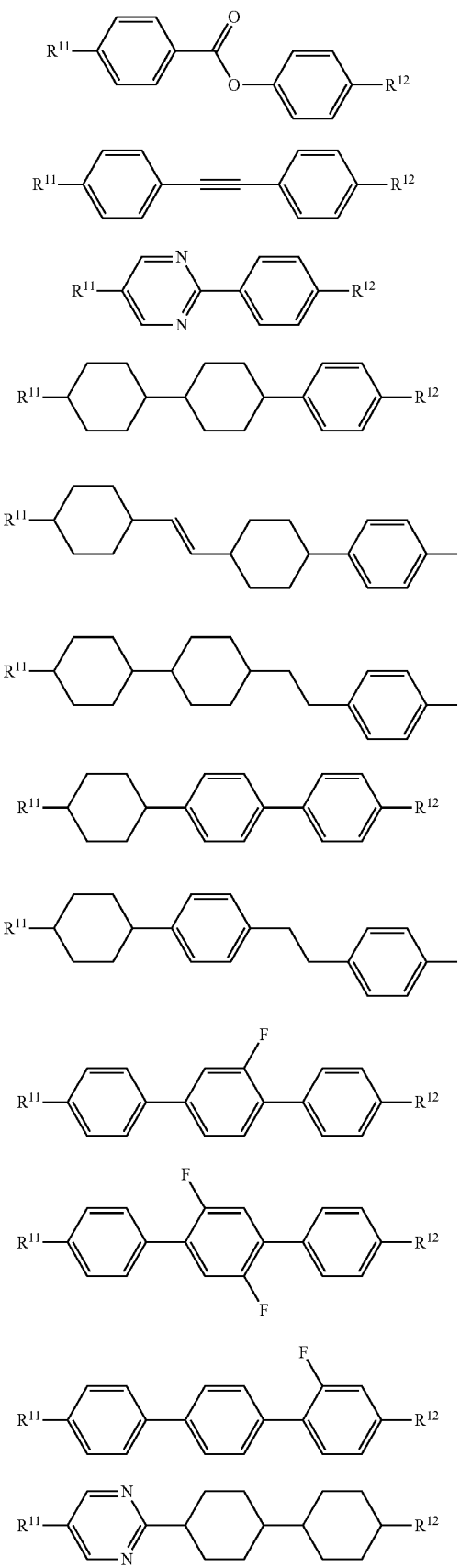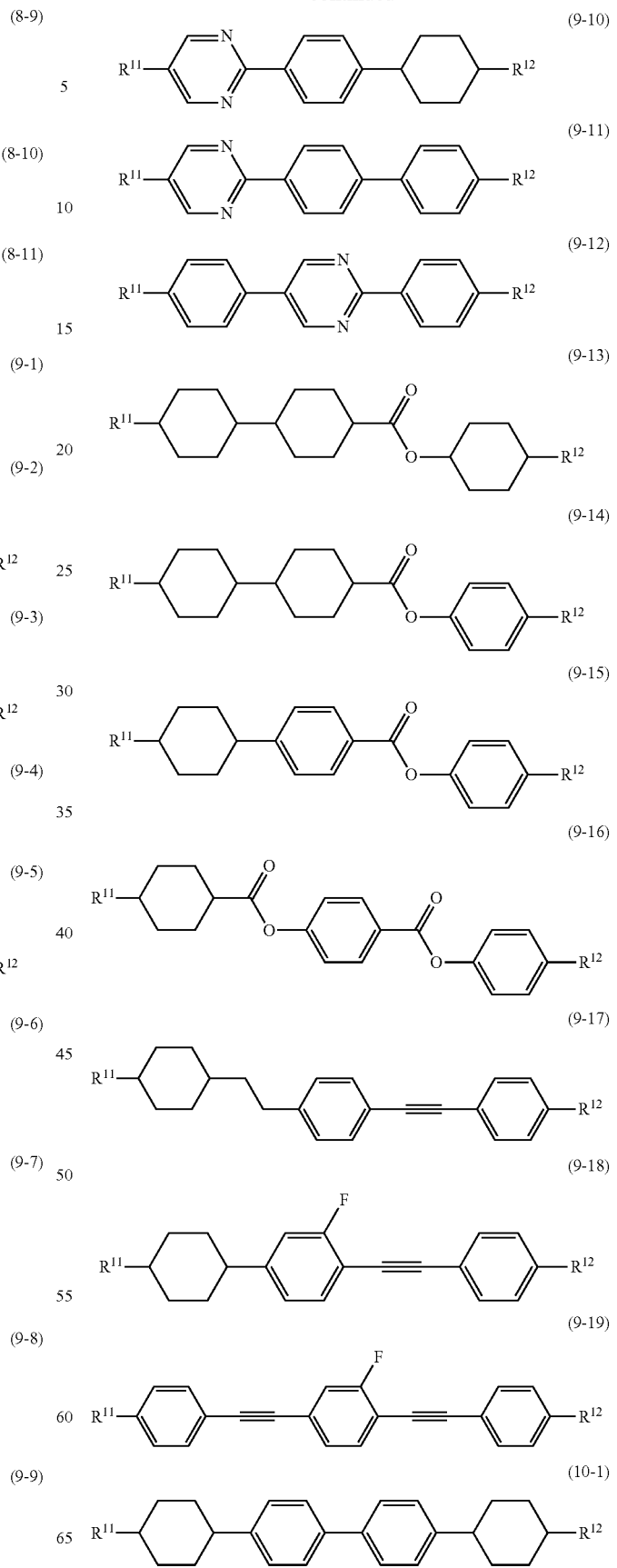

-continued (10-2)
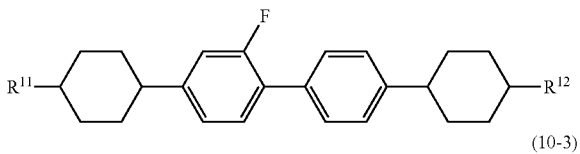

(10-3)
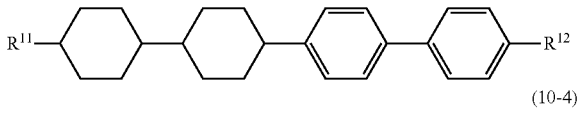

(10-4)
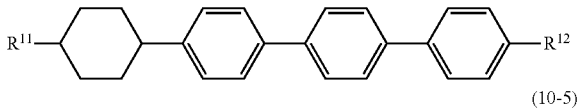

(10-5)
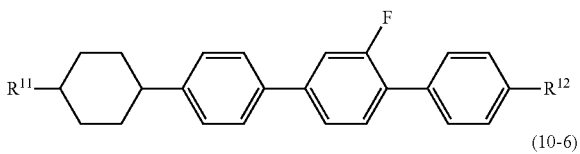

(10-6)
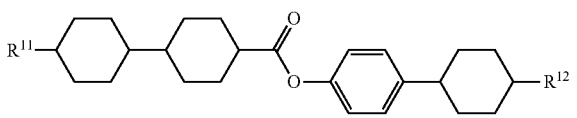

In these formulas, the definitions of $R^{11}$ and $R^{12}$ are just the same as described previously.

The compound represented by formulas (8) to (10) (namely, the component E) is close to neutral since the absolute value of the dielectric anisotropy value is small. The compound represented by formula (8) is effective mainly in adjusting the viscosity or adjusting the refractive index anisotropy, and the compounds represented by formulas (9) and (10) are effective in increasing the temperature range of a nematic phase that is caused by an increase of the clearing point for instance, or adjusting the refractive index anisotropy.

When the content of the component E increases, the threshold voltage of the liquid crystal composition is increased and the viscosity is decreased. Accordingly, it is desirable that the content is increased as long as a desired value of the threshold voltage of the liquid crystal composition is satisfied. The content of the component E is preferably approximately 30% by weight or more, and more preferably approximately 40% by weight or more, based on the total weight of the composition, when a liquid crystal composition that is suitable to a VA mode or a PSA mode is prepared.

It is desirable that the liquid crystal composition of the invention includes at least one of the compounds represented by formula (1) in the range of approximately 0.1% to approximately 99% by weight for exhibiting excellent characteristics.

The liquid crystal composition of the invention is generally prepared according to any known method such as the mutual dissolution of necessary components at a high temperature. An additive that is well-known to a person skilled in the art may be added to a composition depending on its intended use. For example, a liquid crystal composition including an optically active compound which will be described below, or including a polymerizable compound and a polymerization initiator, or a liquid crystal composition for a guest host (GH) mode, to which a dye is added, can be prepared. The additive is generally well known to a person skilled in the art, and is described in the literature and so forth in detail.

The liquid crystal composition of the invention may include at least one optically active compound.

A known chiral dopant is added as an optically active compound. The chiral dopant is effective in inducing a helical structure in liquid crystals, adjusting a necessary twist angle and thus preventing a reverse twist. Examples of the chiral dopant include the following optically active compounds (Op-1) to (Op-13).

(Op-1)
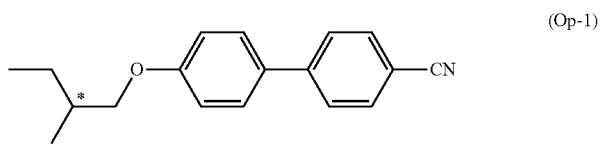

(Op-2)
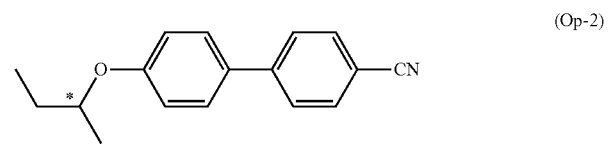

(Op-3)
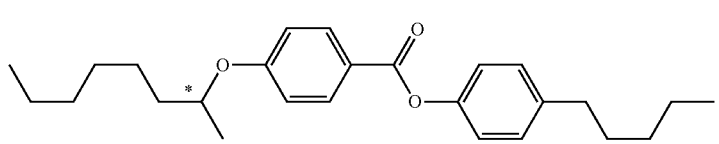

(Op-4)
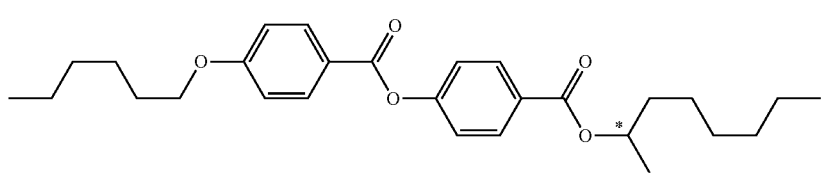

(Op-5)
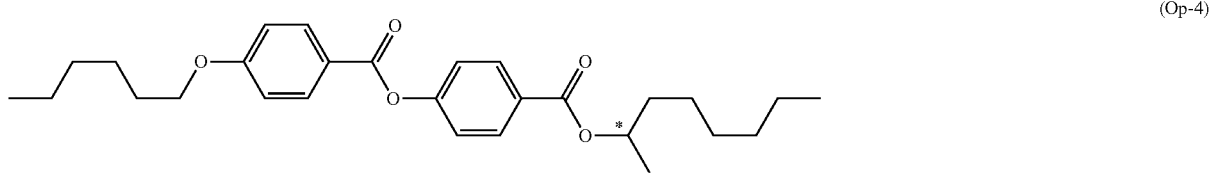

(Op-6)
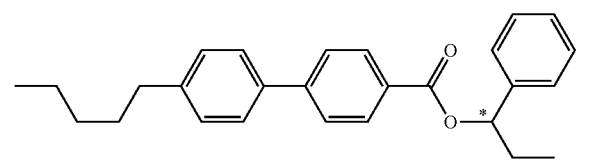

-continued

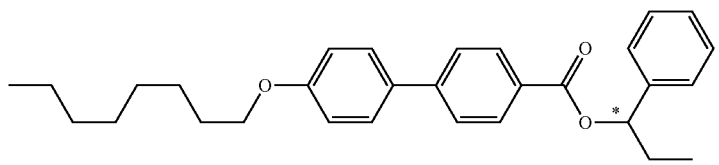
(Op-7)

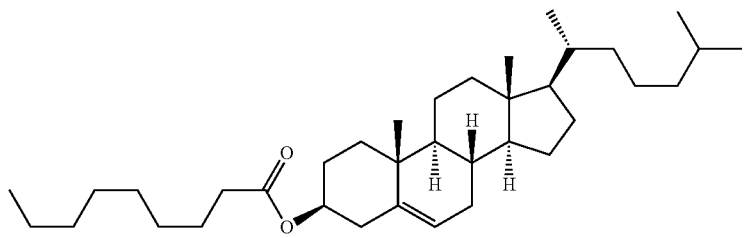
(Op-8)

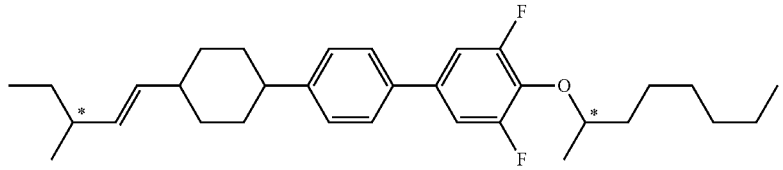
(Op-9)

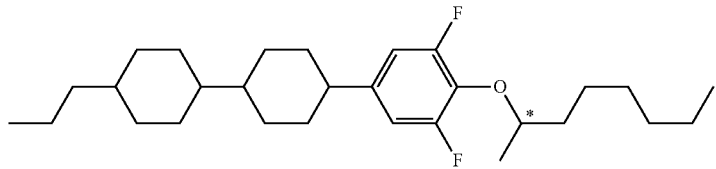
(Op-10)

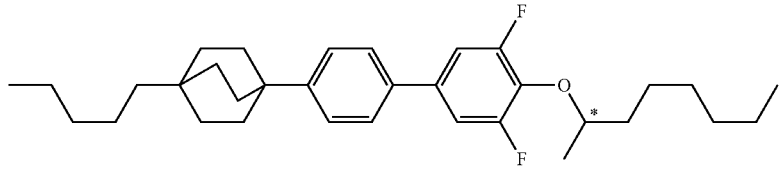
(Op-11)

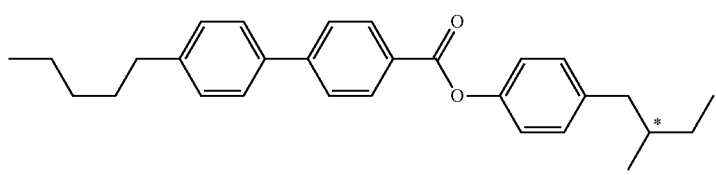
(Op-12)

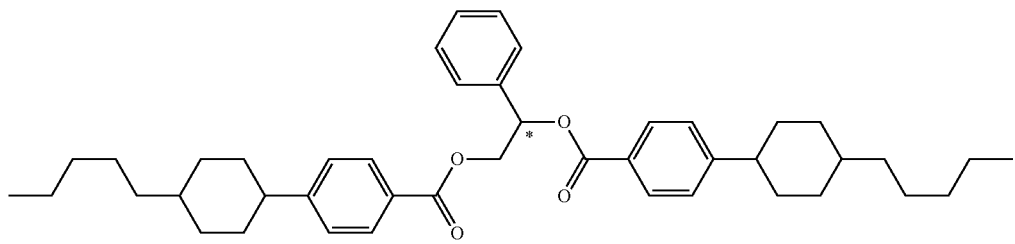
(Op-13)

A helical pitch is usually adjusted by the addition of this optically active compound to the liquid crystal composition of the invention. It is desirable to adjust the helical pitch to the range of approximately 40 micrometers to approximately 200 micrometers in a liquid crystal composition for TFT and TN modes. It is desirable to adjust the helical pitch to the range of approximately 6 micrometers to approximately 20 micrometers in a liquid crystal composition for a STN mode. It is desirable to adjust the helical pitch to the range of approximately 1.5 micrometers to approximately 4 micrometers in a liquid crystal composition for a bistable TN mode. Two or more optically active compounds may be added for the purpose of adjusting the temperature dependence of the helical pitch.

The liquid crystal composition of the invention can be used for a GH mode by the addition of a dichroic dye such as a merocyanine, stylyl, azo, azomethine, azoxy, quinophthalone, anthraquinone or tetrazine compound.

The liquid crystal composition of the invention can be used for NCAP prepared by micro-encapsulating nematic liquid crystals, and for a polymer-distributed liquid crystal display device (PDLCD) prepared by forming a three-dimensional network polymer in liquid crystals, such as a polymer network liquid crystal display device (PNLCD), and also for a double refraction control (ECB) mode or a DS mode.

The liquid crystal composition of the invention can be used as a liquid crystal composition for a polymer sustained alignment (PSA) mode by the addition of a polymerizable compound. Examples of the polymerizable compound include compounds having polymerizable groups such as acrylate, methacrylate, vinyl, vinyloxy, propenylether, epoxy, vinylketone and oxetane. The polymerizable compound is polymerized on irradiation with ultraviolet light or the like, preferably in the presence of a suitable initiator such as a photopolymerization initiator. Suitable conditions for the polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (Ciba Geigy AG), each of which is a photoinitiator, is suitable for radical polymerization.

Method for Preparing the Composition

When each of component compounds in the liquid crystal composition of the invention is a liquid, for example, the composition is prepared by mixing and shaking the compounds. When solids are included, the composition is prepared by mixing each compound, and then shaking after the compounds have been heated and liquefied. Moreover, the liquid crystal composition of the invention can also be prepared according to other known methods.

Characteristics of the Composition

Since the maximum temperature of a nematic phase can be adjusted to 70° C. or higher and the minimum temperature of the nematic phase can be adjusted to −20° C. or lower in the liquid crystal composition of the invention, the temperature range of the nematic phase is wide. Accordingly, the liquid crystal display device containing this liquid crystal composition can be used in a wide temperature range.

In the liquid crystal composition of the invention, the optical anisotropy can be adjusted to the range of approximately 0.10 to approximately 0.13, and also to the range of approximately 0.05 to approximately 0.18, by suitably selecting each component, for instance.

The dielectric anisotropy can be normally adjusted to the range of approximately −5.0 to approximately −2.0, and preferably to the range of approximately −4.5 to approximately −2.5 in the liquid crystal composition of the invention. The liquid crystal composition having dielectric anisotropy in the range of approximately −4.5 to approximately −2.5 can be suitably used for a liquid crystal display device which operates by means of the IPS and VA modes.

The Display Device

The liquid crystal composition of the invention can be used not only for the liquid crystal display devices having operating modes such as the PC, TN, STN, OCB and PSA modes which are driven by means of the AM mode, but also for liquid crystal display devices having operating modes such as the PC, TN, STN, OCB, VA and IPS modes which are driven by means of the passive matrix (PM) mode.

The liquid crystal display devices having the AM and PM modes can be applied to any of liquid crystal displays and so forth that have a reflection type, a transmission type, and a semi-transmission type.

Moreover, the liquid crystal composition of the invention can also be used for a dynamic scattering (DS) mode-device containing the liquid crystal composition to which a conducting agent is added, and a nematic curvilinear aligned phase (NCAP) device containing the liquid crystal composition microencapsulated, and a polymer dispersed (PD) device having a three-dimensional network polymer formed in the liquid crystal composition, for example, a polymer network (PN) device.

Since the liquid crystal composition of the invention has the characteristics described above, it can be suitably used for the liquid crystal display device having an AM mode which is driven by means of an operating mode such as the VA, IPS or PSA mode, wherein the liquid crystal composition having negative dielectric anisotropy is used, especially for the liquid crystal display device having the AM mode which is driven by means of the VA mode.

Incidentally, the direction of an electric field is perpendicular to liquid crystal layers in a liquid crystal display device which is driven by means of the TN mode, the VA mode or the like. On the other hand, the direction of an electric field is parallel to liquid crystal layers in a liquid crystal display device which is driven by means of the IPS mode or the like. The structure of the liquid crystal display device which is driven by means of the VA mode is reported by K. Ohmuro, S. Kataoka, T. Sasaki and Y. Koike, SID '97 Digest of Technical Papers, 28, 845 (1997), and the structure of the liquid crystal display device which is driven by means of the IPS mode is reported in WO 1991/10936 A (patent family: U.S. Pat. No. 5,576,867).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Examples of the Compound (1)

The invention will be explained below in greater detail based on examples of the compound (1). However, the invention is not limited to the examples. The term "%" means "% by weight," unless otherwise noted.

Analytical methods will be explained first, since the resulting compounds herein were identified on the basis of nuclear magnetic resonance spectra obtained by means of $^1$H-NMR analysis, gas chromatograms obtained by means of gas chromatography (GC) analysis and so forth.

$^1$H-NMR Analysis:

A model DRX-500 apparatus (made by Bruker BioSpin Corporation) was used for measurement. Samples prepared in the examples and so forth were dissolved in deuterated solvents such as $CDCl_3$ in which the samples were soluble, and the measurement was carried out under the conditions of room temperature, thirty-two times of accumulation and 500 MHz. In the explanation of the nuclear magnetic resonance spectra obtained, the symbols s, d, t, q, quin, sex, m and br stand for a singlet, a doublet, a triplet, a quartet, a quintet, a sextet, a multiplet and line-broadening, respectively. Tetramethylsilane (TMS) was used as the standard reference material for the zero point of the chemical shift (6 values).

GC Analysis:

A Gas Chromatograph Model GC-14B made by Shimadzu Corporation was used for measurement. A capillary column CBP1-M25-025 (length 25 m, bore 0.22 mm, film thickness 0.25 mictometer; dimethylpolysiloxane as a stationary liquid phase; non-polar) made by Shimadzu Corporation was used. Helium was used as a carrier gas, and its flow rate was adjusted to 1 ml per minute. The temperature of the sample injector was set at 280° C. and the temperature of the detector (FID) was set at 300° C.

A sample was dissolved in toluene to give a 1% by weight solution, and then 1 microliter of the solution obtained was injected into the sample injector.

Chromatopac Model C-R6A made by Shimadzu Corporation or its equivalent was used as a recorder. The obtained gas chromatogram showed the retention time of the peaks and the values of the peak areas corresponding to the component compounds.

Chloroform or hexane, for example, may also be used as a solvent for diluting the sample. The following capillary columns may also be used: DB-1 (length 30 m, bore 0.32 mm, film thickness 0.25 micrometer) made by Agilent Technologies Inc., HP-1 (length 30 m, bore 0.32 mm, film thickness 0.25 micrometer) made by Agilent Technologies Inc., Rtx-1 (length 30 m, bore 0.32 mm, film thickness 0.25 micrometer) made by Restek Corporation, BP-1 (length 30 m, bore 0.32 mm, film thickness 0.25 micrometer) made by SGE International Pty. Ltd, and so forth.

The ratio of the peak areas in the gas chromatogram corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of the liquid crystal compounds as components. An internal standard method using gas chromatograms is used in order to determine the composition ratio of the liquid crystal compounds in the liquid crystal composition more accurately by means of the gas chromatograms. Each liquid crystal compound (test-component) weighed accurately in a fixed amount and a liquid crystal compound serving as a standard (standard reference material) are analyzed simultaneously by means of gas chromatography, and the relative intensity is calculated in advance from the ratio of the peak area of the test-component to that of the standard reference material. Then, the composition ratio of the liquid crystal compounds in the liquid crystal composition can be determined more accurately by means of the gas-chromatographic analysis using the correction method based on the relative intensity of the peak area of each component to that of the standard reference material.

Samples for Measurement

Two kinds of samples are used for measuring physical properties of a liquid crystal compound: one is the compound itself, and the other is a mixture of the compound and mother liquid crystals.

In the latter case using a sample in which the compound is mixed with mother liquid crystals, the measurement is carried out according to the following method. First, the sample is prepared by mixing 15% by weight of the liquid crystal compound obtained and 85% by weight of the mother liquid crystals. Then, extrapolated values are calculated from the measured values of the resulting sample by means of an extrapolation method based on the following formula. The extrapolated values are regarded as physical properties of this compound.

[Extrapolated value]=(100×[Measured value of sample]−[% by weight of mother liquid crystals]×[Measured value of mother liquid crystals])/[% by weight of compound]

When a smectic phase or crystals deposited even at this ratio of the compound to the mother liquid crystals at 25° C., the ratio of the liquid crystal compound to the mother liquid crystals was changed in the order of (10% by weight: 90% by weight), (5% by weight:95% by weight) and (1% by weight: 99% by weight). Physical properties of the sample were measured at the ratio in which the smectic phase or the crystals did not deposit at 25° C. Extrapolated values were determined according to the above equation, and regarded as physical properties of the liquid crystal compound.

There are a variety of mother liquid crystals used for measurement and, for example, each component of the mother liquid crystals (i) is shown below.

Mother Liquid Crystals (i) are as follows.

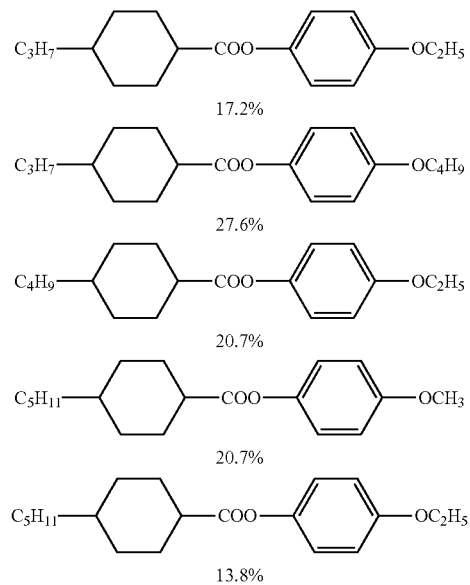

Incidentally, in the case where physical properties of a liquid crystal composition were measured, the composition itself was used as a sample.

Methods of Measurement

Physical properties of compounds were measured according to the following methods. Most of the measurement methods are those described in the Standard of Electronic Industries Association of Japan, EIAJ•ED-2521A, or those with some modifications. No TFT was attached to a TN device or a VA device used for measurement.

When a liquid crystal compound itself or a liquid crystal compound composition itself was employed as a sample, a measured value itself was described here. When a sample was prepared by mixing the compound with mother liquid crystals, a value calculated from a measured value according to the extrapolation method was described here as a extrapolated value.

Phase Structure and Transition Temperature (° C.):

Measurements were carried out according to the following methods (1) and (2).

(1) A compound was placed on a hot plate of a melting point apparatus (Hot Stage Model FP-52 made by Mettler Toledo International Inc.) equipped with a polarizing microscope, and the phase conditions and their changes were observed with the polarizing microscope while the compound was heated at the rate of 3° C. per minute, and the kinds of liquid crystal phase were specified.

(2) A sample was heated and then cooled at a rate of 3° C. per minute using a Perkin-Elmer differential scanning calorimeter, a DSC-7 System or a Diamond DSC System. The starting point of an endothermic peak or an exothermic peak caused by a phase change of the sample was obtained by means of the extrapolation, and thus the phase transition temperature was determined.

Hereinafter, the symbol C stood for crystals, which were expressed by $C_1$ or $C_2$ when the kinds of the crystals were distinguishable. The symbols S and N stood for a smectic phase and a nematic phase, respectively. The symbol I stood for a liquid (isotropic). When a smectic B phase and a smectic A phase were distinguishable in the smectic phases, they were expressed as $S_B$ and $S_A$, respectively. Phase-transition temperatures were expressed, for example, as "C 50.0 N 100.0 I", which means that the phase-transition temperature from crystals to a nematic phase (CN) is 50.0° C., and the phase-transition temperature from the nematic phase to a liquid (NI) is 100.0° C. The same applied to the other transition temperatures.

Maximum Temperature of a Nematic Phase ($T_{NI}$; ° C.):

A sample (a liquid crystal composition, or a mixture of a liquid crystal compound and mother liquid crystals) was placed on a hot plate of a melting point apparatus (Hot Stage Model FP-52 made by Mettler Toledo International Inc.) equipped with a polarizing microscope, and was observed with the polarizing microscope while being heated at the rate of 1° C. per minute. A maximum temperature meant a temperature measured when part of the sample began to change from a nematic phase to an isotropic liquid. Hereinafter, the maximum temperature of a nematic phase may simply be abbreviated to "maximum temperature."

Compatibility at Low Temperature:

Samples were prepared by mixing a liquid crystal compound with mother liquid crystals so that the amount of the liquid crystal compound became 20% by weight, 15% by weight, 10% by weight, 5% by weight, 3% by weight and 1% by weight, and placed in glass vials. After these glass vials had been kept in a freezer at −10° C. or −20° C. for a certain period of time, they were observed as to whether or not crystals or a smectic phase had been deposited.

Viscosity (Bulk Viscosity; η; Measured at 20° C.; mPa·s)

An E-type viscometer was used for measurement.

Viscosity (Rotational Viscosity; γ1; Measured at 25° C.; mPa·s)

Rotational viscosity was measured according to the method described in M. Imai, et al., Molecular Crystals and Liquid Crystals, vol. 259, p. 37 (1995). A sample (a liquid crystal composition, or a mixture of a liquid crystal compound and mother liquid crystals) was put in a VA device in which the distance between two glass substrates (cell gap) was 20 micrometers. A voltage in the range of 30 V to 50 V was applied stepwise with an increment of 1 volt to the device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from the measured values and the calculating equation (8) on page 40 of the paper presented by M. Imai, et al. Incidentally, the value of the dielectric anisotropy (Δ∈) necessary for the present calculation was obtained by the method described below, under the heading "Dielectric Anisotropy."

Optical Anisotropy (Refractive Index Anisotropy; Δn; Measured at 25° C.)

Measurement was carried out using an Abbe refractometer with a polarizing plate attached to the ocular, on irradiation with light at a wavelength of 589 nm at 25° C. The surface of the main prism was rubbed in one direction, and then a sample (a liquid crystal composition, or a mixture of a liquid crystal compound and mother liquid crystals) was dropped onto the main prism. A refractive index (n∥) was measured when the direction of the polarized light was parallel to that of the rubbing. A refractive index (n⊥) was measured when the direction of polarized light was perpendicular to that of the rubbing. The value of the refractive index anisotropy was calculated from the equation: Δn=n∥−n⊥.

Dielectric Anisotropy (Δ∈; Measured at 25° C.)

Dielectric anisotropy was measured by the following method.

An ethanol (20 mL) solution of octadecyltriethoxysilane (0.16 mL) was applied to a well-washed glass substrate. The glass substrate was rotated with a spinner, and then heated at 150° C. for 1 hour. A VA device in which the distance (cell gap) was 20 micrometers was assembled from the two glass substrates.

A polyimide alignment film was prepared on glass substrates in a similar manner. After a rubbing-treatment to the alignment film formed on the glass substrates, a TN device in which the distance between the two glass substrates was 9 micrometers and the twist angle was 80 degrees was assembled.

A sample (a liquid crystal composition, or a mixture of a liquid crystal compound and mother liquid crystals) was put in the VA device obtained, a voltage of 0.5 V (1 kHz, sine waves) was applied to the sample, and then the dielectric constant (∈∥) in the major axis direction of the liquid crystal molecules was measured.

The sample (the liquid crystal composition, or the mixture of the liquid crystal compound and the mother liquid crystals) was put in the TN device obtained, a voltage of 0.5 V (1 kHz, sine waves) was applied to the sample, and then the dielectric constant (∈⊥) in the minor axis direction of the liquid crystal molecules was measured.

The value of the dielectric anisotropy was calculated from the equation of Δ∈=∈∥−∈⊥.

Voltage Holding Ratio (VHR; Measured at 25° C.; %)

A TN device used for measurement had a polyimide-alignment film and a distance between two glass substrates (cell gap) was 6 micrometers. A sample (a liquid crystal composition, or a mixture of a compound and mother liquid crystals) was put in the device, and then the device was sealed with an adhesive polymerizable under ultraviolet radiation. The TN device was charged by applying pulse voltage (60 microseconds at 5 V). Decreasing voltage was measured for 16.7 milliseconds with a High Speed Voltmeter, and the area A between a voltage curve and a horizontal axis in a unit period was measured. The area B was an area without the decrease. The voltage holding ratio was the percentage of the area A to the area B.

Elastic Constant ($K_{11}$ and $K_{33}$; Measured at 25° C.)

Elastic Constant Measurement System Model EC-1 made by Toyo Corporation was used for measurement. A sample was put in a homeotropic cell in which a distance between two glass substrates (cell gap) was 20 micrometers. An electric charge of 20 volts to 0 volts was applied to the cell, and electrostatic capacity and applied voltage were measured. The measured values of the electrostatic capacity (C) and the applied voltage (V) were fitted to equation (2.98) and equation (2.101) in page 75 of the "Liquid Crystal Device Handbook" (Ekisho Debaisu Handobukku, in Japanese; The Nikkan Kogyo Shimbun, Ltd.) and the value of the elastic constant was obtained from equation (2.100).

Example 1

Preparation of trans-4-((trans-4'-(4-butoxy-2,3-difluorophenyl)bicyclohexane)-4-yl)methoxy-2,2',3,3'-tetrafluoro-4'-hexyloxybiphenyl (No. 138)

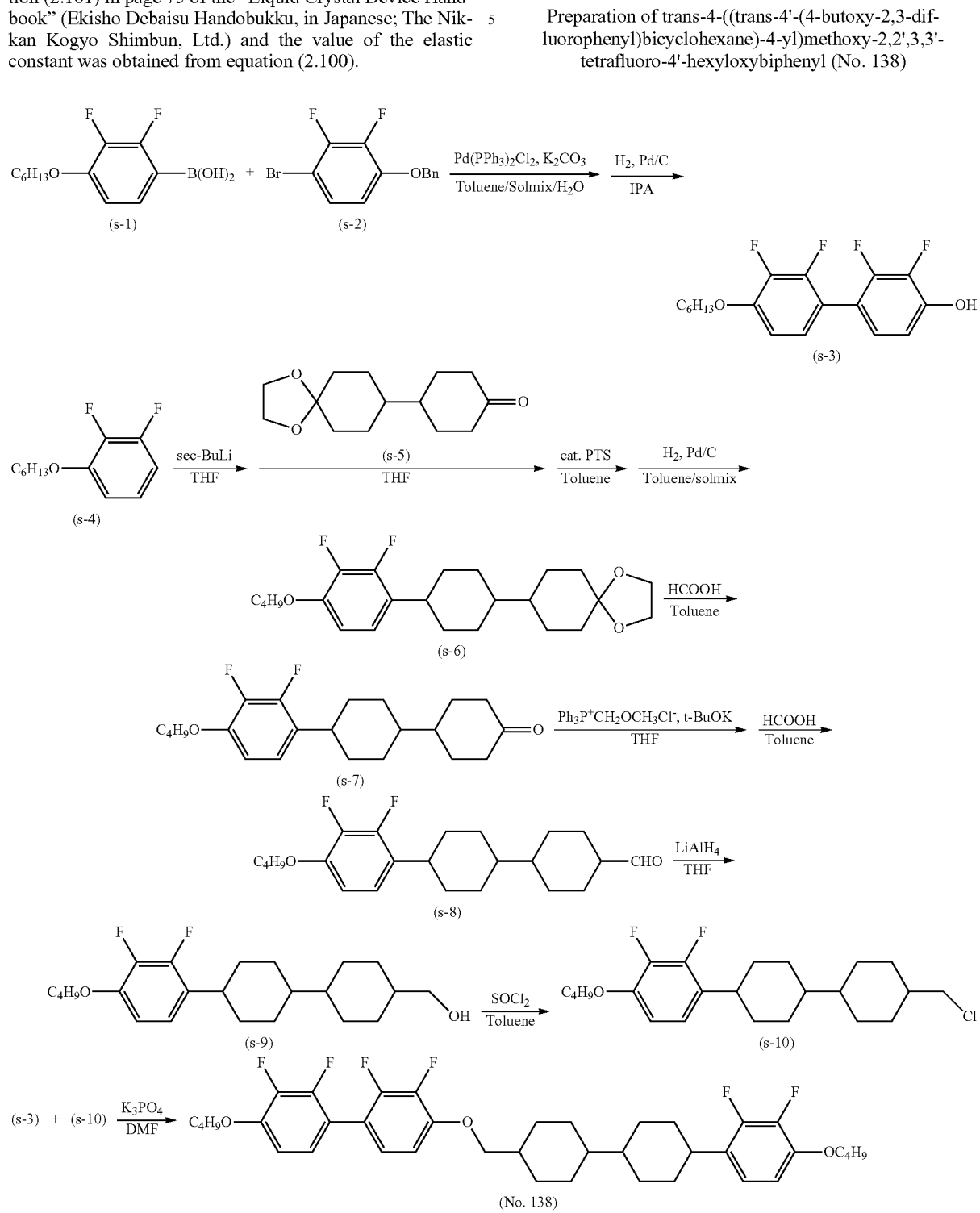

First Step:

4-Hexyloxy-2,3-difluorophenylboronic acid (s-1) (30.0 g), 4-bromo-2,3-difluorobenzoxybenzene (s-2) (31.6 g), potassium carbonate (43.8 g), Pd(PPh$_3$)$_2$Cl$_2$ (2.2 g), triphenylphosphine (1.7 g), tetrabutylammonium bromide (20.4 g), toluene (200 ml), Solmix A-11 (200 ml) and water (200 ml) were put in a reaction vessel and the mixture was heated to reflux for 2 hours under an atmosphere of nitrogen. After the reaction mixture had been cooled to 25° C., it was poured into water (200 ml) and toluene (200 ml), and mixed with them. The mixture was then allowed to stand until it had separated into two phases of organic and aqueous phases, and the extraction was carried out. The combined organic phase was washed with water and dried over anhydrous magnesium sulfate. The solution was concentrated under reduced pressure and the resulting residue was purified by column chromatography using silica gel as a stationary phase powder and a mixed solvent of toluene/heptane (2/1 by volume) as an eluent. The product was dissolved in a mixed solvent of toluene (150 ml) and Solmix A-11 (150 ml), Pd/C (0.26 g) was added thereto, and the mixture was stirred at room temperature under an atmosphere of hydrogen until hydrogen absorption had ceased. After the completion of the reaction, Pd/C was removed and the solvent was distilled off. The resulting residue was purified by column chromatography using silica gel as a stationary phase powder and toluene as an eluent, and then by recrystallization from a mixed solvent of toluene/heptane (1/2 by volume) to give 4-hexyloxy-2,2',3,3'-tetrafluoro-1,1'-biphenol (s-3) (15.1 g). The yield based on the compound (s-2) was 41.8%.

Second Step:

3-Butoxy-1,2-difluorobenzene (s-4) (10.0 g) and THF (200 ml) were put in a reaction vessel and were cooled to −74° C. under an atmosphere of nitrogen. sec-Butyllithium (a 1.00 M solution in n-hexane and cyclohexane; 64.0 ml) was added dropwide thereto in the temperature range of −74° C. to −70° C., and the stirring was continued for another 2 hours. Then, 4-(1,4-dioxaspiro[4.5]decan-8-yl)-cyclohexanone (s-5) (12.8 g) in a THF (50 ml) solution was added dropwise thereto in the temperature range of −75° C. to −70° C., and the stirring was continued for another 8 hours while the mixture was allowed to come to 25° C. The mixture was poured into a vessel containing an aqueous solution of ammonium chloride (3%; 100 ml) and ethyl acetate (100 ml), and mixed with them. The mixture was then allowed to stand until it had separated into organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off to give 4-(1,4-dioxaspiro[4.5]decan-8-yl)-1-(4-butoxy-2,3-difluorophenyl)-cyclohexanol. p-Toluenesulfonic acid (0.68 g) and toluene (200 ml) were mixed with this compound and the mixture was heated to reflux for 2 hours, while distilled water was removed. After the reaction mixture had been cooled to 30° C., water (200 ml) and toluene (200 ml) were added to the mixture, and mixed with it. The mixture was then allowed to stand until it had separated into two phases of organic and aqueous phases, and the extraction was carried out. The combined organic phase was washed successively with a saturated aqueous solution of sodium hydrogencarbonate and water, and dried over anhydrous magnesium sulfate. The resulting solution was purified by column chromatography using silica gel as a stationary phase powder and toluene as an eluent. Pd/C (0.3 g) was added to the product and the mixture was stirred at room temperature under an atmosphere of hydrogen until hydrogen absorption had ceased. After the completion of the reaction, Pd/C was removed and the solvent was distilled off. The resulting residue was purified by recrystallization from a mixed solvent of THF/heptane (1/9 by volume) to give 8-[4-(4-butoxy-2,3-difluorophenyl)-cyclohexenyl]-1,4-dioxaspiro[4.5]decane (s-6) (7.7 g). The yield based on the compound (s-4) was 35.2%.

Third Step:

The compound (s-6) (7.7 g), formic acid (87%; 8.7 g) and toluene (100 ml) were mixed and the mixture was heated to reflux for 2 hours. After the reaction mixture had been cooled to 30° C., it was poured into water (200 ml) and toluene (200 ml) were added to the mixture, and mixed with it. The mixture was then allowed to stand until it had separated into two phases of organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under reduced pressure and the residue was purified by recrystallization from heptane to give 4'-(4-butoxy-2,3-difluorophenyl)-bicyclohexyl-4-one (s-7) (6.8 g). The yield based on the compound (s-6) was 99.0%.

Fourth Step:

Well-dried methoxymethyltriphenylphosphonium chloride (7.9 g) and THF (100 ml) were mixed under an atmosphere of nitrogen and the mixture was cooled to −30° C. Then, potassium t-butoxide (t-BuOK) (2.6 g) was added in four portions in the temperature range of −30° C. to −20° C. The stirring was continued at −20° C. for another 30 minutes, and the compound (s-7) (6.8 g) dissolved in THF (35 ml) was added dropwise thereto in the temperature range of −30 to −20° C. After the stirring at −10° C. for another 30 minutes, the reaction mixture was poured into a mixture of water (200 ml) and toluene (100 ml), and mixed with it. The mixture was then allowed to stand until it had separated into two phases of organic and aqueous phases, and the extraction was carried out. The combined organic phase was washed with water and dried over anhydrous magnesium sulfate. The solution was concentrated under reduced pressure and the resulting residue was purified by column chromatography using silica gel as a stationary phase powder and toluene as an eluent. The resulting eluent was concentrated under reduced pressure to give 4-(4-butoxy-2,3-difluorophenyl)-4'-methoxymethylene-bicyclohexyl. Formic acid (87%; 8.4 g) and toluene (100 ml) were added to the compound and the mixture was heated to reflux for 2 hours. After the reaction mixture had been cooled to 30° C., water (200 ml) and toluene (300 ml) were added to the mixture, and mixed with it. The mixture was then allowed to stand until it had separated into two phases of organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under reduced pressure and the resulting residue was purified by recrystallization from a mixed solvent of heptane/THF (9/1 by volume) to give 4'-(4-butoxy-2,3-difluorophenyl)-bicyclohexyl-trans-4-carboaldehyde (s-8) (6.0 g). The yield based on the compound (s-7) was 82.5%.

Fifth Step:

Lithium aluminum hydride (4.2 g) was suspended in THF (300 ml). 4'-(4-Butoxy-2,3-difluorophenyl)-bicyclohexyl-trans-4-carboaldehyde (s-8) (6.0 g) was added to the suspension in the temperature range of −20° C. to −10° C. and the stirring was continued for 2 hours in the same temperature range. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The combined organic phase was washed successively with water and brine, and dried over anhydrous magnesium sulfate. The solution was concentrated under reduced pressure to give trans-4'-(4-butoxy-2,3-difluorophenyl)-trans-4-hydroxymethylbicyclohexyl (s-9) (6.0 g). The yield based on the compound (s-8) was 99.5%.

Sixth Step:

The compound (s-9) (6.0 g), toluene (100 ml) and pyridine (0.1 ml) were put in a reaction vessel under an atmosphere of nitrogen and the stirring was continued at 45° C. for 1 hour. Then, thionyl chloride (1.4 ml) was added in the temperature range of 45° C. to 55° C., and the mixture was heated to reflux for 2 hours. After the reaction mixture had been cooled to 25° C., it was poured into water (100 ml) and toluene (100 ml), and mixed with them. The mixture was then allowed to stand until it had separated into two phases of organic and aqueous phases, and the extraction was carried out. The combined organic phase was washed successively with a saturated aqueous solution of sodium hydrogencarbonate twice and water three times, and dried over anhydrous magnesium sulfate. The solution was concentrated under reduced pressure and the resulting residue was purified by column chromatography using silica gel as a stationary phase powder and a mixed solvent of toluene/heptane (1/1 by volume) as an eluent, and then by recrystallization from Solmix A-11 to give trans-4'-(4-butoxy-2,3-difluorophenyl)-trans-4-chloromethylbicyclohexyl (s-10) (6.2 g). The yield based on the compound (s-9) was 98.6%.

Seventh Step:

4-Hexyloxy-2,2',3,3'-tetrafluoro-1,1'-biphenol (s-3) (2.6 g) and tripotassium phosphate ($K_3PO_4$; 8.0 g) were added to DMF (100 ml) under an atmosphere of nitrogen, and the mixture was stirred at 80° C. The compound (s-9) (3.0 g) was added thereto and the stirring was continued at 80° C. for 7 hours. After the reaction mixture had been cooled to 30° C. and then solids had been separated by filtration, toluene (100 ml) and water (100 ml) were added to the filtrate, and mixed with it. The mixture was then allowed to stand until it had separated into two phases of organic and aqueous phases, and the extraction was carried out. The combined organic phase was washed salt water and dried over anhydrous magnesium sulfate. Then, the solvent was distilled off under reduced pressure and the resulting residue was purified by column chromatography using silica gel as a stationary phase powder and a mixed solvent of heptane/toluene (1/2 by volume) as an eluent, and then by recrystallization from a mixed solvent of Solmix A-11/heptane (1/2 by volume) to give trans-4-((trans-4'-(4-butoxy-2,3-difluorophenyl)bicyclohexane)-4-yl)methoxy-2,2',3,3'-tetrafluoro-4'-hexyloxybiphenyl (No. 138) (4.3 g). The yield based on the compound (s-10) was 81.3%.

The chemical shift (δ, ppm) in $^1$H-NMR analysis was described below, and the compound obtained was identified as trans-4-((trans-4'-(4-butoxy-2,3-difluorophenyl)bicyclohexane)-4-yl)methoxy-2,2',3, 3'-tetrafluoro-4'-hexyloxybiphenyl (No. 138). The solvent for measurement was $CDCl_3$.

Chemical shift δ (ppm); 7.07 (m, 3H), 6.91 (t, 1H), 6.81 (t, 1H), 6.71 (t, 1H), 6.12 (m, 1H), 4.17 (q, 2H), 4.02 (q, 2H), 3.22 (m, 1H), 2.70-2.59 (m, 1H), 2.59-2.44 (m, 2H), 2.38-2.30 (m, 1H), 2.08-2.01 (m, 1H), 2.01-1.91 (m, 1H), 1.81 (quin, 2H), 1.51-1.43 (m, 5H), 1.34 (m, 4H) and 0.91 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample consisting of the compound (15% by weight) and the mother liquid crystals (i) (85% by weight), according to the extrapolation method described above. Physical properties of the compound (No. 138) were as follows.

Transition temperature: C 102.6 $S_A$ 232.2 N 276.5 I.
$T_{NI}$=227.9° C.; Δ∈=−10.37; Δn=0.178.

Example 2

Preparation of 1-butoxy-4-(trans-4-(trans-4-((trans-4-(2,3-difluoro-4-(hexyloxy)phenyl)cyclohexyl)methoxy)-2,3-difluorophenyl)cyclohexyl)-2,3-difluorobenzene (No. 218)

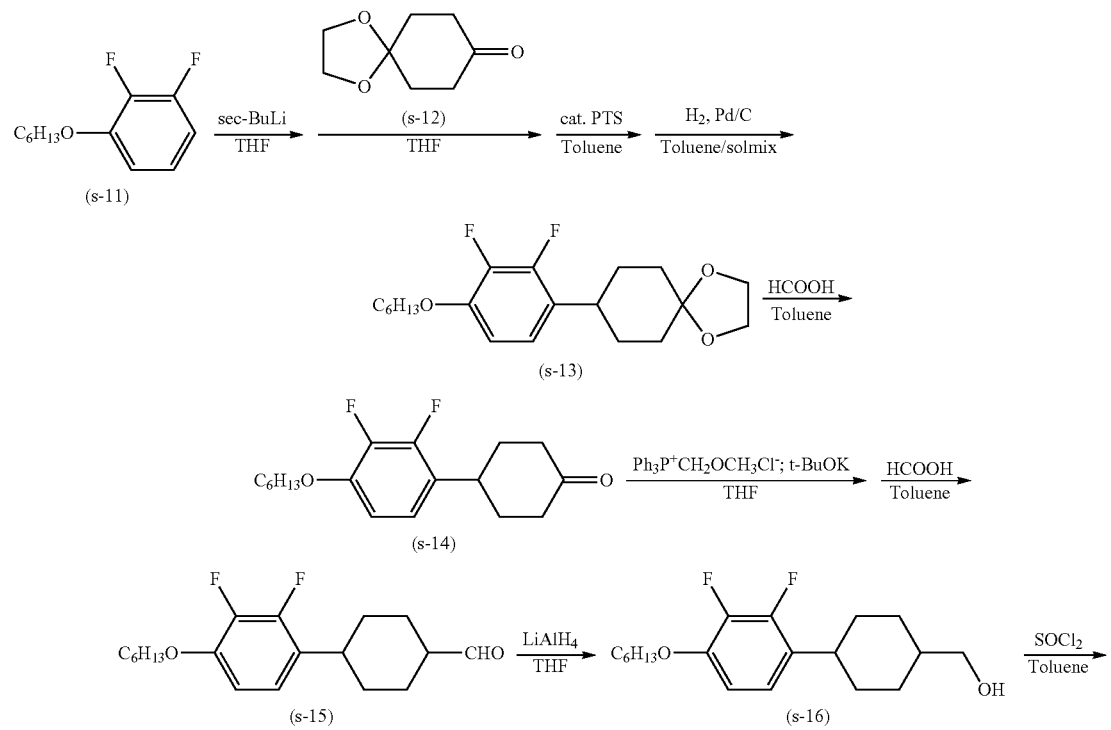

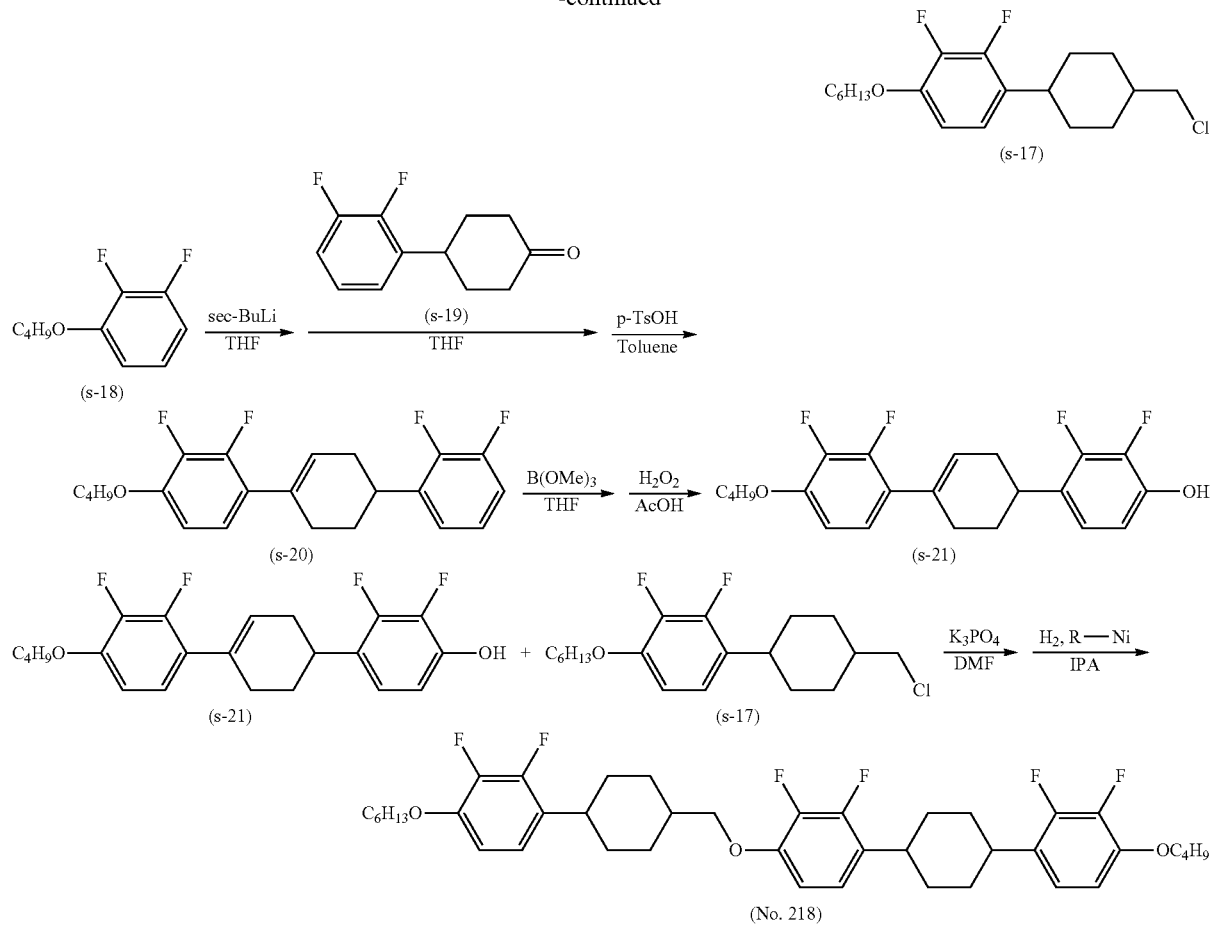

First Step:

3-Hexyloxy-1,2-difluorobenzene (s-11) (100 g) and THF (1000 ml) were put in a reaction vessel under an atmosphere of nitrogen and cooled to −74° C. sec-Butyllithium (a 1.00 M solution in n-hexane and cyclohexane; 500 ml) was added dropwide thereto in the temperature range of −74° C. to −70° C., and the stirring was continued for another 2 hours. Then, 1,4-dioxaspiro[4.5]decan-8-one (s-12) (72.9 g) in a THF (200 ml) solution was added dropwise thereto in the temperature range of −75° C. to −70° C., and the stirring was continued for another 8 hours while the mixture was allowed to come to 25° C. The reaction mixture was poured into a vessel containing an aqueous solution of ammonium chloride (3%; 500 ml) and ethyl acetate (500 ml), and mixed with them. The mixture was then allowed to stand until it had separated into organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under the reduced pressure to give 8-(4-butoxy-2,3-difluorophenyl)-1,4-dioxaspiro[4.5]decan-8-ol. p-Toluenesulfonic acid (4.1 g) and toluene (300 ml) were added to the compound and the mixture was heated to reflux for 2 hours, while distilled water was removed. After the reaction mixture had been cooled to 30° C., water (500 ml) and toluene (500 ml) were added to the mixture, and mixed with it. The mixture was then allowed to stand until it had separated into two phases of organic and aqueous phases, and the extraction was carried out. The combined organic phase was washed successively with a saturated aqueous solution of sodium hydrogencarbonate and water, and dried over anhydrous magnesium sulfate. The resulting solution was purified by column chromatography using silica gel as a stationary phase powder and toluene as an eluent. The product was dissolved in a mixed solvent of toluene (200 ml) and Solmix A-11 (200 ml), Pd/C (1.4 g) was added thereto and the mixture was stirred at room temperature under an atmosphere of hydrogen until hydrogen absorption had ceased. After the completion of the reaction, Pd/C was removed and the solvent was distilled off. The resulting residue was purified by column chromatography using silica gel as a stationary phase powder and toluene as an eluent, and then by recrystallization from Solmix A-11 to give 8-(4-hexyloxy-2,3-difluorophenyl)-1,4-dioxaspiro [4.5]decane (s-13) (127.4 g). The yield based on the compound (s-11) was 73.6%.

Second Step:

The compound (s-13) (127.4 g), formic acid (87%; 82.7 g) and toluene (500 ml) were mixed and the mixture was heated to reflux for 2 hours After the reaction mixture had been cooled to 30° C., water (500 ml) and toluene (500 ml) were added to the mixture, and mixed with it. The mixture was then allowed to stand until it had separated into two phases of organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under reduced pressure and the resultant residue was purified by column chromatography using silica gel as a stationary phase powder and toluene as an eluent, and then by recrystallization from a mixed solvent of heptane/toluene (2/1 by volume) to give 1-(4-hexyloxy-2,3-difluorophenyl)-cyclohexan-4-one (s-14) (101.4 g). The yield based on the compound (s-13) was 90.9%.

Third Step:

Well-dried methoxymethyltriphenylphosphonium chloride (37.3 g) and THF (500 ml) were mixed under an atmosphere of nitrogen and the mixture was cooled to −30° C. Then, potassium t-butoxide (t-BuOK) (13.0 g) was added in two portions in the temperature range of −30° C. to −20° C. After the mixture had been stirred at −20° C. for another 30 minutes, the compound (s-14) (30.0 g) dissolved in THF (100 ml) was added dropwise thereto in the temperature range of −30 to −20° C. After the reaction mixture had been stirred at −10° C. for another 30 minutes, it was poured into a mixture of water (200 ml) and toluene (200 ml), and mixed with it. The mixture was then allowed to stand until it had separated into two phases of organic and aqueous phases, and the extraction was carried out. The combined organic phase was washed with water and dried over anhydrous magnesium sulfate. The solution was concentrated under reduced pressure and the resulting residue was purified by column chromatography using silica gel as a stationary phase powder and a mixed solvent of heptane/toluene (1/1 by volume) as an eluent. The resulting eluent was concentrated under reduced pressure to give 1-(4-hexyloxy-2,3-difluorophenyl)-4-methoxymethylenecyclohexane. Then, formic acid (87%; 22.3 g) and toluene (300 ml) were added to the compound and the mixture was heated to reflux for 2 hours. After the reaction mixture had been cooled to 30° C., water (100 ml) and toluene (200 ml) were added to the mixture, and mixed with it. The mixture was then allowed to stand until it had separated into two phases of organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under reduced pressure and the resulting residue was purified by column chromatography using silica gel as a stationary phase powder and toluene as an eluent, and then by recrystallization from heptane/toluene (2/1 by volume) to give trans-4-(4-hexyloxy-2,3-difluorophenyl)-cyclohexanecarboaldehydeu (s-15) (15.8 g). The yield based on the compound (s-14) was 50.4%.

Fourth Step:

Lithium aluminum hydride (1.1 g) was suspended in THF (200 ml). trans-4-(4-Hexyloxy-2,3-difluorophenyl)-cyclohexanecarboaldehyde (s-15) (15.8 g) was added dropwise to the suspension in the temperature range of −20° C. to −10° C., and the stirring was continued in this temperature range for 2 hours. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The combined organic phase was washed successively with water and brine, and dried over anhydrous magnesium sulfate. The solvent was distilled off under reduced pressure and the residue was purified by recrystallization from heptane to give trans-4-(4-hexyloxy-2,3-difluorophenyl)-hydroxymethylcyclohexane (s-16) (4.7 g). The yield based on the compound (s-15) was 29.6%.

Fifth Step:

The compound (s-16) (4.7 g), toluene (100 ml) and pyridine (0.5 ml) were put in a reaction vessel under an atmosphere of nitrogen and the stirring was continued at 45° C. for 1 hour. Then, thionyl chloride (1.6 ml) was added thereto in the temperature range of 45° C. to 55° C. and the mixture was heated to reflux for 2 hours. After the reaction mixture had been cooled to 25° C., it was poured into water (100 ml) and toluene (100 ml), and mixed with them. The mixture was then allowed to stand until it had separated into two phases of organic and aqueous phases, and the extraction was carried out. The combined organic phase was washed successively with a saturated aqueous solution of sodium hydrogencarbonate twice and water three times, and dried over anhydrous magnesium sulfate. The solution was concentrated under reduced pressure and the resulting residue was purified by column chromatography using silica gel as a stationary phase powder and a mixed solvent of toluene/heptane (1/1 by volume) as an eluent, and then by recrystallization from Solmix A-11 to give trans-4-(4-hexyloxy-2,3-difluorophenyl)-chloromethylcyclohexane (s-17) (4.7 g). The yield based on the compound (s-16) was 94.7%.

Sixth Step:

3-Butoxy-1,2-difluorobenzene (s-18) (17.7 g) and THF (500 ml) were put in a reaction vessel under an atmosphere of nitrogen and cooled to −74° C. sec-Butyllithium (a 1.00 M solution in n-hexane and cyclohexane; 114 ml) was added dropwide thereto in the temperature range of −74° C. to −70° C., and the stirring was continued for another 2 hours. Then, 4-(2,3-difluorophenyl)cyclohexanone (s-19) (20.0 g) dissolved in THF (100 ml) was added dropwise thereto in the temperature range of −75° C. to −70° C., and the stirring was continued for another 8 hours while the mixture was allowed to come to 25° C. The reaction mixture was poured into a vessel containing an aqueous solution of ammonium chloride (3%; 200 ml) and ethyl acetate (200 ml), and mixed with them. The mixture was then allowed to stand until it had separated into organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under the reduced pressure. p-Toluenesulfonic acid (4.1 g) and toluene (300 ml) were added to the residue and the mixture was heated to reflux for 2 hours, while distilled water was removed. After the reaction mixture had been cooled to 30° C., water (500 ml) and toluene (500 ml) were added to the mixture, and mixed with it. The mixture was then allowed to stand until it had separated into two phases of organic and aqueous phases, and the extraction was carried out. The combined organic phase was washed successively with a saturated aqueous solution of sodium hydrogencarbonate and water, and dried over anhydrous magnesium sulfate. The solution was purified by column chromatography using silica gel as a stationary phase powder and a mixed solvent of toluene and heptane (1/1 by volume) as an eluent, and then by recrystallization from Solmix A-11 to give 1-butoxy-4-(4-(2,3-difluorophenyl)cyclohex-1-enyl)-2,3-difluorobenzene (s-20) (7.2 g). The yield based on the compound (s-18) was 20.0%.

Seventh Step:

1-Butoxy-4-(4-(2,3-difluorophenyl)cyclohex-1-enyl)-2,3-difluorobenzene (s-20) (7.2 g) and THF (200 ml) were put in a reaction vessel under an atmosphere of nitrogen and cooled to −74° C. sec-Butyllithium (a 1.00 M solution in n-hexane and cyclohexane; 23.0 ml) was added dropwise thereto in the temperature range of −74° C. to −70° C., and the stirring was continued for another 2 hours. Then, trimethyl borate (2.0 g) in a THF (30 ml) solution was added dropwise thereto in the temperature range of −74° C. to −65° C., and the stirring was continued for another 8 hours while the mixture was allowed to come to 25° C. Then, the reaction mixture was poured into a vessel containing 1 N hydrochloric acid (100 ml) and ice-water (200 ml), and mixed with them. Ethyl acetate (200 ml) was added and the mixture was allowed to separate into organic and aqueous phases, and the extraction was carried out. The combined organic phase was washed successively with water, a saturated aqueous solution of sodium hydrogencarbonate and salt water, and dried over anhydrous magnesium sulfate. Then, the solvent was distilled off under reduced pressure. The residue and acetic acid (50 ml) were put in a reaction vessel under an atmosphere of nitrogen, and hydrogen peroxide (a 31% aqueous solution; 1.0 g) was added in the temperature range of 25° C. to 30° C., and then the stirring was continued for another 2 hours. Then, the reaction mixture was poured into a vessel containing an aqueous solution of sodium hydrogensulfite (100 ml) and ethyl acetate (200 ml), and mixed with them. The mixture was then allowed to stand until it had separated into organic and aqueous phases, and the extraction was carried out. The combined organic phase was washed successively with water and salt water, and dried over anhydrous magnesium sulfate. Then, the solvent was distilled off to give 1-butoxy-4-(4-(2,3-difluorophenyl)cyclohex-1-enyl)-2,3-difluorophenol (s-21) (5.9 g). The yield based on the compound (s-20) was 78.6%.

Eighth Step:

1-Butoxy-4-(4-(2,3-difluorophenyl)cyclohex-1-enyl)-2,3-difluorophenol (s-21) (5.9 g) and tripotassium phosphate ($K_3PO_4$) (14.4 g) were added to DMF (100 ml) under an atmosphere of nitrogen and the mixture was stirred at 80° C. The compound (s-17) (4.7 g) was added thereto and the stirring was continued at 80° C. for another 7 hours. After the reaction mixture had been cooled to 30° C. and solids had been separated by filtration, toluene (100 ml) and water (100 ml) were added to the mixture, and mixed with it. The mixture was then allowed to stand until it had separated into two phases of organic and aqueous phases, and the extraction was carried out. The combined organic phase was washed with salt water and dried over anhydrous magnesium sulfate. Then, the solvent was distilled off under reduced pressure and the resulting residue was purified by column chromatography using silica gel as a stationary phase powder and a mixed solvent of heptane/toluene (1/2 by volume) as an eluent. Pd/C (0.5 g) was added to the product and the mixture was stirred at room temperature under an atmosphere of hydrogen until hydrogen absorption had ceased. After the completion of the reaction, Pd/C was removed and the solvent was distilled off. The resulting residue was purified by column chromatography using silica gel as a stationary phase powder and toluene as an eluent, and then by recrystallization from a mixed solvent of Solmix A-11/heptane (1/2 by volume) to give 1-butoxy-4-(trans-4-(trans-4-((trans-4-(2,3-difluoro-4-(hexyloxy)phenyl)cyclohexyl)methoxy)-2,3-difluorophenyl)cyclohexyl)-2,3-difluorobenzene (No. 218) (1.6 g). The yield based on the compound (s-17) was 17.0%.

The chemical shift (δ, ppm) in $^1$H-NMR analysis was described below, and the compound obtained was identified as 1-butoxy-4-(trans-4-(trans-4-((trans-4-(2,3-difluoro-4-(hexyloxy)phenyl)cyclohexyl)m ethoxy)-2,3-difluorophenyl)cyclohexyl)-2,3-difluorobenzene (No. 218). The solvent for measurement was $CDCl_3$.

Chemical shift δ (ppm); 7.11-7.02 (m, 3H), 6.90 (td, 1H), 6.81 (td, 2H), 6.70 (td, 1H), 6.78 (td, 1H), 4.16 (q, 2H), 4.02 (t, 2H), 3.02 (m, 1H), 2.91 (m, 1H), 2.03 (m, 4H), 1.82 (quin, 2H), 1.77-1.62 (m, 4H), 1.51-1.43 (m, 5H), 1.38-1.31 (m, 4H) and 0.91 (t, 3H).

Transition temperature was expressed in terms of measured values of the compound itself. Maximum temperature ($T_{NI}$), dielectric anisotropy ($\Delta\epsilon$) and optical anisotropy ($\Delta n$) were expressed in terms of extrapolated values calculated from measured values of the sample consisting of the compound (5% by weight) and the mother liquid crystals (i) (95% by weight) according to the extrapolation method described above. Physical properties of the compound (No. 218) were as follows.

Transition temperature: C 125.7 $S_A$ 200.5 N 244.8 I. $T_{NI}$=202.6° C.; $\Delta\epsilon$=−6.23; $\Delta n$=0.153.

Example 3

Preparation of 1-butoxy-4-(4-(4-(4-(2,3-difluoro-4-hexyloxyphenyl)cyclohex-1-enyl)-2,3-difluorophenyl)cyclohex-1-en yl)-2,3-difluorobenzene (No. 48)

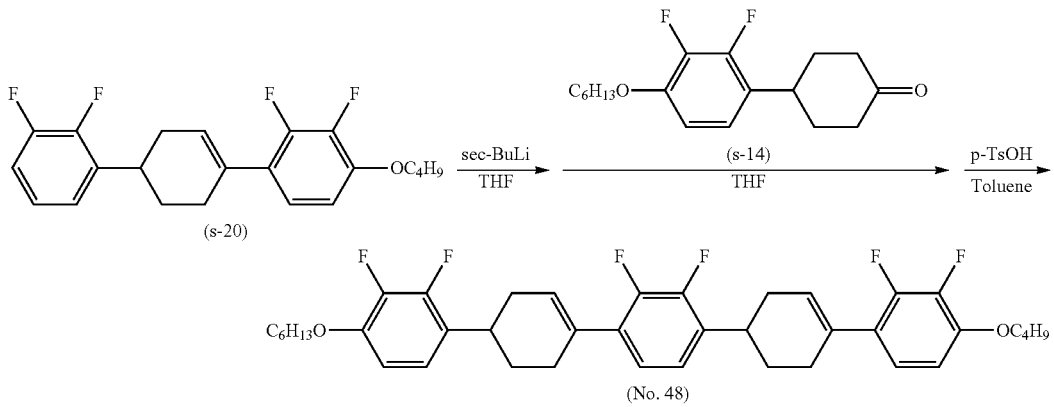

First Step:

1-Butoxy-4-(4-(2,3-difluorophenyl)cyclohex-1-enyl)-2,3-difluorobenzene (s-20) (8.1 g) and THF (200 ml) were put in a reaction vessel under an atmosphere of nitrogen and cooled to −74° C. sec-Butyllithium (a 1.00 M solution in n-hexane and cyclohexane; 26.0 ml) was added dropwise thereto in the temperature range of −74° C. to −70° C., and the stirring was continued for another 2 hours. Then, 4-(2,3-difluoro-4-hexyloxyphenyl)cyclohexanone (s-14) (20.0 g) dissolved in THF (100 ml) was added dropwise thereto in the temperature range of −75° C. to −70° C., and the stirring was continued for another 8 hours while the mixture was allowed to come to 25° C. The reaction mixture was poured into a vessel containing an aqueous solution of ammonium chloride (3%; 100 ml) and ethyl acetate (100 ml), and mixed with them. The mixture was then allowed to stand until it had separated into organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under reduced pressure. p-Toluenesulfonic acid (0.14 g) and toluene (200 ml) was mixed with the residue and the mixture was heated to reflux for 2 hours, while distilled water was removed. After the reaction mixture had been cooled to 30° C., water (100 ml) and toluene (100 ml) were added to the mixture, and mixed with it. The mixture was then allowed to stand until it had separated into two phases of organic and aqueous phases, and the extraction was carried out. The combined organic phase was washed successively with a saturated aqueous solution of sodium hydrogencarbonate and water, and dried over anhydrous magnesium sulfate. The solution was purified by column chromatography using silica gel as a stationary phase powder and a mixed solvent of toluene/heptane (1/1 by volume) as an eluent, and then by recrystallization from a mixed solvent of ethyl acetate/Solmix A-11 (1/1 by volume) to give 1-butoxy-4-(4-(4-(4-(2,3-difluoro-4-hexyloxyphenyl)cyclohex-1-enyl)-2,3-difluo rophenyl)cyclohex-1-enyl)-2,3-difluorobenzene (No. 48) (0.61 g). The yield based on the compound (s-20) was 4.2%.

The chemical shift (δ, ppm) in $^1$H-NMR analysis was described below, and the compound obtained was identified as 1-butoxy-4-(4-(4-(4-(2,3-difluoro-4-hexyloxyphenyl)cyclohex-1-en yl)-2,3-difluorophenyl)cyclohexen-1-enyl)-2,3-difluorobenzene (No. 48). The solvent for measurement was CDCl$_3$.

Chemical shift δ (ppm); 6.99 (m, 3H), 6.82 (m, 2H), 6.65 (t, 1H), 4.17 (q, 2H), 4.01 (t, 2H), 2.73 (m, 3H), 1.95 (m, 2H), 1.88 (m, 2H), 1.80 (quin, 2H), 1.60 (q, 2H), 1.52-1.42 (m, 7H), 1.42-1, 30 (m, 5H), 1.21-1, 12 (m, 2H) and 0.91 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample consisting of the compound (15% by weight) and the mother liquid crystals (i) (85% by weight) according to the extrapolation method described above. Physical properties of the compound (No. 48) were as follows.

Transition temperature: C 91.8 SB 101.5 SA 236.7 N 270.4 I.

$T_{NI}$=210.6° C.; Δ∈=−8.24; Δn=0.192.

Example 4

Preparation of 4'-(4-butoxy-2,3-difluorophenyl) bicyclohexane-4-yl4-(2,3-difluoro-4-hexyloxyphenyl) cyclohexylcar boxylate (No. 458)

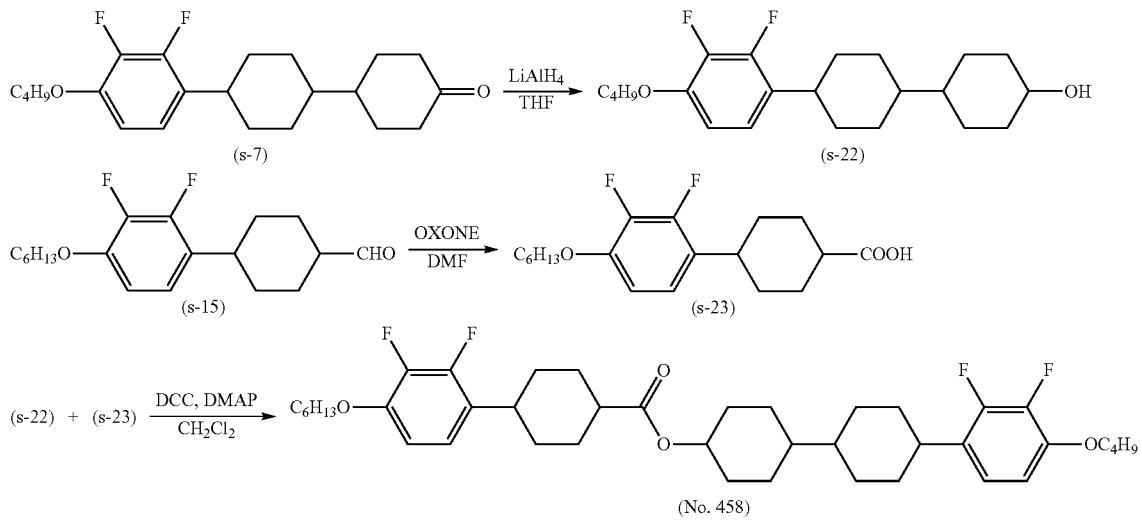

First Step:
Lithium aluminum hydride (0.62 g) was suspended in THF (200 ml). 4'-(4-Butoxy-2,3-difluorophenyl)-bicyclohexyl-4-one (s-7) (10.0 g) was added dropwise to the suspension in the temperature range of −20° C. to −10° C., and the stirring was continued in this temperature range for 2 hours. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The combined organic phase was washed successively with water and brine, and dried over anhydrous magnesium sulfate. The solvent was distilled off under reduced pressure and the residue was purified by recrystallization from heptane to give 4'-(4-butoxy-2,3-difluorophenyl)-bicyclohexanol (s-22) (8.8 g). The yield based on the compound (s-7) was 87.5%.

Second Step:
The compound (s-15) (10.5 g), OXONE (23.8 g) and DMF (100 ml) were put in a vessel under an atmosphere of nitrogen and the mixture was stirred at room temperature for 24 hours. The reaction mixture was poured into a 1 N HCl aqueous solution (200 ml) and toluene (200 ml), and mixed with them. The mixture was then allowed to stand until it had separated into two phases of organic and aqueous phases, and the extraction was carried out. The combined organic phase was washed with water three times and dried over anhydrous magnesium sulfate. The solution was concentrated under reduced pressure to give trans-4-(4-hexyloxy-2,3-difluorophenyl)-cyclohexylcarboxylic acid (s-23) (7.8 g). The yield based on the compound (s-15) was 70.8%.
Third Step:

The compound (s-22) (2.2 g), the compound (s-23) (2.0 g), 1,3-dicyclohexylcarbodiimide (DCC) (1.5 g) and 4-dimethylaminopyridine (DMAP) (0.07 g) were added to toluene (100 ml) under an atmosphere of nitrogen and the stirring was continued at 25° C. for 20 hours. After the completion of the reaction had been confirmed by means of GC analysis, toluene (100 ml) and water (100 ml) were added to the reaction mixture, and mixed with it. The mixture was then allowed to stand until it had separated into two phases of organic and aqueous phases, and the extraction was carried out. The combined organic phase was washed with water and dried over anhydrous magnesium sulfate. The solution was concentrated under reduced pressure and the residue was purified by column chromatography using silica gel as a stationary phase powder and toluene as an eluent, and then by recrystallization from a mixed solvent of ethyl acetate/Solmix A-11 (1/1 by volume) to give 4'-(4-butoxy-2,3-difluorophenyl)bicyclohexane-4-yl 4-(2,3-difluoro-4-hexyloxyphenyl)cyclohexylcarboxylate (No. 458) (3.2 g). The yield based on the compound (s-22) was 78.6%.

The chemical shift (δ, ppm) in $^1$H-NMR analysis was described below, and the compound obtained was identified as 4'-(4-butoxy-2,3-difluorophenyl)bicyclohexane-4-yl 4-(2,3-difluoro-4-hexyloxyphenyl)cyclohexylcarboxylate (No. 458). The solvent for measurement was $CDCl_3$.

Chemical shift δ (ppm); 6.82 (m, 2H), 6.66 (t, 2H), 4.66 (tt, 1H), 4.01 (m, 4H), 2.78 (tt, 1H), 2.72 (tt, 1H), 2.30 (tt, 1H), 2.08 (m, 2H), 1.99 (m, 2H), 1.96-1.75 (m, 12H), 1.65-1.54 (m, 2H), 1.53-1.27 (m, 14H), 1.22-1.08 (m, 6H), 0.97 (t, 3H) and 0.90 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample consisting of the compound (10% by weight) and the mother liquid crystals (i) (90% by weight) according to the extrapolation method described above. Physical properties of the compound (No. 458) were as follows.

Transition temperature: C 106.6 $S_c$ 258.9 $S_A$ 277.2 N 317.9 I.

$T_{NI}$=245.6° C.; Δ∈=−8.35; Δn=0.141.

Example 5

Preparation of 4'-(2,2',3,3'-tetrafluoro-4'-hexyloxy-1,1'-biphenyl)-4-yl trans-4'-(4-butoxy-2,3-difluorophenyl)bicyclohexylcarboxylate (No. 258)

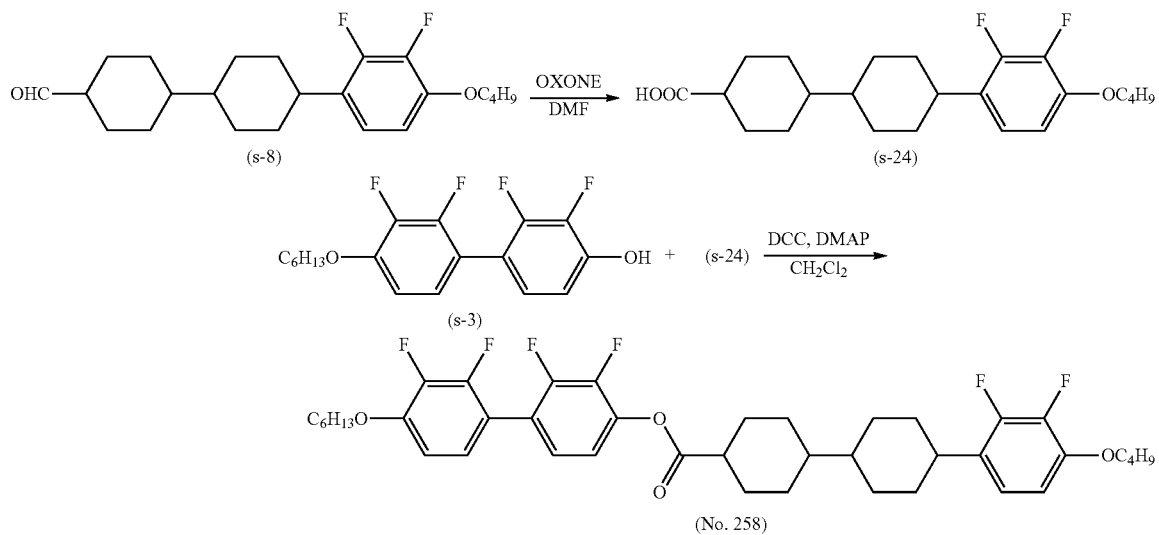

First Step:

The compound (s-8) (10.0 g), OXONE (17.8 g) and DMF (100 ml) were put in a vessel under an atmosphere of nitrogen, and the stirring was continued at room temperature for 24 hours. The reaction mixture was poured into a 1 N HCl aqueous solution (200 ml) and toluene (200 ml), and mixed with them. The mixture was then allowed to stand until it had separated into two phases of organic and aqueous phases, and the extraction was carried out. The combined organic phase was washed with water three times and dried over anhydrous magnesium sulfate. The solution was concentrated under reduced pressure to give trans-4-(4-hexyloxy-2,3-difluorophenyl)-cyclohexylcarboxylic acid (s-24) (7.8 g). The yield based on the compound (s-8) was 74.8%.
Second Step:

The compound (s-3) (2.0 g), the compound (s-24) (2.3 g), 1,3-dicyclohexylcarbodiimide (DCC) (1.3 g) and 4-dimethylaminopyridine (DMAP) (0.07 g) were added to toluene (100 ml) under an atmosphere of nitrogen and the mixture was stirred at 25° C. for 20 hours. After the completion of the reaction had been confirmed by means of GC analysis, toluene (100 ml) and water (100 ml) were added to the reaction mixture, and mixed with it. The mixture was then allowed to stand until it had separated into two phases of organic and aqueous phases, and the extraction was carried out. The combined organic phase was washed with water and dried over anhydrous magnesium sulfate. The solution was concentrated under reduced pressure and the residue was purified by column chromatography using silica gel as a stationary phase powder and toluene as an eluent, and then by recrystallization from a mixed solvent of ethyl acetate/Solmix A-11 (1/1 by volume) to give 4'-(2,2',3,3'-tetrafluoro-4'-hexyloxy-1,1'-biphenyl)-4-yl trans-4'-(4-butoxy-2,3-difluorophenyl)bicyclohexylcarboxylate (No. 258) (3.6 g). The yield based on the compound (s-3) was 86.7%.

The chemical shift (δ, ppm) in $^1$H-NMR analysis was described below, and the compound obtained was identified as 4'-(2,2',3,3'-tetrafluoro-4'-hexyloxy-1,1'-biphenyl)-4-yl trans-4'-(4-butoxy-2,3-difluorophenyl)bicyclohexylcarboxylate (No. 258). The solvent for measurement was CDCl$_3$.

Chemical shift δ (ppm); 7.10 (t, 1H), 7.02 (t, 1H), 6.97 (t, 1H), 6.86-6.78 (m, 2H), 6.67 (t, 1H), 4.08 (t, 2H), 4.01 (t, 2H), 2.74 (tt, 1H), 2.57 (tt, 1H), 2.22 (m, 2H), 1.95-1.74 (m, 10H), 1.65-1.54 (m, 2H), 1.54-1.39 (m, 6H), 1.38-1.32 (m, 4H), 1.26-1.09 (m, 6H), 0.97 (t, 3H) and 0.91 (t, 3H).

Transition temperature was expressed in terms of measured values of the compound itself. Maximum temperature (T$_{NI}$), dielectric anisotropy (Δ∈) and optical anisotropy (Δn) were expressed in terms of extrapolated values calculated from measured values of the sample consisting of the compound (10% by weight) and the mother liquid crystals (i) (90% by weight) according to the extrapolation method described above. Physical properties of the compound (No. 258) were as follows.

Transition temperature: C 134.1 S$_C$ 170.7 S$_A$ 272.6 N 321.5 I.

T$_{NI}$=233.6° C.; Δ∈=−8.95; Δn=0.161.

Example 6

Preparation of trans-4-(4'-ethoxy-2,2',3,3'-tetrafluoro-1,1'-biphenyl-4-yl)cyclohexyl trans-4-(2,3-difluoro-4-hexyloxyphenyl)cyclohexylcarboxylate (No. 347)

atmosphere of nitrogen and cooled to −74° C. sec-Butyllithium (a 1.00 M solution in n-hexane and cyclohexane; 222 ml) was added dropwide thereto in the temperature range of −74° C. to −70° C., and the stirring was continued for another 2 hours. Then, 1,4-dioxaspiro[4.5]decan-8-one (s-12) (28.8 g) dissolved in THF (200 ml) was added dropwise thereto in the temperature range of −75° C. to −70° C., and the stirring was continued for another 8 hours while the mixture was allowed to come to 25° C. The reaction mixture was poured into a vessel containing an aqueous solution of ammonium chloride (3%; 500 ml) and ethyl acetate (500 ml), and mixed with them. The mixture was then allowed to stand until it had separated into organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off to give 8-(4'-ethoxy-2,2',3,3'-tetrafluoro-1,1'-biphenyl-4-yl)-1,4-dioxaspiro[4.5]decan-8-ol. p-Toluenesulfonic acid (1.5 g) and toluene (300 ml) were added to the compound and the mixture was heated to reflux for 2 hours, while distilled water was removed. After the reaction mixture had been cooled to 30° C., water (300 ml) and toluene (300 ml) were added to the mixture, and mixed with it. The mixture was then allowed to stand until it had separated into two phases of organic and aqueous phases, and the extraction was carried out. The combined organic phase was washed successively with a saturated aqueous solution of sodium hydrogencarbonate and water, and dried over anhydrous magnesium sulfate. The resulting solution was purified by column chromatography using silica gel as a stationary phase powder and toluene as an eluent. The product was dissolved in a mixed solvent of toluene (100 ml)

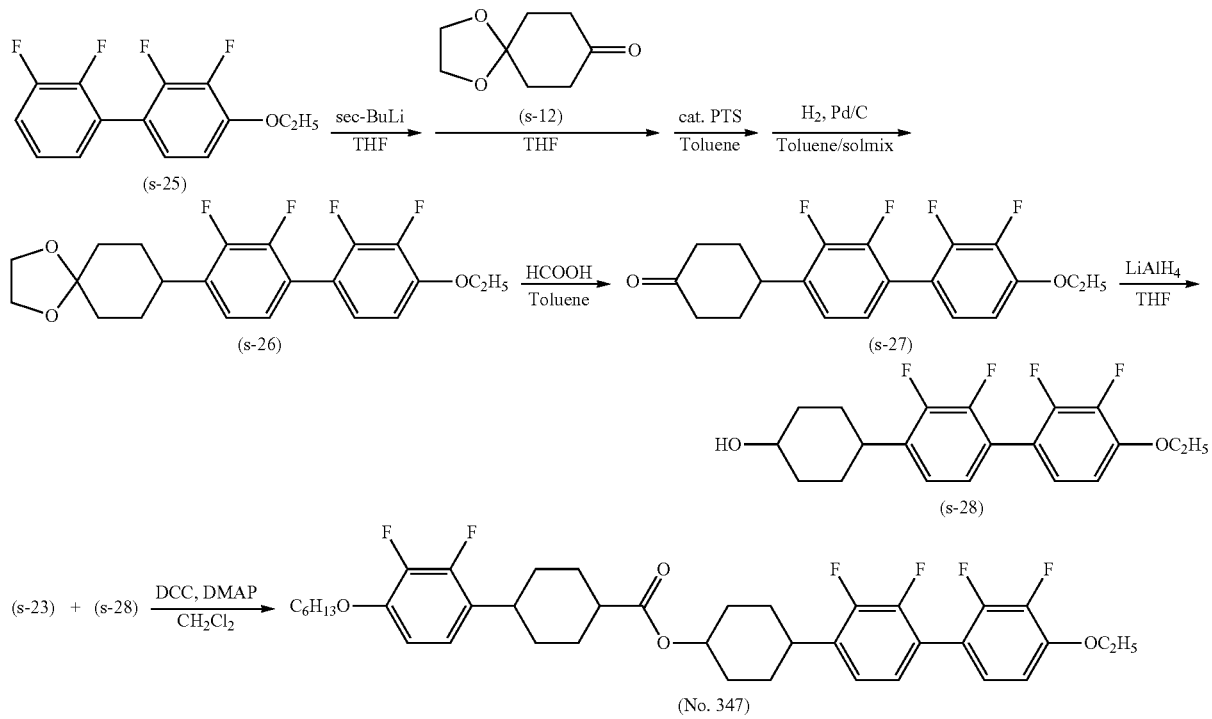

First Step:

4'-Ethoxy-2,2',3,3'-tetrafluoro-1,1'-biphenyl (s-25) (50 g) and THF (500 ml) were put in a reaction vessel under an and Solmix A-11 100 ml), Pd/C (2.5 g) was added thereto, and the mixture was stirred at room temperature under an atmosphere of hydrogen until hydrogen absorption had ceased.

After the completion of the reaction, Pd/C was removed and the solvent was distilled off. The resulting residue was purified by column chromatography using silica gel as a stationary phase powder and toluene as an eluent, and then by recrystallization from Solmix A-11 to give 8-(4'-ethoxy-2,2', 3,3'-tetrafluoro-1,1'-biphenyl-4-yl)-1,4-dioxaspiro[4.5]decane (s-26) (31.9 g). The yield based on the compound (s-25) was 42.0%.

Second Step:

The compound (s-26) (31.9 g), formic acid (87%; 10.7 g) and toluene (200 ml) were mixed and the mixture was heated to reflux for 2 hours. After the reaction mixture had been cooled to 30° C., water (200 ml) and toluene (200 ml) were added to the mixture, and mixed with it. The mixture was then allowed to stand until it had separated into two phases of organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under reduced pressure and the resulting residue was purified by column chromatography using silica gel as a stationary phase powder and toluene as an eluent, and then by recrystallization from a mixed solvent of heptane/toluene (2/1 by volume) to give 1-(4'-ethoxy-2,2',3,3'-tetrafluoro-1,1'-biphenyl-4-yl)-cyclohexan-4-one (s-27) (21.8 g). The yield based on the compound (s-26) was 76.6%.

Third Step:

Lithium aluminum hydride (0.31 g) was suspended in THF (100 ml). 1-(4'-Ethoxy-2,2',3,3'-tetrafluoro-1,1'-biphenyl-4-yl)-cyclohexan-4-one (s-27) (5.0 g) dissolved in THF (20 ml) was added dropwide to the suspension in the temperature range of –20° C. to –10° C., and the stirring was continued in this temperature range for another 2 hours. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The combined organic phase was washed successively with water and brine, and dried over anhydrous magnesium sulfate. The solvent was distilled off under reduced pressure and the residue was purified by recrystallization from heptane to give trans-4-(4'-ethoxy-2,2',3,3'-tetrafluoro-1,1'-biphenyl-4-yl)-cyclohexanol (s-28) (12.1 g). The yield based on the compound (s-27) was 89.1%.

Fourth Step:

The compound (s-23) (2.0 g), the compound (s-28) (2.2 g), 1,3-dicyclohexylcarbodiimide (DCC) (1.8 g) and 4-dimethylaminopyridine (DMAP) (0.07 g) were added to toluene (50 ml) under an atmosphere of nitrogen and the mixture was stirred at 25° C. for 20 hours. After the completion of the reaction had been confirmed by means of GC analysis, toluene (100 ml) and water (100 ml) were added to the reaction mixture, and mixed with it. The mixture was then allowed to stand until it had separated into two phases of organic and aqueous phases, and the extraction was carried out. The combined organic phase was washed with water and dried over anhydrous magnesium sulfate. The resulting solution was concentrated under reduced pressure and the residue was purified by column chromatography using silica gel as a stationary phase powder and toluene as an eluent, and then by recrystallization from a mixed solvent of ethyl acetate/Solmix A-11 (1/1 by volume) to give trans-4-(4'-ethoxy-2,2',3, 3'-tetrafluoro-1,1'-biphenyl-4-yl)cyclohexyl trans-4-(2,3-difluoro-4-hexyloxyphenyl)cyclohexylcarboxylate (No. 347) (3.0 g). The yield based on the compound (s-28) was 74.6%.

The chemical shift (δ, ppm) in $^1$H-NMR analysis was described below, and the compound obtained was identified as trans-4-(4'-ethoxy-2,2',3,3'-tetrafluoro-1,1'-biphenyl-4-yl)cyclohexyl trans-4-(2,3-difluoro-4-hexyloxyphenyl)cyclohexylcarboxylate (No. 347). The solvent for measurement was CDCl$_3$.

Chemical shift δ (ppm); 7.03 (m, 3H), 6.81 (tt, 2H), 6.67 (t, 1H), 4.81 (m, 1H), 4.17 (q, 2H), 4.00 (t, 2H), 2.93 (tt, 1H), 2.80 (tt, 1H), 2.34 (tt, 1H), 2.12 (m, 4H), 1.98 (m, 2H), 1.94 (m, 2H), 1.80 (quin, 2H), 1.71-1.42 (m, 13H), 1.38-1.31 (m, 4H) and 0.90 (t, 3H).

Transition temperature was expressed in terms of measured values of the compound itself. Maximum temperature ($T_{NI}$), dielectric anisotropy (Δ∈) and optical anisotropy (Δn) were expressed in terms of extrapolated values calculated from measured values of the sample consisting of the compound (15% by weight) and the mother liquid crystals (i) (85% by weight) according to the extrapolation method described above. Physical properties of the compound (No. 347) were as follows.

Transition temperature: C 135.2 N 314.0 I.
$T_{NI}$=234.6° C.; Δ∈=–7.54; Δn=0.174.

Example 7

Preparation of trans-4-(2,3-difluoro-4-hexyloxyphenyl)cyclohexyl trans-4-(4'-ethoxy-2,2',3,3'-tetrafluoro-1,1'-biphenyl-4-yl)cyclohexylcarboxylate (No. 297)

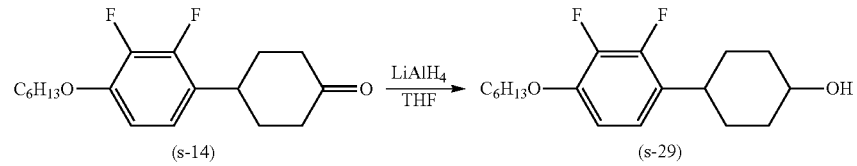

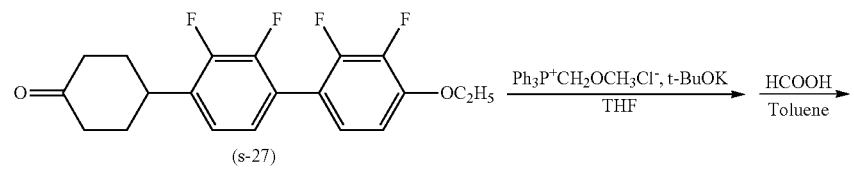

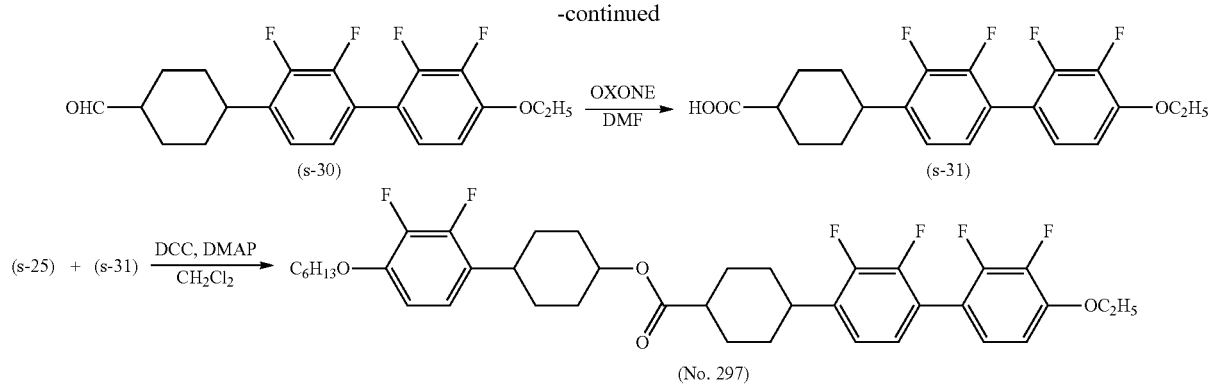

First Step:

Lithium aluminum hydride (1.47 g) was suspended in THF (200 ml). 4-(4'-Hexyloxy-2,3,-difluorophenyl)-cyclohexanone (s-14) (20.0 g) dissolved in THF (50 ml) was added dropwise to the suspension in the temperature range of −20° C. to −10° C., and the stirring was continued in this temperature range for another 2 hours. After the completion of the reaction had been confirmed by means of GC analysis, ethyl acetate and then a saturated aqueous solution of ammonia were added to the reaction mixture under ice-cooling and deposits were removed by filtration through Celite. The filtrate was extracted with ethyl acetate. The combined organic phase was washed successively with water and brine, and dried over anhydrous magnesium sulfate. The solvent was distilled off under reduced pressure and the residue was purified by recrystallization from heptane to give trans-4-(4'-hexyloxy-2,3,-difluorophenyl)-cyclohexanol (s-29) (16.3 g). The yield based on the compound (s-27) was 81.0%.

Second Step:

Well dried methoxymethyltriphenylphosphonium chloride (320.4 g) and THF (200 ml) were mixed under an atmosphere of nitrogen, and the solution was cooled to −30° C. Then, potassium t-butoxide (t-BuOK) (6.7 g) was added in two portions in the temperature range of −30° C. to −20° C. After the stirring at −20° C. for 30 minutes, the compound (s-27) (16.8 g) dissolved in THF (50 ml) was added dropwise thereto in the temperature range of −30 to −20° C. After the stirring at −10° C. for 30 minutes, the reaction mixture was poured into a mixture of water (200 ml) and toluene (200 ml), and mixed with them. The mixture was then allowed to stand until it had separated into two phases of organic and aqueous phases, and the extraction was carried out. The combined organic phase was washed with water and dried over anhydrous magnesium sulfate. The solution was concentrated under reduced pressure and the resulting residue was purified by column chromatography using silica gel as a stationary phase powder and a mixed solvent of heptane/toluene (1/1 by volume) as an eluent. The resulting eluent was concentrated under reduced pressure to give trans-4-(4'-ethoxy-2,2',3,3'-tetrafluoro-1,1'-biphenyl-4-yl)-methoxymethylenecyclohexane. Then, formic acid (87%; 4.2 g) and toluene (100 ml) were mixed and the mixture was heated to reflux for 2 hours. After the reaction mixture had been cooled to 30° C., water (100 ml) and toluene (100 ml) were added to the mixture, and mixed with it. The mixture was then allowed to stand until it had separated into two phases of organic and aqueous phases, and the extraction was carried out. The combined organic phase was washed successively with water, a saturated aqueous solution of sodium hydrogencarbonate and water, and dried over anhydrous magnesium sulfate. Then, the solvent was distilled off under reduced pressure and the resulting residue was purified by column chromatography using silica gel as a stationary phase powder and toluene as an eluent, and then by recrystallization from a mixed solvent of heptane/toluene (2/1 by volume) to give trans-4-(4'-ethoxy-2,2',3,3'-tetrafluoro-1,1'-biphenyl-4-yl)-cyclohexanecarboaldehyde (s-30) (11.7 g). The yield based on the compound (s-27) was 67.1%.

Third Step:

The compound (s-30) (5.0 g), OXONE (9.7 g) and DMF (50 ml) were added to a reaction vessel under an atmosphere of nitrogen and the stirring was continued at room temperature for 24 hours. The reaction mixture was poured into a 1 N HCl aqueous solution (100 ml) and toluene (100 ml), and mixed with them. The mixture was then allowed to stand until it had separated into two phases of organic and aqueous phases, and the extraction was carried out. The combined organic phase was washed with water three times and dried over anhydrous magnesium sulfate. The solution was concentrated under reduced pressure to give trans-4-(4'-ethoxy-2,2',3,3'-tetrafluoro-1,1'-biphenyl-4-yl)-cyclohexylcarboxylic acid (s-31) (2.5 g). The yield based on the compound (s-8) was 48.0%.

Fourth Step:

The compound (s-25) (0.9 g), the compound (s-31) (0.7 g), 1,3-dicyclohexylcarbodiimide (DCC) (0.7 g) and 4-dimethylaminopyridine (DMAP) (0.03 g) were added to toluene (50 ml) under an atmosphere of nitrogen, and the stirring was continued at 25° C. for 20 hours. After the completion of the reaction had been confirmed by means of GC analysis, toluene (100 ml) and water (100 ml) were added to the reaction mixture, and mixed with it. The mixture was then allowed to stand until it had separated into two phases of organic and aqueous phases, and the extraction was carried out. The combined organic phase was washed with water and dried over anhydrous magnesium sulfate. The solution was concentrated under reduced pressure and the resulting residue was purified by column chromatography using silica gel as a stationary phase powder and toluene as an eluent, and then by recrystallization from a mixed solvent of ethyl acetate/Solmix A-11 (1/1 by volume) to give trans-4-(2,3-difluoro-4-hexyloxyphenyl)cyclohexylcarboxylic acid trans-4-(4'-ethoxy-2,2',3,3'-tetrafluoro-1,1'-biphenyl-4-yl)cyclohexyl (No. 297) (0.18 g). The yield based on the compound (s-25) was 11.5%.

The chemical shift (δ, ppm) in $^1$H-NMR analysis was described below, and the compound obtained was identified as trans-4-(2,3-difluoro-4-hexyloxyphenyl)cyclohexyl trans-4-(4'-ethoxy-2,2',3,3'-tetrafluoro-1,1'-biphenyl-4-yl)cyclohexylcarboxylate (No. 297). The solvent for measurement was $CDCl_3$.

Chemical shift δ (ppm); 7.10-6.99 (m, 3H), 6.81 (m, 2H), 6.68 (m, 1H), 4.80 (m, 1H), 4.17 (q, 2H), 4.00 (t, 2H), 2.93 (tt, 1H), 2.81 (tt, 1H), 2.36 (tt, 1H), 2.18-2.06 (m, 4H), 2.00 (m, 2H), 1.93 (m, 2H), 1.80 (quin, 2H), 1.71-1.42 (m, 13H), 1.39-1.31 (m, 4H) and 0.90 (t, 3H).

Transition temperature was expressed in terms of measured values of the compound itself. Maximum temperature ($T_{NI}$), dielectric anisotropy ($\Delta\epsilon$) and optical anisotropy ($\Delta n$) were expressed in terms of extrapolated values calculated from measured values of the sample consisting of the compound (5% by weight) and the mother liquid crystals (i) (95% by weight) according to the extrapolation method described above. Physical properties of the compound (No. 297) were as follows.

Transition temperature: C 113.7 $S_A$ 117.5 N 305.9 I.
$T_{NI}$=232.6° C.; $\Delta\epsilon$=−6.61; $\Delta n$=0.185.

Example 8

The compounds No. 1 to No. 460 shown below can be synthesized by synthetic methods similar to those described in Examples 1 to 7. Attached data were measured in accordance with the methods described above. Measured values of the compound itself were used for the transition temperature, and values converted from the measured values of the sample, in which the compound was mixed with the mother liquid crystals (i), by means of the extrapolation method described above were used for the maximum temperature ($T_{NI}$), the dielectric anisotropy ($\Delta\epsilon$) and the optical anisotropy ($\Delta n$). Incidentally, the values for the compounds No. 218 and No. 297 were obtained by preparing liquid crystal compositions consisting of 95% by weight of the mother liquid crystals and 5% by weight of each of the compounds, and by measuring the physical properties of the compositions obtained and by extrapolating the measured values. The values for the compounds No. 258 and No. 458 were obtained by preparing liquid crystal compositions consisting of 90% by weight of the mother liquid crystals and 10% by weight of each of the compounds, and by measuring the physical properties of the compositions obtained, and by extrapolating the measured values. The values of the other compounds having characteristic data were obtained by preparing liquid crystal compositions consisting of 85% by weight of the mother liquid crystals and 15% by weight of each of the compounds, and by measuring the physical properties of the compositions obtained, and by extrapolating the measured values.

-continued
| No. | |
|---|---|
| 8 | 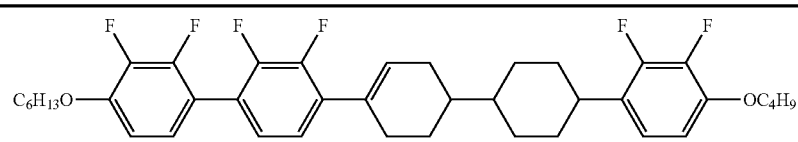 |
| 9 | 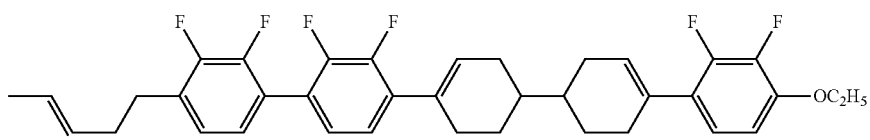 [SMILES: C/C=C/CCc1ccc(-c2ccc(C3=CCC(C4CC=C(c5ccc(OCC)c(F)c5F)CC4)CC3)c(F)c2F)c(F)c1F] |
| 10 | 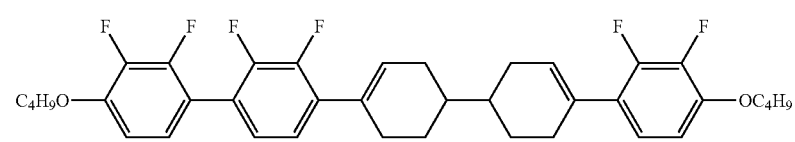 |
| 11 | 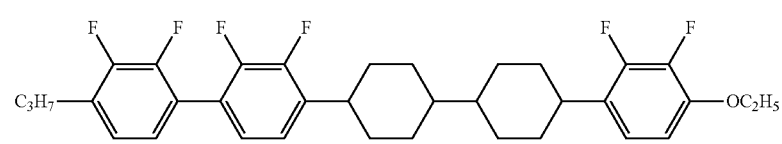 |
| 12 | 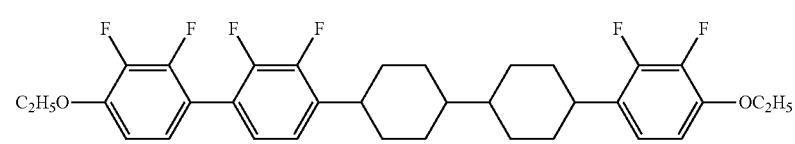 |
| 13 | 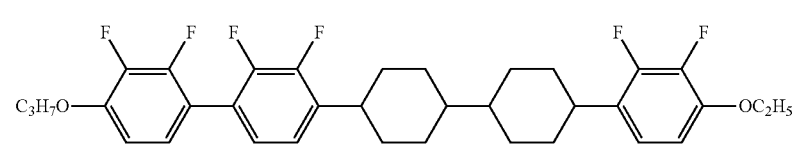 |
| 14 | 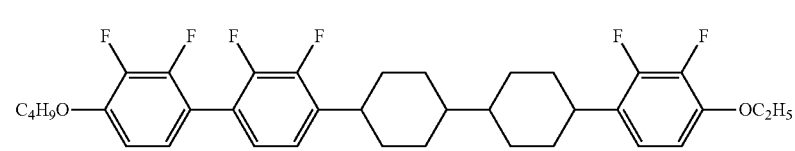 |
| 15 | 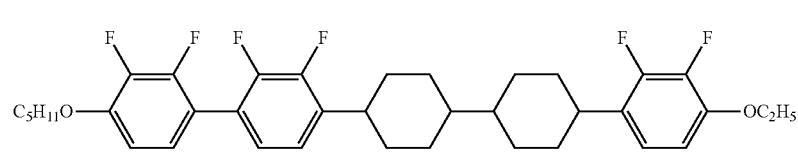 |
| 16 | 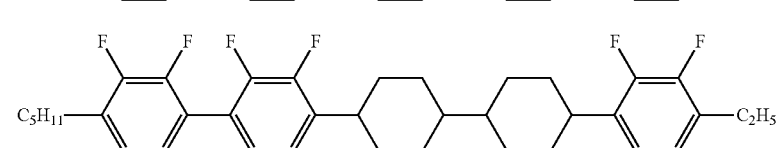 |
| 17 | 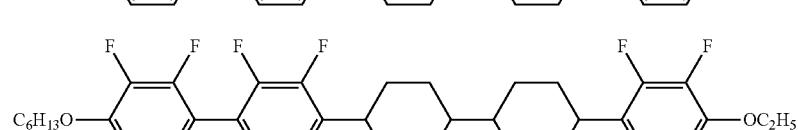 |
| 18 | 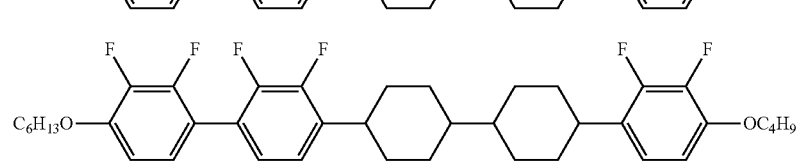 |

| No. | |
|---|---|
| 19 | 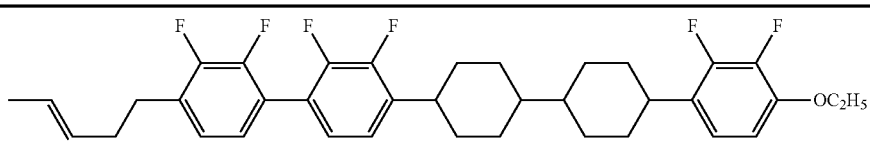 |
| 20 | 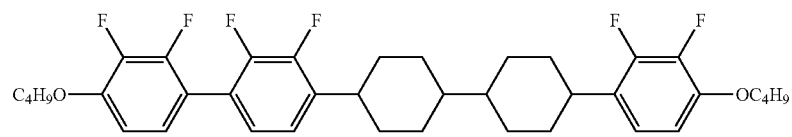 |
| 21 | 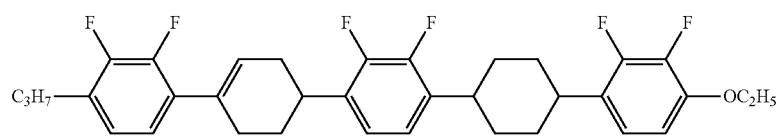 |
| 22 | 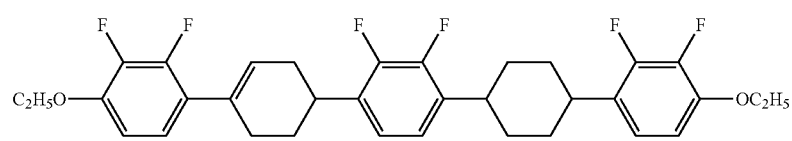 |
| 23 | 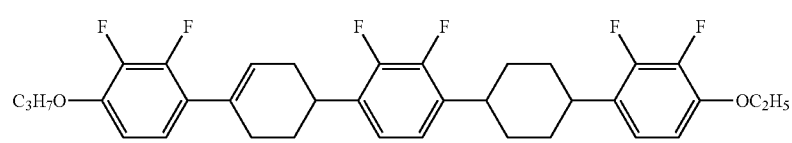 |
| 24 |  |
| 25 | 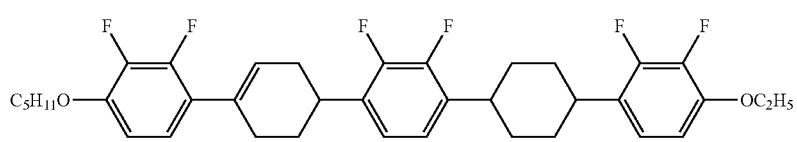 |
| 26 |  |
| 27 |  |
| 28 | 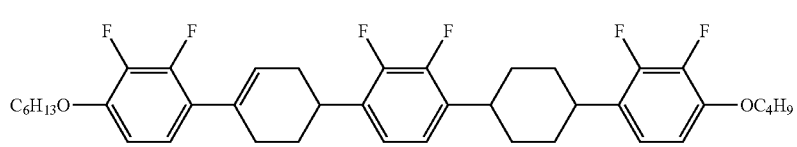 |
| 29 | 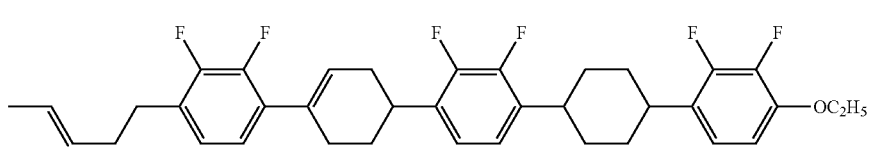 |

| No. | |
|---|---|
| 30 | 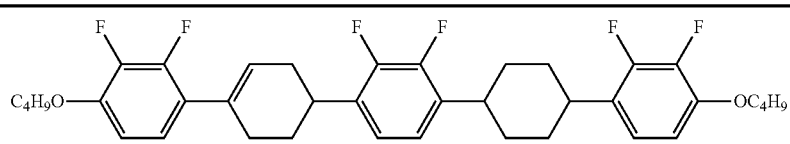 |
| 31 | 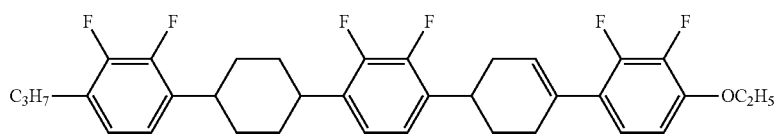 |
| 32 | 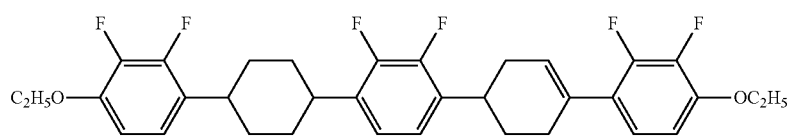 |
| 33 | 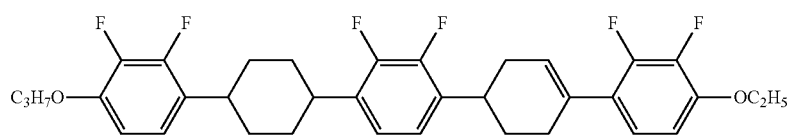 |
| 34 | 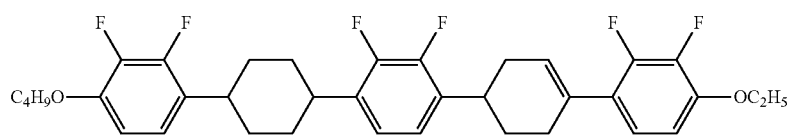 |
| 35 | 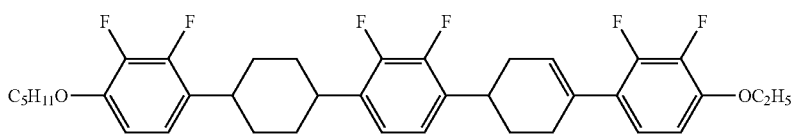 |
| 36 |  |
| 37 | 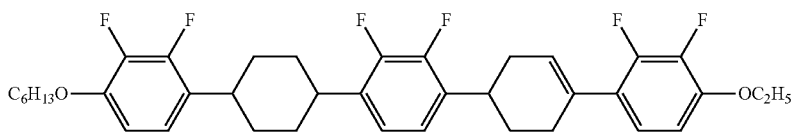 |
| 38 | 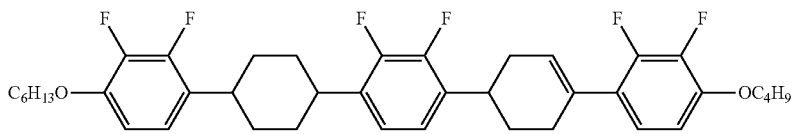 |
| 39 | 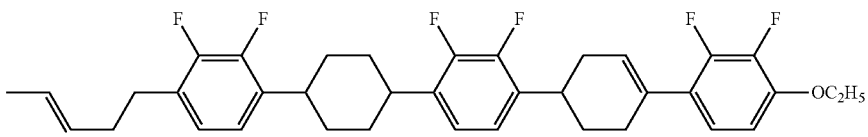 [SMILES: C/C=C/CCc1ccc(C2CCC(c3ccc(C4CC=C(c5ccc(OCC)c(F)c5F)CC4)c(F)c3F)CC2)c(F)c1F] |
| 40 | 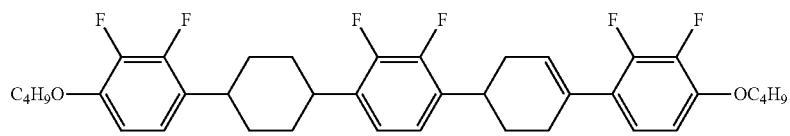 |

-continued
| No. | |
|---|---|
| 41 | 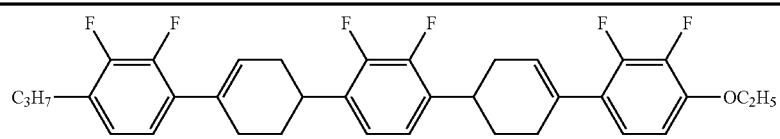 |
| 42 | 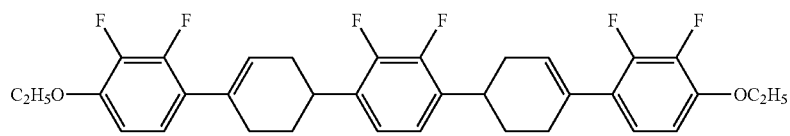 |
| 43 | 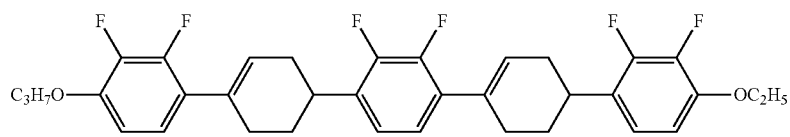 |
| 44 | 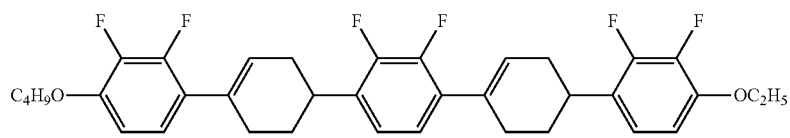 |
| 45 | 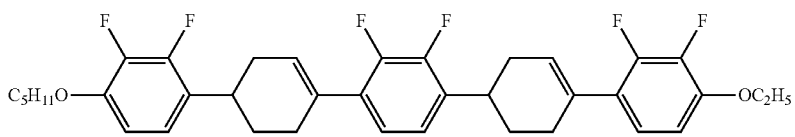 |
| 46 | 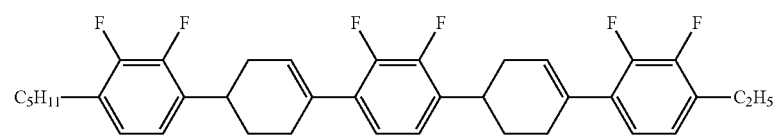 |
| 47 | 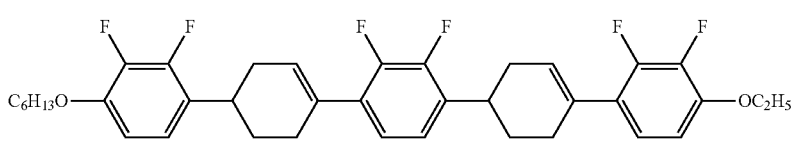 |
| 48 | 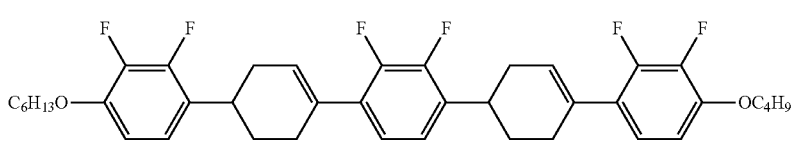<br>C 91.8 $S_B$ 101.5 $S_A$ 236.7 N 270.4 I<br>$T_{NI}$; 210.6° C., Δ ε; −8.24, Δ n; 0.192 |
| 49 | 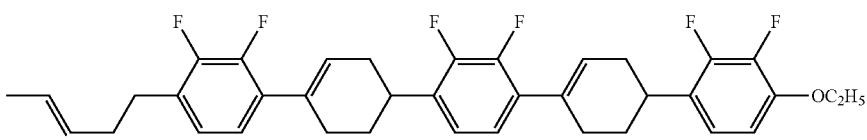 [SMILES: C/C=C/CCc1ccc(C2=CCC(c3ccc(C4=CCC(c5ccc(OCC)c(F)c5F)CC4)c(F)c3F)CC2)c(F)c1F] |
| 50 | 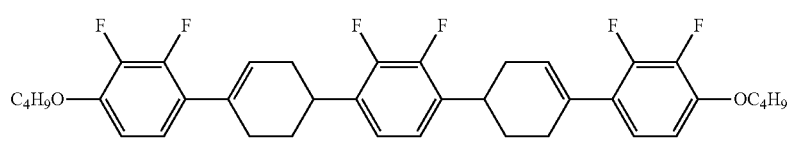 |
| 51 |  |

| No. | |
|---|---|
| 52 | 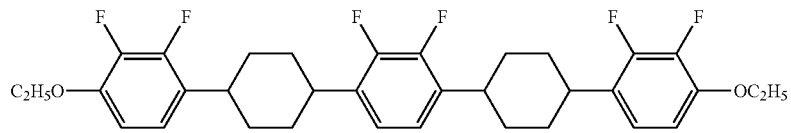 |
| 53 | 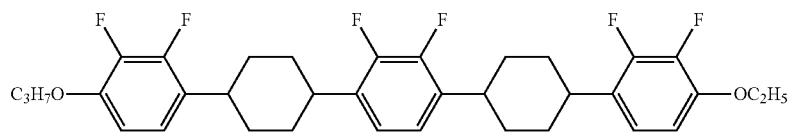 |
| 54 | 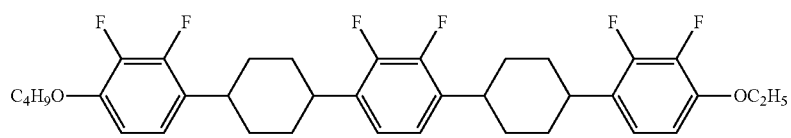 |
| 55 | 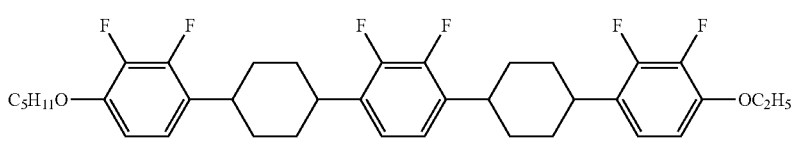 |
| 56 |  |
| 57 | 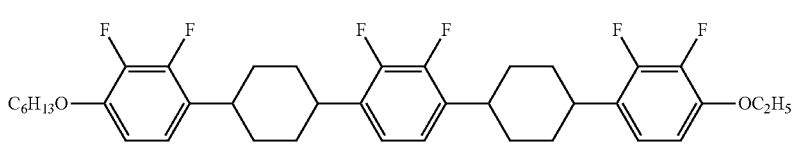 |
| 58 | 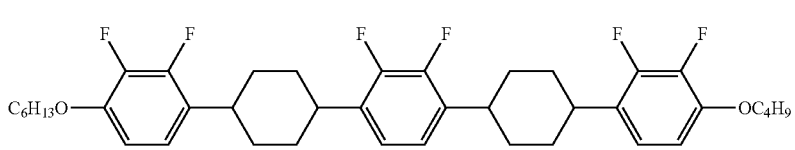 |
| 59 | 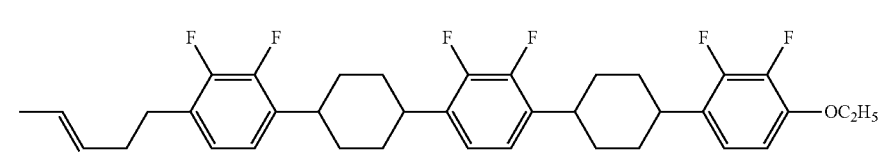 [SMILES: C/C=C/CCc1ccc(C2CCC(c3ccc(C4CCC(c5ccc(OCC)c(F)c5F)CC4)c(F)c3F)CC2)c(F)c1F] |
| 60 | 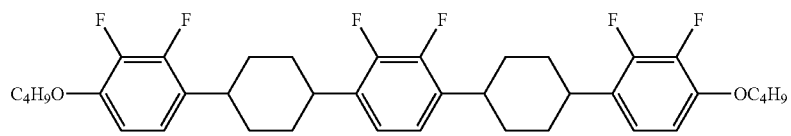 |
| 61 | 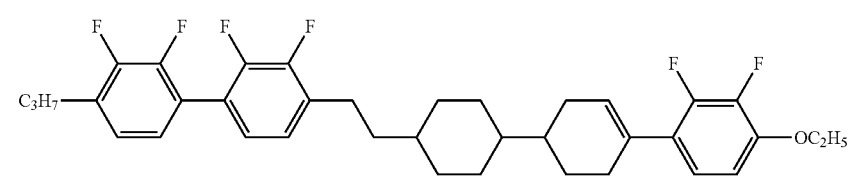 |

| No. | |
|---|---|
| 62 | 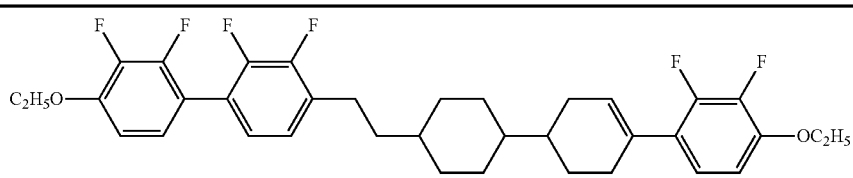 |
| 63 | 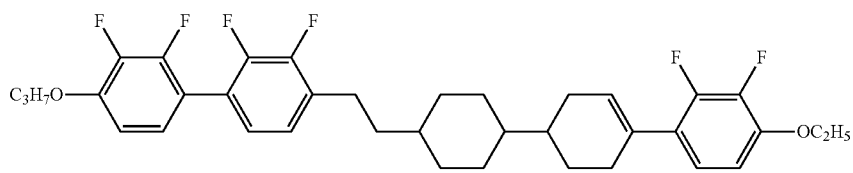 |
| 64 | 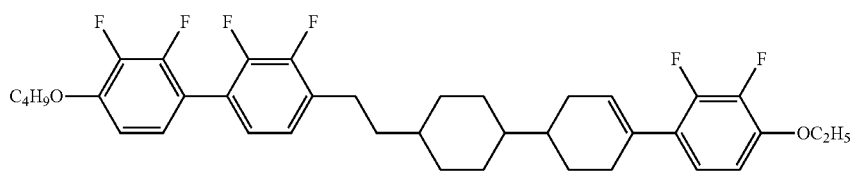 |
| 65 | 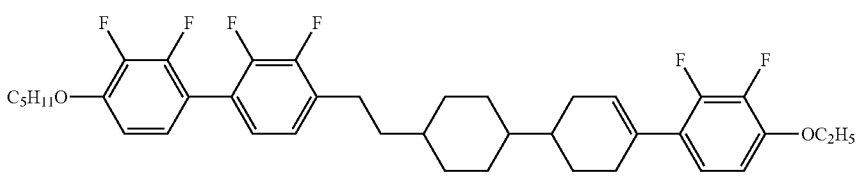 |
| 66 | 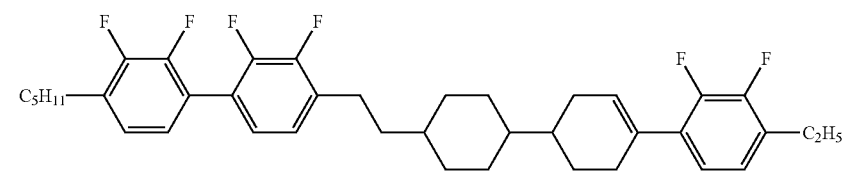 |
| 67 | 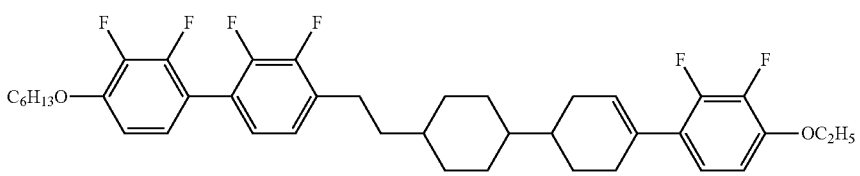 |
| 68 | 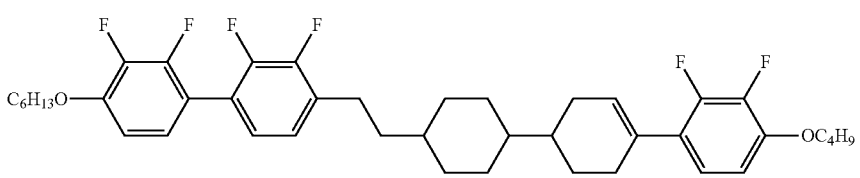 |
| 69 | 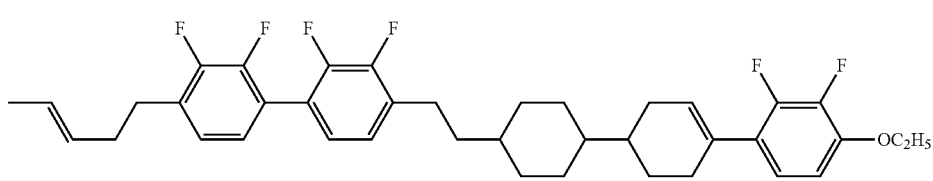 |
| 70 | 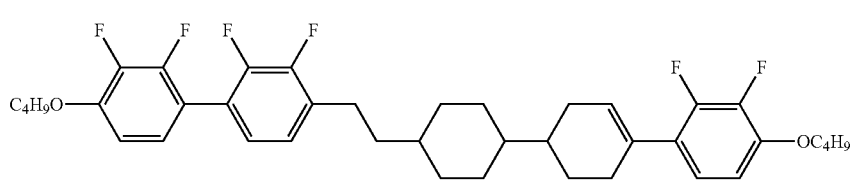 |

| No. | |
|---|---|
| 71 | 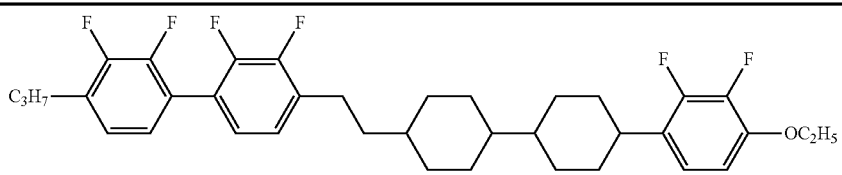 |
| 72 | 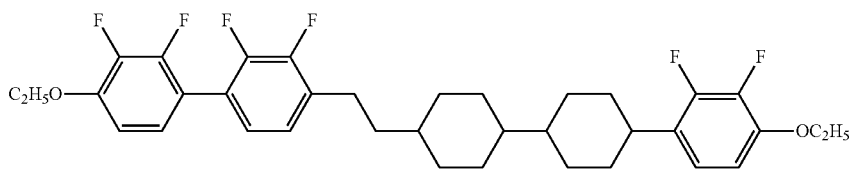 |
| 73 | 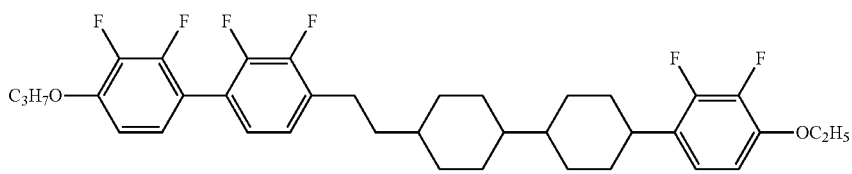 |
| 74 | 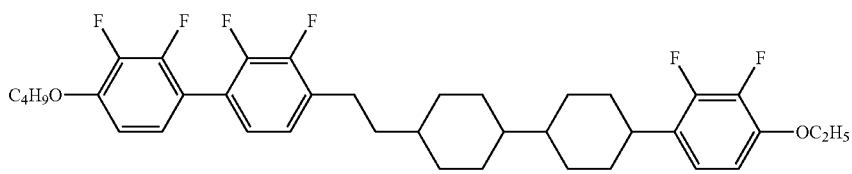 |
| 75 | 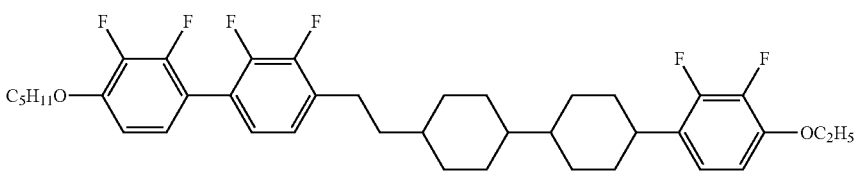 |
| 76 | 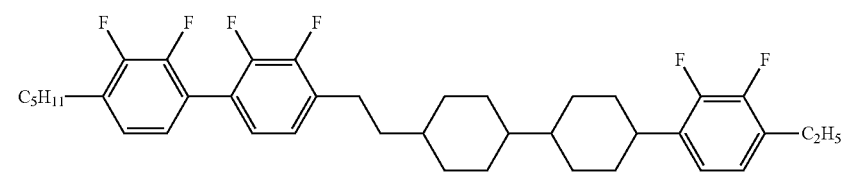 |
| 77 | 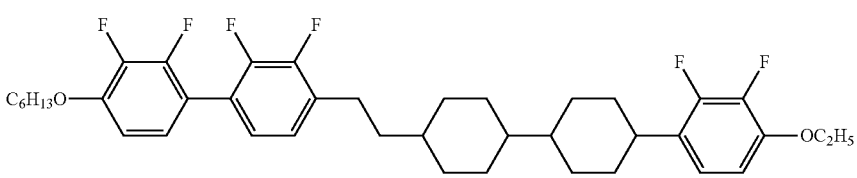 |
| 78 | 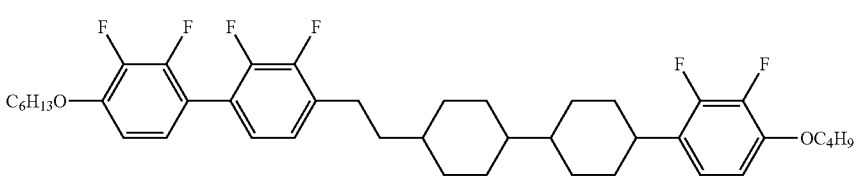 |
| 79 | 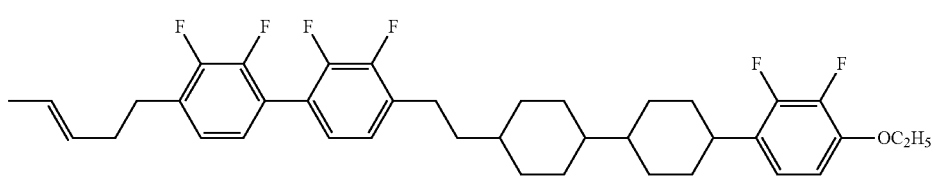 |

| No. | |
|---|---|
| 80 | 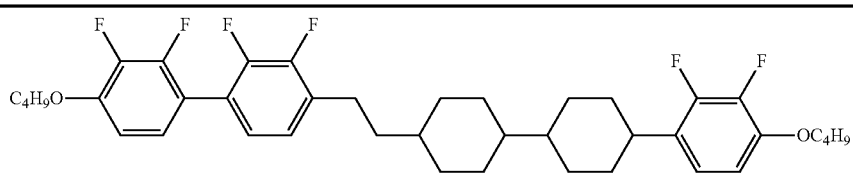 |
| 81 | 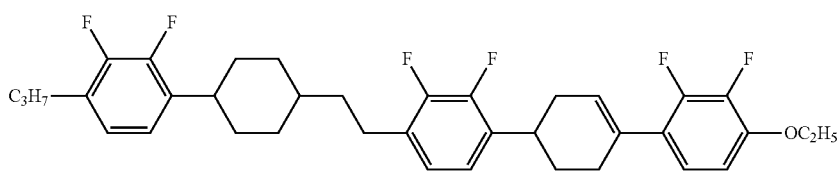 |
| 82 | 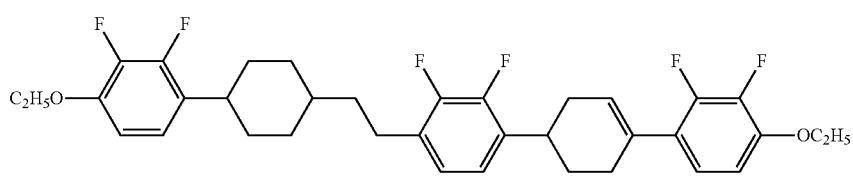 |
| 83 | 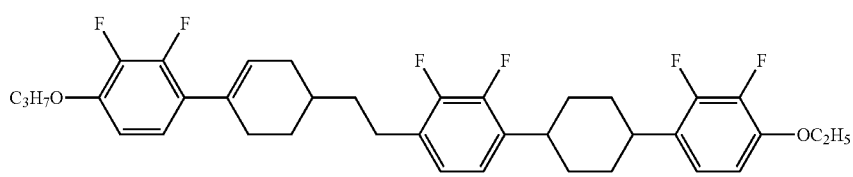 |
| 84 | 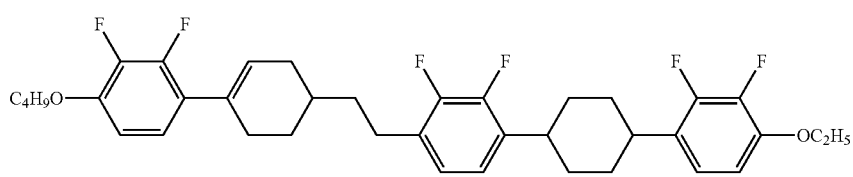 |
| 85 | 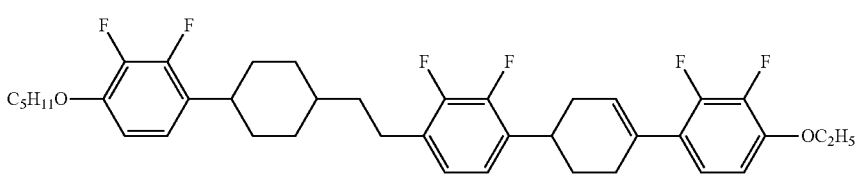 |
| 86 | 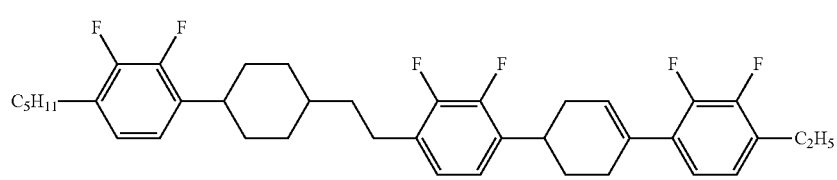 |
| 87 | 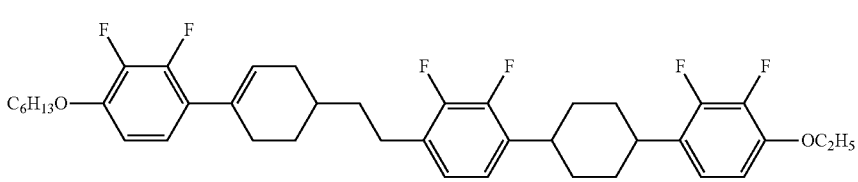 |
| 88 | 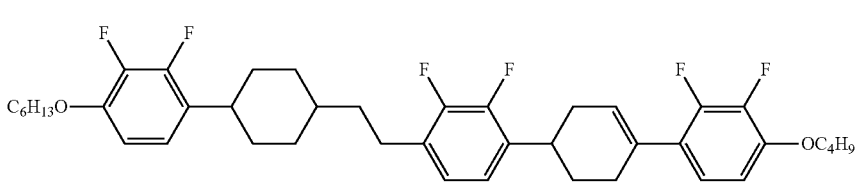 |

| No. | |
|---|---|
| 89 | 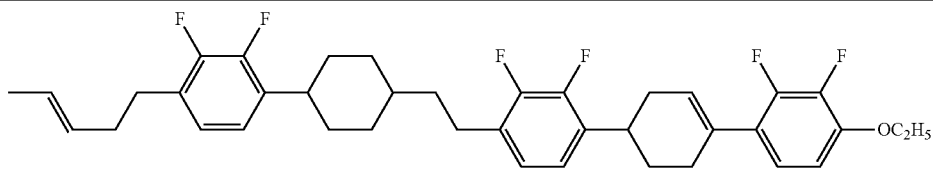 |
| 90 | 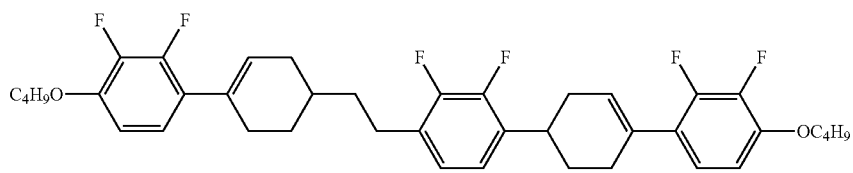 |
| 91 | 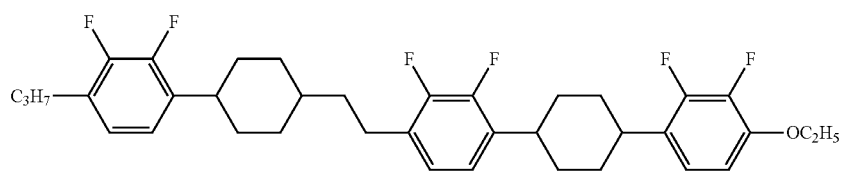 |
| 92 | 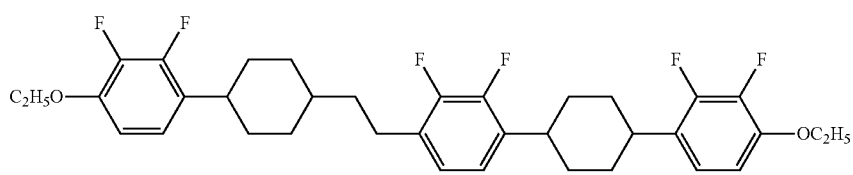 |
| 93 | 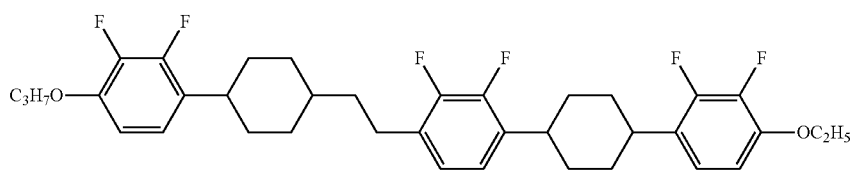 |
| 94 | 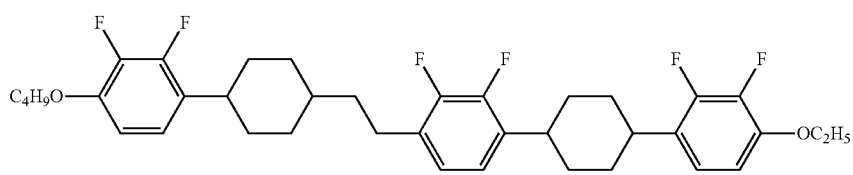 |
| 95 | 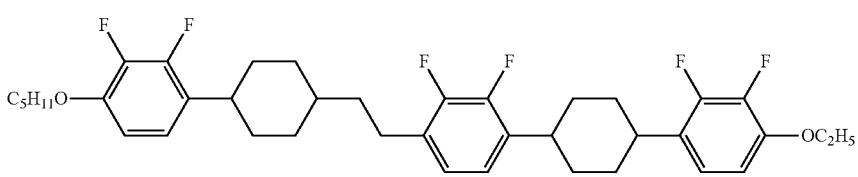 |
| 96 | 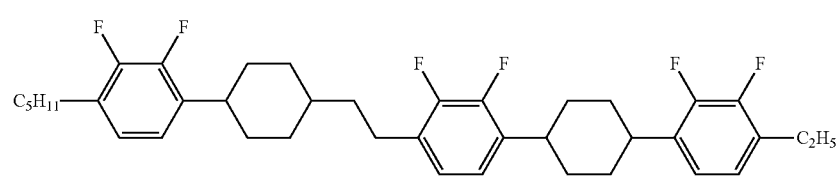 |
| 97 | 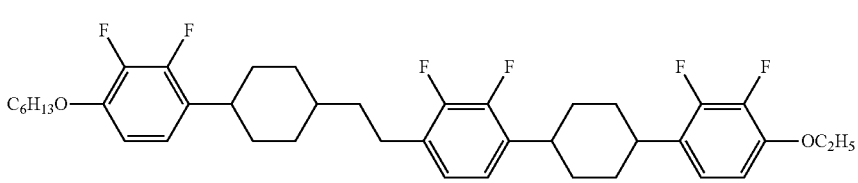 |

| No. | |
|---|---|
| 98 | 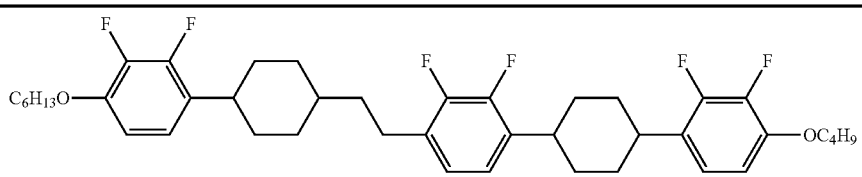 |
| 99 | 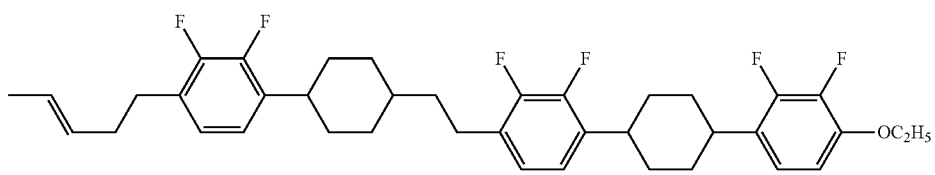 [SMILES: C/C=C/CCc1ccc(C2CCC(CCc3ccc(C4CCC(c5ccc(OCC)c(F)c5F)CC4)c(F)c3F)CC2)c(F)c1F] |
| 100 | 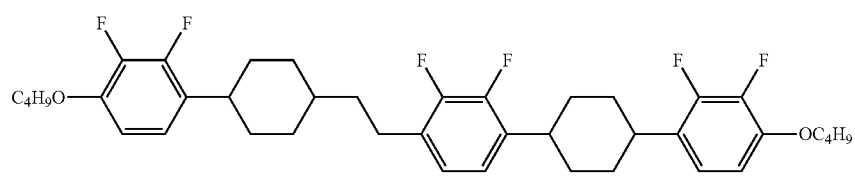 |
| 101 | 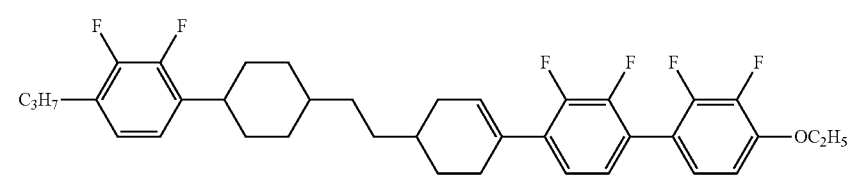 |
| 102 | 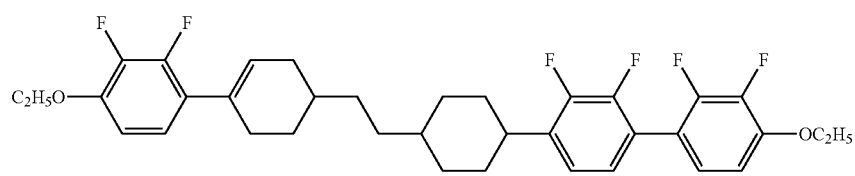 |
| 103 | 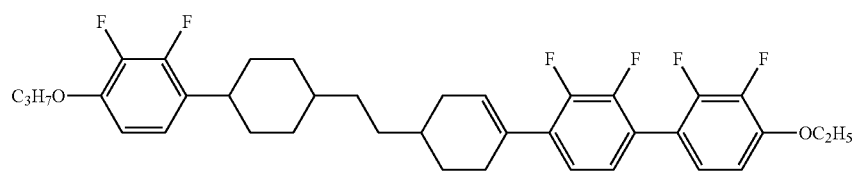 |
| 104 | 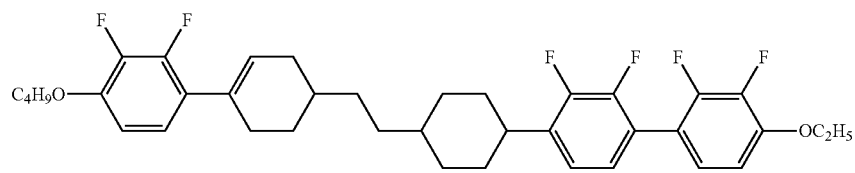 |
| 105 | 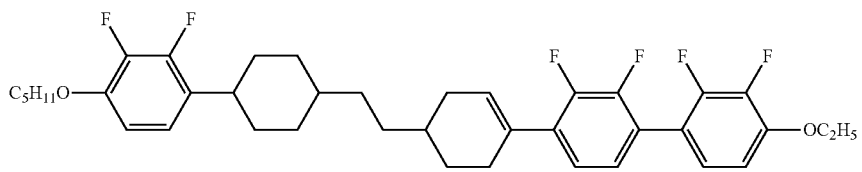 |
| 106 | 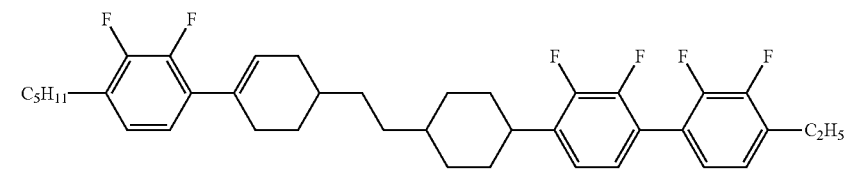 |

| No. | |
|---|---|
| 107 | 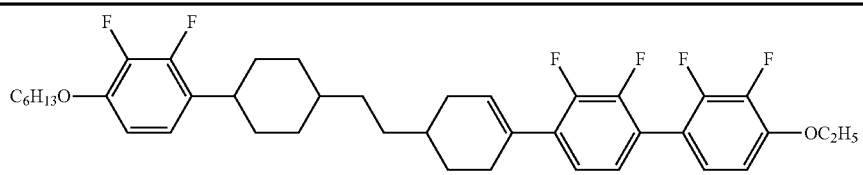 |
| 108 | 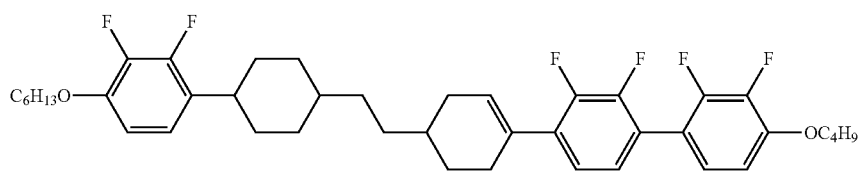 |
| 109 | 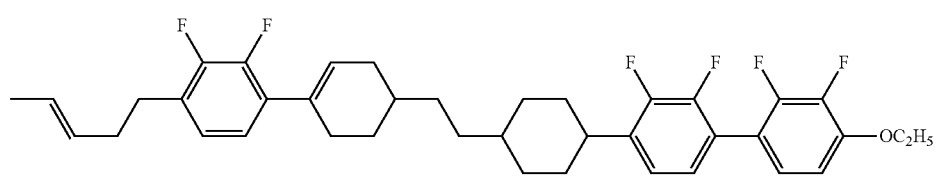 |
| 110 | 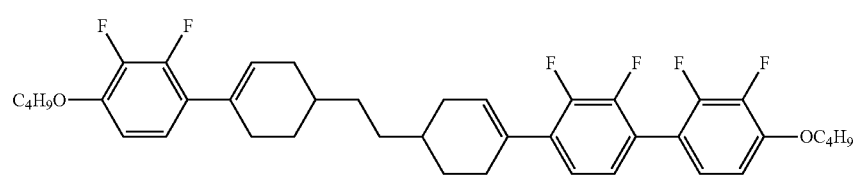 |
| 111 | 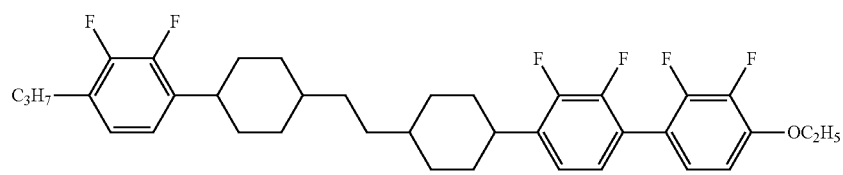 |
| 112 | 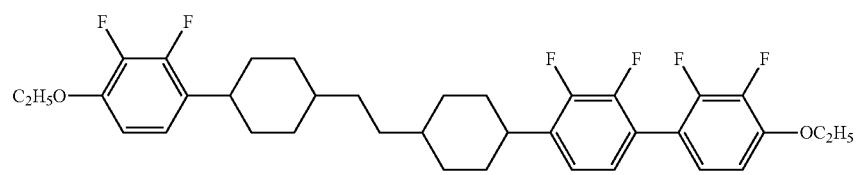 |
| 113 | 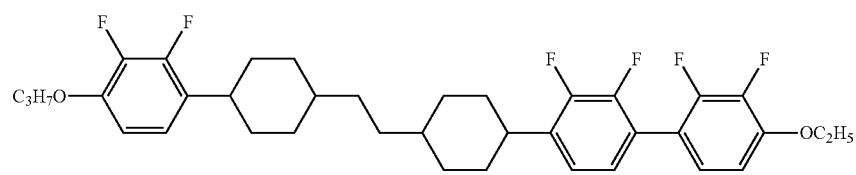 |
| 114 | 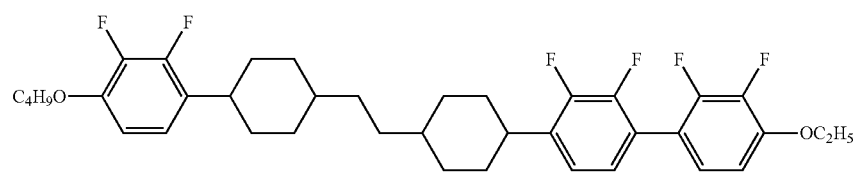 |
| 115 | 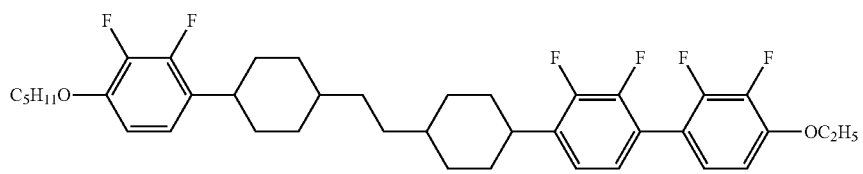 |

| No. | |
|---|---|
| 116 | 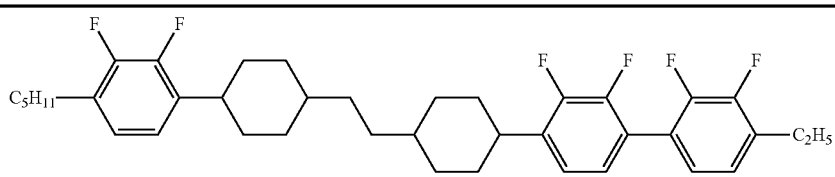 |
| 117 | 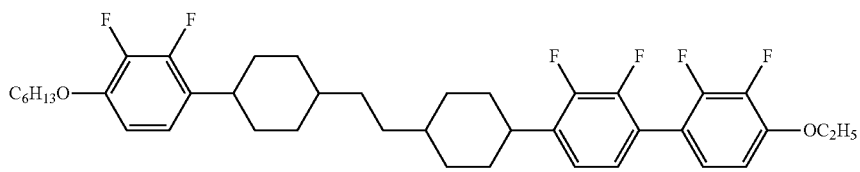 |
| 118 | 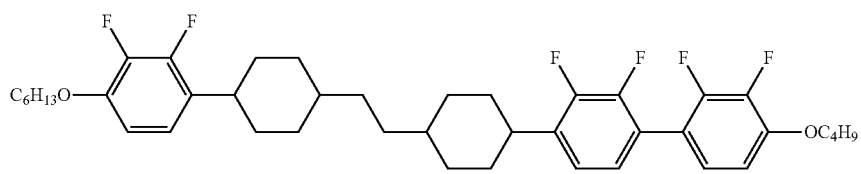 |
| 119 | 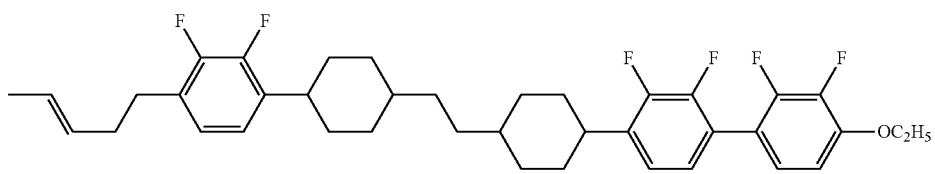 [SMILES: C/C=C/CCc1ccc(C2CCC(CCC3CCC(c4ccc(-c5ccc(OCC)c(F)c5F)c(F)c4F)CC3)CC2)c(F)c1F] |
| 120 | 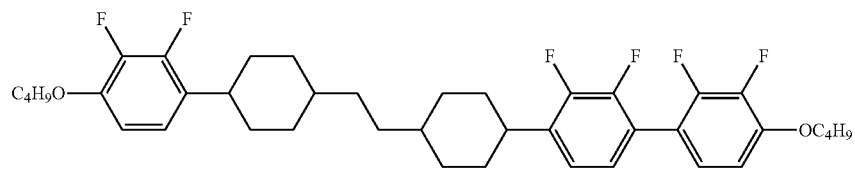 |
| 121 | 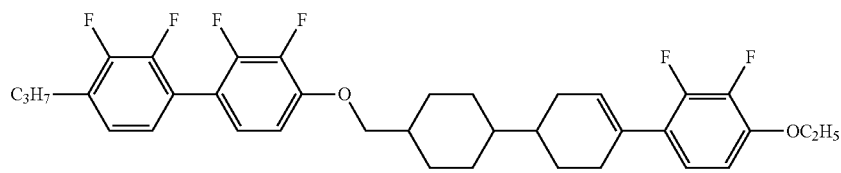 |
| 122 | 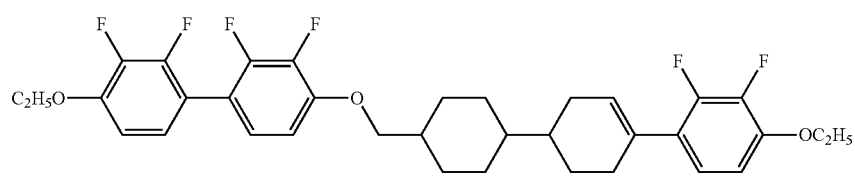 |
| 123 | 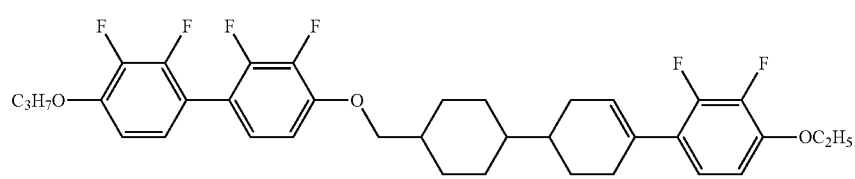 |
| 124 | 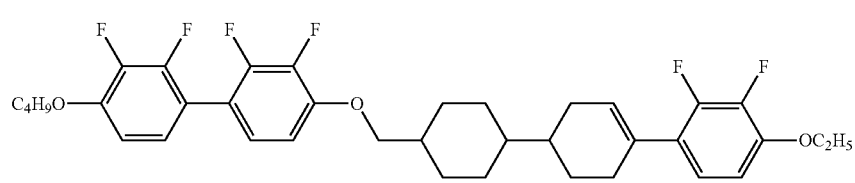 |

| No. | |
|---|---|
| 125 | 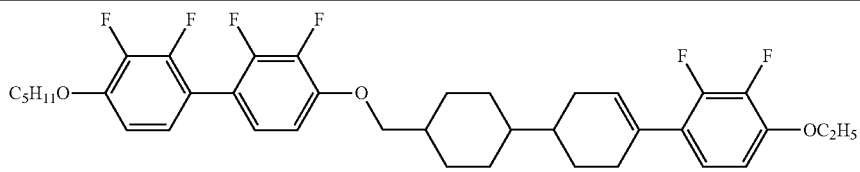 |
| 126 | 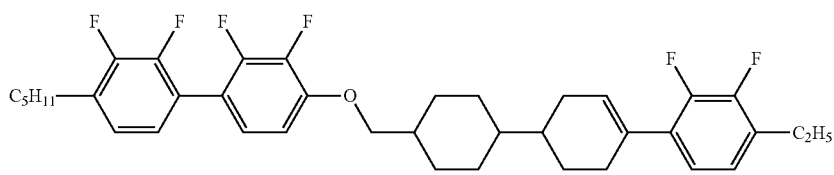 |
| 127 | 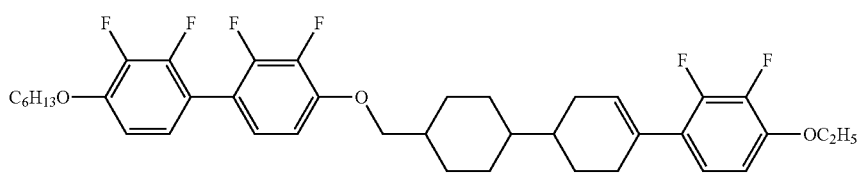 |
| 128 | 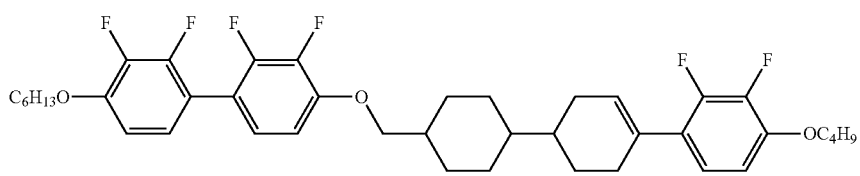 |
| 129 | 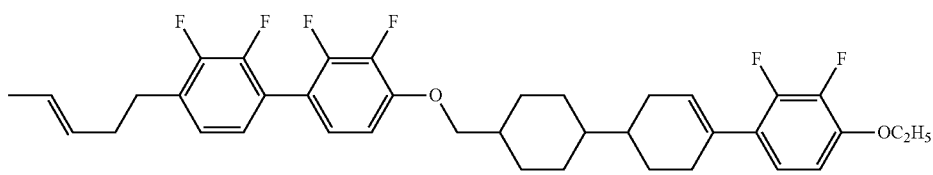 |
| 130 | 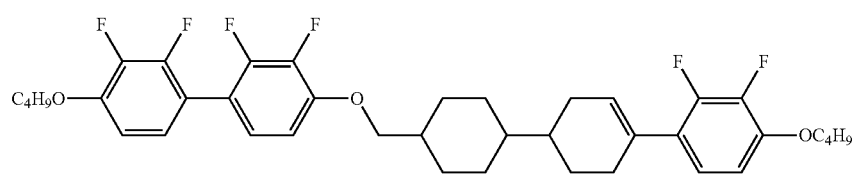 |
| 131 | 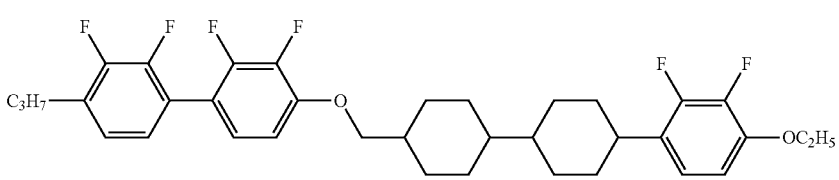 |
| 132 | 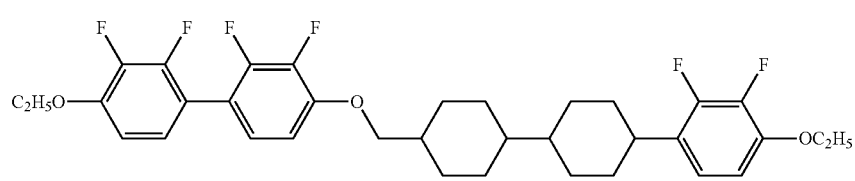 |
| 133 | 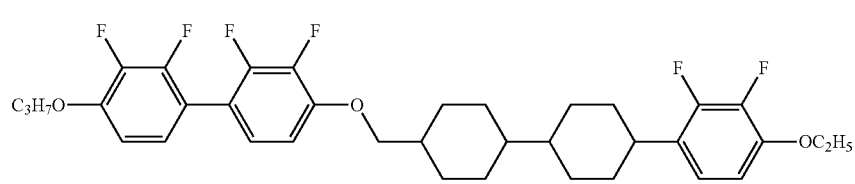 |

-continued
| No. | |
|---|---|
| 134 | 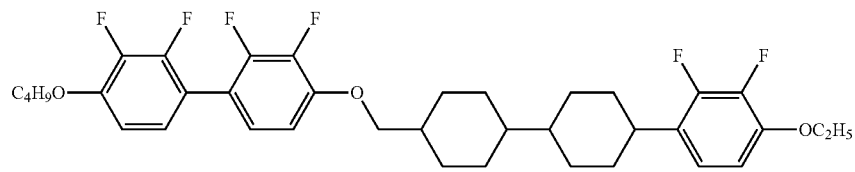 |
| 135 | 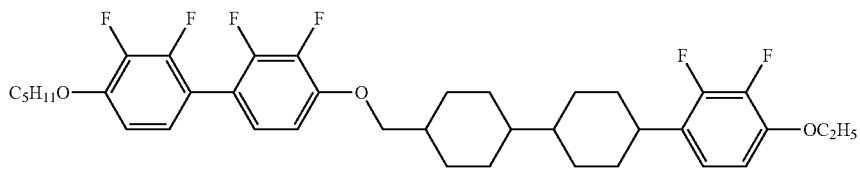 |
| 136 | 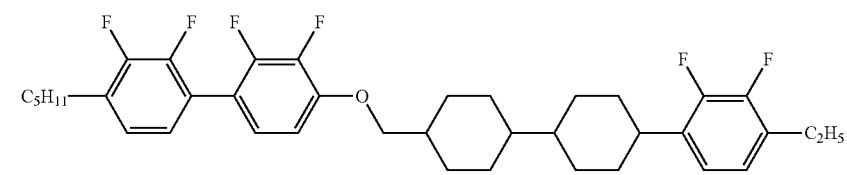 |
| 137 | 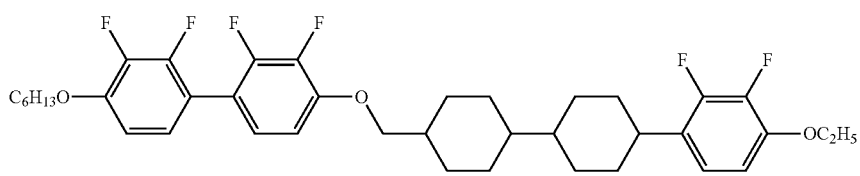 |
| 138 | 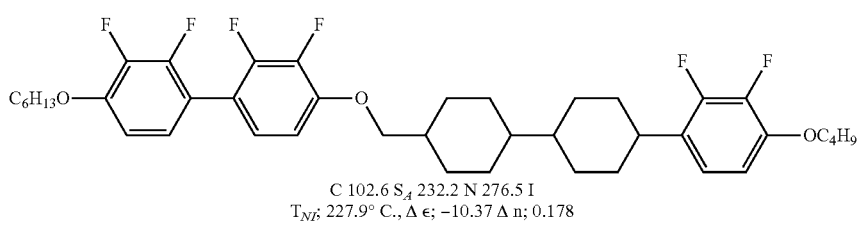<br>C 102.6 $S_A$ 232.2 N 276.5 I<br>$T_{NI}$; 227.9° C., Δ ϵ; −10.37 Δ n; 0.178 |
| 139 | 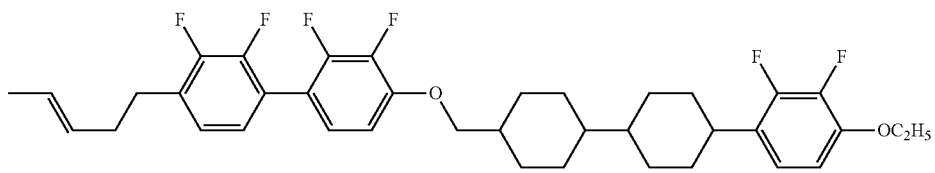 |
| 140 | 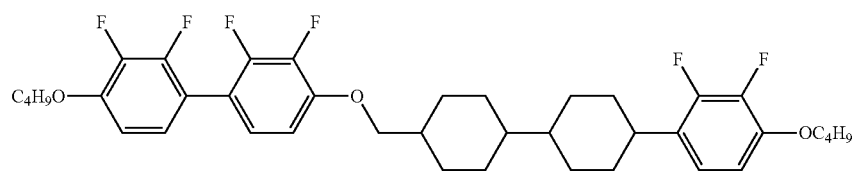 |
| 141 | 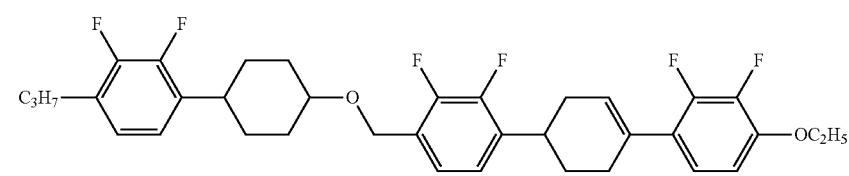 |

-continued
| No. | |
|---|---|
| 142 | 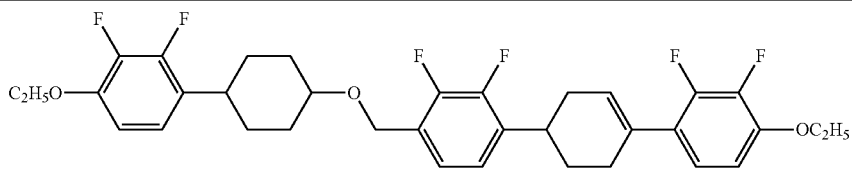 |
| 143 | 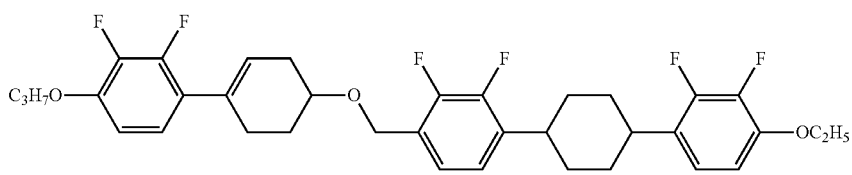 |
| 144 | 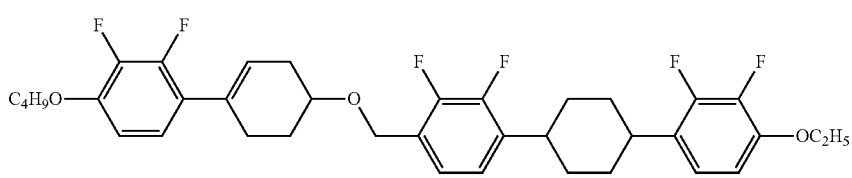 |
| 145 | 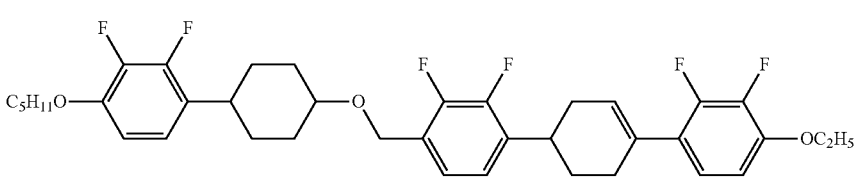 |
| 146 | 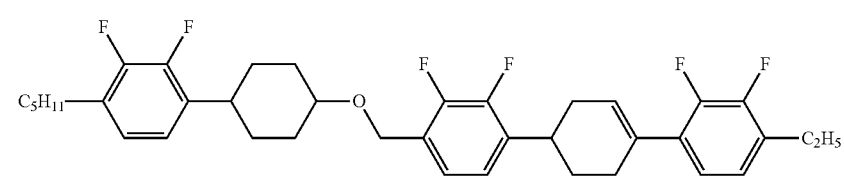 |
| 147 | 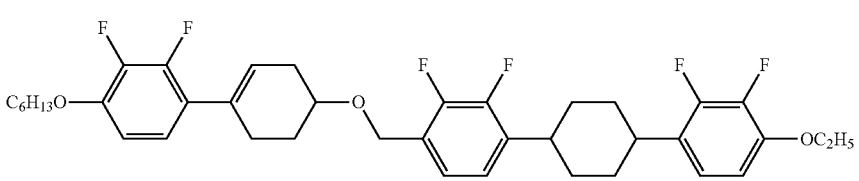 |
| 148 | 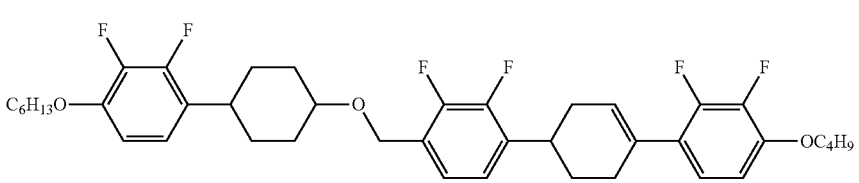 |
| 149 | 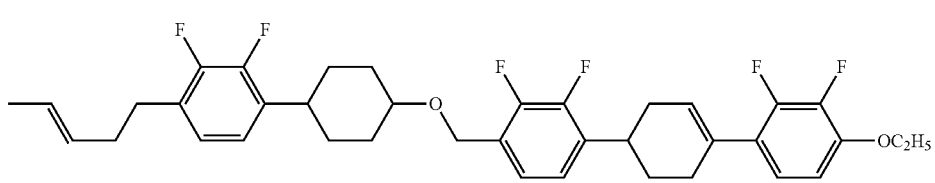 |
| 150 | 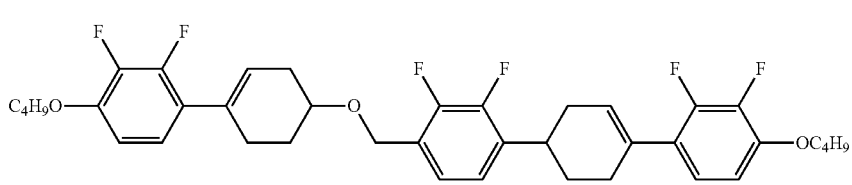 |

| No. | |
|---|---|
| 151 | 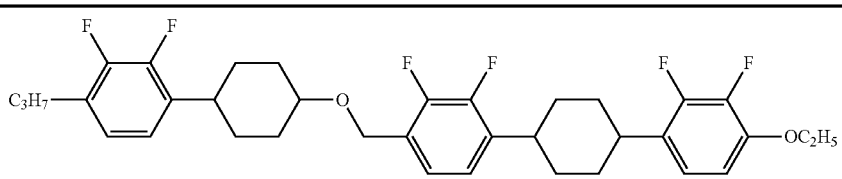 |
| 152 | 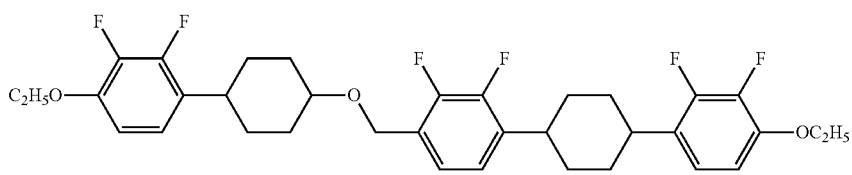 |
| 153 | 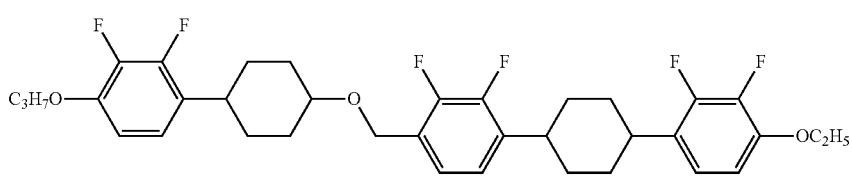 |
| 154 | 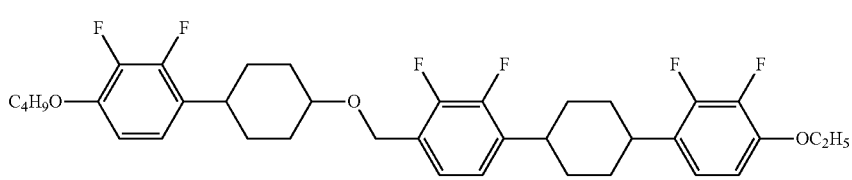 |
| 155 | 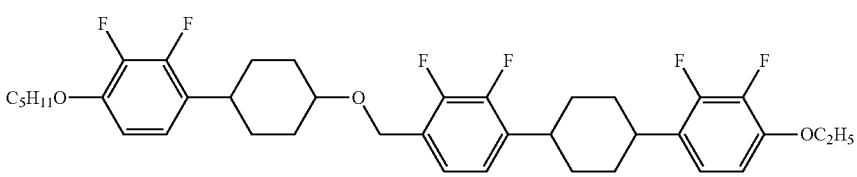 |
| 156 | 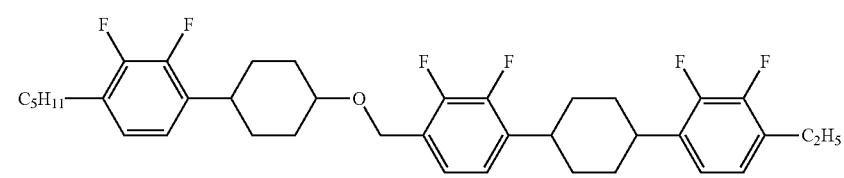 |
| 157 | 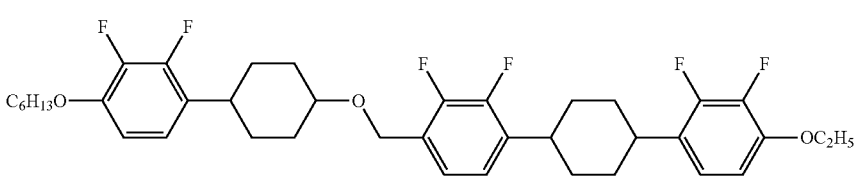 |
| 158 | 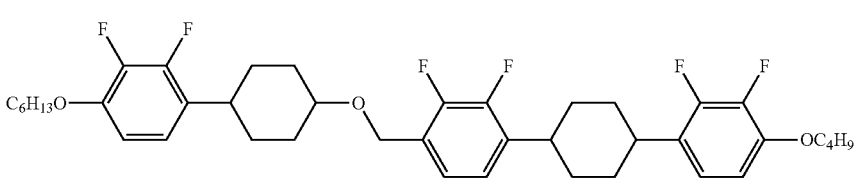 |
| 159 | 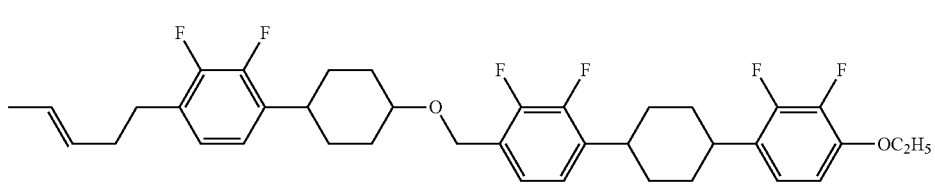 |

-continued
| No. | |
|---|---|
| 160 | 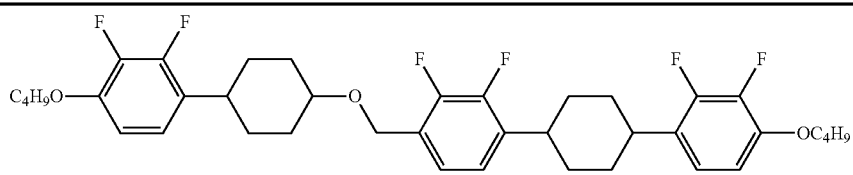 |
| 161 | 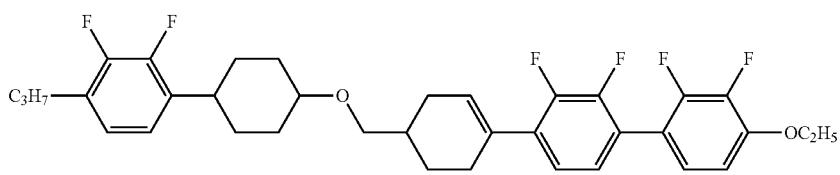 |
| 162 | 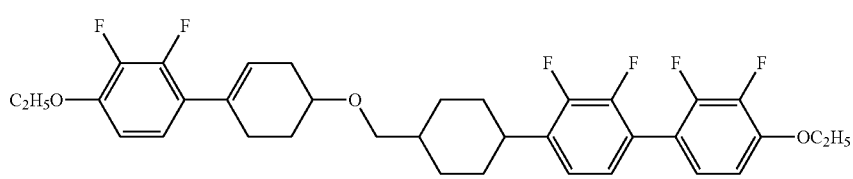 |
| 163 | 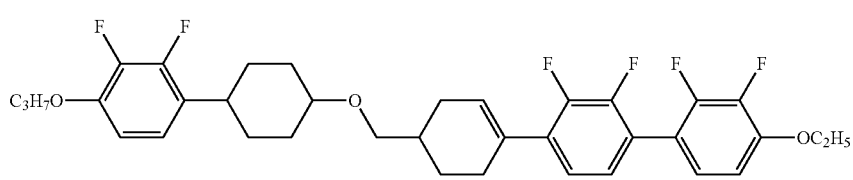 |
| 164 | 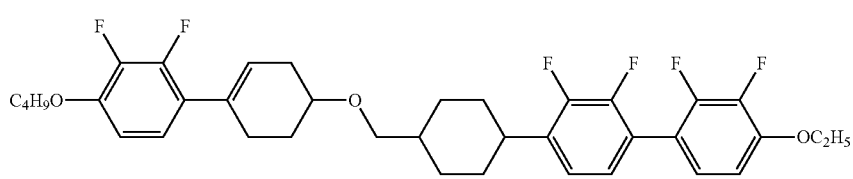 |
| 165 | 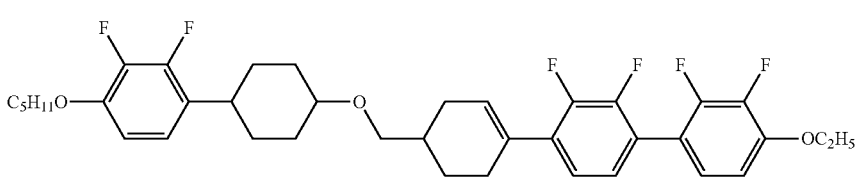 |
| 166 | 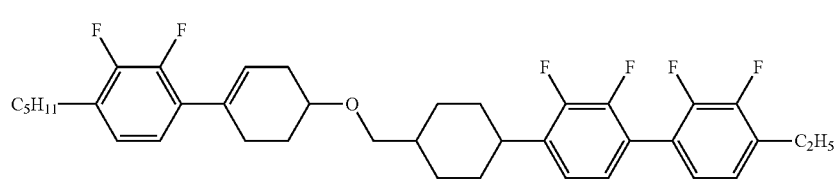 |
| 167 | 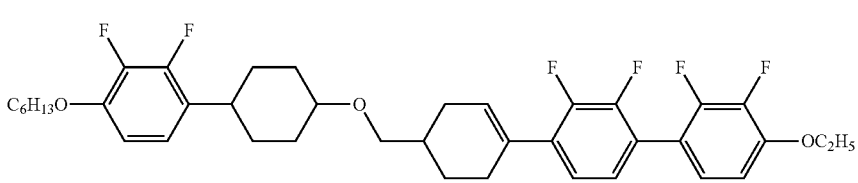 |
| 168 | 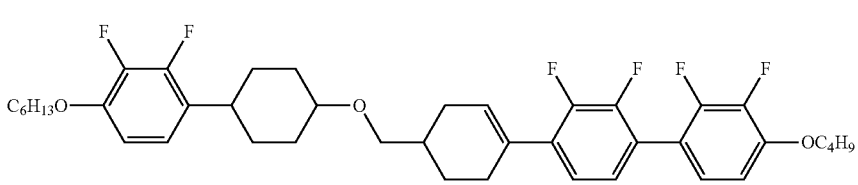 |

| No. | |
|---|---|
| 169 | 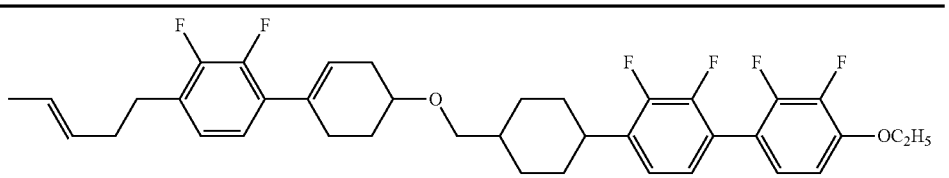 |
| 170 | 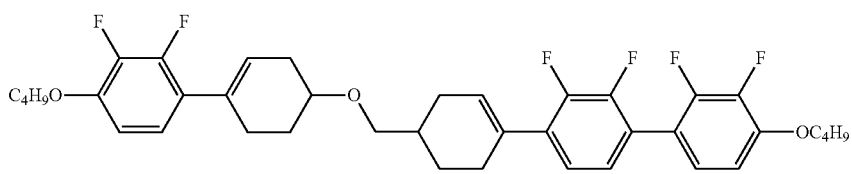 |
| 171 | 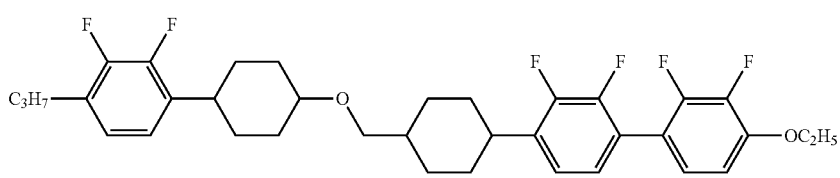 |
| 172 | 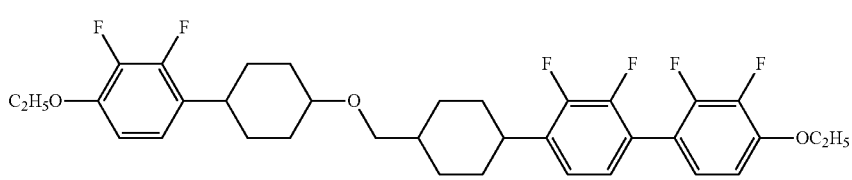 |
| 173 | 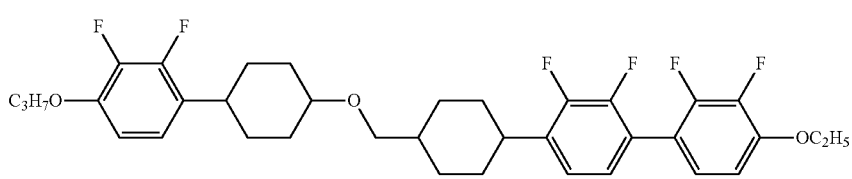 |
| 174 | 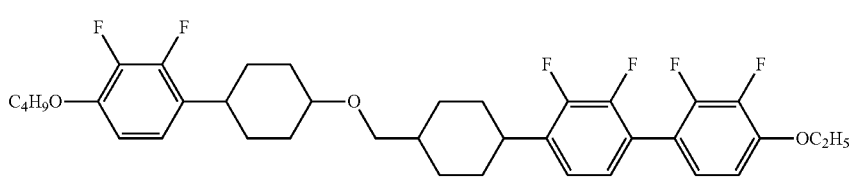 |
| 175 | 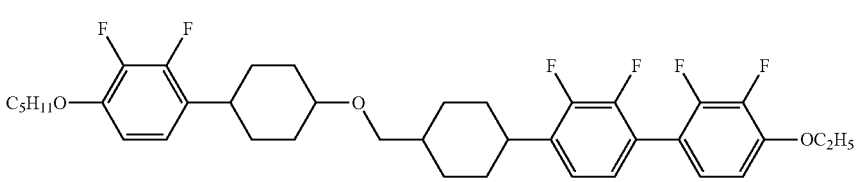 |
| 176 | 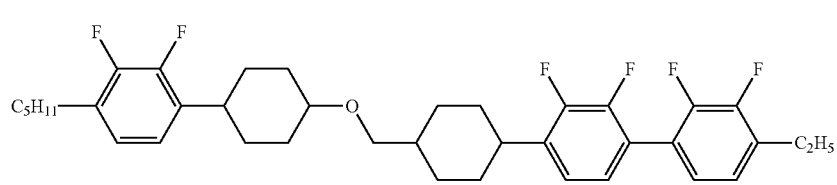 |
| 177 | 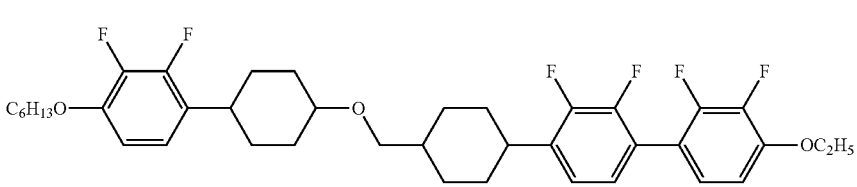 |

| No. | |
|---|---|
| 178 | 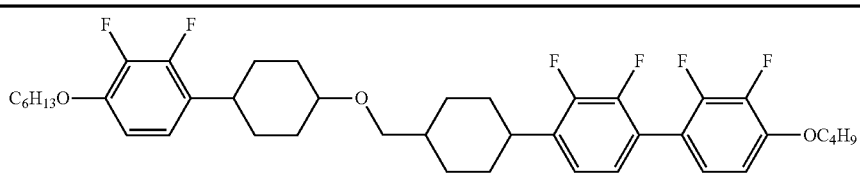 |
| 179 | 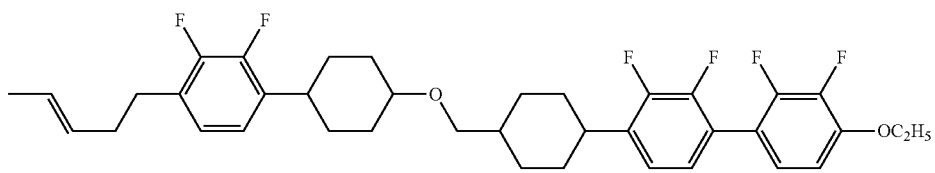 |
| 180 | 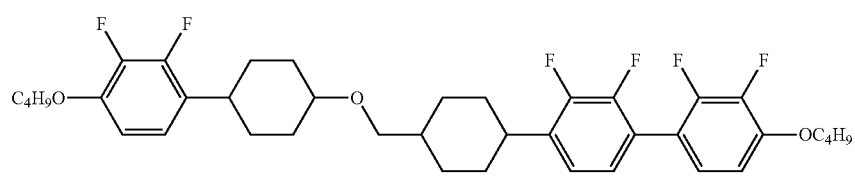 |
| 181 | 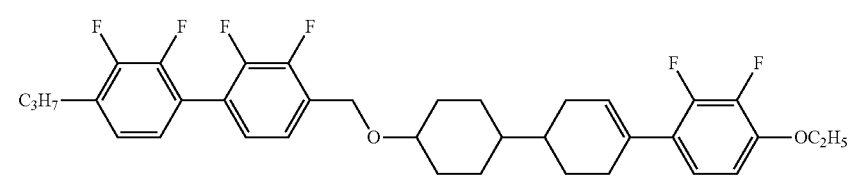 |
| 182 | 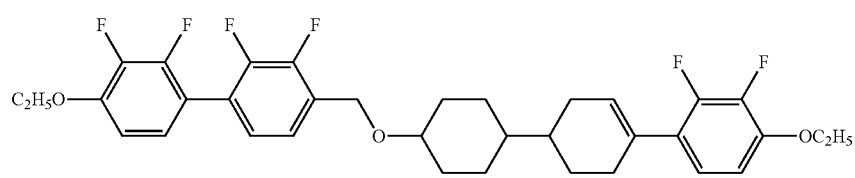 |
| 183 | 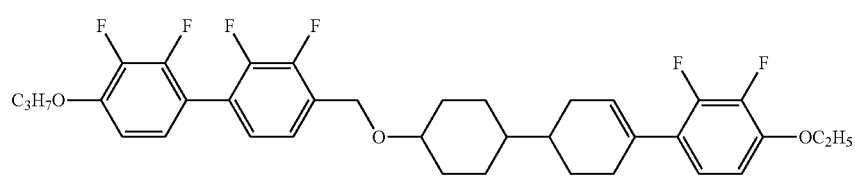 |
| 184 | 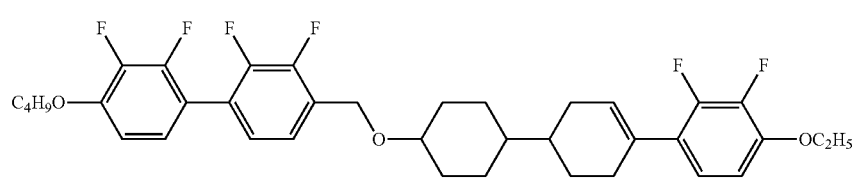 |
| 185 | 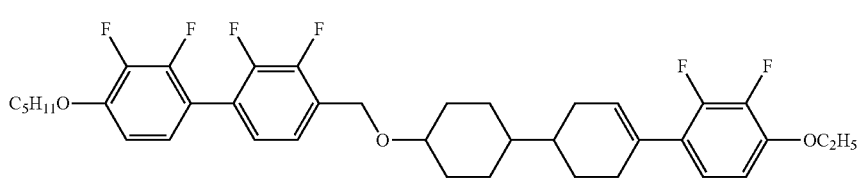 |
| 186 | 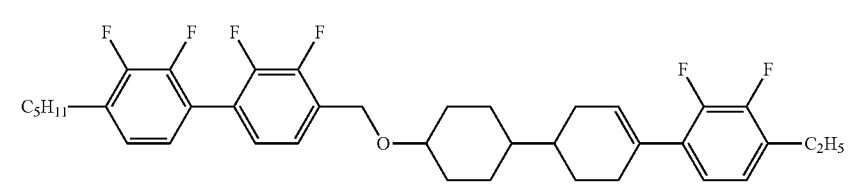 |

| No. | |
|---|---|
| 187 | 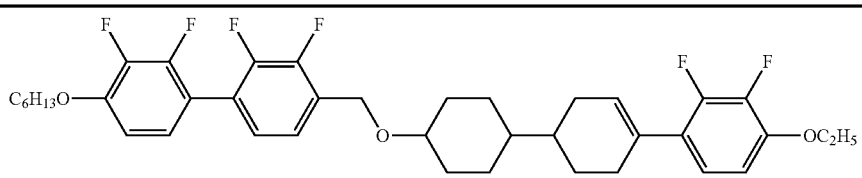 |
| 188 | 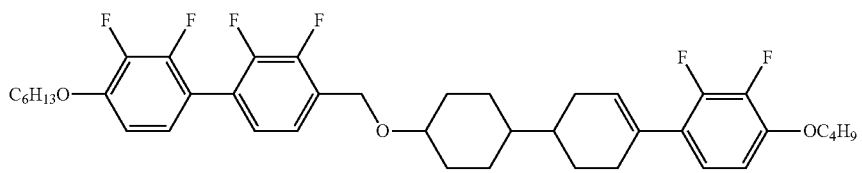 |
| 189 | 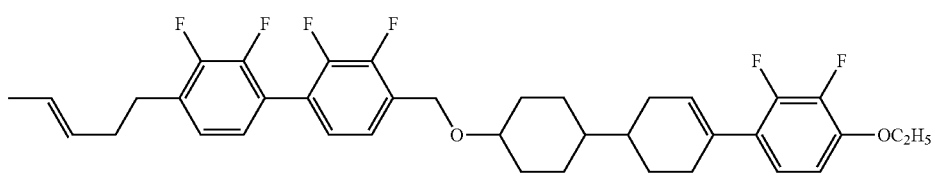 |
| 190 | 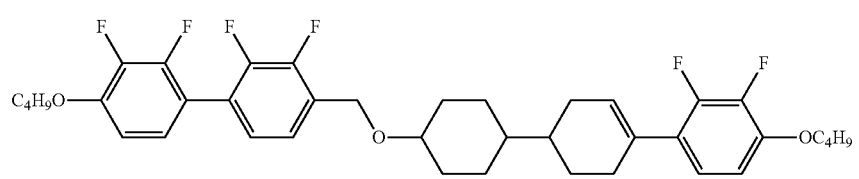 |
| 191 | 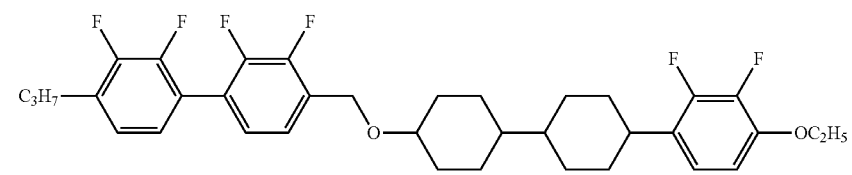 |
| 192 | 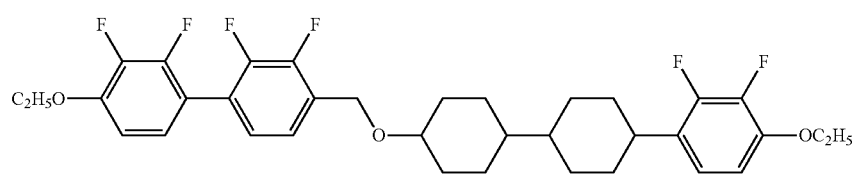 |
| 193 | 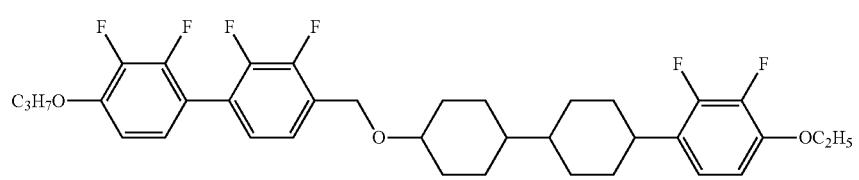 |
| 194 | 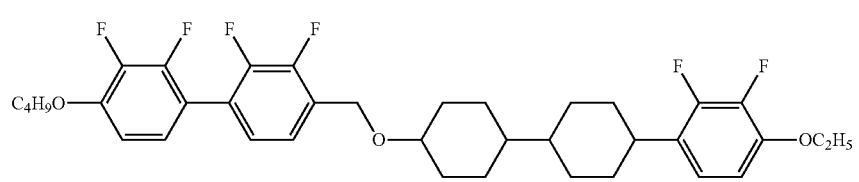 |
| 195 | 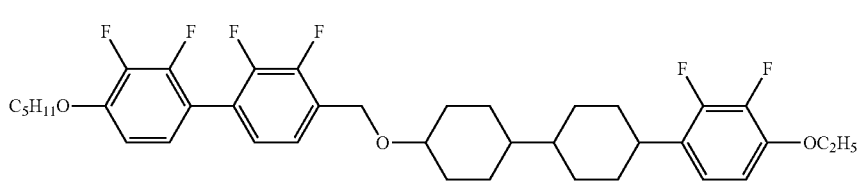 |

| No. | |
|---|---|
| 196 | 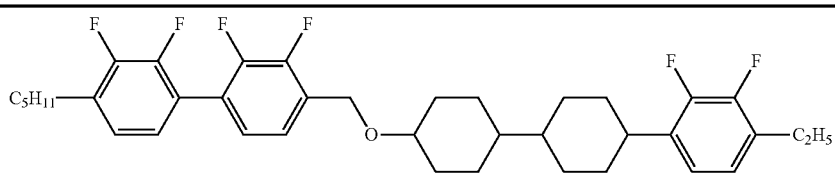 |
| 197 | 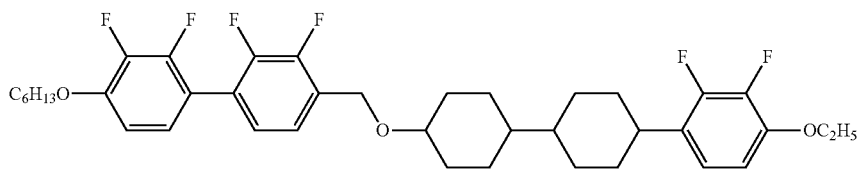 |
| 198 | 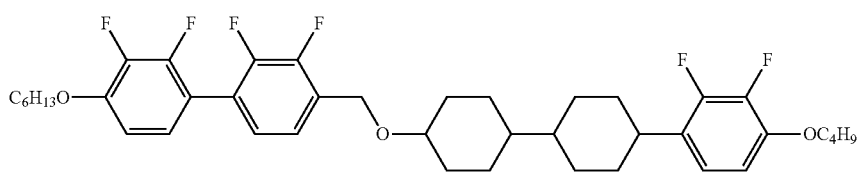 |
| 199 | 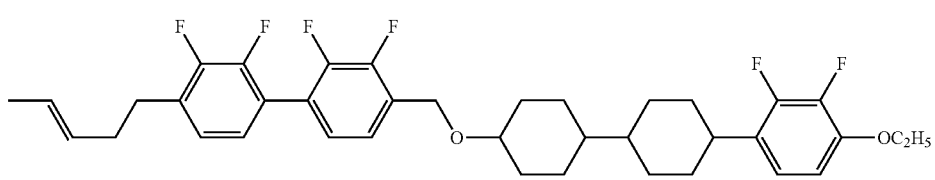 |
| 200 | 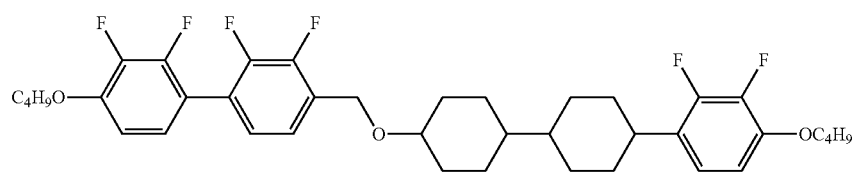 |
| 201 | 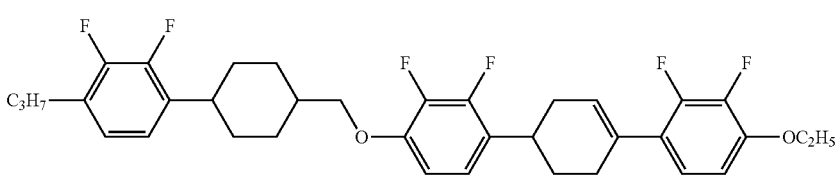 |
| 202 | 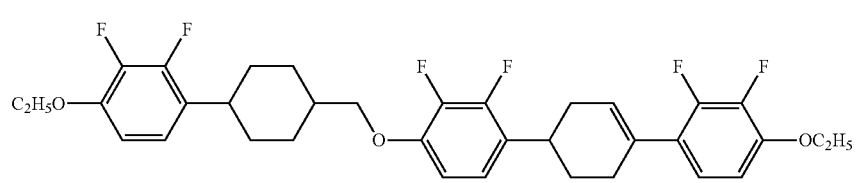 |
| 203 | 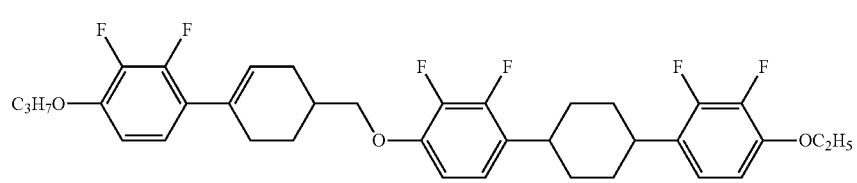 |
| 204 | 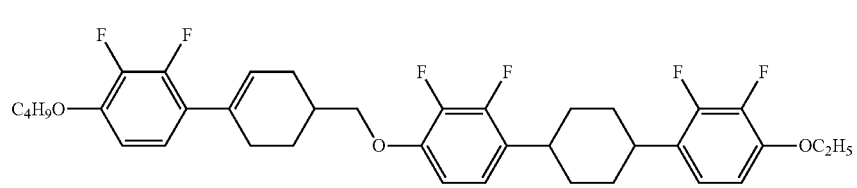 |

-continued
| No. |  |
|---|---|
| 205 | 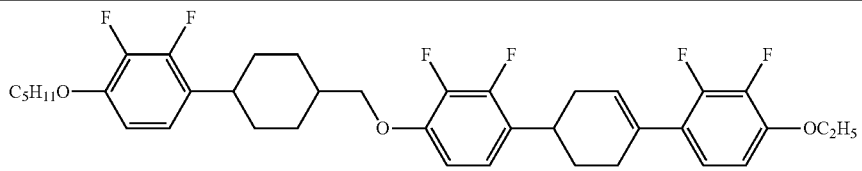 |
| 206 | 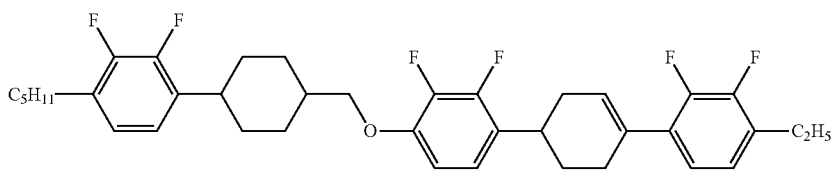 |
| 207 | 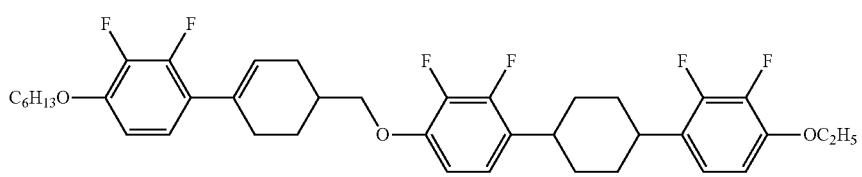 |
| 208 | 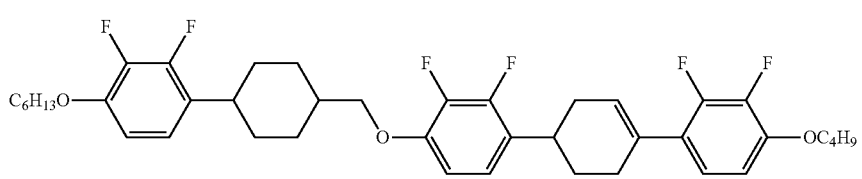 |
| 209 | 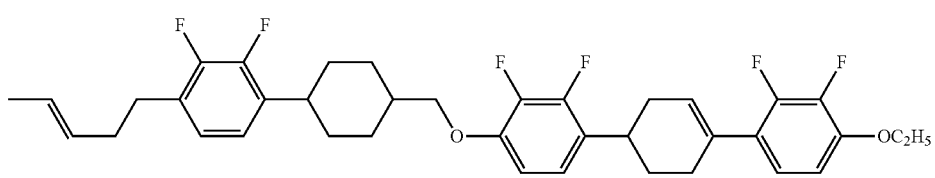 |
| 210 | 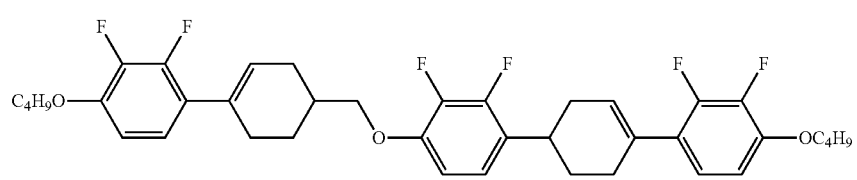 |
| 211 | 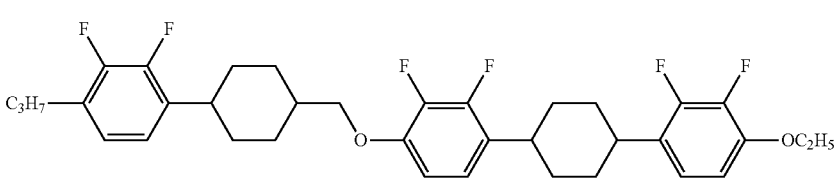 |
| 212 | 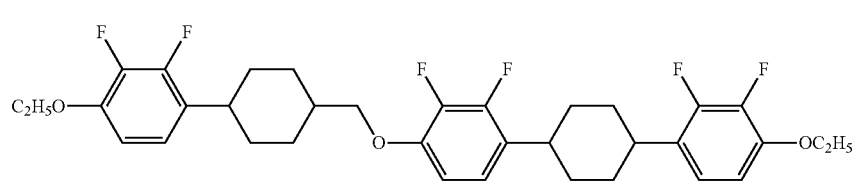 |
| 213 | 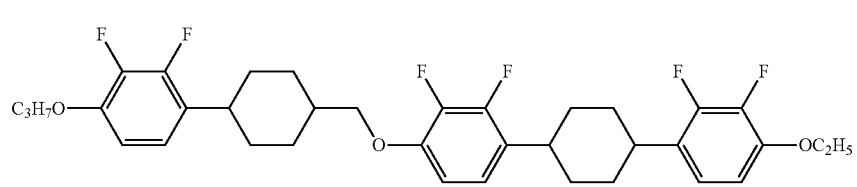 |

-continued
| No. | |
|---|---|
| 214 | 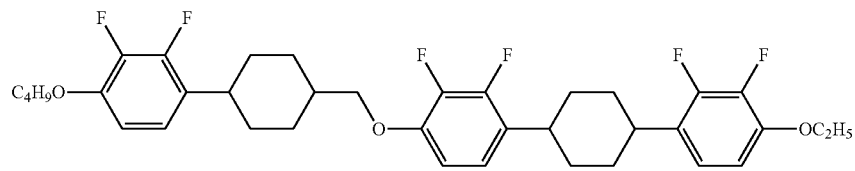 |
| 215 | 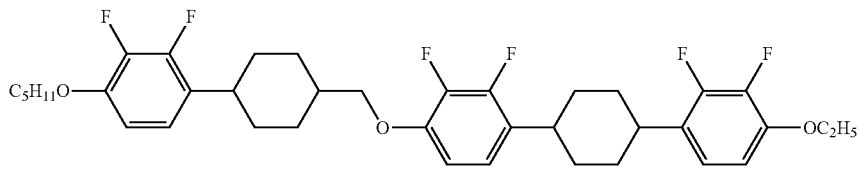 |
| 216 | 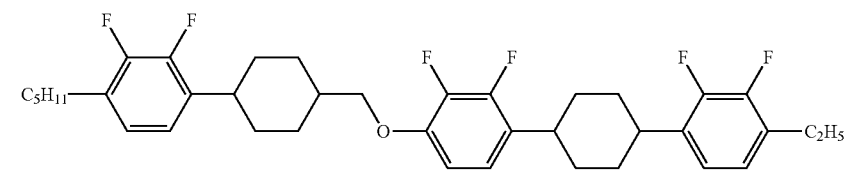 |
| 217 | 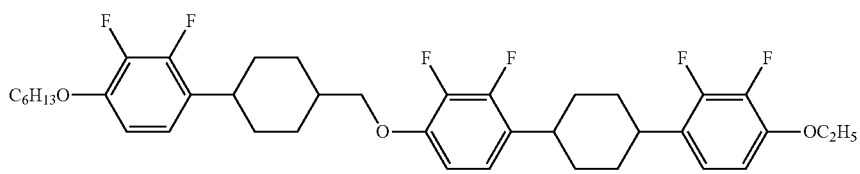 |
| 218 | 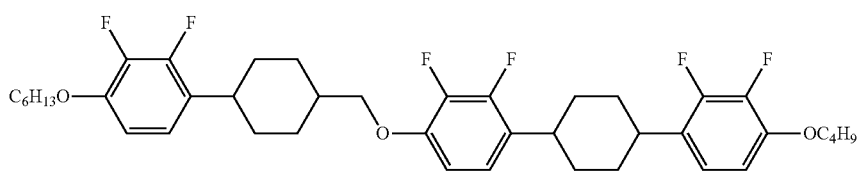<br>C 125.7 $S_A$ 200.5 N 244.8 I<br>$T_{NI}$; 202.6° C., Δ ε; −6.23 Δ n; 0.153 |
| 219 | 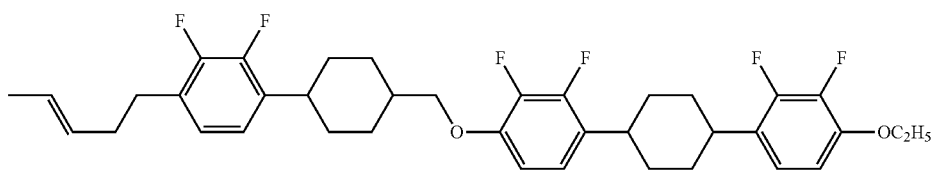 |
| 220 | 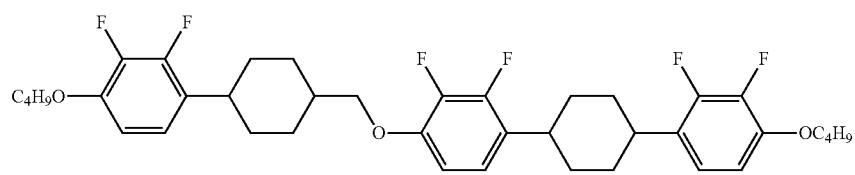 |
| 221 | 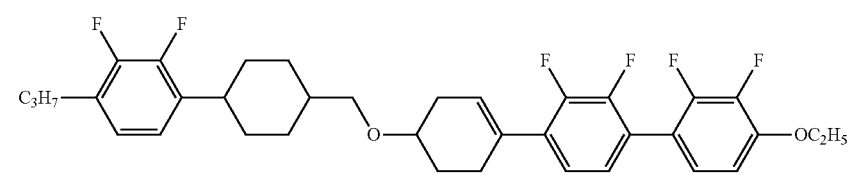 |

-continued
| No. | |
|---|---|
| 222 | 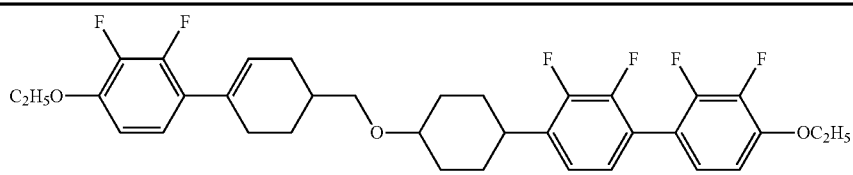 |
| 223 | 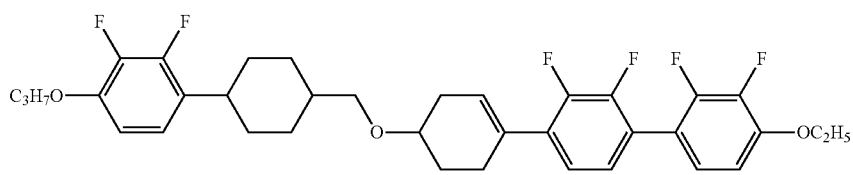 |
| 224 | 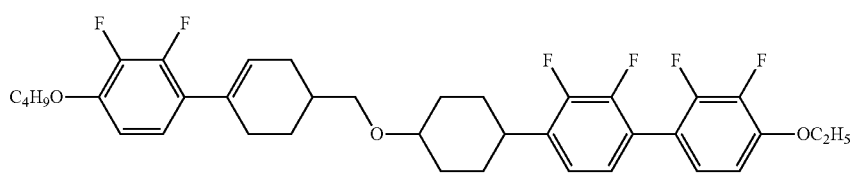 |
| 225 | 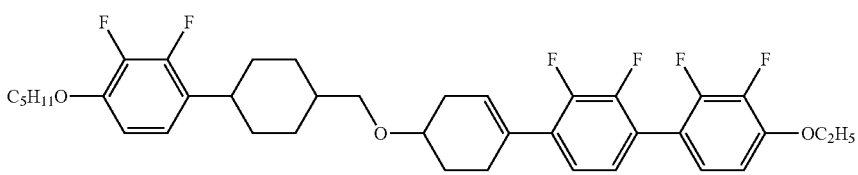 |
| 226 | 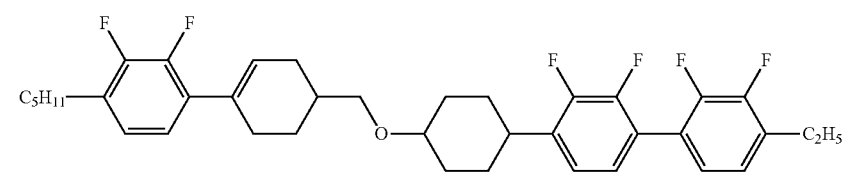 |
| 227 | 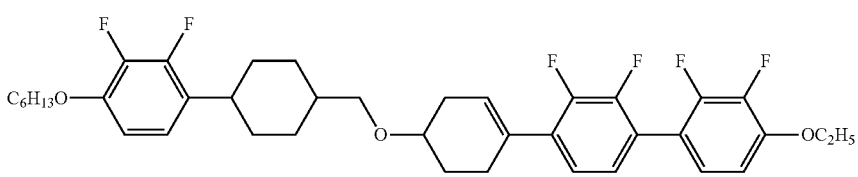 |
| 228 | 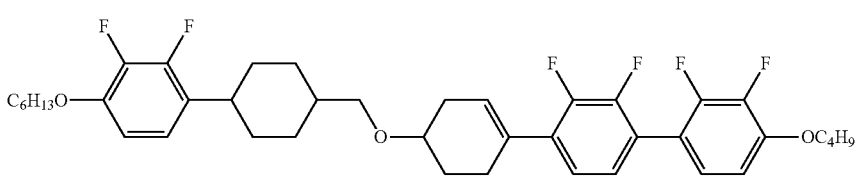 |
| 229 | 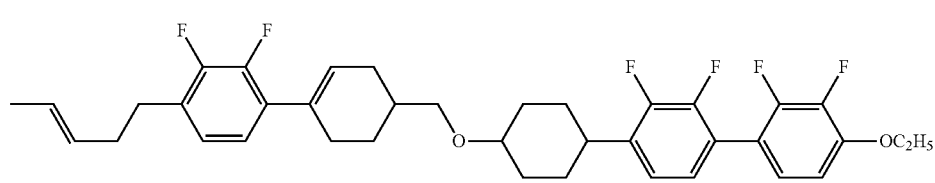 [SMILES: C/C=C/CCc1ccc(C2=CCC(COC3CCC(c4ccc(-c5ccc(OCC)c(F)c5F)c(F)c4F)CC3)CC2)c(F)c1F] |
| 230 | 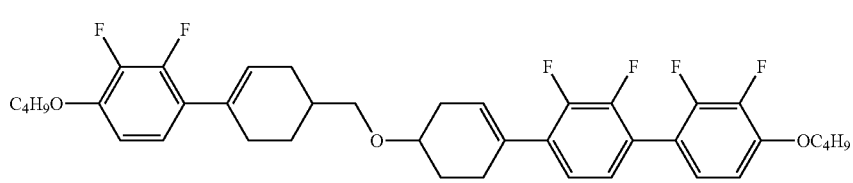 |

-continued
| No. | |
|---|---|
| 231 | 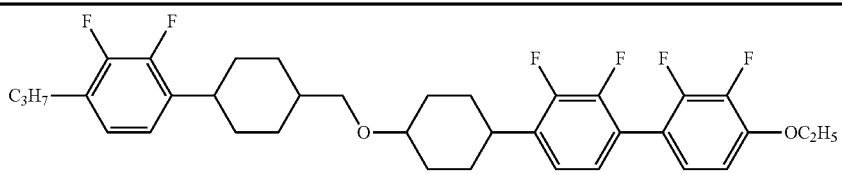 |
| 232 | 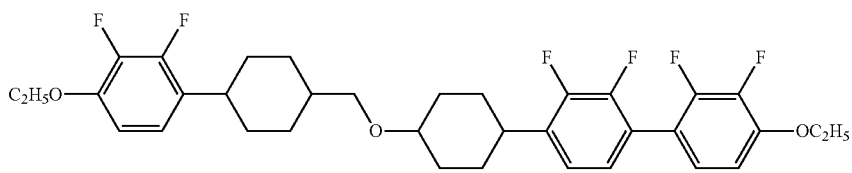 |
| 233 | 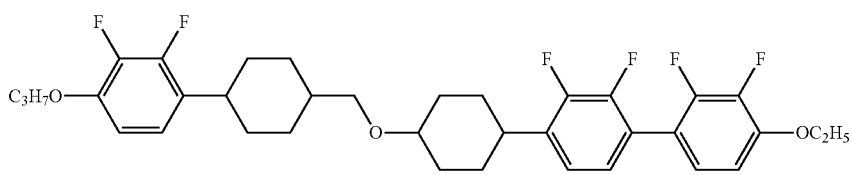 |
| 234 | 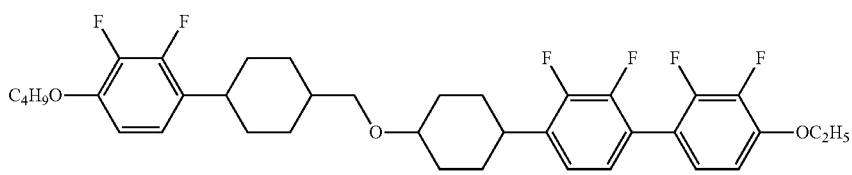 |
| 235 | 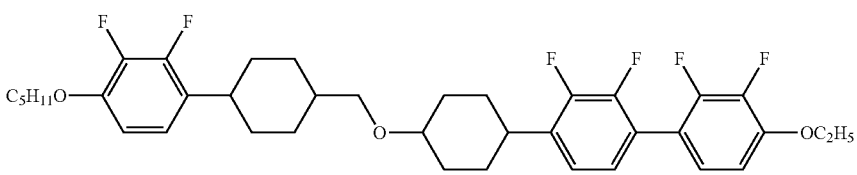 |
| 236 | 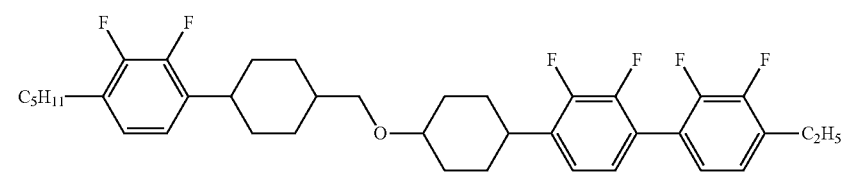 |
| 237 | 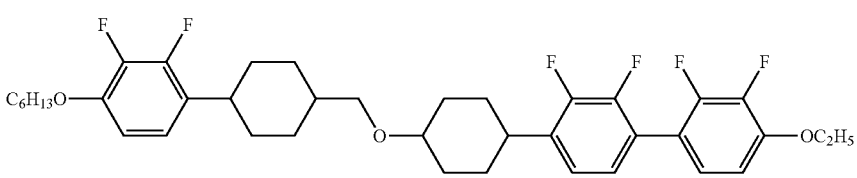 |
| 238 | 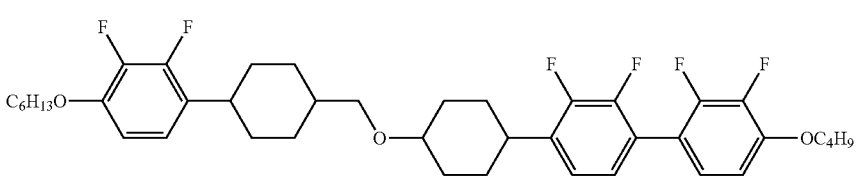 |
| 239 | 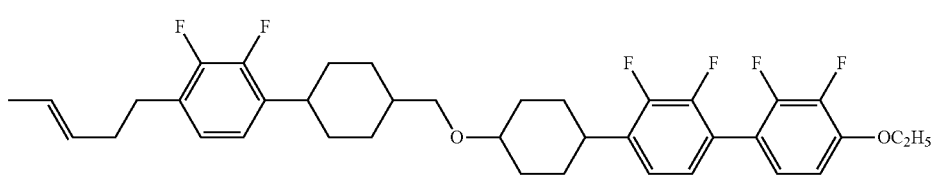 [SMILES: C/C=C/CCc1ccc(C2CCC(COC3CCC(c4ccc(-c5ccc(OCC)c(F)c5F)c(F)c4F)CC3)CC2)c(F)c1F] |

| No. | |
|---|---|
| 240 | 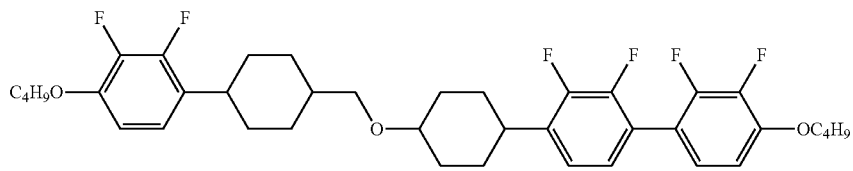 |
| 241 | 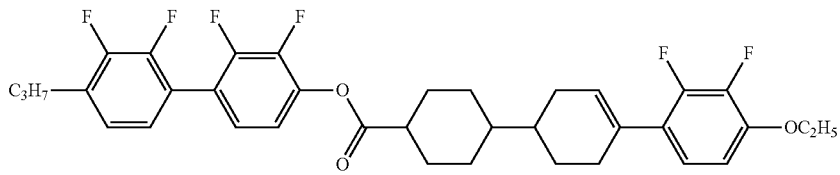 |
| 242 | 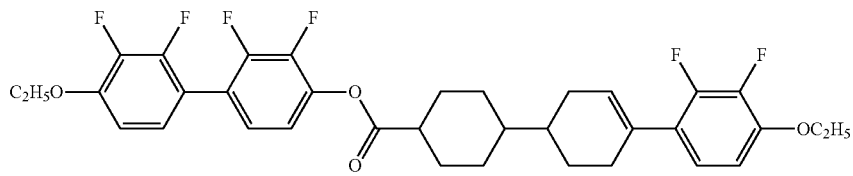 |
| 243 | 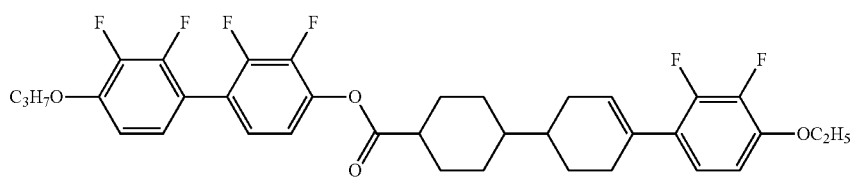 |
| 244 | 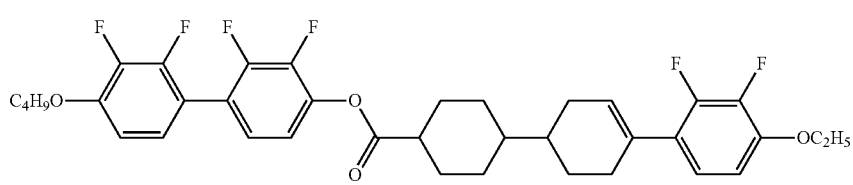 |
| 245 | 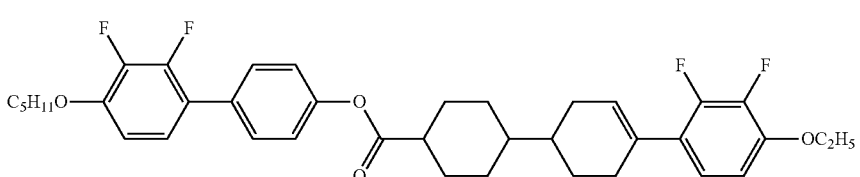 |
| 246 | 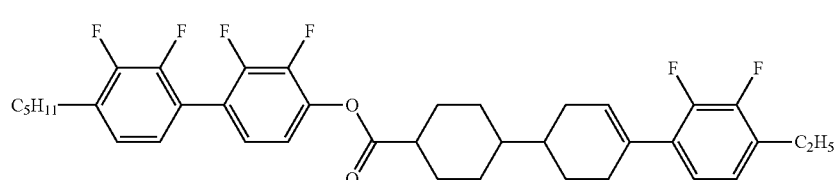 |
| 247 | 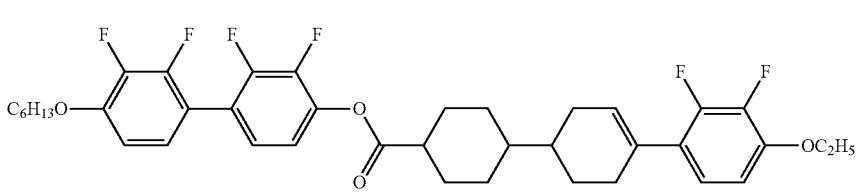 |

-continued
| No. | |
|---|---|
| 248 | 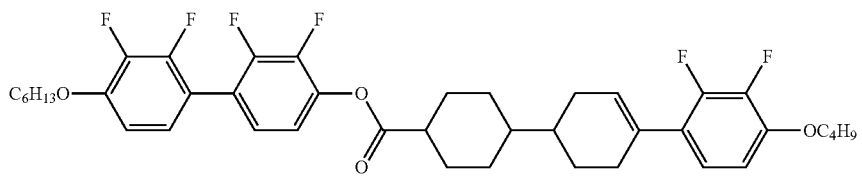 |
| 249 | 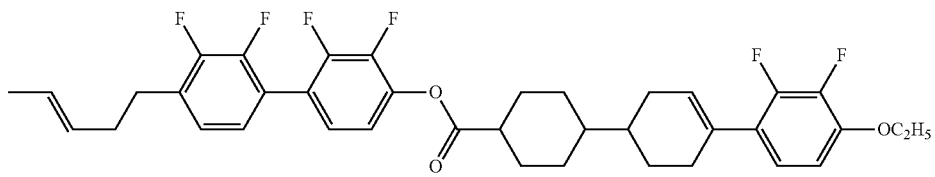 |
| 250 | 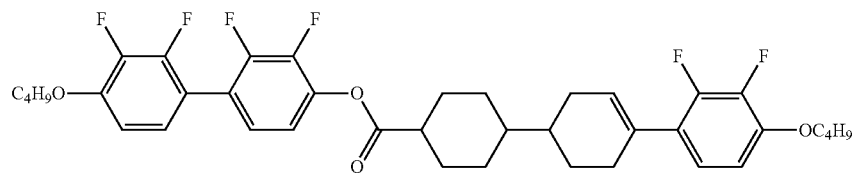 |
| 251 | 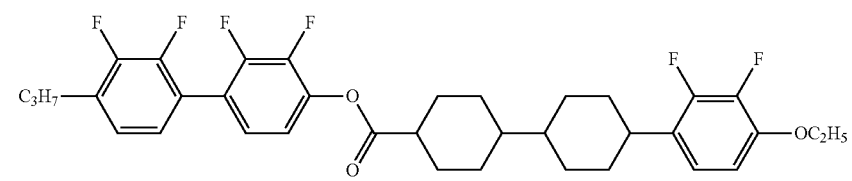 |
| 252 | 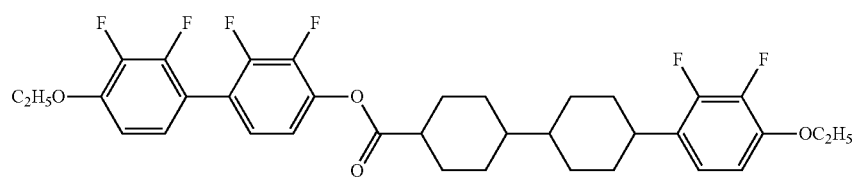 |
| 253 | 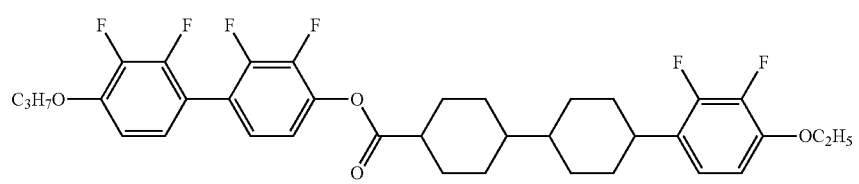 |
| 254 | 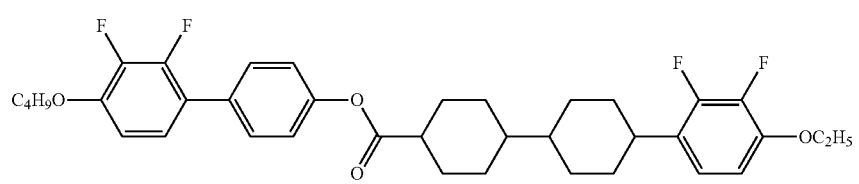 |
| 255 | 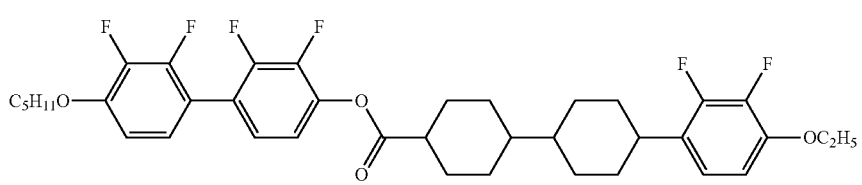 |

| No. | |
|---|---|
| 256 | 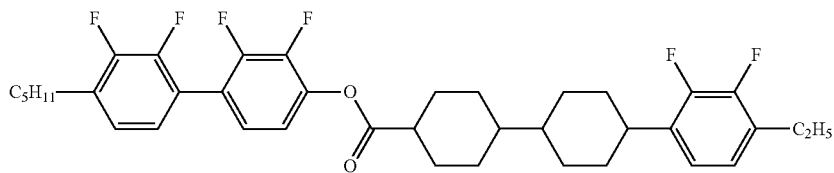 |
| 257 | 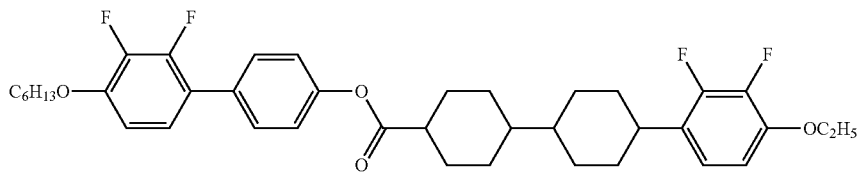 |
| 258 | 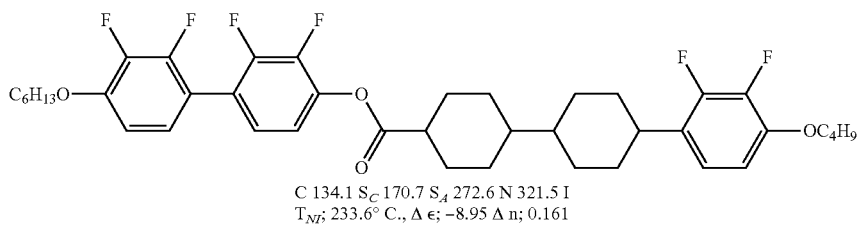
C 134.1 S$_C$ 170.7 S$_A$ 272.6 N 321.5 I
T$_{NI}$; 233.6° C., Δ ε; −8.95 Δ n; 0.161 |
| 259 | 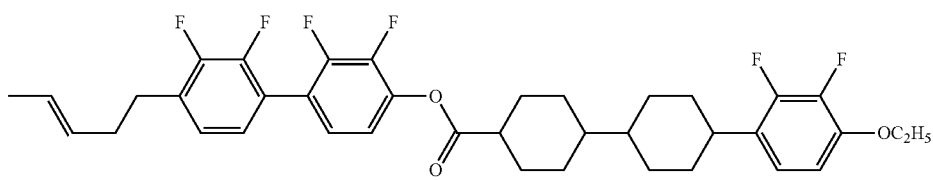 [SMILES: C/C=C/CCc1ccc(-c2ccc(OC(=O)C3CCC(C4CCC(c5ccc(OCC)c(F)c5F)CC4)CC3)c(F)c2F)c(F)c1F] |
| 260 | 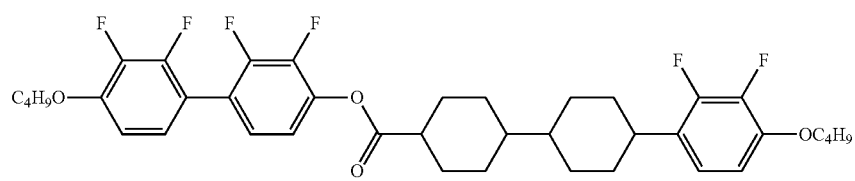 |
| 261 | 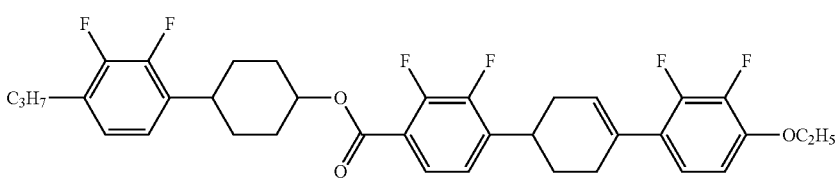 |
| 262 | 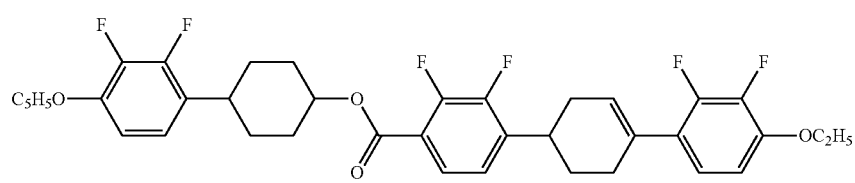 |
| 263 | 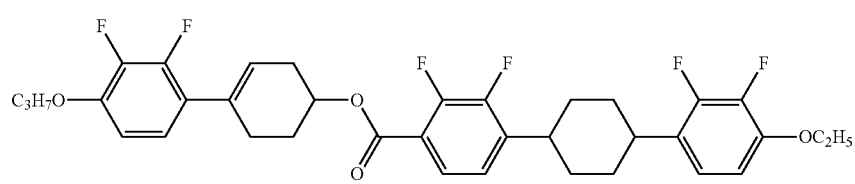 |

| No. | |
|---|---|
| 264 | 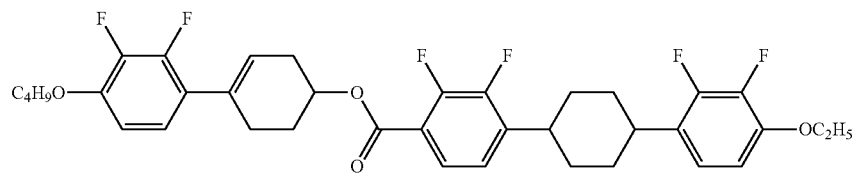 |
| 265 | 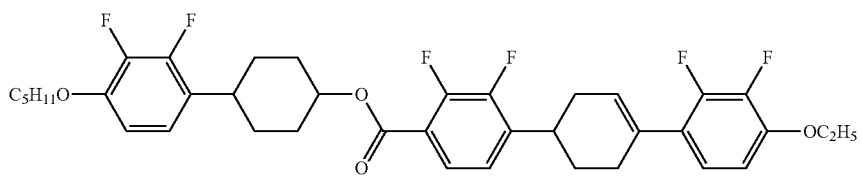 |
| 266 | 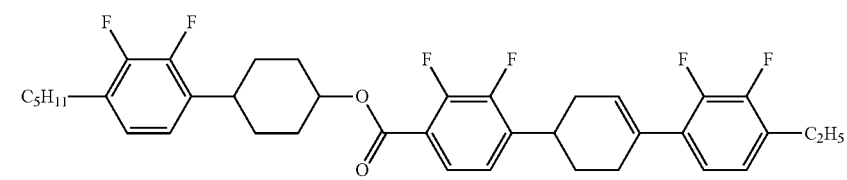 |
| 267 | 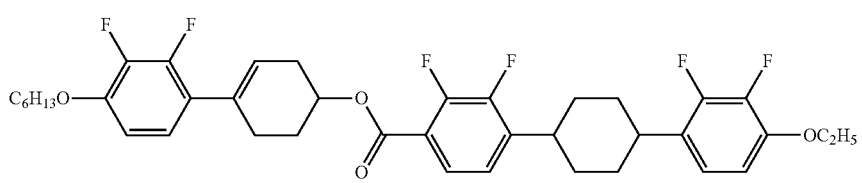 |
| 268 | 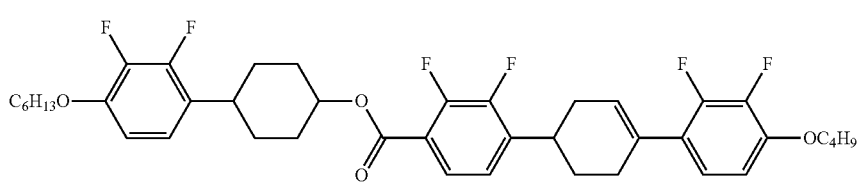 |
| 269 | 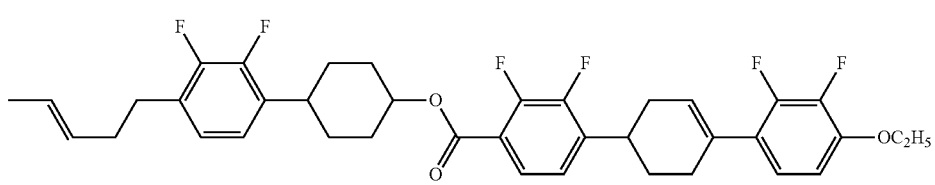 |
| 270 | 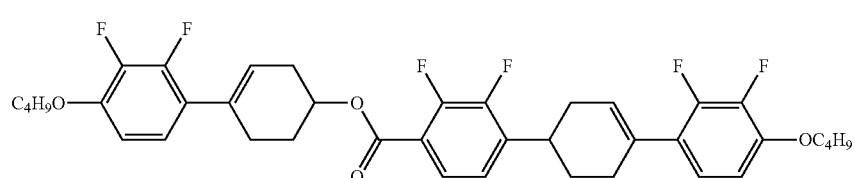 |
| 271 | 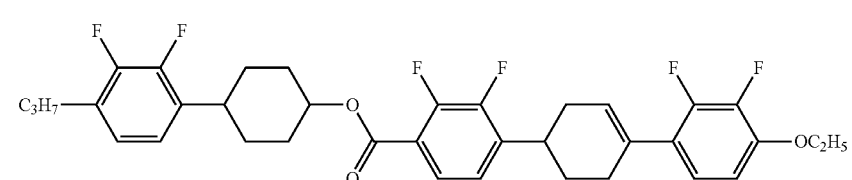 |

-continued
| No. | |
|---|---|
| 272 | 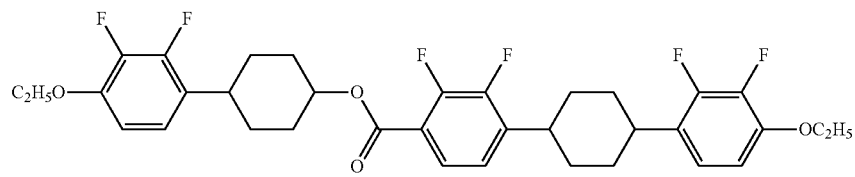 |
| 273 | 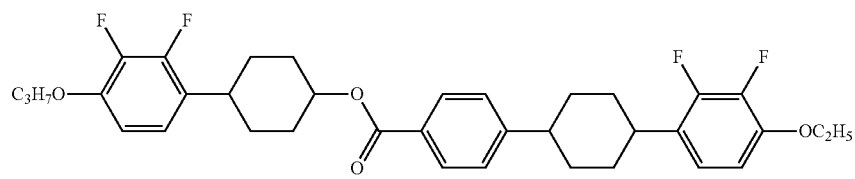 |
| 274 | 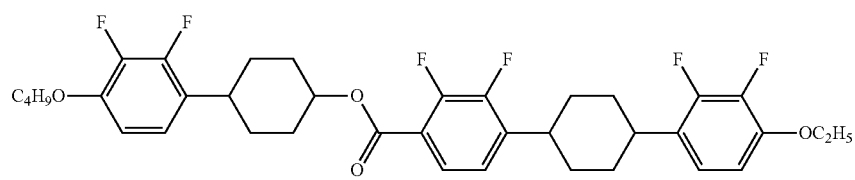 |
| 275 | 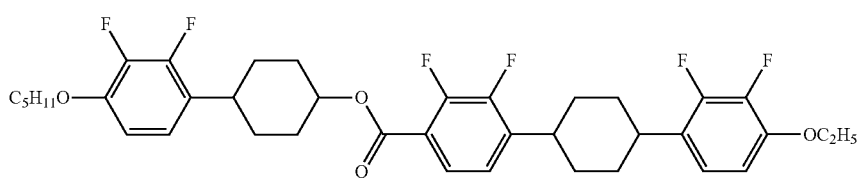 |
| 276 | 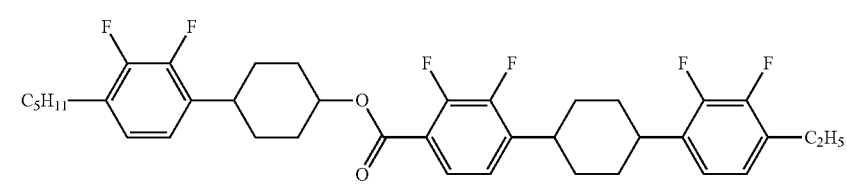 |
| 277 | 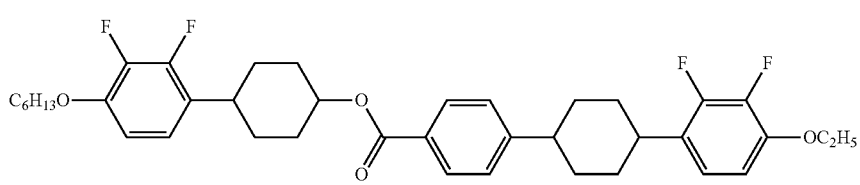 |
| 278 | 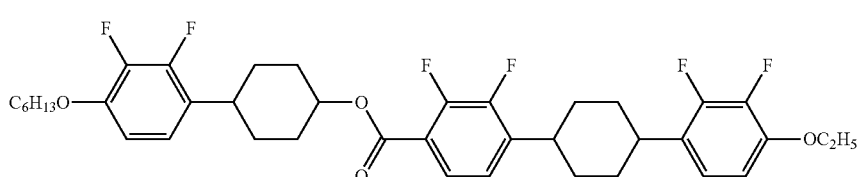 |
| 279 | 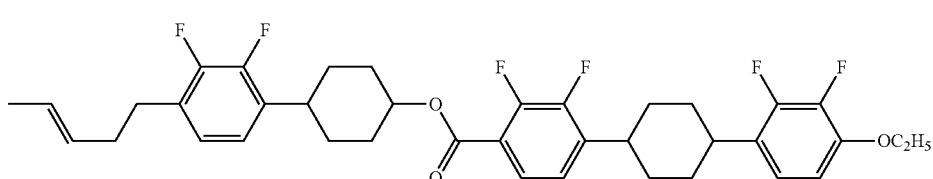 |

| No. |
|---|
| 280 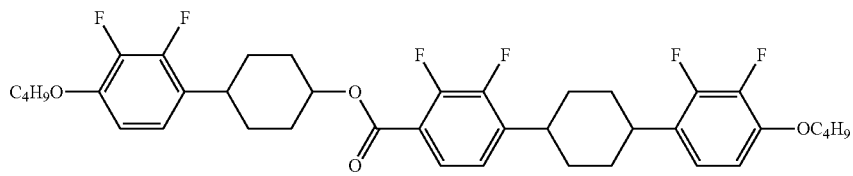 |
| 281 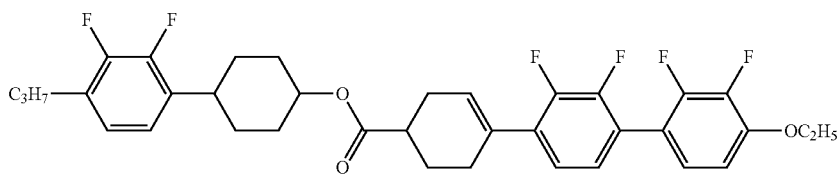 |
| 282 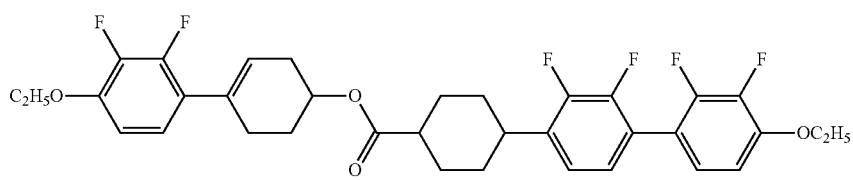 |
| 283 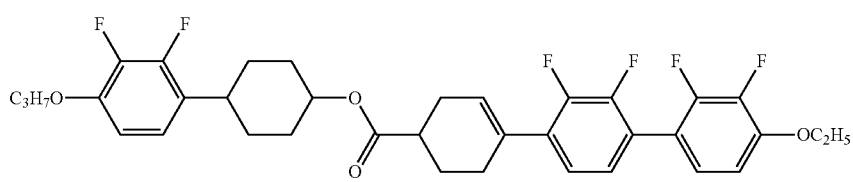 |
| 284 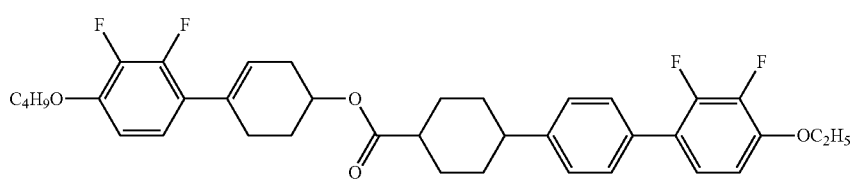 |
| 285 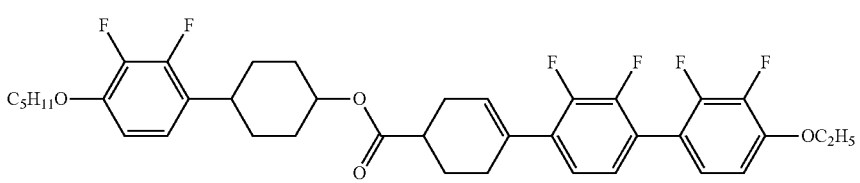 |
| 286 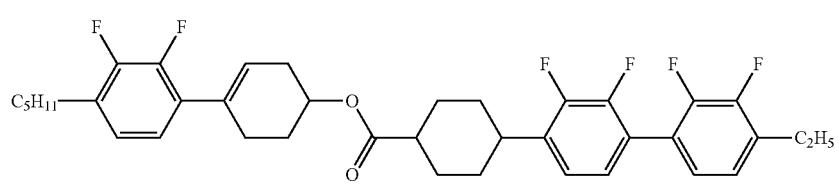 |
| 287 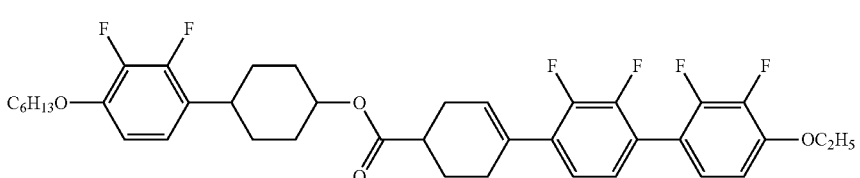 |

-continued
| No. |
|---|
| 288 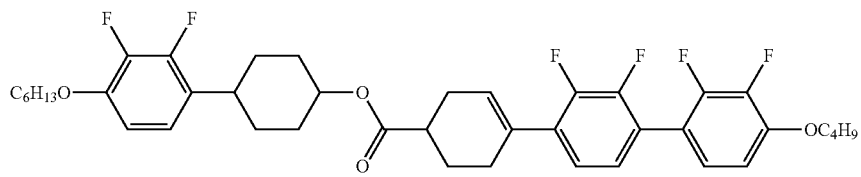 |
| 289 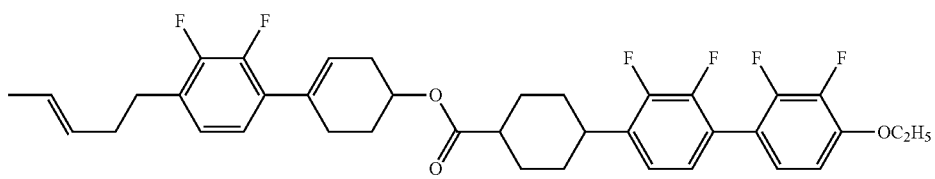 [SMILES: C/C=C/CCc1ccc(C2=CCC(OC(=O)C3CCC(c4ccc(-c5ccc(OCC)c(F)c5F)c(F)c4F)CC3)CC2)c(F)c1F] |
| 290 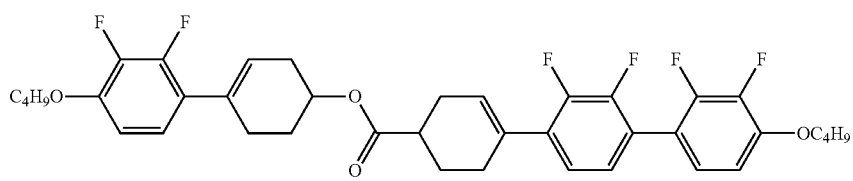 |
| 291 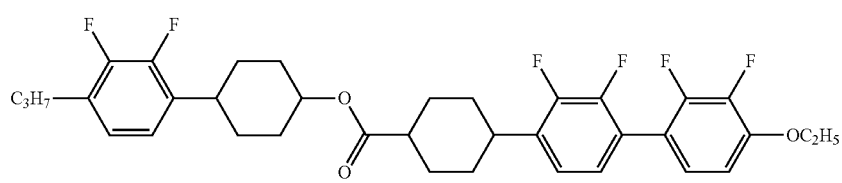 |
| 292 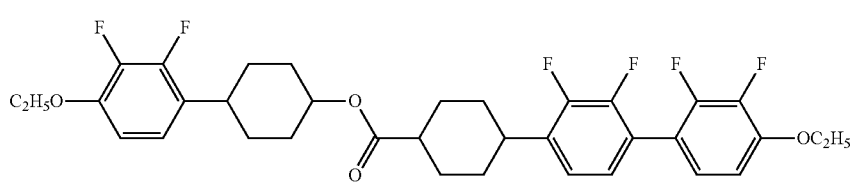 |
| 293 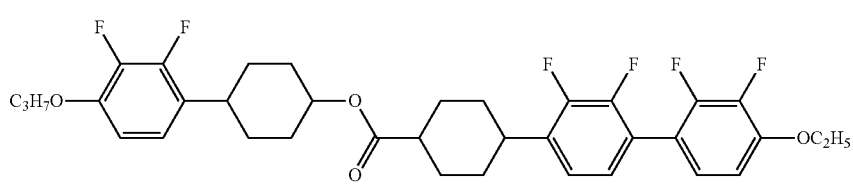 |
| 294 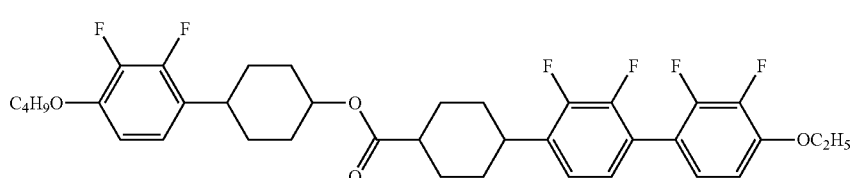 |
| 295 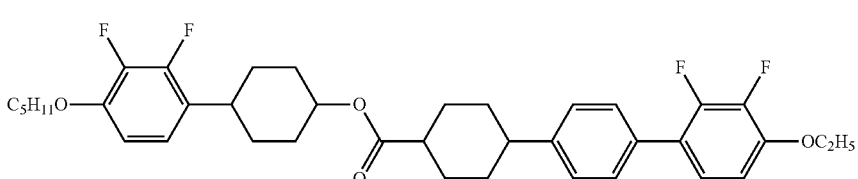 |

-continued
| No. | |
|---|---|
| 296 | 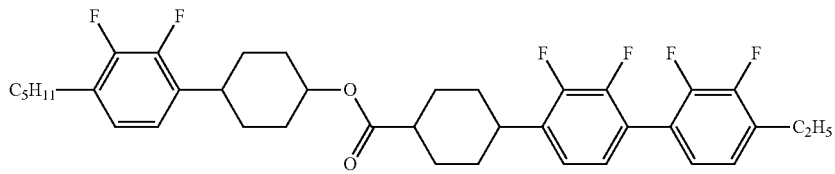 |
| 297 | 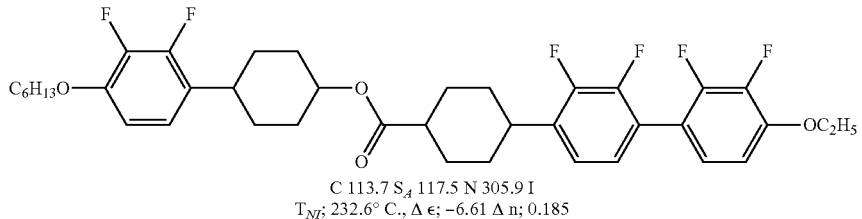
C 113.7 S$_A$ 117.5 N 305.9 I
T$_{NI}$; 232.6° C., Δ ε; −6.61 Δ n; 0.185 |
| 298 | 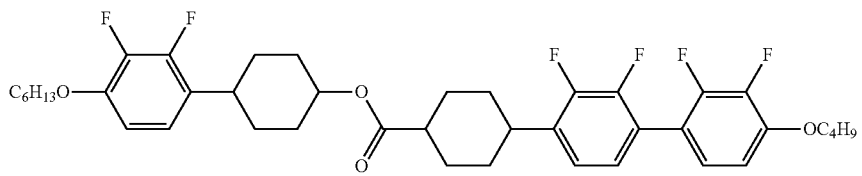 |
| 299 | 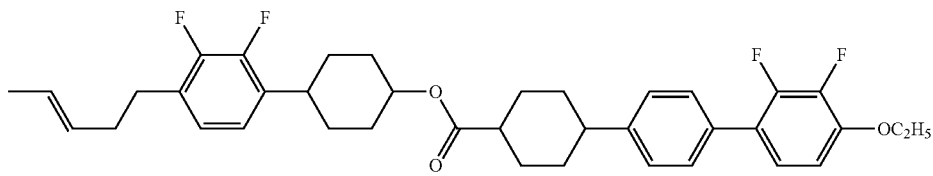 [SMILES: C/C=C/CCc1ccc(C2CCC(OC(=O)C3CCC(c4ccc(-c5ccc(OCC)c(F)c5F)cc4)CC3)CC2)c(F)c1F] |
| 300 | 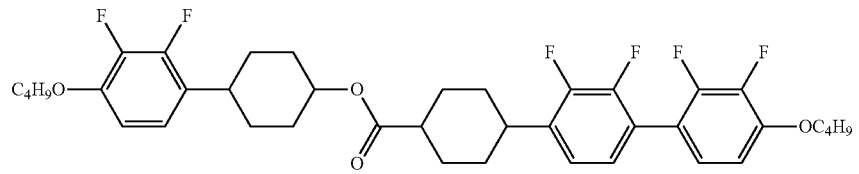 |
| 301 | 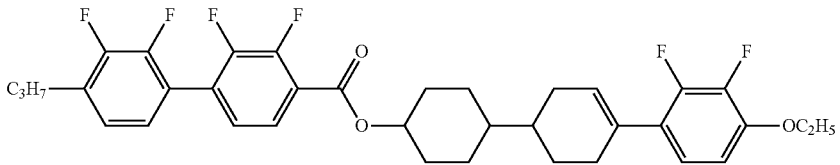 |
| 302 | 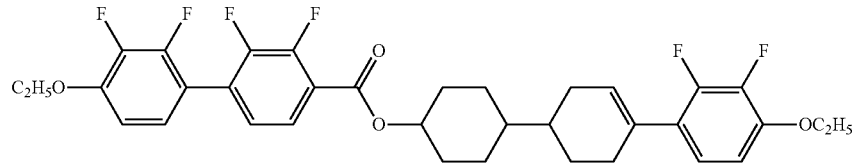 |
| 303 | 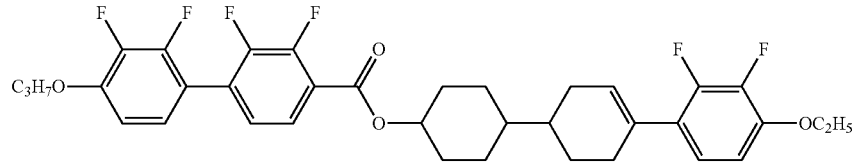 |

| No. | |
|---|---|
| 304 | 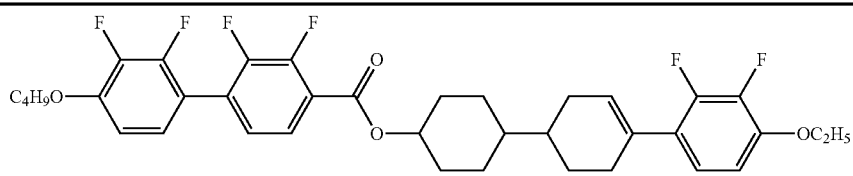 |
| 305 | 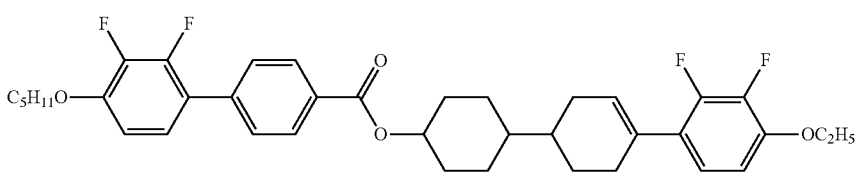 |
| 306 | 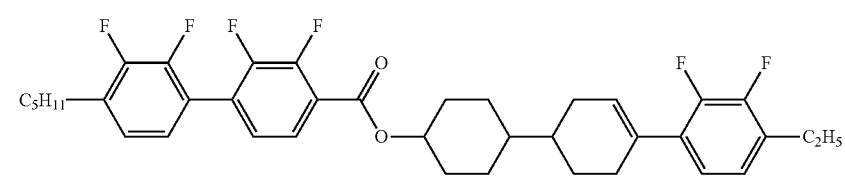 |
| 307 | 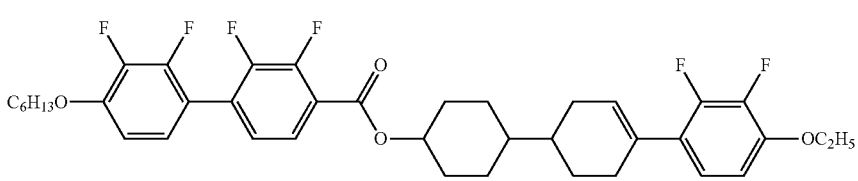 |
| 308 | 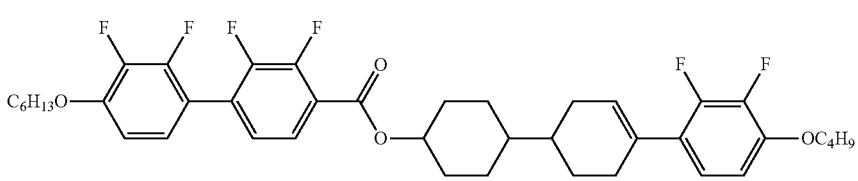 |
| 309 | 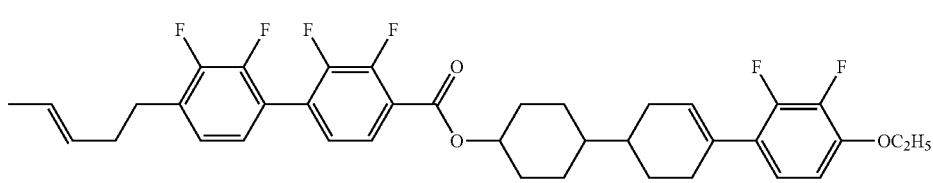 [SMILES: C/C=C/CCc1ccc(-c2ccc(C(=O)OC3CCC(C4CC=C(c5ccc(OCC)c(F)c5F)CC4)CC3)c(F)c2F)c(F)c1F] |
| 310 | 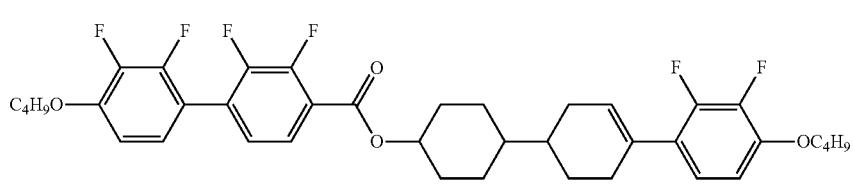 |
| 311 | 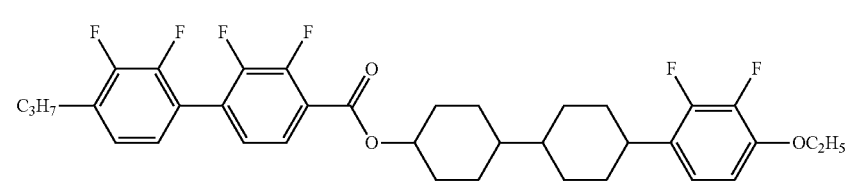 |
| 312 | 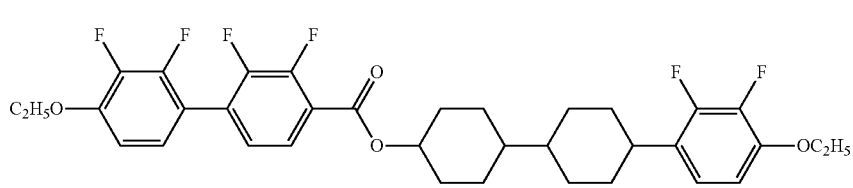 |

-continued
| No. | |
|---|---|
| 313 | 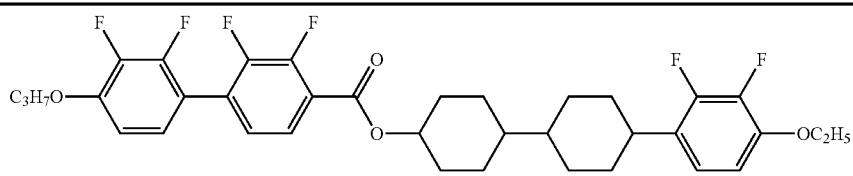 |
| 314 | 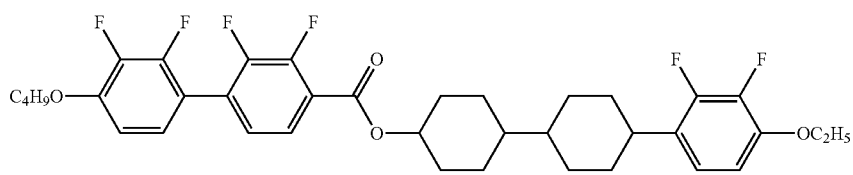 |
| 315 | 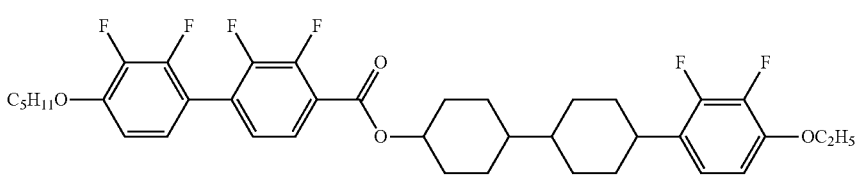 |
| 316 | 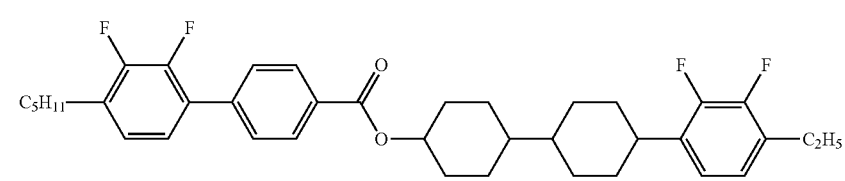 |
| 317 | 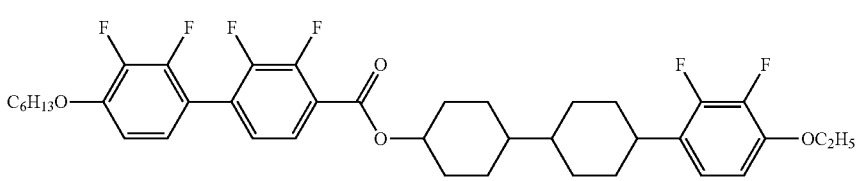 |
| 318 | 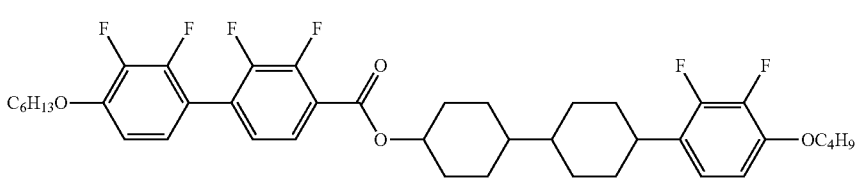 |
| 319 | 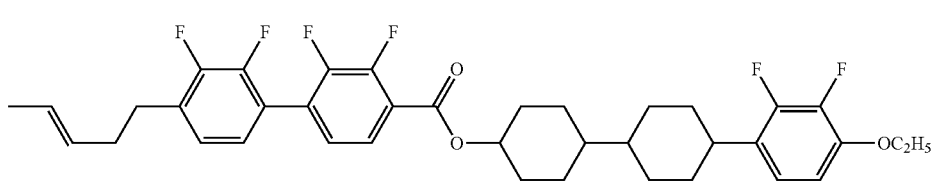 [SMILES: C/C=C/CCc1ccc(-c2ccc(C(=O)OC3CCC(C4CCC(c5ccc(OCC)c(F)c5F)CC4)CC3)c(F)c2F)c(F)c1F] |
| 320 | 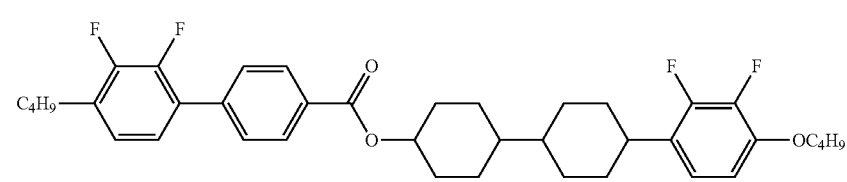 |
| 321 | 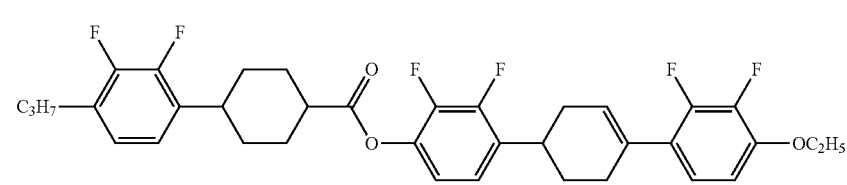 |

| No. | |
|---|---|
| 322 | 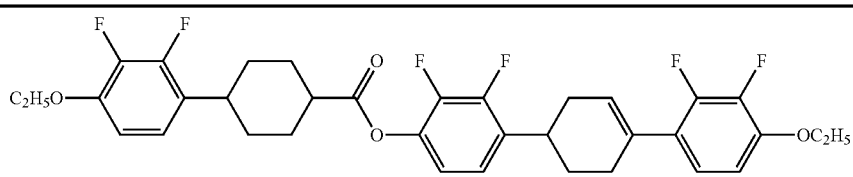 |
| 323 | 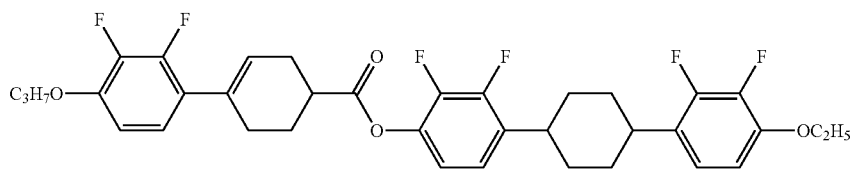 |
| 324 | 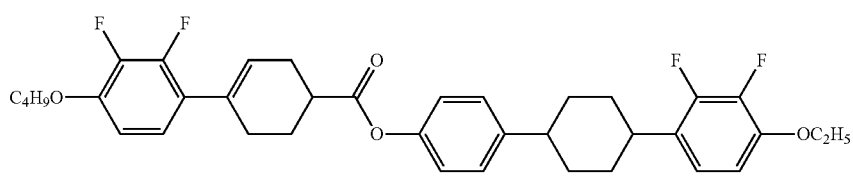 |
| 325 | 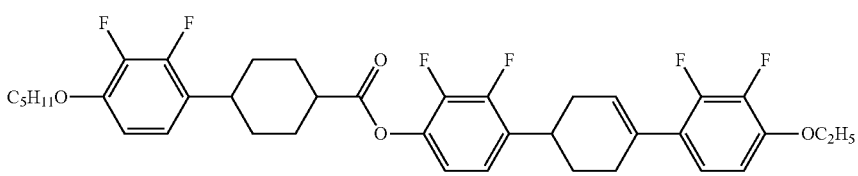 |
| 326 | 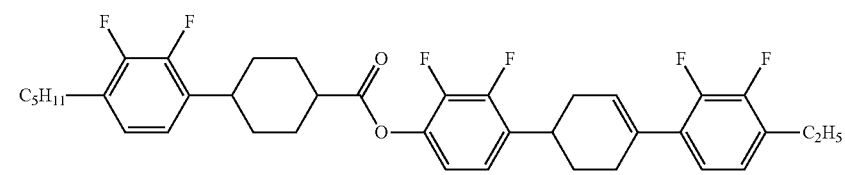 |
| 327 | 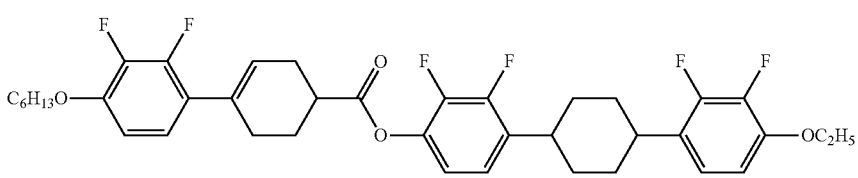 |
| 328 | 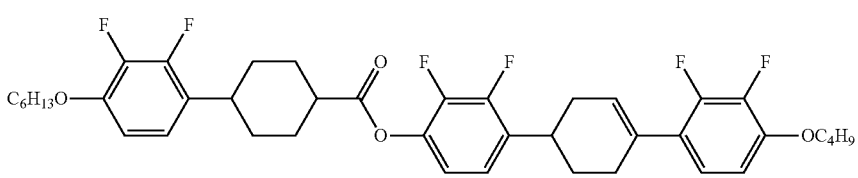 |
| 329 | 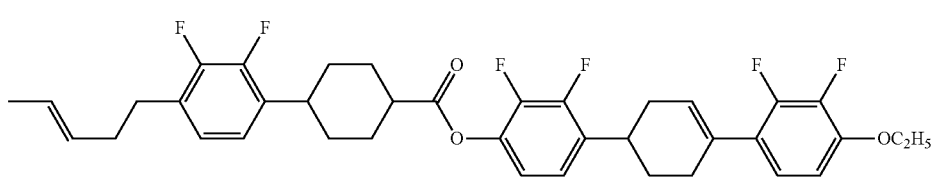 |
| 330 | 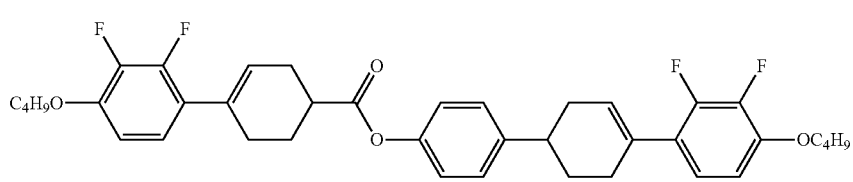 |

-continued
| No. | |
|---|---|
| 331 | 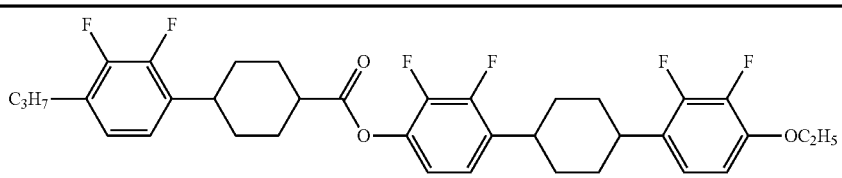 |
| 332 | 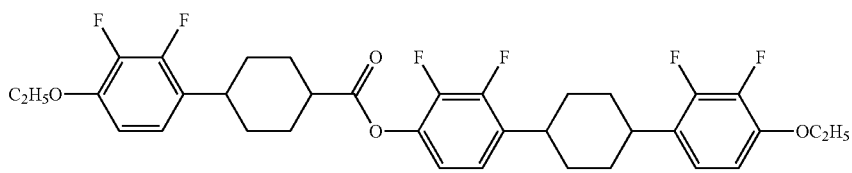 |
| 333 | 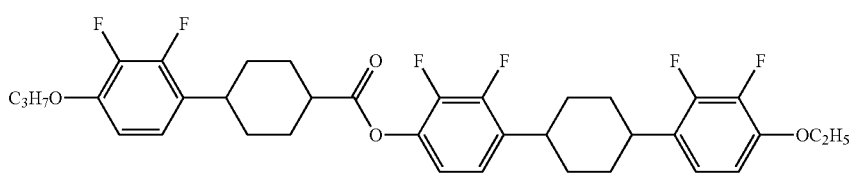 |
| 334 | 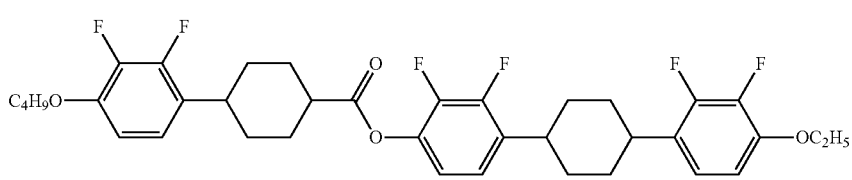 |
| 335 | 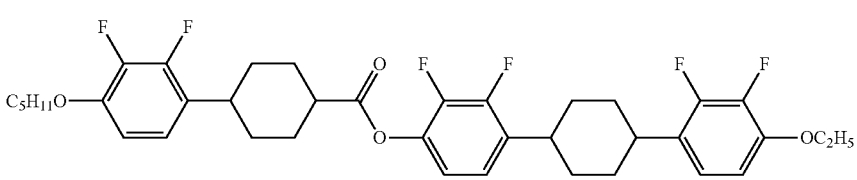 |
| 336 | 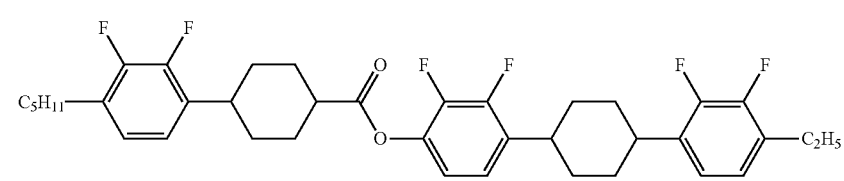 |
| 337 | 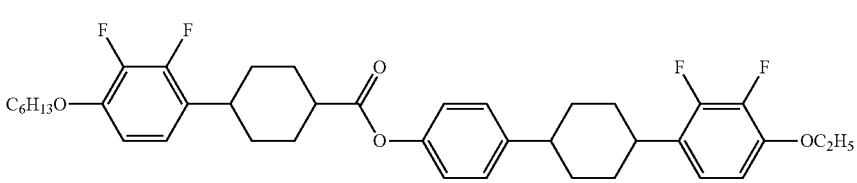 |
| 338 | 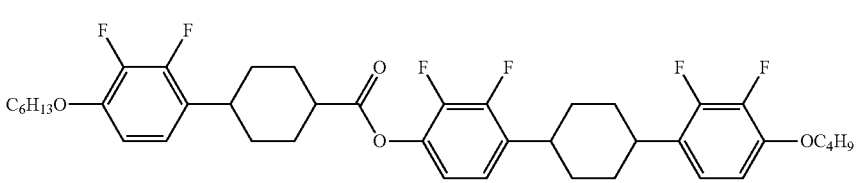 |
| 339 | 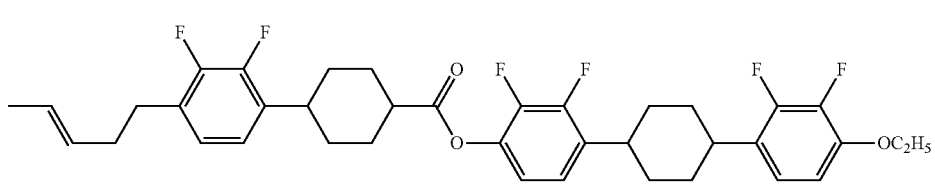 [SMILES: C/C=C/CCc1ccc(C2CCC(C(=O)Oc3ccc(C4CCC(c5ccc(OCC)c(F)c5F)CC4)c(F)c3F)CC2)c(F)c1F] |

-continued
| No. | |
|---|---|
| 340 | 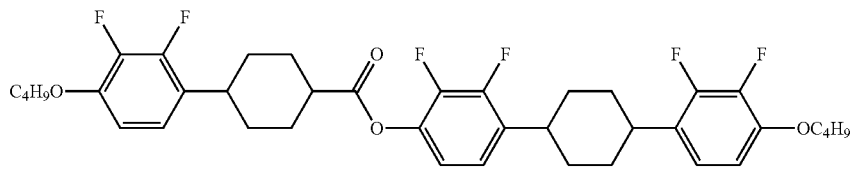 |
| 341 | 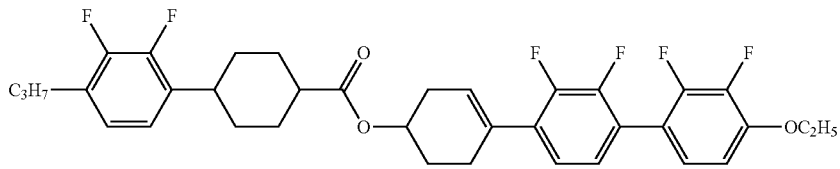 |
| 342 | 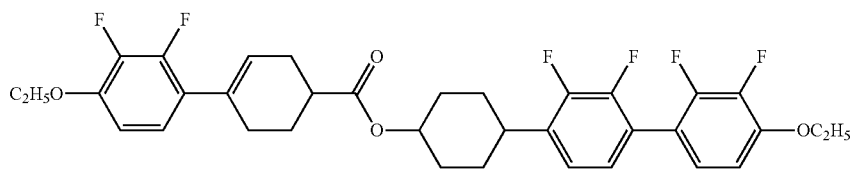 |
| 343 | 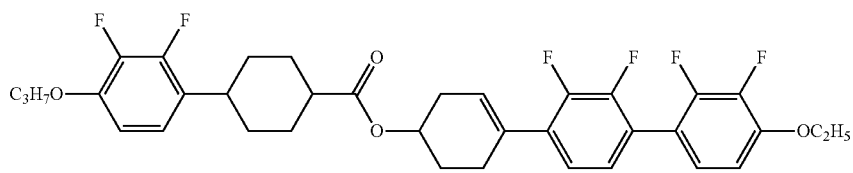 |
| 344 | 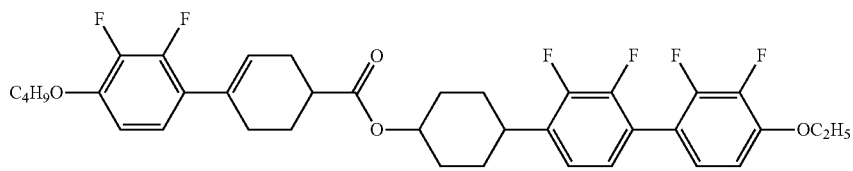 |
| 345 | 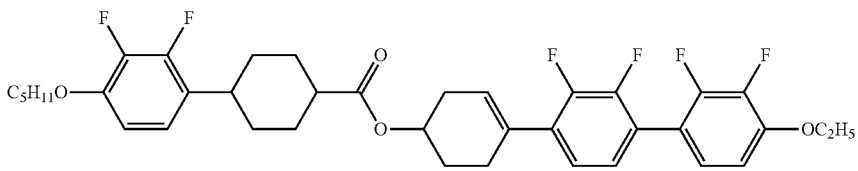 |
| 346 | 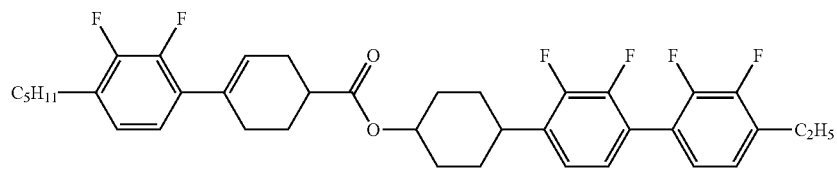 |
| 347 | 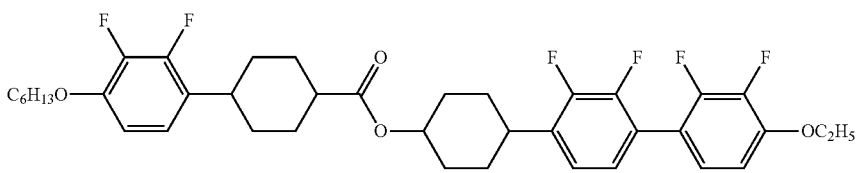 |
C 135.2 N 314.0 I
$T_{NI}$; 234.6° C., Δ ∈; −7.54 Δ n; 0.174

| No. | |
|---|---|
| 348 | 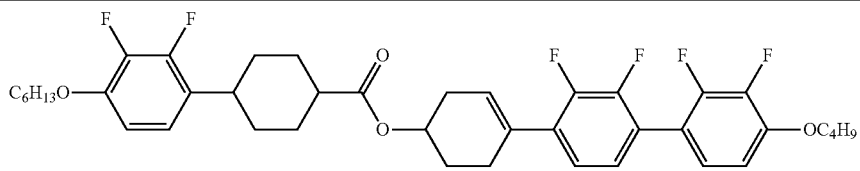 |
| 349 | 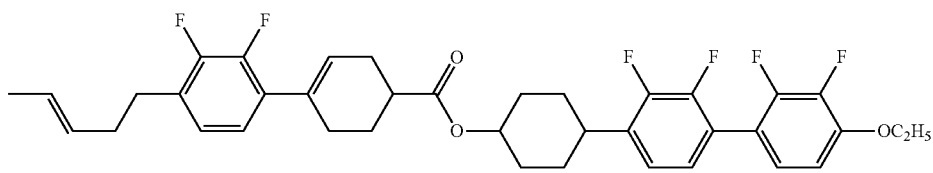 [SMILES: C/C=C/CCc1ccc(C2=CCC(C(=O)OC3CCC(c4ccc(-c5ccc(OCC)c(F)c5F)c(F)c4F)CC3)CC2)c(F)c1F] |
| 350 | 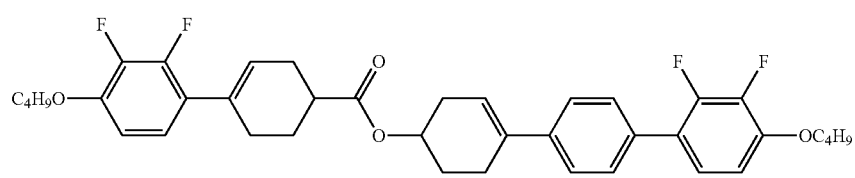 |
| 351 | 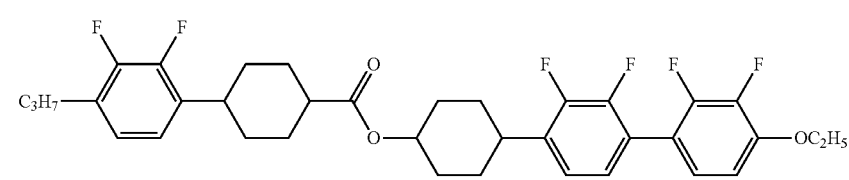 |
| 352 | 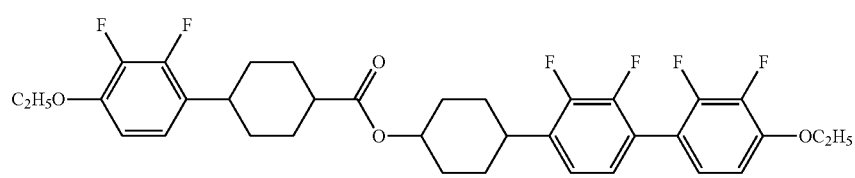 |
| 353 | 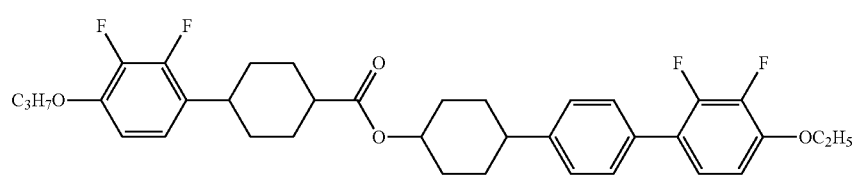 |
| 354 | 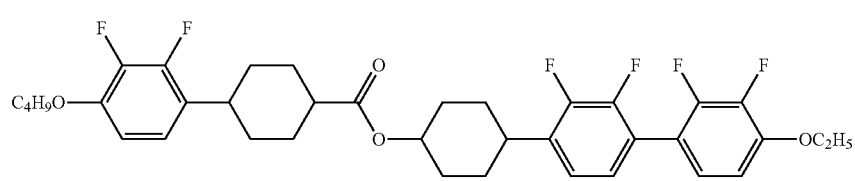 |
| 355 | 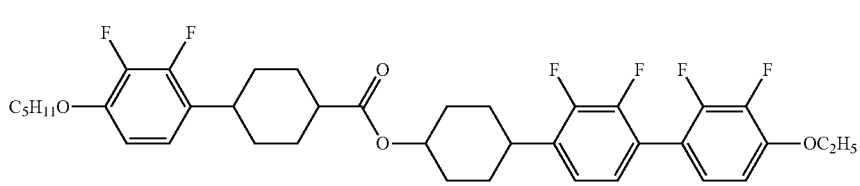 |
| 356 | 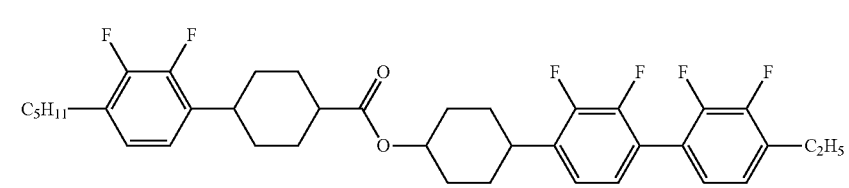 |

-continued
| No. |
|---|
| 357 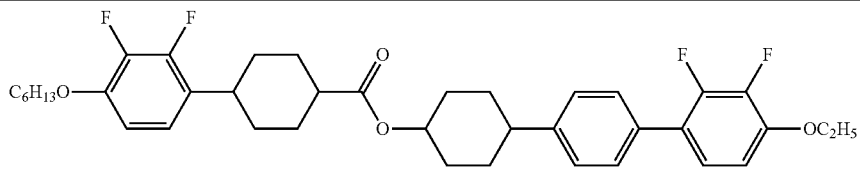 |
| 358 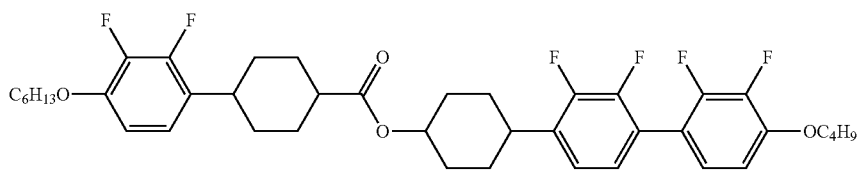 |
| 359 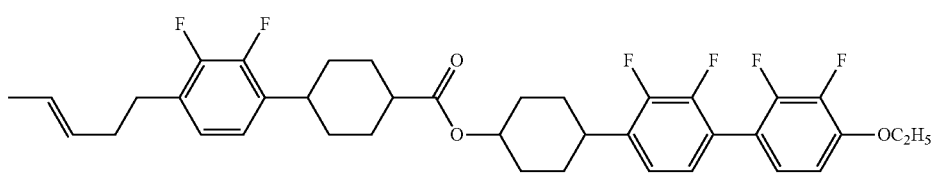 |
| 360 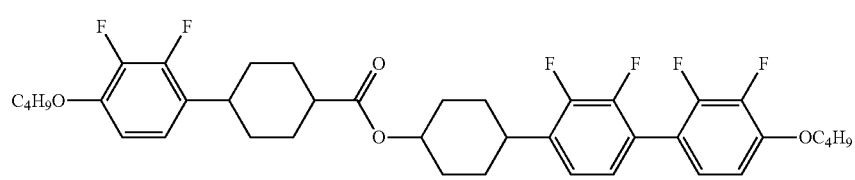 |
| 361 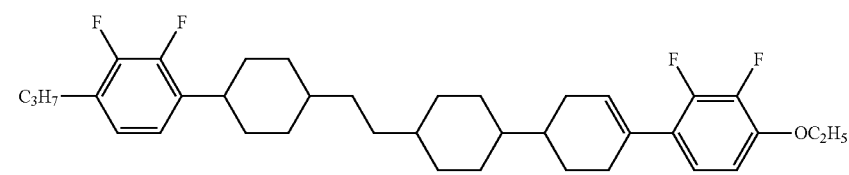 |
| 362 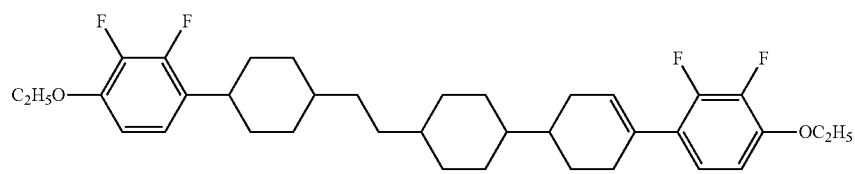 |
| 363 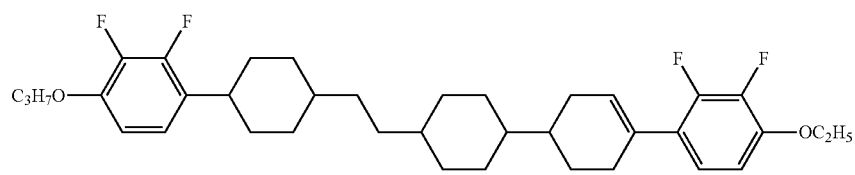 |
| 364 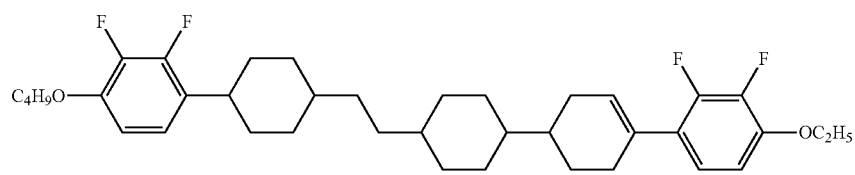 |
| 365 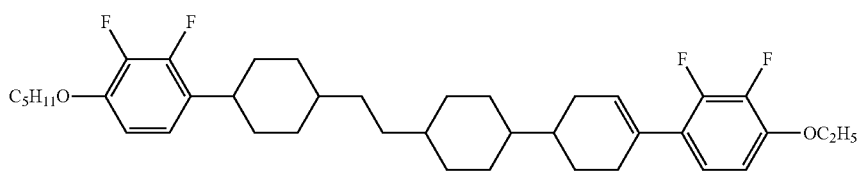 |

-continued
| No. | |
|---|---|
| 366 | 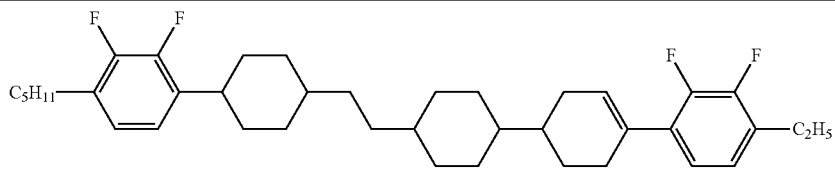 |
| 367 | 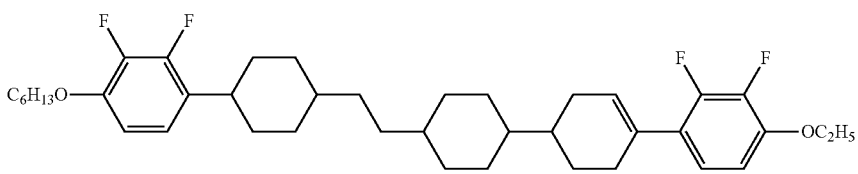 |
| 368 | 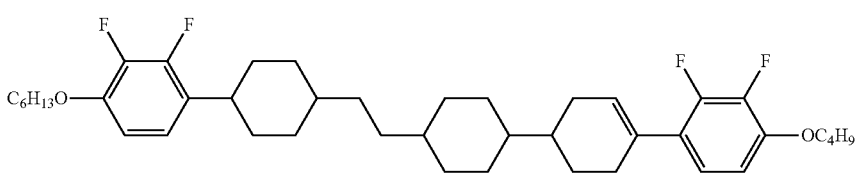 |
| 369 | 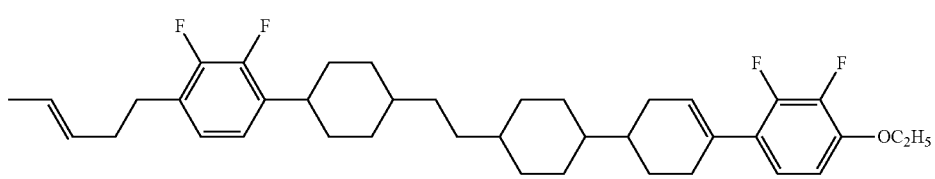 [SMILES: C/C=C/CCc1ccc(C2CCC(CCC3CCC(C4CC=C(c5ccc(OCC)c(F)c5F)CC4)CC3)CC2)c(F)c1F] |
| 370 | 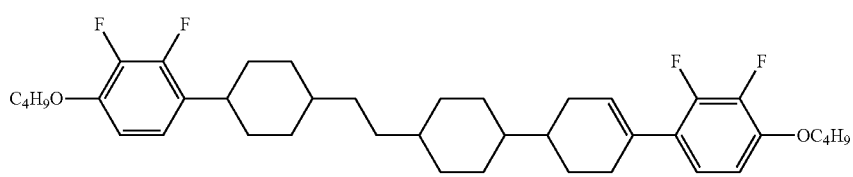 |
| 371 | 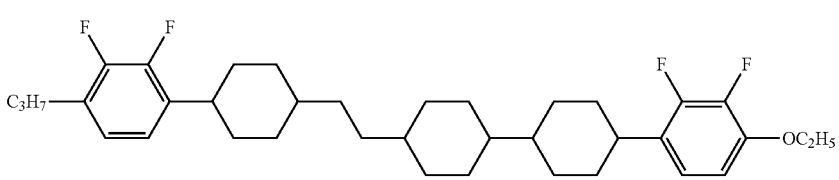 |
| 372 | 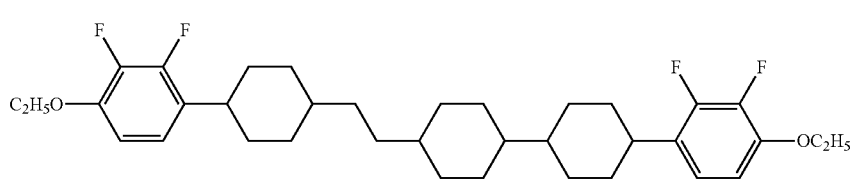 |
| 373 | 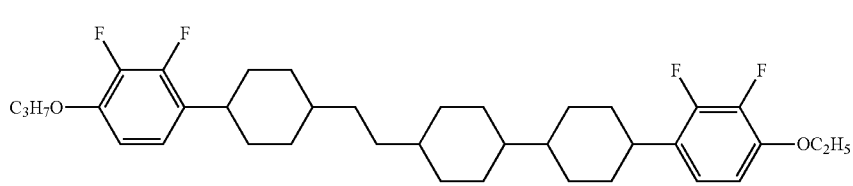 |
| 374 | 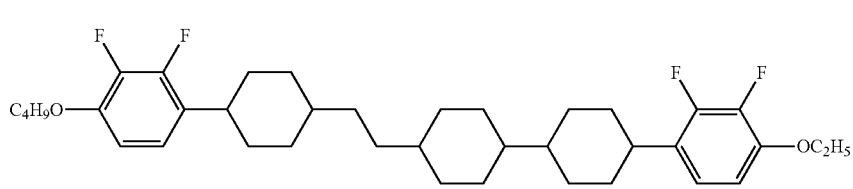 |

| No. | |
|---|---|
| 375 | 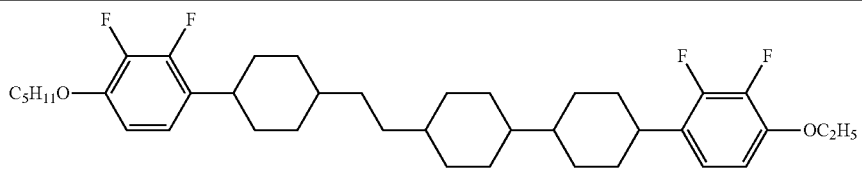 |
| 376 | 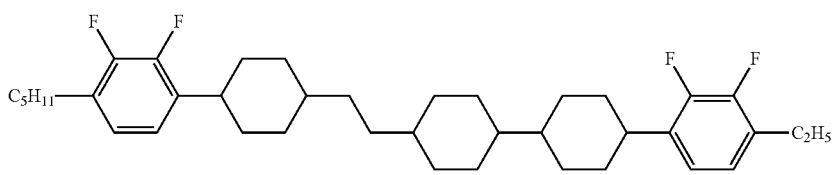 |
| 377 | 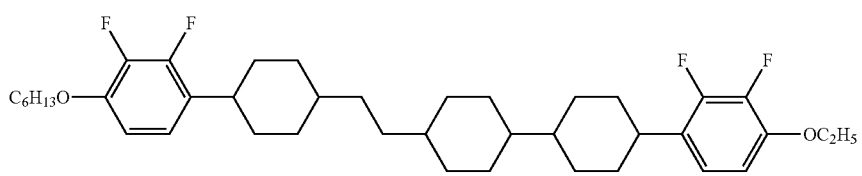 |
| 378 | 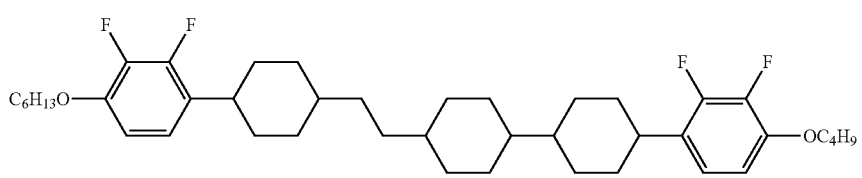 |
| 379 | 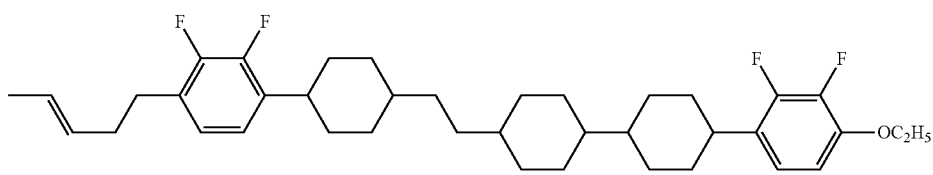 |
| 380 | 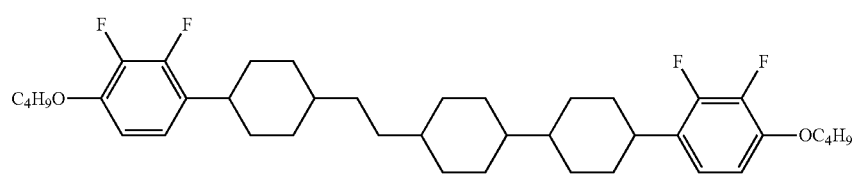 |
| 381 | 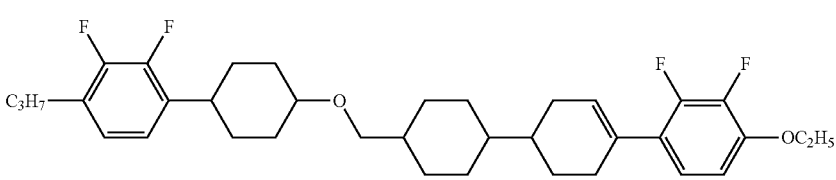 |
| 382 | 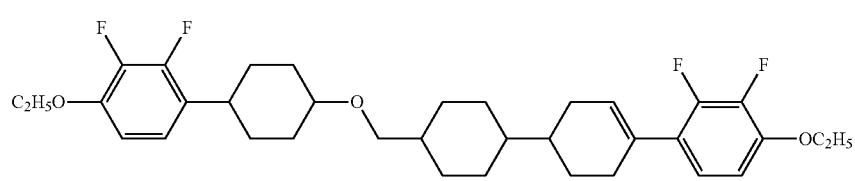 |
| 383 | 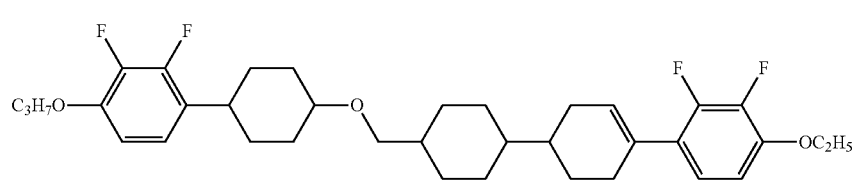 |

-continued
| No. | |
|---|---|
| 384 | 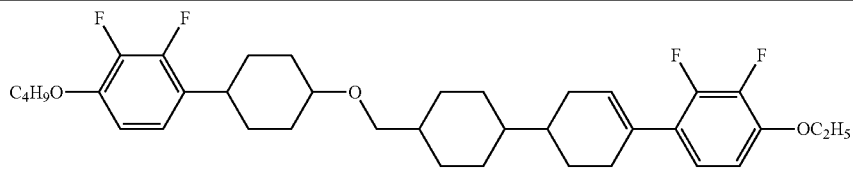 |
| 385 | 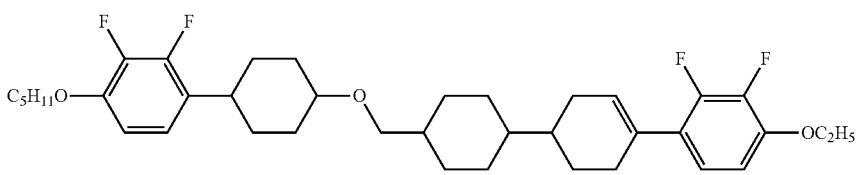 |
| 386 | 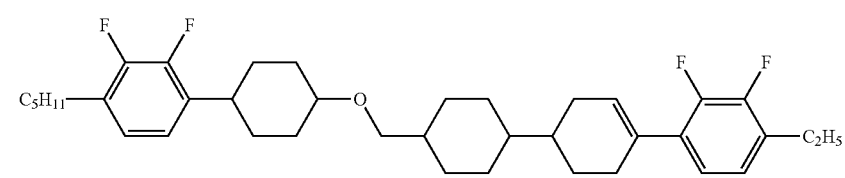 |
| 387 | 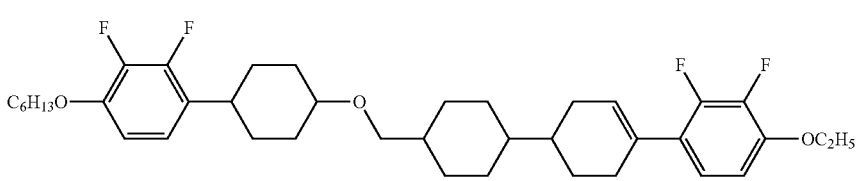 |
| 388 | 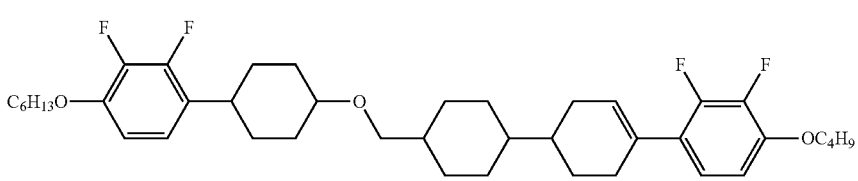 |
| 389 | 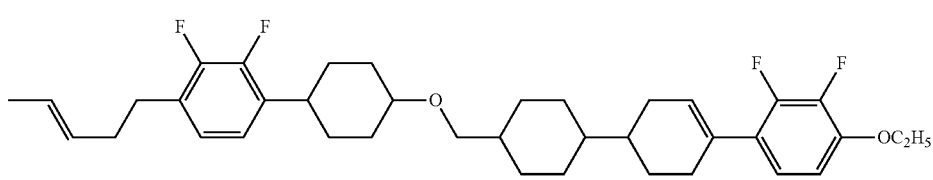 |
| 390 | 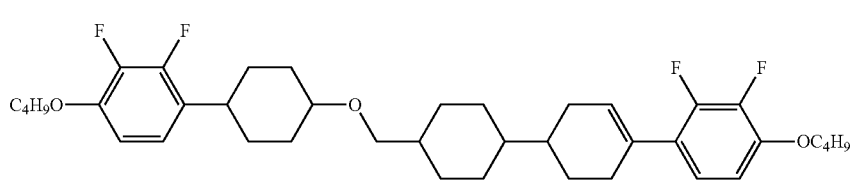 |
| 391 | 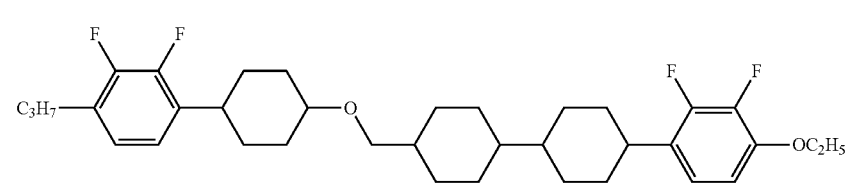 |
| 392 | 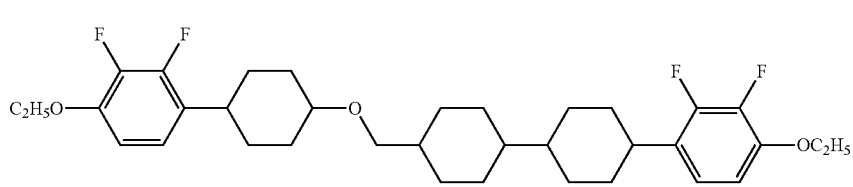 |

-continued
| No. |  |
|---|---|
| 393 | 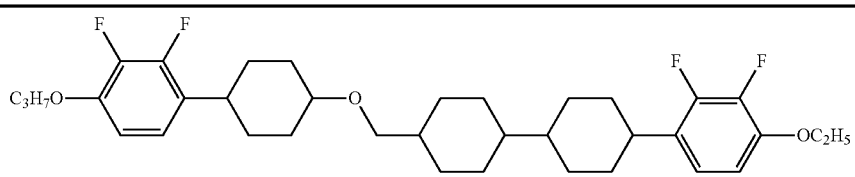 |
| 394 | 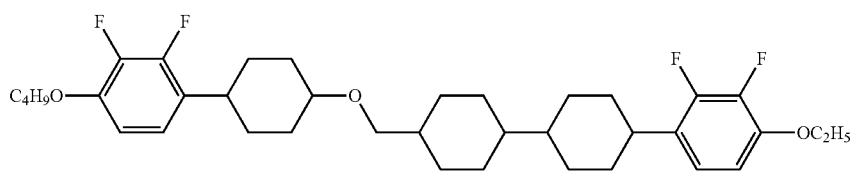 |
| 395 | 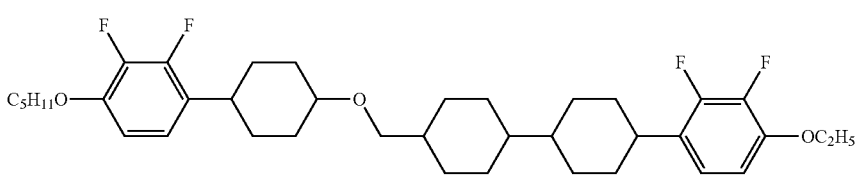 |
| 396 | 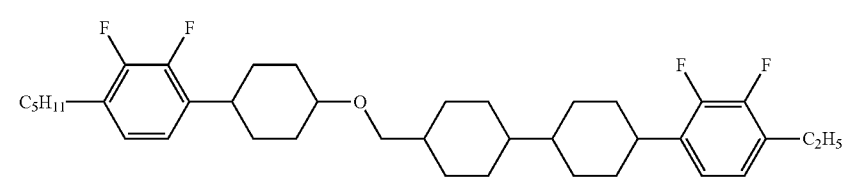 |
| 397 | 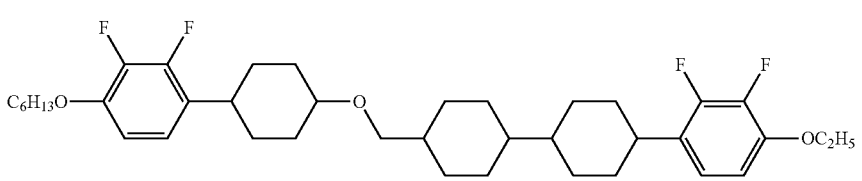 |
| 398 | 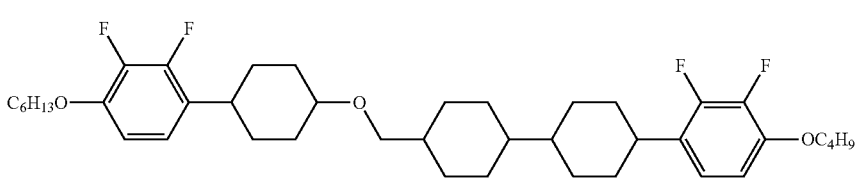 |
| 399 | 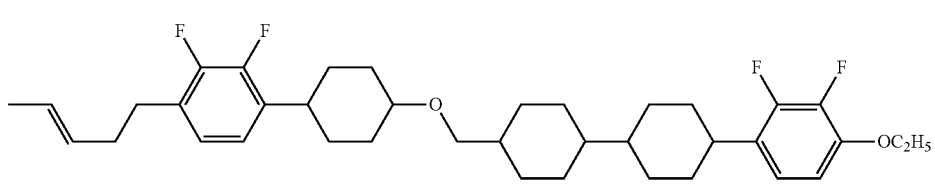 |
| 400 | 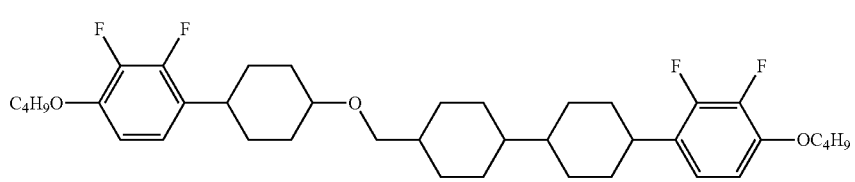 |
| 401 | 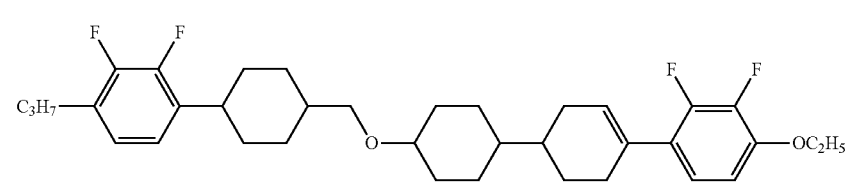 |

| No. | |
|---|---|
| 402 | 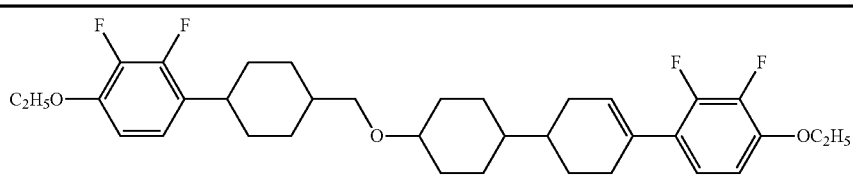 |
| 403 | 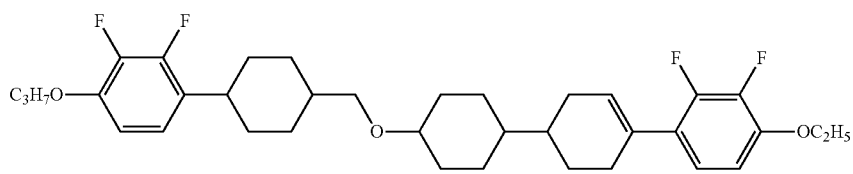 |
| 404 | 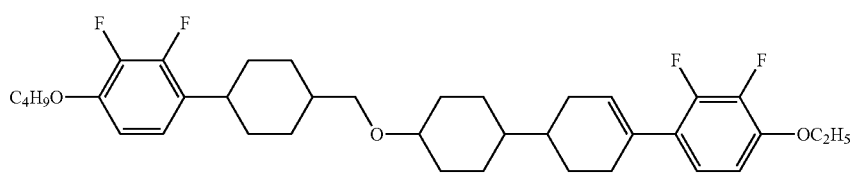 |
| 405 | 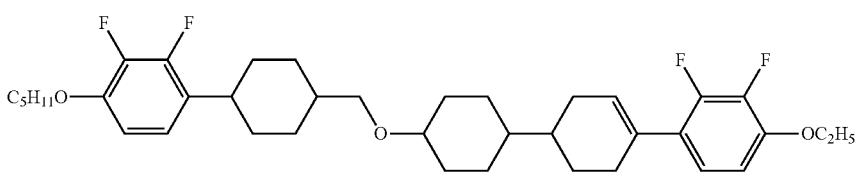 |
| 406 | 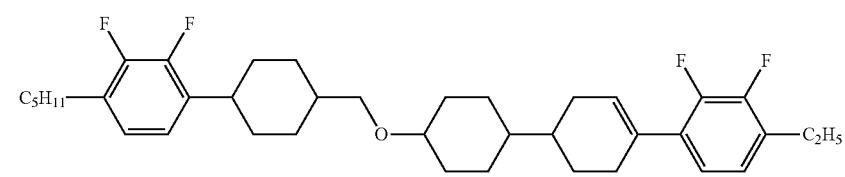 |
| 407 | 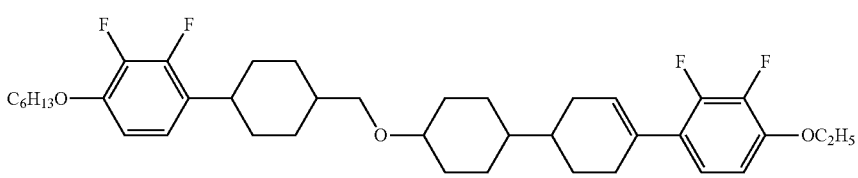 |
| 408 | 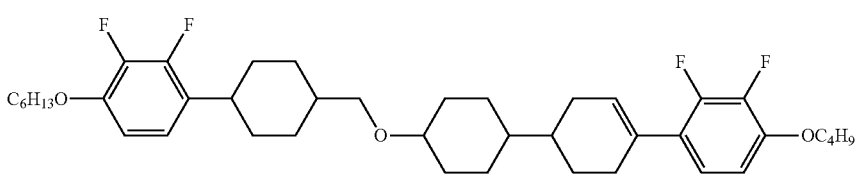 |
| 409 | 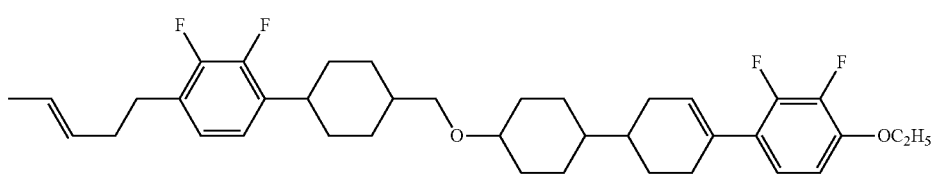 |
| 410 | 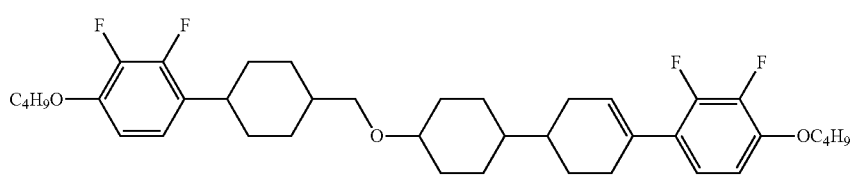 |

-continued
| No. | |
|---|---|
| 411 | 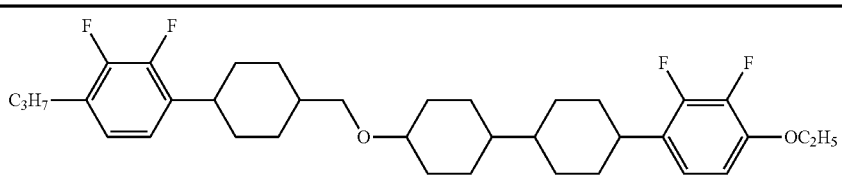 |
| 412 | 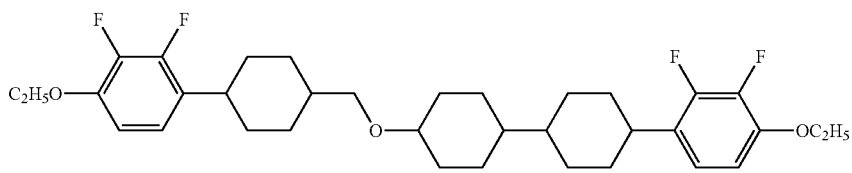 |
| 413 | 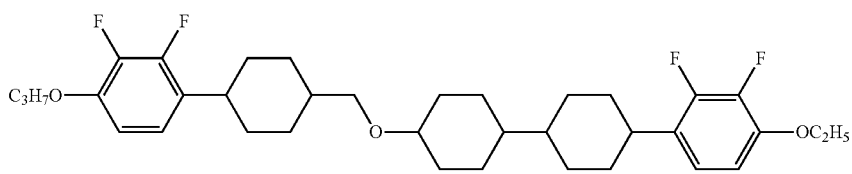 |
| 414 | 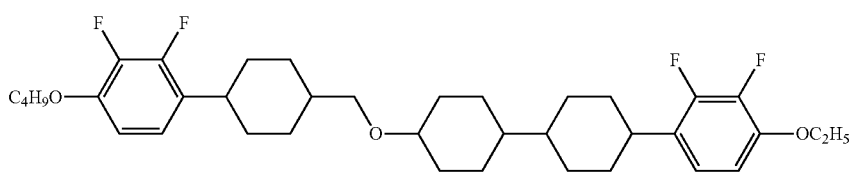 |
| 415 | 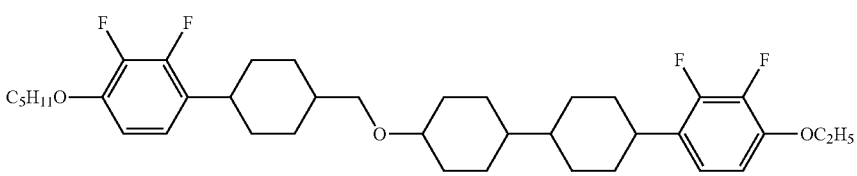 |
| 416 | 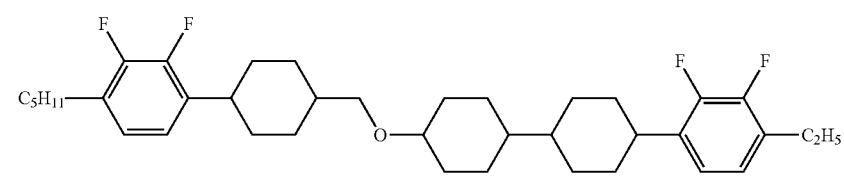 |
| 417 | 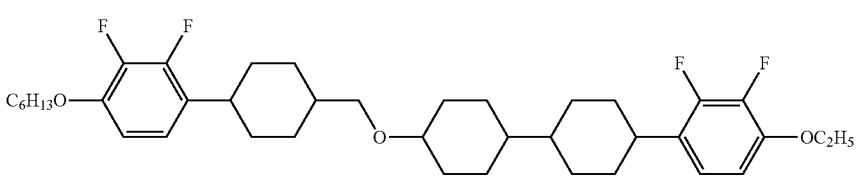 |
| 418 | 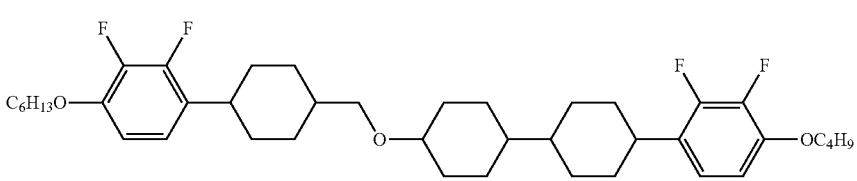 |
| 419 | 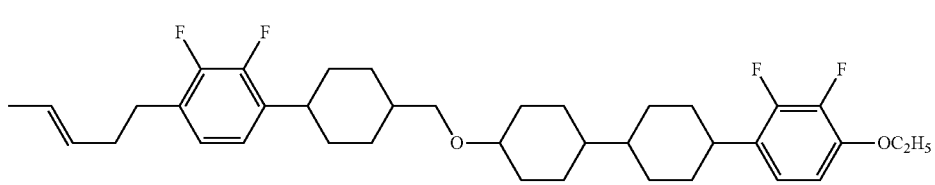 |

| No. | |
|---|---|
| 420 | 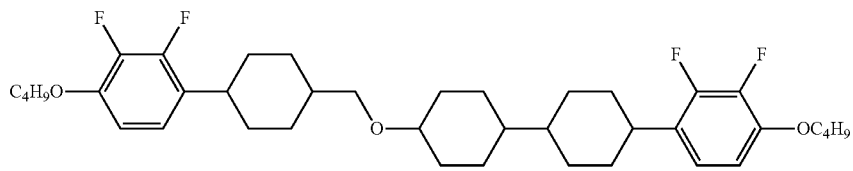 |
| 421 | 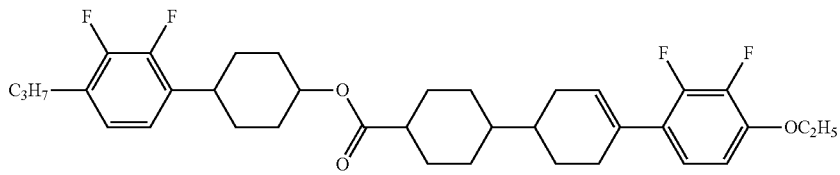 |
| 422 | 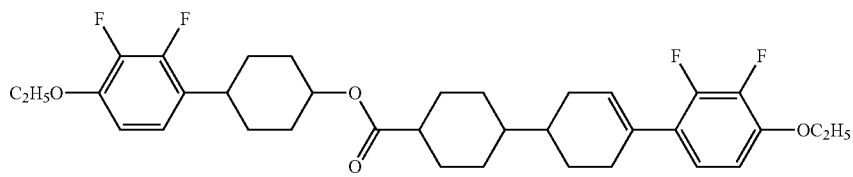 |
| 423 | 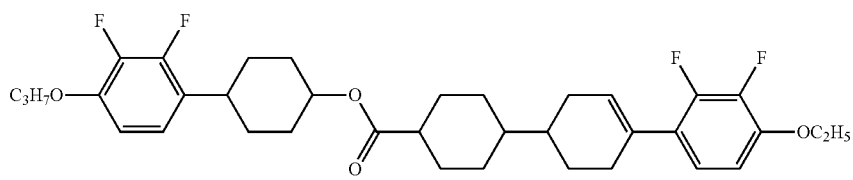 |
| 424 | 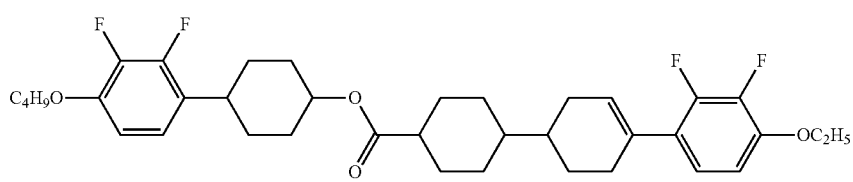 |
| 425 | 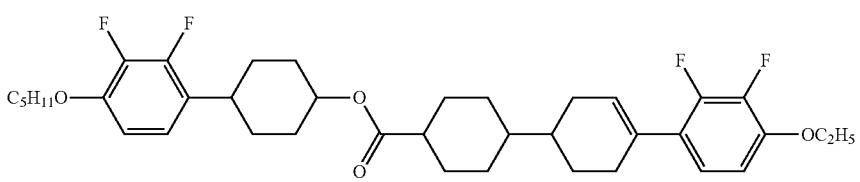 |
| 426 | 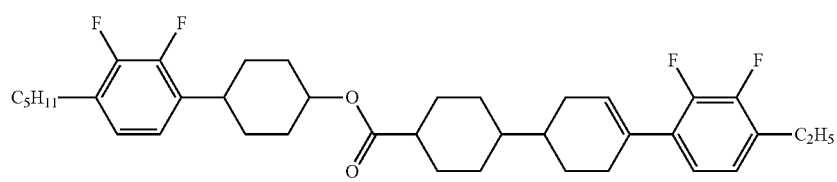 |
| 427 | 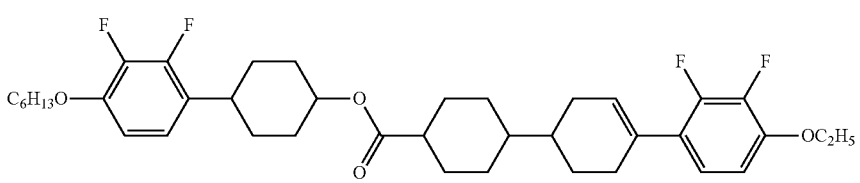 |

| No. | |
|---|---|
| 428 | 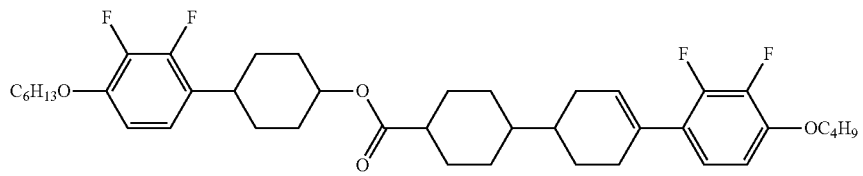 |
| 429 | 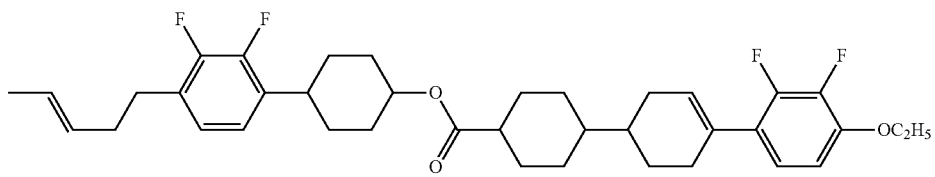 |
| 430 | 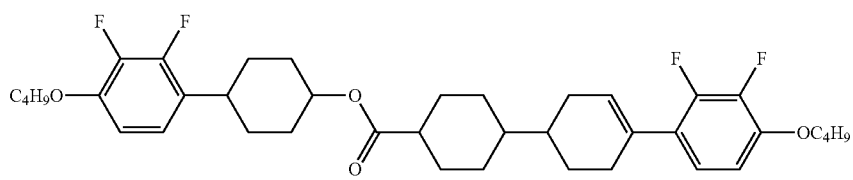 |
| 431 | 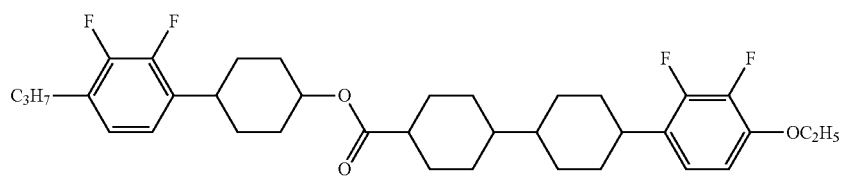 |
| 432 | 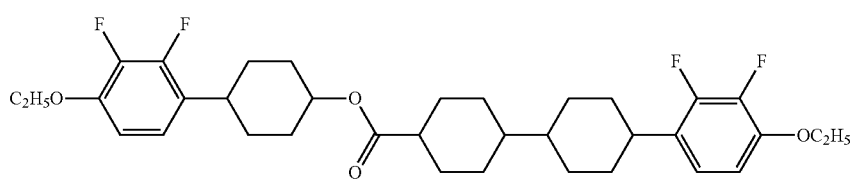 |
| 433 | 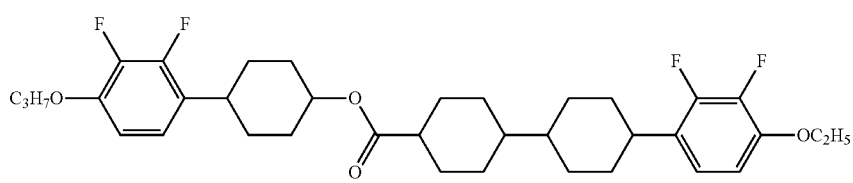 |
| 434 | 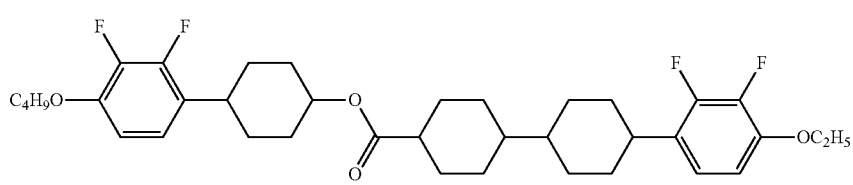 |
| 435 | 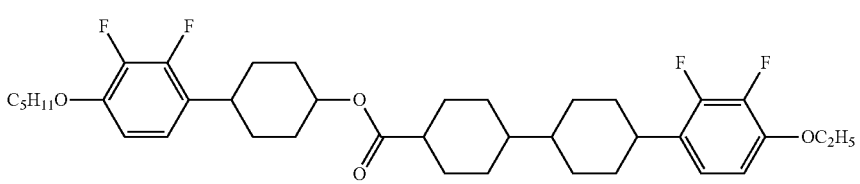 |

| No. | |
|---|---|
| 436 | 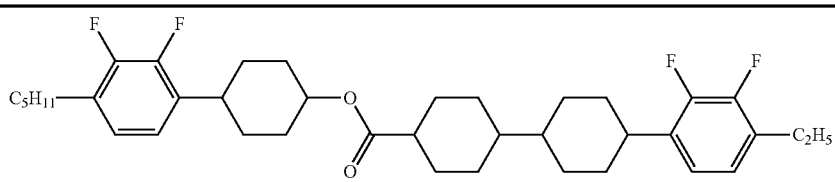 |
| 437 | 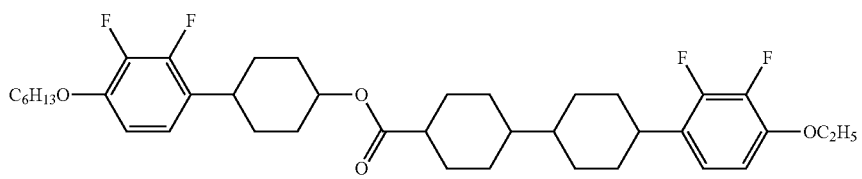 |
| 438 | 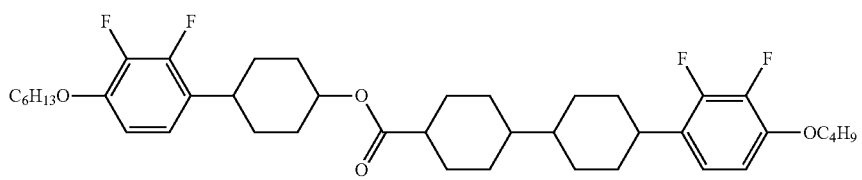 |
| 439 | 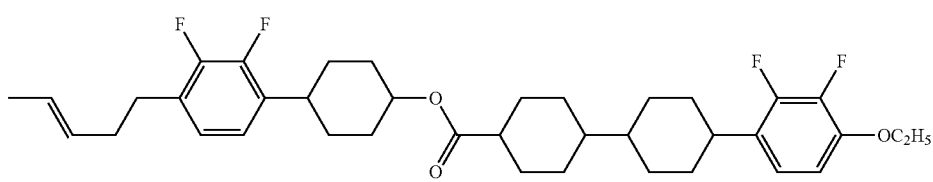 |
| 440 | 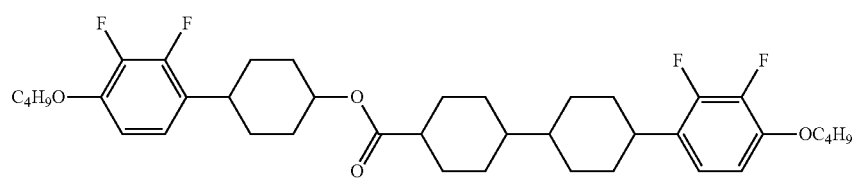 |
| 441 | 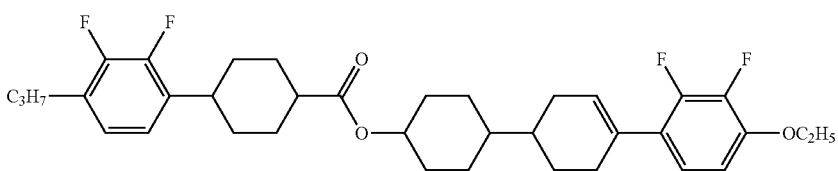 |
| 442 | 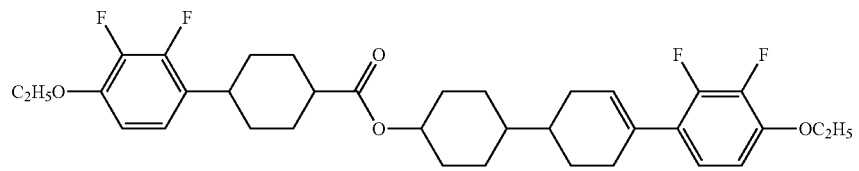 |
| 443 | 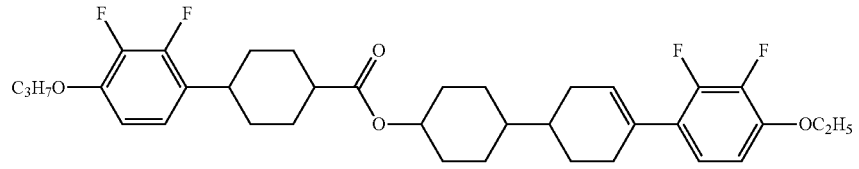 |
| 444 | 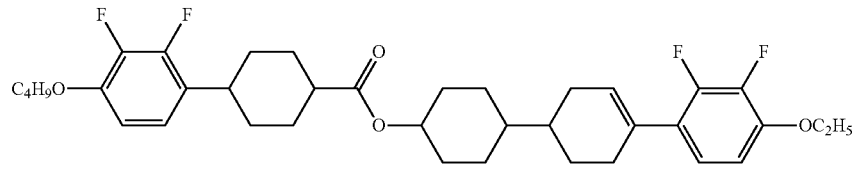 |

| No. |
|---|
| 445 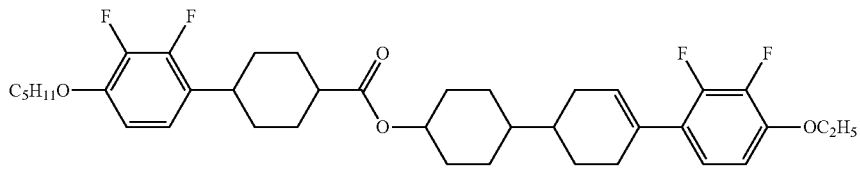 |
| 446 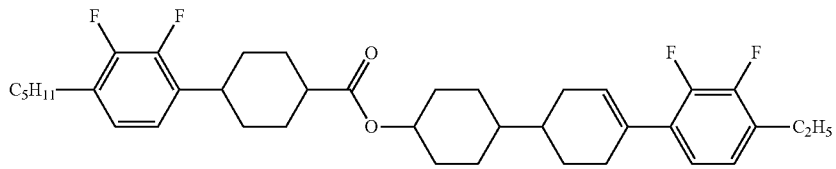 |
| 447 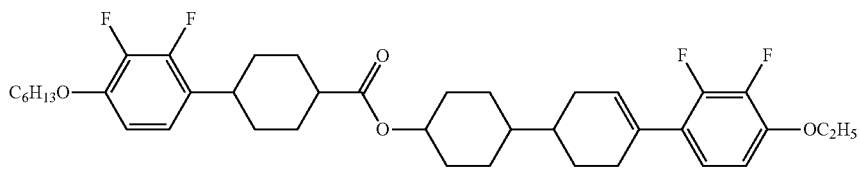 |
| 448 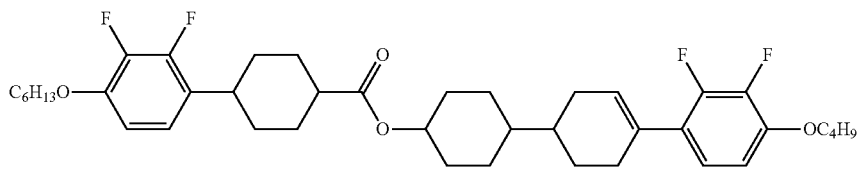 |
| 449 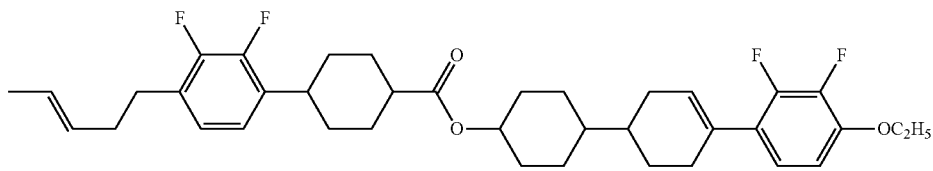 [SMILES: C/C=C/CCc1ccc(C2CCC(C(=O)OC3CCC(C4CC=C(c5ccc(OCC)c(F)c5F)CC4)CC3)CC2)c(F)c1F] |
| 450 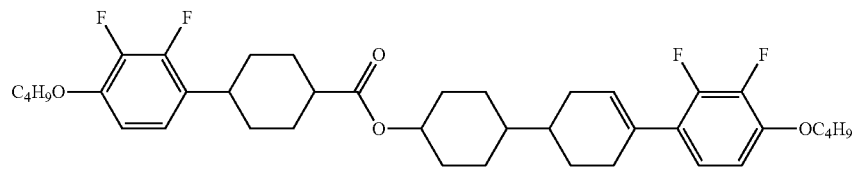 |
| 451 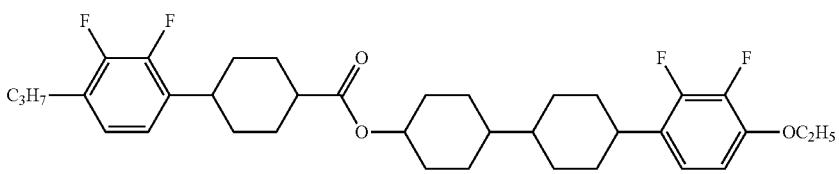 |
| 452 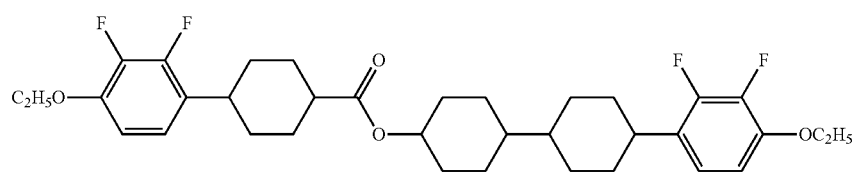 |
| 453 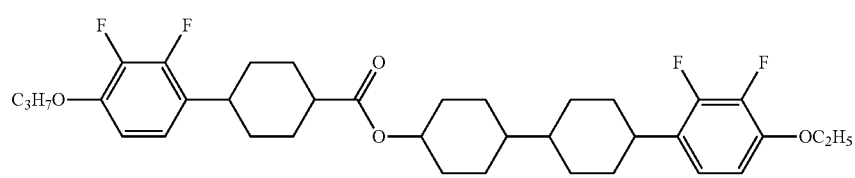 |

-continued
| No. | |
|---|---|
| 454 | 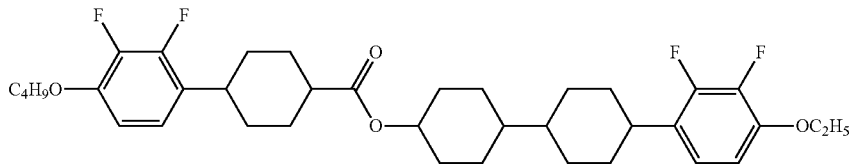 |
| 455 | 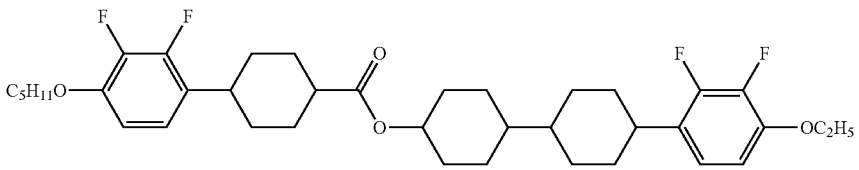 |
| 456 | 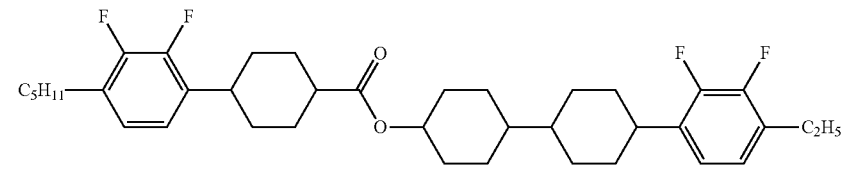 |
| 457 | 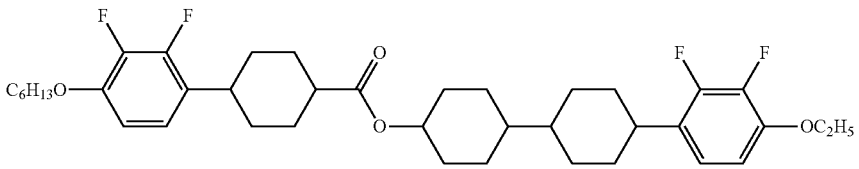 |
| 458 | 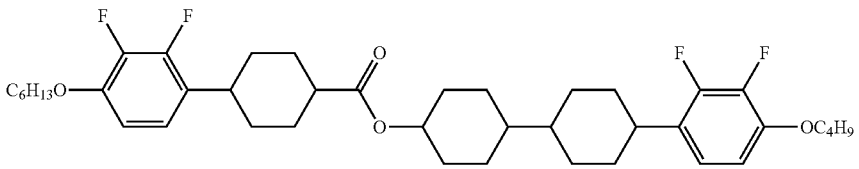<br>C 106.6 $S_C$ 258.9 $S_A$ 277.2 N 317.9 I<br>$T_{NI}$; 245.6° C., Δ ε; −8.35 Δ n; 0.141 |
| 459 | 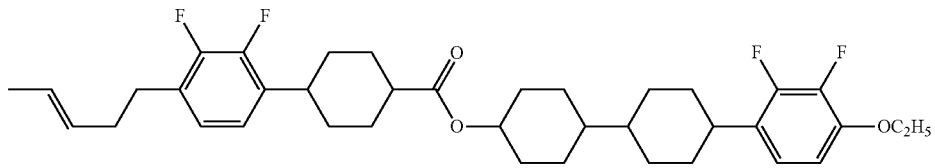 |
| 460 | 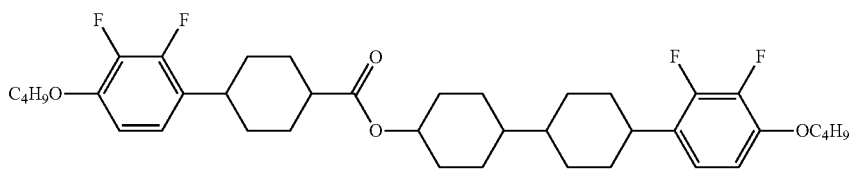 |

Comparative Example 1 trans-4-Pentyl-trans-4''-(2,3-difluoroethoxyphenyl)-1,1',4',1''-tercyclohexyl (C) was prepared as a compound for comparison

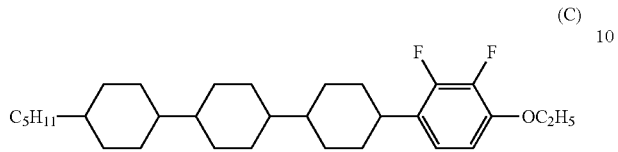

(C)

The chemical shift (δ, ppm) in $^1$H-NMR analysis was described below, and the compound obtained was identified as trans-4-pentyl-trans-4''-(2,3-difluoroethoxyphenyl)-1,1',4',1''-tercyclohexyl (C). The solvent for measurement was $CDCl_3$.

Chemical shift δ (ppm); 6.85 (td, 1H), 6.68 (td, 1H), 4.11 (q, 2H), 2.74 (tt, 1H), 1.93-1.82 (m, 4H), 1.82-1.68 (m, 8H), 1.48-1.37 (m, 4H) and 1.37-0.82 (m, 27H).

The transition temperature of the compound (C) was as follows.

Transition temperature: C 71.8 $S_B$ 298.2 N 330.7 I.

The liquid crystal composition (iv) consisting of the mother liquid crystals (i) (97% by weight) and the resulting trans-4-pentyl-trans-4''-(2,3-difluoroethoxyphenyl)-1,1',4',1''-tercyclohexyl (C) (3% by weight) was prepared. Physical properties of the liquid crystal composition (iv) were measured and the extrapolated values of physical properties of the comparative example compound (C) were calculated by extrapolating of the measured values. The values were as follows.

Optical anisotropy (Δn)=0.137.
Dielectric anisotropy (Δ∈)=−1.86.

The elastic constant $K_{33}$ of the liquid crystal composition (iv) was 11.31 pN.

Example 7

Physical Properties of the Compound (No. 218)

The liquid crystal composition (v) consisting of the mother liquid crystals (i) (95% by weight) and 1-butoxy-4-(trans-4-(trans-4-((trans-4-(2,3-difluoro-4-(hexyloxy)phenyl)cyclohexyl)methoxy)-2,3-difluorophenyl)cyclohexyl)-2,3-difluorobenzene (No. 218) (5% by weight) obtained in Example 2 was prepared. Physical properties of the liquid crystal composition (v) were measured and the extrapolated values of physical properties of the liquid crystal compound (No. 218) were calculated by extrapolating the measured values. The values were as follows.

Optical anisotropy (Δn)=0.153.
Dielectric anisotropy (Δ∈)=−6.23.

The elastic constant $K_{33}$ of the liquid crystal composition (v) was 16.04 pN.

From these results, it was found that the liquid crystal compound (No. 218) had a large optical anisotropy (Δn), a large negative dielectric anisotropy (Δ∈) and a large elastic constant $K_{33}$.

It was also found that the liquid crystal compound (No. 218) had a large optical anisotropy (Δn), a large negative dielectric anisotropy (Δ∈) and a large elastic constant $K_{33}$, in comparison with the comparative compound (C).

Comparative Example 2

4-Ethoxy-4'''-pentyl-2''',3''',2,3-tetrafluoro-1,1',4',1'',4'',1'''-quarterphenyl (G) that was similar to the compound (D) was prepared as a compound for comparison

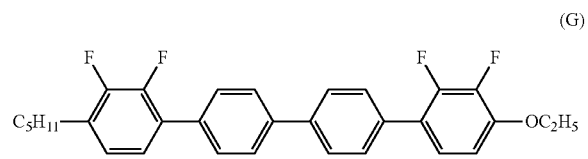

(G)

The chemical shift (δ, ppm) in $^1$H-NMR analysis was described below, and the compound obtained was identified as 4-ethoxy-4'''-pentyl-2''',3''',2,3-tetrafluoro-1,1',4',1'',4'',1'''-quarterphenyl (G). The solvent for measurement was $CDCl_3$.

Chemical shift δ (ppm); 7.50 (q, 4H), 7.14 (d, 2H), 7.09 (td, 1H), 6.92 (d, 1H), 6.78 (t, 1H), 4.17 (q, 2H), 2.42 (tt, 1H), 1.86 (m, 4H), 1.53-1.17 (m, 13H), 1.08-0.98 (m, 2H) and 0.89 (t, 3H).

The transition temperature of the compound (F) was as follows.

Transition temperature: C 149.8 N 306.7 I.

The liquid crystal composition (v) consisting of the mother liquid crystals (i) (95% by weight) and 4-ethoxy-4'''-pentyl-2''',3''',2,3-tetrafluoro-1,1',4',1'',4'',1'''-quarterphenyl (G) (5% by weight) was prepared. Physical properties of the liquid crystal composition (v) were measured and the extrapolated values of physical properties of the comparative compound (G) were calculated by extrapolating the measured values. The value was as follows.

Dielectric anisotropy (Δ∈=−6.05.

The elastic constant $K_{33}$ of the liquid crystal composition (v) was 15.78 pN.

Example 8

Physical Properties of the Compound (No. 48)

The liquid crystal composition (v) consisting of the mother liquid crystals (i) (85% by weight) and 1-butoxy-4-(4-(4-(4-(2,3-difluoro-4-hexyloxyphenyl)cyclohex-1-en yl)-2,3-difluorophenyl)cyclohex-1-enyl)-2,3-difluorobenzene (No. 48) (15% by weight) obtained in Example 3 was prepared. Physical properties of the liquid crystal composition (v) were measured and the extrapolated values of physical properties of the liquid crystal compound (No. 48) were calculated by extrapolating the measured values. The value was as follows.

Dielectric anisotropy (Δ∈=−8.24.

The elastic constant $K_{33}$ of the liquid crystal composition (v) was 16.47 pN.

From these results, it was found that the liquid crystal compound (No. 48) had a low melting point, a small viscosity (η) and a large negative dielectric anisotropy (Δ∈).

It was also found that the liquid crystal compound (No. 48) had a large negative dielectric anisotropy (Δ∈), a low melting

Comparative Example 3

4-Ethoxy-2,3,2",3"-tetrafluoro-4"-(2,3-difluoro-4-pentylphenylethyl)-1,1"-terphenyl (H) that was similar to the compound (E) was prepared as a compound for comparison

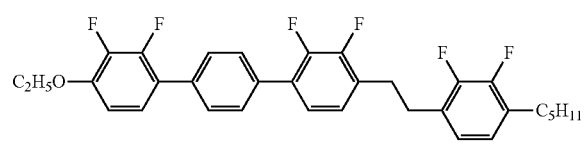

(H)

The chemical shift (δ, ppm) in $^1$H-NMR analysis was described below, and the compound obtained was identified as 4-ethoxy-2,3,2",3"-tetrafluoro-4"-(2,3-difluoro-4-pentylphenylethyl)-1,1"-terphenyl (H). The solvent for measurement was $CDCl_3$.

Chemical shift δ (ppm); 7.60 (m, 4H), 7.15 (m, 2H), 6.97 (m, 1H), 6.83 (m, 3H), 4.18 (q, 2H), 2.99 (m, 2H), 2.62 (t, 2H), 1.64-1.55 (m, 5H), 1.49 (t, 3H), 1.33 (m, 3H) and 0.90 (t, 3H).

The transition temperature of the compound (H) was as follows.

Transition temperature: C 136.5 N 201.0 I.

The liquid crystal composition (vi) consisting of the mother liquid crystals (i) (97% by weight) and 4-ethoxy-2,3,2",3"-tetrafluoro-4"-(2,3-difluoro-4-pentylphenylethyl)-1,1"-terphenyl (H) (3% by weight) was prepared. Physical properties of the liquid crystal composition (vi) were measured and the extrapolated values of physical properties of the comparative example compound (H) were calculated by extrapolating the measured values. The values were as follows.

Maximum temperature $(T_{NI})$=154.6° C.
Dielectric anisotropy (Δ∈)=−6.73
The elastic constant $K_{33}$ of the liquid crystal composition (vi) was 14.57 pN.

Example 9

Physical Properties of the Compound (No. 138)

The liquid crystal composition (vii) consisting of the mother liquid crystals (i) (85% by weight) and trans-4-((trans-4'-(4-butoxy-2,3-difluorophenyl)bicyclohexane)-4-yl)methoxy-2,2',3,3'-tetrafluoro-4'-hexyloxybiphenyl (No. 138) (15% by weight) obtained in Example 1 was prepared. Physical properties of the liquid crystal composition (vii) were measured and the extrapolated values of physical properties of the liquid crystal compound (No. 138) were calculated by extrapolating the measured values. The values were as follows.

Maximum temperature $(T_{NI})$=227.9° C.
Dielectric anisotropy (Δ∈)=−10.37.
The elastic constant $K_{33}$ of the liquid crystal composition (vii) was 17.03 pN.

From these results, it was found that the liquid crystal compound (No. 138) had a low melting point, a high maximum temperature $(T_{NI})$ and a large negative dielectric anisotropy (Δ∈).

It was also found that the liquid crystal compound (No. 138) had a high maximum temperature $(T_{NI})$, a large negative dielectric anisotropy (Δ∈), a low melting point (η) and a large elastic constant $K_{33}$, in comparison with the comparative compound (H).

Comparative Example 4

2,3-Difluoro-4-(trans-4'-propylbicyclohexane-trans-4-yl)phenyl trans-4'-pentylbicyclohexane)-trans-4-carboxylate (I) that was similar to the compound (F) was prepared as a compound for comparison

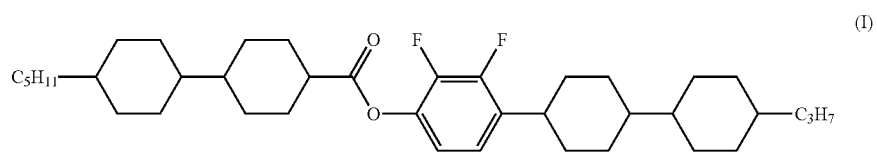

(I)

The chemical shift (δ, ppm) in $^1$H-NMR analysis was described below, and the compound obtained was identified as 2,3-difluoro-4-(trans-4'-propylbicyclohexane-trans-4-yl)phenyl trans-4'-pentylbicyclohexane)-trans-4-carboxylate (I). The solvent for measurement was $CDCl_3$.

Chemical shift δ (ppm); 6.93 (t, 1H), 6.80 (t, 1H), 2.78 (tt, 1H), 2.50 (tt, 1H), 2.16 (m, 2H), 1.93-1.81 (m, 6H), 1.81-1.68 (m, 8H), 1.59-1.49 (m, 2H), 1.48-1.36 (m, 2H), 1.35-0.93 (m, 26H) and 0.92-0.80 (m, 10H).

The transition temperature of the compound (1) was as follows.

Transition temperature: C 74.4 $S_G$ 146.3 $S_B$ 231.1 N>350 I.

The liquid crystal composition (vi) consisting of the mother liquid crystals (i) (95% by weight) and 2,3-difluoro-4-(trans-4'-propylbicyclohexane-trans-4-yl)phenyl trans-4'-pentylbicyclohexane)-trans-4-carboxylate (I) (5% by weight) was prepared. Physical properties of the liquid crystal composition (vi) were measured and the extrapolated values of physical properties of the comparative example compound (1) were calculated by extrapolating the measured values. The value was as follows.

Dielectric anisotropy (Δ∈=−2.92.
The elastic constant $K_{33}$ of the liquid crystal composition (vi) was 15.42 pN.

Example 10

Physical Properties of the Compound (No. 458)

The liquid crystal composition (vii) consisting of the mother liquid crystals (i) (90% by weight) and 4'-(4-butoxy-2,3-difluorophenyl)bicyclohexane-4-yl 4-(2,3-difluoro-4-hexyloxyphenyl)cyclohexylcarboxylate (No. 458) (10% by weight) obtained in Example 4 was prepared. Physical properties of the liquid crystal composition (vii) were measured and the extrapolated values of physical properties of the liquid crystal compound (No. 458) were calculated by extrapolating the measured values. The value was as follows.

Dielectric anisotropy ($\Delta\in$)=−8.35.

The elastic constant $K_{33}$ of the liquid crystal composition (vii) was 16.76 pN.

From these results, it was found that the liquid crystal compound (No. 458) had a large negative dielectric anisotropy ($\Delta\in$).

It was also found that the liquid crystal compound (No. 458) had a large negative dielectric anisotropy ($\Delta\in$) and a large elastic constant $K_{33}$, in comparison with the comparative compound (H).

Examples of the Composition

Hereinafter, the liquid crystal compositions obtained by means of the invention will be explained in detail by way of examples. Liquid crystal compounds used in the examples are expressed as symbols according to the notations in the Table below. In the Table, 1,4-cyclohexylene has a trans-configuration. The ratio (percentage) of each compound means a weight percentage (% by weight) based on the total weight of the composition, unless otherwise indicated. The values of characteristics of the composition obtained are shown in the last part of each example.

A number described next to the name of a liquid crystal compound in each example corresponds to that of the formula of the liquid crystal compound used for the first to third components of the invention described above. When only a "-" symbol is given instead of the number of a formula, it means another compound, which is different from that of the components.

The notations using symbols for compounds are shown below.

TABLE

| Method of Description of Compounds using Symbols<br>R—(A$_1$)—Z$_1$— ... —Z$_n$—(A$_n$)—R' | |
|---|---|
| 1) Left-Terminal Group R— | Symbol |
| $C_nH_{2n+1}$— | n- |
| $C_nH_{2n+1}O$— | nO— |
| $C_mH_{2m+1}OC_nH_{2n}$— | mOn- |
| $CH_2=CH$— | V— |
| $C_nH_{2n+1}$—CH=CH— | nV— |
| $CH_2=CH$—$C_nH_{2n}$— | Vn- |
| $C_mH_{2m+1}$—CH=CH—$C_nH_{2n}$— | mVn- |
| $CF_2=CH$— | VFF— |
| $CF_2=CH$—$C_nH_{2n}$— | VFFn- |
| 2) Right-Terminal Group —R' | Symbol |
| —$C_nH_{2n+1}$ | -n |
| —$OC_nH_{2n+1}$ | —On |
| —CH=CH$_2$ | —V |
| —CH=CH—$C_nH_{2n+1}$ | —Vn |
| —$C_nH_{2n}$—CH=CH$_2$ | -nV |
| —CH=CF$_2$ | —VFF |
| —COOCH$_3$ | —EMe |
| —CN | —C |
| —F | —F |
| —Cl | —CL |
| —OCF$_3$ | —OCF$_3$ |
| 3) Bonding Group —Zn— | Symbol |
| —$C_nH_{2n}$— | n |
| —COO— | E |
| —OCO— | e |
| —CH=CH— | V |
| —CH$_2$O— | 1O |
| —OCH$_2$— | O1 |
| —CF$_2$O— | X |
| —C≡C— | T |
| 4) Ring Structure —An— | Symbol |

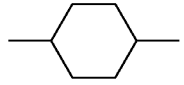

H

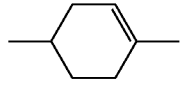

Ch

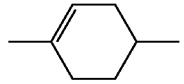

ch

TABLE-continued
Method of Description of Compounds using Symbols
R—(A₁)—Z₁— ... —Zₙ—(Aₙ)—R'
| | |
|---|---|
| 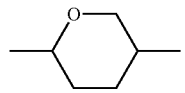 | Dh |
| 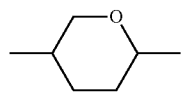 | dh |
| 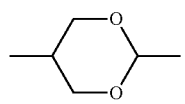 | G |
| 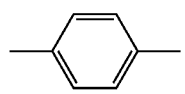 | B |
| 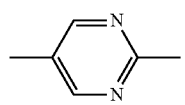 | Py |
| 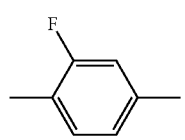 | B(2F) |
| 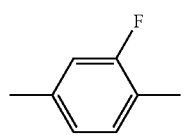 | B(F) |
| 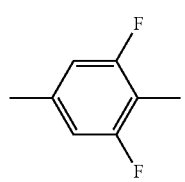 | B(F,F) |
| 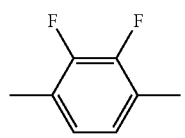 | B(2F,3F) |
| 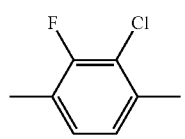 | B(2F,3CL) |
| 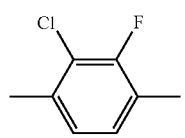 | B(2CL,3F) |

TABLE-continued

Method of Description of Compounds using Symbols
R—(A$_1$)—Z$_1$— ... —Z$_n$—(A$_n$)—R'

5) Examples of Description

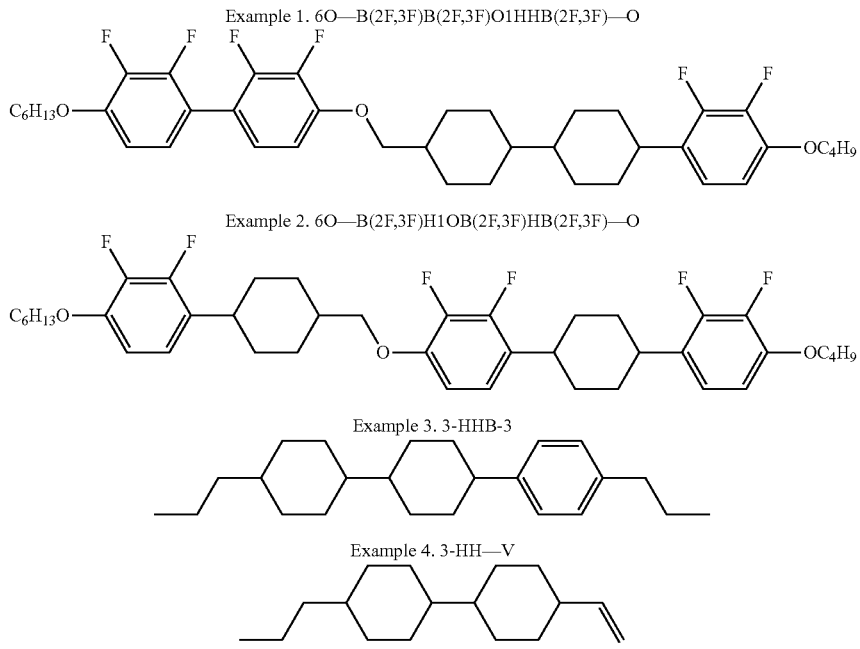

Example 1. 6O—B(2F,3F)B(2F,3F)O1HHB(2F,3F)—O

Example 2. 6O—B(2F,3F)H1OB(2F,3F)HB(2F,3F)—O

Example 3. 3-HHB-3

Example 4. 3-HH—V

Characteristics were measured according to the following methods. Most methods are described in the Standards of Electronic Industries Association of Japan, EIAJ•ED-2521 A or those with some modifications.

(1) Maximum Temperature of a Nematic Phase (NI; ° C.)

A sample was placed on a hot plate in a melting point apparatus equipped with a polarizing microscope and was heated at the rate of 1° C. per minute. The temperature was measured when part of the sample began to change from a nematic phase to an isotropic liquid. A higher limit of the temperature range of a nematic phase may be abbreviated to "the maximum temperature."

(2) Minimum Temperature of a Nematic Phase (Tc; ° C.)

A sample having a nematic phase was in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as ≦−20° C. A lower limit of the temperature range of a nematic phase may be abbreviated to "the minimum temperature."

(3) Optical Anisotropy (Δn; measured at 25° C.)

Measurement was carried out by use of an Abbe refractometer with a polarizing plate mounted on the ocular, using light at a wavelength of 589 nanometers. The surface of the main prism was rubbed in one direction, and then a sample was dropped on the main prism. A refractive index (ni∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥−n⊥.

(4) Viscosity (η; Measured at 20° C.; mPa·s)

An E-type viscometer was used for measurement.

(5) Dielectric Anisotropy (Δ∈s; Measured at 25° C.)

An ethanol (20 mL) solution of octadecyltriethoxysilane (0.16 mL) was applied to well-washed glass substrates. The glass substrates were rotated with a spinner, and then heated at 150° C. for 1 hour. A VA device in which the distance (cell gap) was 20 micrometers was assembled from the two glass substrates.

A polyimide alignment film was prepared on glass substrates in a similar manner. After a rubbing-treatment to the alignment film obtained on the glass substrates, a TN device in which the distance between the two glass substrates was 9 micrometers and the twist angle was 80 degrees was assembled.

A sample (a liquid crystal composition, or a mixture of a liquid crystal compound and mother liquid crystals) was put in the VA device obtained, a voltage of 0.5 V (1 kHz, sine waves) was applied to the sample, and then the dielectric constant (∈∥) in the major axis direction of the liquid crystal molecules was measured.

The sample (the liquid crystal composition, or the mixture of the liquid crystal compound and the mother liquid crystals) was put in the TN device obtained, a voltage of 0.5 V (1 kHz, sine waves) was applied to the sample, and then the dielectric constant (∈⊥) in the minor axis direction of the liquid crystal molecules was measured. The value of the dielectric anisotropy was calculated from the equation of Δ∈=∈∥−∈⊥. A composition in which this value is negative has negative dielectric anisotropy.

(6) Voltage Holding Ratio (VHR; Measured at 25° C. and 100° C.; %)

A TN device was prepared by putting a sample in a cell having a polyimide alignment film, where the distance between two glass substrates (cell gap) was 6 micrometers. The TN device was charged at 25° C. by applying pulse voltage (60 microseconds at 5V). The waveforms of the voltage applied to the TN device were observed with a cathode ray oscilloscope and the area between the voltage curve and the axis of abscissa in a unit period (16.7 milliseconds) was measured. An area was similarly measured based on the waveform of the applied voltage after the TN device had been removed. The value of the voltage holding ratio (%) was calculated from the equation: [voltage holding ratio]=[value of the area in the presence of a TN device]/[value of the area in the absence of a TN device]×100.

The voltage holding ratio thus obtained was referred to as "VHR-1." Then, the TN device was heated at 100° C. for 250 hours. After the TN device had been allowed to return to 25° C., the voltage holding ratio was measured by a method similar to that described above. The voltage holding ratio obtained after the heating test was referred to as "VHR-2." The heating test means an acceleration test and was used as a test corresponding to a long-term durability test for the TN device.

Example 11

| | | |
|---|---|---|
| 6O-B(2F,3F)B(2F,3F)O1HHB(2F,3F)-O4 | (No. 138) | 5% |
| 6O-B(2F,3F)H1OB(2F,3F)HB(2F,3F)-O4 | (No. 218) | 3% |
| 3-HH-O1 | (8-1) | 8% |
| 5-HH-O1 | (8-1) | 4% |
| 3-HH-4 | (8-1) | 5% |
| 3-HB(2F,3F)-O2 | (2-1) | 16% |
| 5-HB(2F,3F)-O2 | (2-1) | 21% |
| 2-HHB(2F,3F)-1 | (3-1) | 5% |
| 3-HHB(2F,3F)-1 | (3-1) | 7% |
| 3-HHB(2F,3F)-O2 | (3-1) | 14% |
| 5-HHB(2F,3F)-O2 | (3-1) | 12% |

NI = 66.5° C.;
Δn = 0.081;
η = 32.6 mPa · s;
Δε = −4.4.

Example 12

| | | |
|---|---|---|
| 6O-B(2F,3F)H1OB(2F,3F)HB(2F,3F)-O4 | (No. 218) | 3% |
| 6O-B(2F,3F)ChB(2F,3F)ChB(2F,3F)-O4 | (No. 48) | 3% |
| 3-HB-O1 | (8-5) | 15% |
| 3-HH-4 | (8-1) | 5% |
| 3-HB(2F,3F)-O2 | (2-1) | 12% |
| 5-HB(2F,3F)-O2 | (2-1) | 12% |
| 2-HHB(2F,3F)-1 | (3-1) | 12% |
| 3-HHB(2F,3F)-1 | (3-1) | 12% |
| 3-HHB(2F,3F)-O2 | (3-1) | 8% |
| 5-HHB(2F,3F)-O2 | (3-1) | 12% |
| 3-HHB-1 | (9-1) | 6% |

NI = 89.3° C.;
Δn = 0.094;
η = 41.9 mPa · s;
Δε = −3.5.

Example 13

| | | |
|---|---|---|
| 6O-B(2F,3F)ChB(2F,3F)ChB(2F,3F)-O4 | (No. 48) | 3% |
| 6O-B(2F,3F)HEHHB(2F,3F)-O4 | (No. 458) | 3% |
| 5-HB-O2 | (8-5) | 8% |
| 3-H2B(2F,3F)-O2 | (2-4) | 22% |
| 5-H2B(2F,3F)-O2 | (2-4) | 22% |
| 2-HHB(2F,3CL)-O2 | (3-12) | 2% |
| 3-HHB(2F,3CL)-O2 | (3-12) | 3% |
| 4-HHB(2F,3CL)-O2 | (3-12) | 2% |
| 5-HHB(2F,3CL)-O2 | (3-12) | 2% |
| 3-HBB(2F,3F)-O2 | (3-7) | 9% |
| 5-HBB(2F,3F)-O2 | (3-7) | 9% |
| V-HHB-1 | (9-1) | 6% |
| 3-HHB-3 | (9-1) | 6% |
| 3-HHEBH-5 | (10-6) | 3% |

NI = 91.5° C.;
Δn = 0.105;
η = 36.2 mPa · s;
Δε = −4.6.

Example 14

| | | |
|---|---|---|
| 6O-B(2F,3F)HEHHB(2F,3F)-O4 | (No. 458) | 3% |
| 6O-B(2F,3F)B(2F,3F)eHHB(2F,3F)-O4 | (No. 258) | 3% |
| 3-HB-O1 | (8-5) | 15% |
| 3-HH-4 | (8-1) | 5% |
| 3-HB(2F,3F)-O2 | (2-1) | 12% |
| 5-HB(2F,3F)-O2 | (2-1) | 12% |
| 2-HHB(2F,3F)-1 | (3-1) | 12% |
| 3-HHB(2F,3F)-1 | (3-1) | 12% |
| 3-HHB(2F,3F)-O2 | (3-1) | 10% |
| 5-HHB(2F,3F)-O2 | (3-1) | 10% |
| 6-HEB(2F,3F)-O2 | (2-6) | 6% |

NI = 86.5° C.;
Δn = 0.089;
η = 39.6 mPa · s;
Δε = −3.9.

A helical pitch was 61.8 μm when 0.25 part of the optically active compound (Op-05) was added to 100 parts of the composition just above.

Example 15

| | | |
|---|---|---|
| 6O-B(2F,3F)B(2F,3F)O1HHB(2F,3F)-O4 | (No. 138) | 3% |
| 6O-B(2F,3F)B(2F,3F)eHHB(2F,3F)-O4 | (No. 258) | 3% |
| 2-HH-5 | (8-1) | 3% |
| 3-HH-4 | (8-1) | 15% |
| 3-HH-5 | (8-1) | 4% |
| 3-HB-O2 | (8-5) | 12% |
| 3-H2B(2F,3F)-O2 | (2-4) | 15% |
| 5-H2B(2F,3F)-O2 | (2-4) | 15% |
| 3-HHB(2F,3CL)-O2 | (3-12) | 5% |
| 2-HBB(2F,3F)-O2 | (3-7) | 3% |
| 3-HBB(2F,3F)-O2 | (3-7) | 9% |
| 5-HBB(2F,3F)-O2 | (3-7) | 7% |
| 3-HHB-1 | (9-1) | 3% |
| 3-HHB-O1 | (9-1) | 3% |

NI = 80.5° C.;
Δn = 0.096;
η = 27.0 mPa · s;
Δε = −4.5.

Example 16

| | | |
|---|---|---|
| 6O-B(2F,3F)B(2F,3F)O1HHB(2F,3F)-O4 | (No. 138) | 5% |
| 6O-B(2F,3F)ChB(2F,3F)ChB(2F,3F)-O4 | (No. 48) | 3% |
| 3-HB-O1 | (8-5) | 15% |
| 3-HH-4 | (8-1) | 5% |
| 3-HB(2F,3F)-O2 | (2-1) | 12% |
| 5-HB(2F,3F)-O2 | (2-1) | 12% |
| 2-HHB(2F,3F)-1 | (3-1) | 12% |
| 3-HHB(2F,3F)-1 | (3-1) | 12% |
| 3-HHB(2F,3F)-O2 | (3-1) | 5% |

-continued

| | | |
|---|---|---|
| 5-HHB(2F,3F)-O2 | (3-1) | 13% |
| 3-HHB-1 | (9-1) | 6% |

NI = 91.5° C.;
Δn = 0.096;
η = 44.4 mPa · s;
Δε = −3.7.

Example 17

| | | |
|---|---|---|
| 6O-B(2F,3F)HEHB(2F,3F)B(2F,3F)-O2 | (No. 347) | 5% |
| 6O-B(2F,3F)HeHB(2F,3F)B(2F,3F)-O2 | (No. 297) | 3% |
| 3-HH-O1 | (8-1) | 8% |
| 5-HH-O1 | (8-1) | 4% |
| 3-HH-4 | (8-1) | 5% |
| 3-HB(2F,3F)-O2 | (2-1) | 7% |
| 5-HB(2F,3F)-O2 | (2-1) | 21% |
| 3-HHB(2F,3F)-1 | (3-1) | 7% |
| 3-HHB(2F,3F)-O2 | (3-1) | 10% |
| 5-HHB(2F,3F)-O2 | (3-1) | 20% |
| 2-BB(2F,3F)B-3 | (4-1) | 5% |
| 2-BB(2F,3F)B-4 | (4-1) | 5% |

NI = 78.9° C.;
Δn = 0.099;
η = 32.9 mPa · s;
Δε = −4.1.

INDUSTRIAL APPLICABILITY

The liquid crystal compound of the invention has a high stability to heat, light and so forth, a wide temperature range of a nematic phase, a small viscosity, a large optical anisotropy and a suitable elastic constant $K_{33}$, and further has a large negative dielectric anisotropy and an excellent compatibility with other liquid crystal compounds. The liquid crystal composition of the invention has a small viscosity, a large optical anisotropy, a suitable elastic constant $K_{33}$, a large negative dielectric anisotropy and a low threshold voltage, and further has a high maximum temperature of a nematic phase and a low minimum temperature of a nematic phase. The liquid crystal display device of the invention can be widely used for displays of watches, calculators, word processors and so forth, since it contains this liquid crystal composition and has a short response time, low electric power consumption, a low driving voltage, a large contrast ratio and a wide temperature range in which the device can be used.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A compound represented by formula (1):

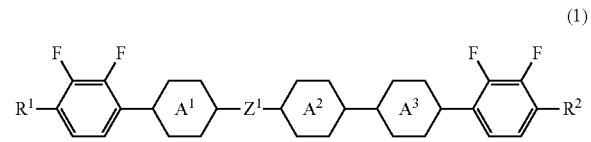

wherein $R^1$ and $R^2$ are each independently hydrogen, alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^1$, the ring $A^2$ and the ring $A^3$ are each independently 1,4-cyclohexylene, 1,4-cyclohexenylene, 1,4-phenylene or 2,3-difluoro-1,4-phenylene; when one of the ring $A^1$, the ring $A^2$ and the ring $A^3$ is 1,4-phenylene or 2,3-difluoro-1,4-phenylene, the other two are 1,4-cyclohexylene or 1,4-cyclohexenylene; and $Z^1$ is a single bond, —(CH$_2$)$_2$—, —CH$_2$O—, —OCH$_2$—, —COO— or —OCO—.

2. The compound according to claim 1, wherein the compound is represented by any one of formulas (1-1) to (1-3):

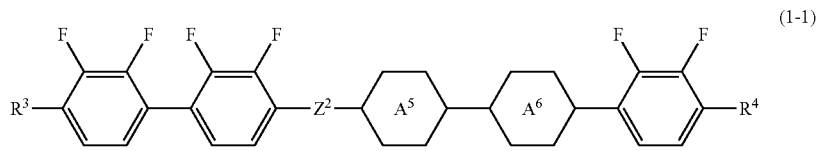

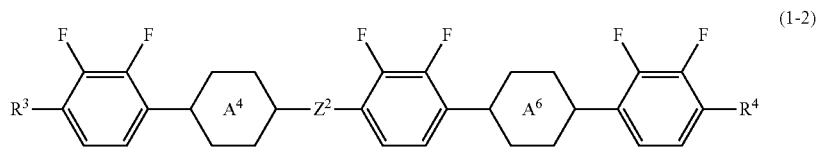

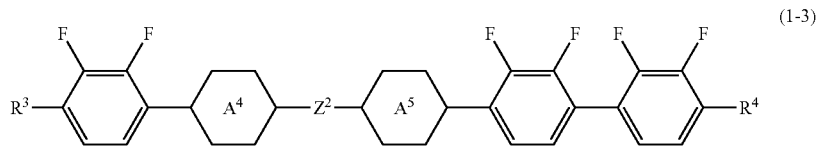

wherein $R^3$ and $R^4$ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; the ring $A^4$, the ring $A^5$ and the ring $A^6$ are each independently 1,4-cyclohexylene or 1,4-cyclohexenylene; and $Z^2$ is a single bond, —(CH$_2$)$_2$—, —CH$_2$O—, —OCH$_2$—, —COO— or —OCO—.

3. The compound according to claim 1, wherein the compound is represented by any one of formulas (1-1-1) to (1-3-1):

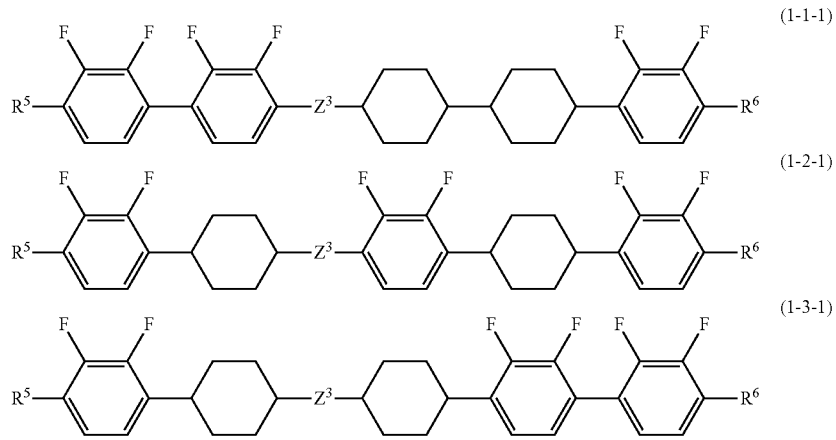

wherein R⁵ and R⁶ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and Z³ is a single bond, —(CH₂)₂—, —CH₂O—, —OCH₂—, —COO— or —OCO—.

4. The compound according to claim 1, wherein the compound is represented by formula (1-4):

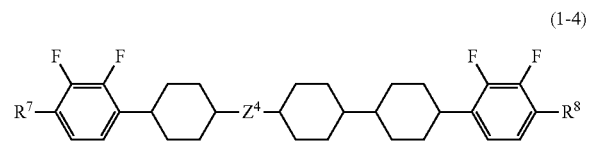

wherein R⁷ and R⁸ are each independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; and Z⁴ is a single bond, —(CH₂)₂—, —CH₂O—, —OCH₂—, —COO— or —OCO—.

5. The compound according to claim 3, wherein Z³ is —(CH₂)₂— in formulas (1-1-1) to (1-3-1).

6. The compound according to claim 3, wherein Z³ is —CH₂O— or —OCH₂— in formulas (1-1-1) to (1-3-1).

7. The compound according to claim 3, wherein Z³ is —COO— or —OCO— in formulas (1-1-1) to (1-3-1).

8. The compound according to claim 4, wherein Z⁴ is —COO— or —OCO— in formula (1-4).

9. A liquid crystal composition that comprises at least one compound according to claim 1.

10. The liquid crystal composition according claim 9, further comprising at least one compound selected from the group of compounds represented by formulas (2), (3), (4), (5), (6) and (7):

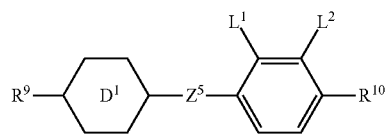
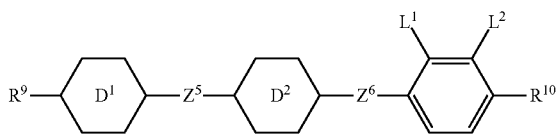
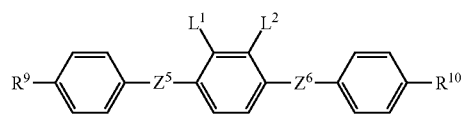
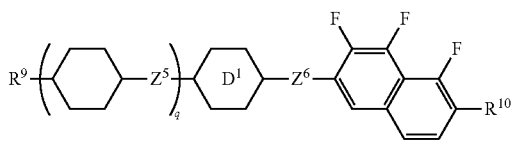
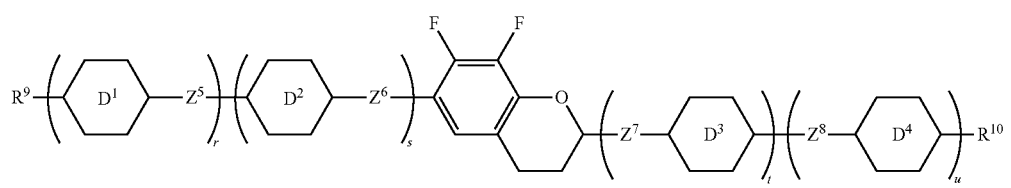

(7)

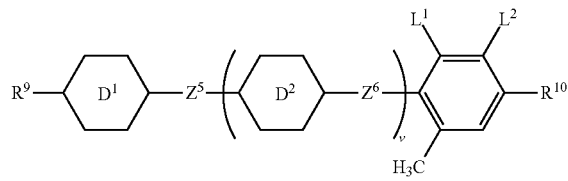

wherein $R^9$ and $R^{10}$ are each independently alkyl having 1 to 10 carbons or alkenyl having 2 to 10 carbons, and in the alkyl and alkenyl, arbitrary hydrogen may be replaced by fluorine and arbitrary —$CH_2$— may be replaced by —O—; the ring $D^1$, the ring $D^2$, the ring $D^3$ and the ring $D^4$ are each independently 1,4-cyclohexylene, 1,4-cyclohexenylene, 1,4-phenylene in which arbitrary hydrogen may be replaced by fluorine, tetrahydropyran-2,5-diyl or decahydro-2,6-naphthalene; $Z^5$, $Z^6$, $Z^7$ and $Z^8$ are each independently —$(CH_2)_2$—, —COO—, —$CH_2O$—, —$OCF_2$—, —$OCF_2(CH_2)_2$— or a single bond; $L^1$ and $L^2$ are each independently fluorine or chlorine; and q, r, s, t, u and v are each independently 0 or 1, and the sum of r, s, t and u is 1 or 2.

11. The liquid crystal composition according claim 9, further comprising at least one compound selected from the group of compounds represented by formulas (8), (9) and (10):

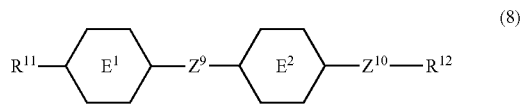
(8)

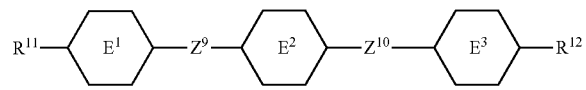
(9)

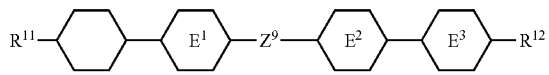
(10)

wherein $R^{11}$ and $R^{12}$ are each independently alkyl having 1 to 10 carbons or alkenyl having 2 to 10 carbons, and in the alkyl and alkenyl, arbitrary —$CH_2$— may be replaced by —O—; the ring $E^1$, the ring $E^2$ and the ring $E^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^9$ and $Z^{10}$ are each independently —C≡C—, —COO—, —$(CH_2)_2$—, —CH═CH— or a single bond.

12. The liquid crystal composition according claim 10, further comprising at least one compound selected from the group of compounds represented by formulas (8), (9) and (10) described in claim 11.

13. The liquid crystal composition according to claim 9, further comprising at least one optically active compound and/or at least one polymerizable compound.

14. The liquid crystal composition according to claim 9, further comprising at least one antioxidant and/or at least one ultraviolet light absorbent.

15. A liquid crystal display device containing the liquid crystal composition according to claim 9.

\* \* \* \* \*